United States Patent
Sakakibara et al.

(10) Patent No.: US 7,423,666 B2
(45) Date of Patent: Sep. 9, 2008

(54) IMAGE PICKUP SYSTEM EMPLOYING A THREE-DIMENSIONAL REFERENCE OBJECT

(75) Inventors: Kuniteru Sakakibara, Nishinomiya (JP); Eiro Fujii, Takatsuki (JP); Koji Fujiwara, Mishima-Gun (JP)

(73) Assignee: Minolta Co., Ltd., Osaka-shi (JP)

( * ) Notice: Subject to any disclaimer, the term of this patent is extended or adjusted under 35 U.S.C. 154(b) by 785 days.

(21) Appl. No.: 10/151,184

(22) Filed: May 20, 2002

(65) Prior Publication Data

US 2002/0175994 A1 Nov. 28, 2002

(30) Foreign Application Priority Data

| May 25, 2001 | (JP) | ............................ 2001-157822 |
| Jul. 4, 2001 | (JP) | ............................ 2001-203375 |
| Jul. 4, 2001 | (JP) | ............................ 2001-203470 |
| Jul. 5, 2001 | (JP) | ............................ 2001-204720 |
| Jul. 6, 2001 | (JP) | ............................ 2001-206822 |
| Jul. 6, 2001 | (JP) | ............................ 2001-206823 |
| Jul. 6, 2001 | (JP) | ............................ 2001-206824 |

(51) Int. Cl.
H04N 7/18 (2006.01)
H04N 9/47 (2006.01)
H04N 13/02 (2006.01)
H04N 15/00 (2006.01)
H04N 5/225 (2006.01)
G06T 17/00 (2006.01)

(52) U.S. Cl. ...................... 348/136; 348/47; 348/218.1; 345/420

(58) Field of Classification Search ................... 348/47, 348/48, 136, 137, 139, 142, 218.1; 345/419, 345/420, 424, 427; 382/154
See application file for complete search history.

(56) References Cited

U.S. PATENT DOCUMENTS 5,473,364 A * 12/1995 Burt ............................ 348/47

(Continued)

FOREIGN PATENT DOCUMENTS

JP 61-277010 (A) 12/1986

(Continued)

OTHER PUBLICATIONS

Akira Takahashi, Ikuo Ishii, Hideo Makino, and Makoto Nakashizuka, "A Measuring Method of Marker Position/Orientation for VR Interface by Monocular Image Processing", *Electronic Information Report Journal AJ79*, pp. 804-811, 1996.

(Continued)

Primary Examiner—Justin P Misleh
(74) Attorney, Agent, or Firm—Sidley Austin LLP

(57) ABSTRACT

The present invention provides a three-dimensional chart, a parameter acquiring method and an information processing device that are used for carrying out camera calibration in a wide range with high precision. For this reason, a plurality of unit graphic forms the sizes of which are coded by using different cross-ratios are placed on side faces of a three-dimensional chart. The cross-ratios of unit graphic forms are calculated from a picked-up image of the three-dimensional chart, and by collating these with actual values, the position and orientation of the image-pickup point are determined. The shifting average of the heights of the unit graphic forms is made approximately proportional to the distance from the apex so that it is possible to reduce the limitation of image-pickup distances. A movable camera is attached to a subject-use camera, and upon picking up an image of the subject, an image of the three-dimensional chart is also picked up simultaneously. Based upon the position and orientation of the movable camera found out by the above-mentioned sequence of image-pickup processes and the relative position and orientation between the two cameras that have been preliminarily found, it is possible to determine the position and orientation of the subject-use camera.

7 Claims, 84 Drawing Sheets

U.S. PATENT DOCUMENTS

| | | | |
|---|---|---|---|
| 5,995,649 A * | 11/1999 | Marugame | 382/154 |
| 6,038,074 A * | 3/2000 | Kitaguchi et al. | 359/618 |
| 6,256,036 B1 * | 7/2001 | Matsumoto | 345/419 |
| 6,356,272 B1 * | 3/2002 | Matsumoto et al. | 345/582 |
| 6,359,647 B1 * | 3/2002 | Sengupta et al. | 348/154 |
| 6,363,169 B1 * | 3/2002 | Ritter et al. | 382/154 |
| 6,404,455 B1 * | 6/2002 | Ito et al. | 348/169 |
| 6,445,814 B2 * | 9/2002 | Iijima et al. | 382/154 |
| 6,514,081 B1 * | 2/2003 | Mengoli | 434/252 |
| 6,594,600 B1 * | 7/2003 | Arnoul et al. | 702/94 |
| 6,621,921 B1 * | 9/2003 | Matsugu et al. | 382/154 |
| 6,937,235 B2 * | 8/2005 | Fujiwara et al. | 345/420 |
| 6,965,690 B2 * | 11/2005 | Matsumoto | 382/154 |
| 6,980,690 B1 * | 12/2005 | Taylor et al. | 382/154 |

FOREIGN PATENT DOCUMENTS

| | | |
|---|---|---|
| JP | 06-080403 (B2) | 10/1994 |
| JP | 11-018000 (A) | 1/1999 |
| JP | 11-041504 (A) | 2/1999 |
| JP | 2000-270343 (A) | 9/2000 |

OTHER PUBLICATIONS

W. Niem, "*Robust and Fast Modelling of 3D Natural Objects From Multiple Views*", SPIE Proceedings Image and Video Proceeding II, vol. 2182, 1994, pp. 388-397.

L. Quan and Z. Lan, "Linear N-Point Camera Pose Determination", IEEE Trans. PAMI 21(8), 1999, pp. 774-780.

\* cited by examiner

F I G. 4
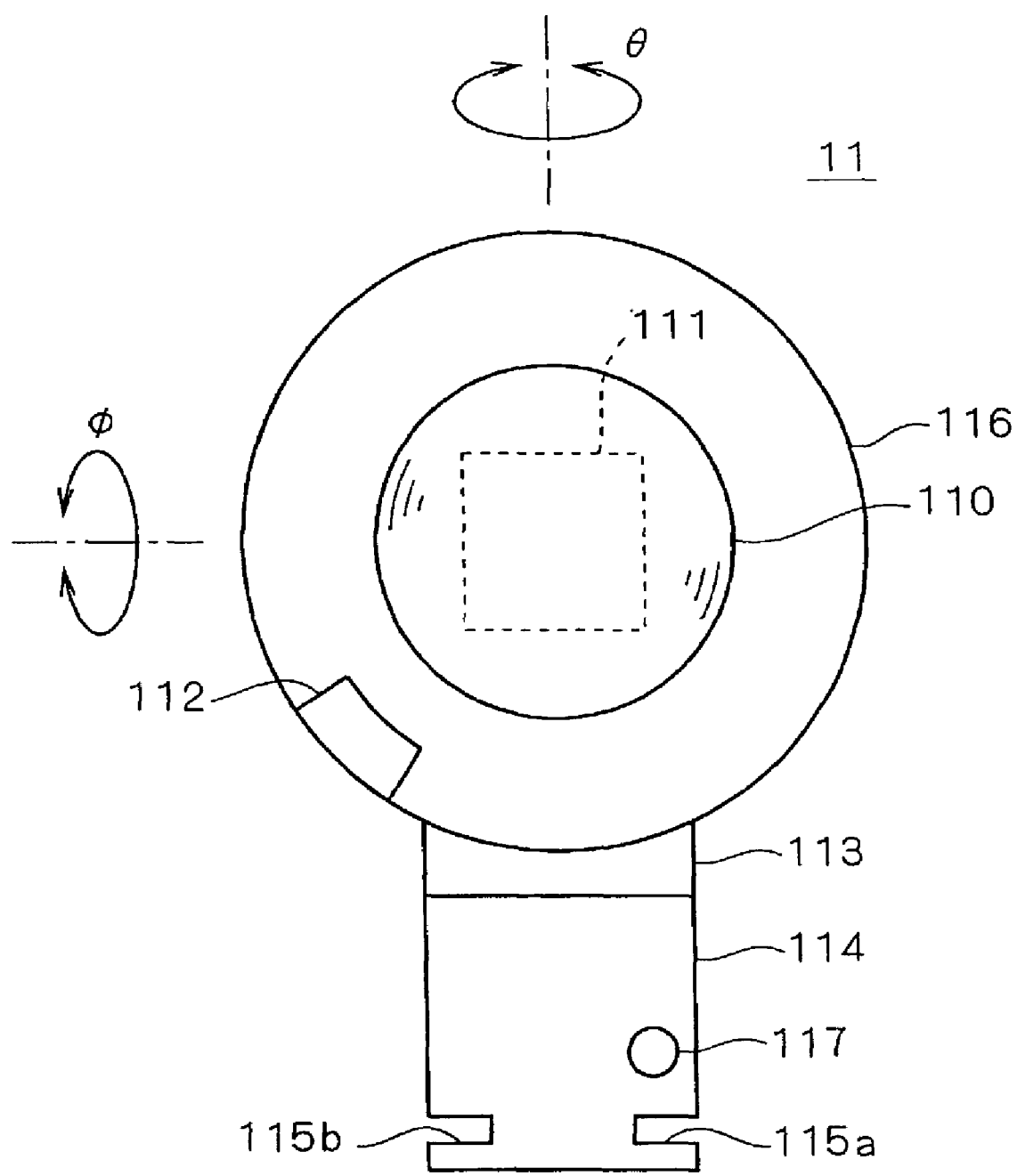

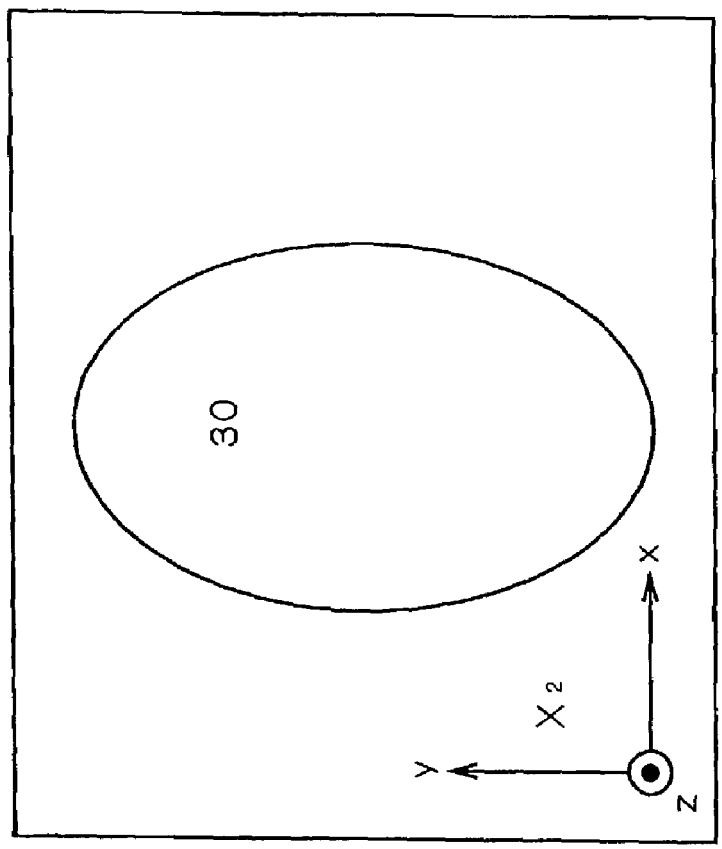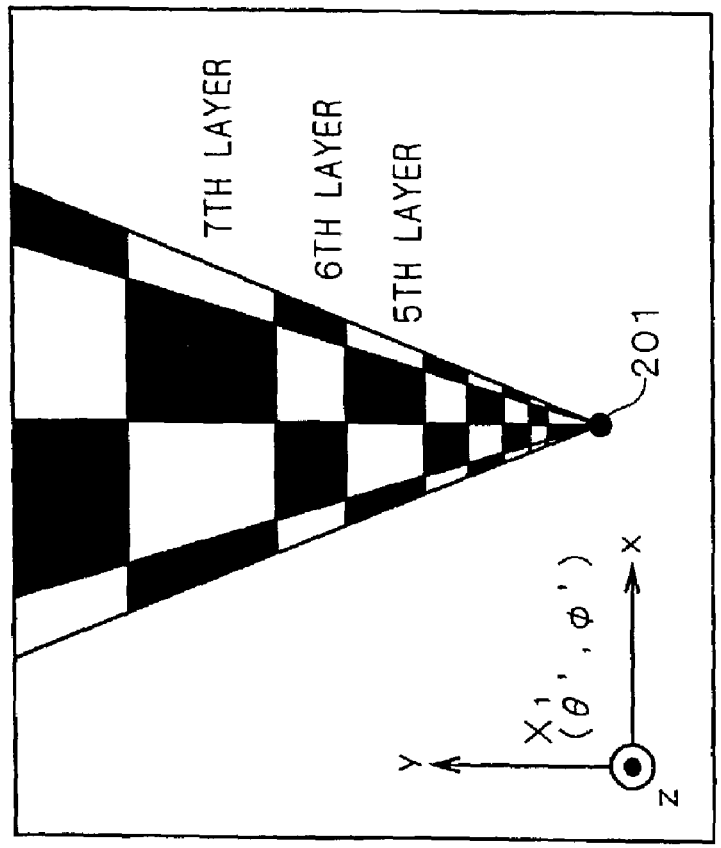
FIG. 15A
FIG. 15B

FIG. 19

| LAYER | POSITION | CROSS RATIO | WIDTH DISTANCE RATIO |
|---|---|---|---|
| 1 | 17.000 | 0.278 | 0.278 |
| 2 | 22.500 | 0.241 | 0.318 |
| 3 | 31.000 | 0.271 | 0.313 |
| 4 | 42.500 | 0.178 | 0.300 |
| 5 | 57.500 | 0.363 | 0.357 |
| 6 | 82.500 | 0.130 | 0.240 |
| 7 | 105.000 | 0.432 | 0.385 |
| 8 | 155.000 | 0.084 | 0.209 |
| 9 | 191.250 |  | 0.435 |
| 10 | 297.500 |  | 0.162 |
| 11 | 350.000 |  |  |

POSITION OF I-TH LAYER $$\overline{X_0 X_i}$$

CROSS RATIO OF I-TH LAYER $$\frac{\overline{X_i X_{i+1}} * \overline{X_{i+2} X_{i+3}}}{(\overline{X_i X_{i+1}} + \overline{X_{i+1} X_{i+2}}) * (\overline{X_{i+1} X_{i+2}} + \overline{X_{i+2} X_{i+3}})}$$

WIDTH DISTANCE RATIO OF I-TH LAYER $$\frac{\overline{X_i X_{i+1}}}{(\overline{X_0 X_i} + \overline{X_0 X_2})/2}$$

FIG. 21

| | a | b | c | d | CROSS RATIO 1 | CROSS RATIO 2 |
|---|---|---|---|---|---|---|
| SIDE FACE 1 | 50 | 150 | 150 | 50 | 0.125 | 0.125 |
| SIDE FACE 2 | 70 | 130 | 130 | 70 | 0.175 | 0.175 |
| SIDE FACE 3 | 90 | 110 | 110 | 90 | 0.225 | 0.225 |
| SIDE FACE 4 | 110 | 90 | 90 | 110 | 0.275 | 0.275 |
| SIDE FACE 5 | 130 | 70 | 70 | 130 | 0.325 | 0.325 |
| SIDE FACE 6 | 150 | 50 | 50 | 150 | 0.375 | 0.375 |

$a = \overline{y_0 y_1}$
$b = \overline{y_1 y_2}$
$c = \overline{y_2 y_3}$
$d = \overline{y_3 y_4}$ $$\text{CROSS RATIO 1} = \frac{a*c}{(a+b)*(b+c)}$$

$$\text{CROSS RATIO 2} = \frac{b*d}{(b+c)*(c+d)}$$

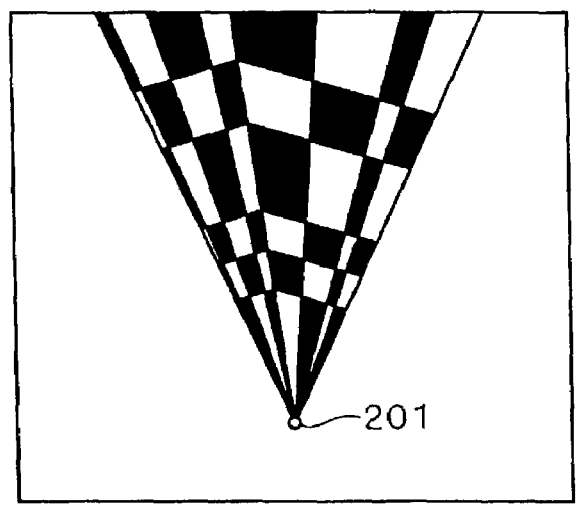
F I G . 2 3 A
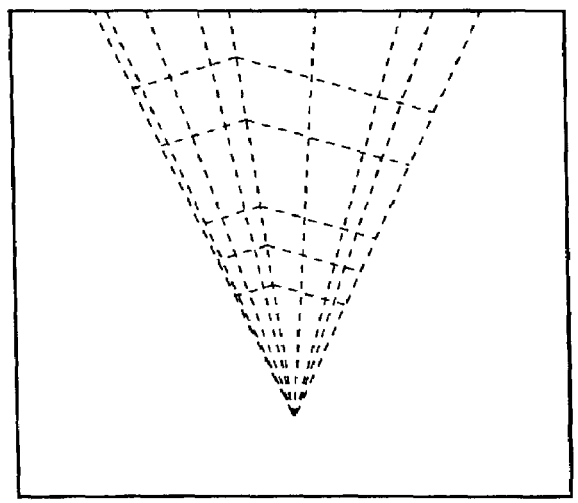
F I G . 2 3 B
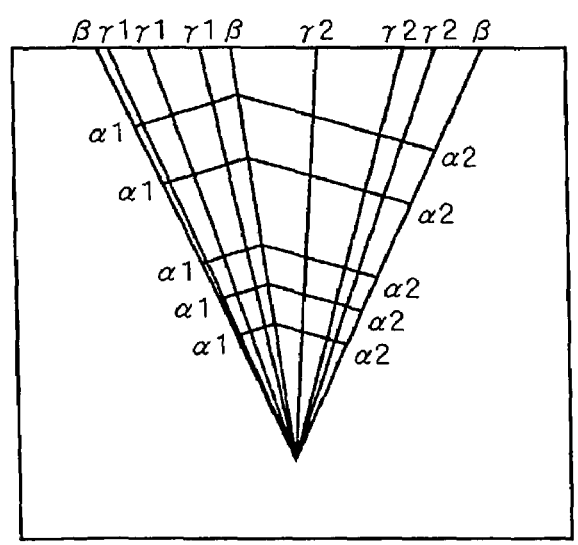
F I G . 2 3 C

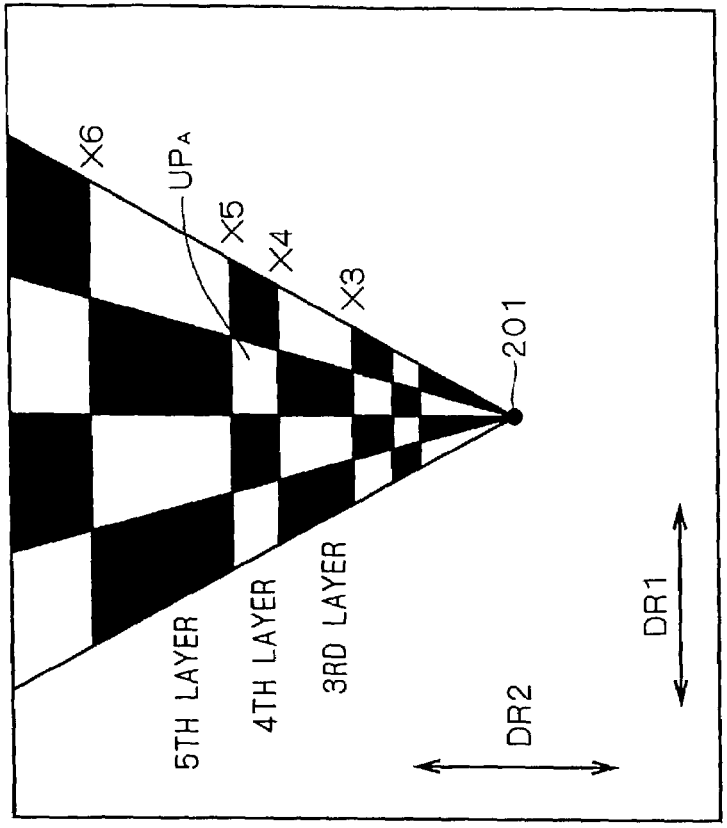
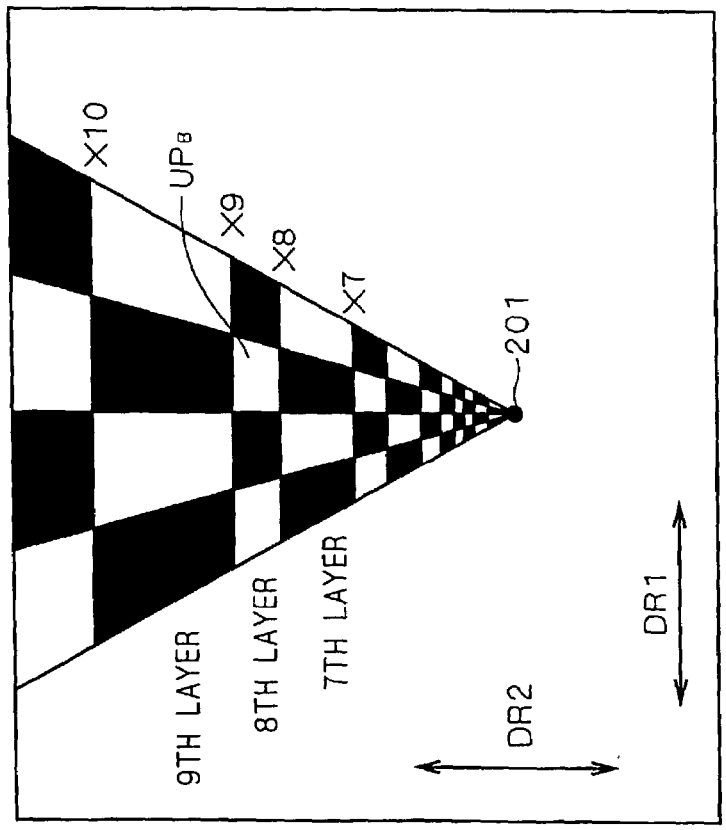
FIG. 24A PICKED-UP IMAGE FROM LONG DISTANCE
FIG. 24B PICKED-UP IMAGE FROM SHORT DISTANCE F I G . 3 5
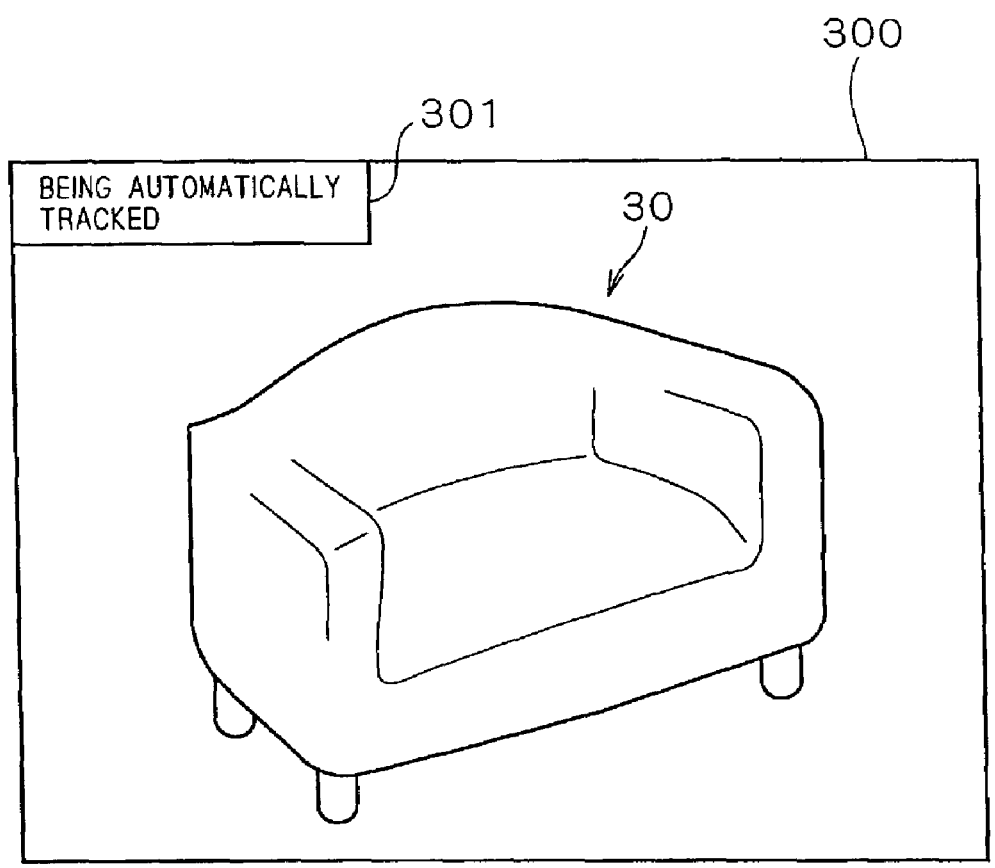

F I G. 6 1
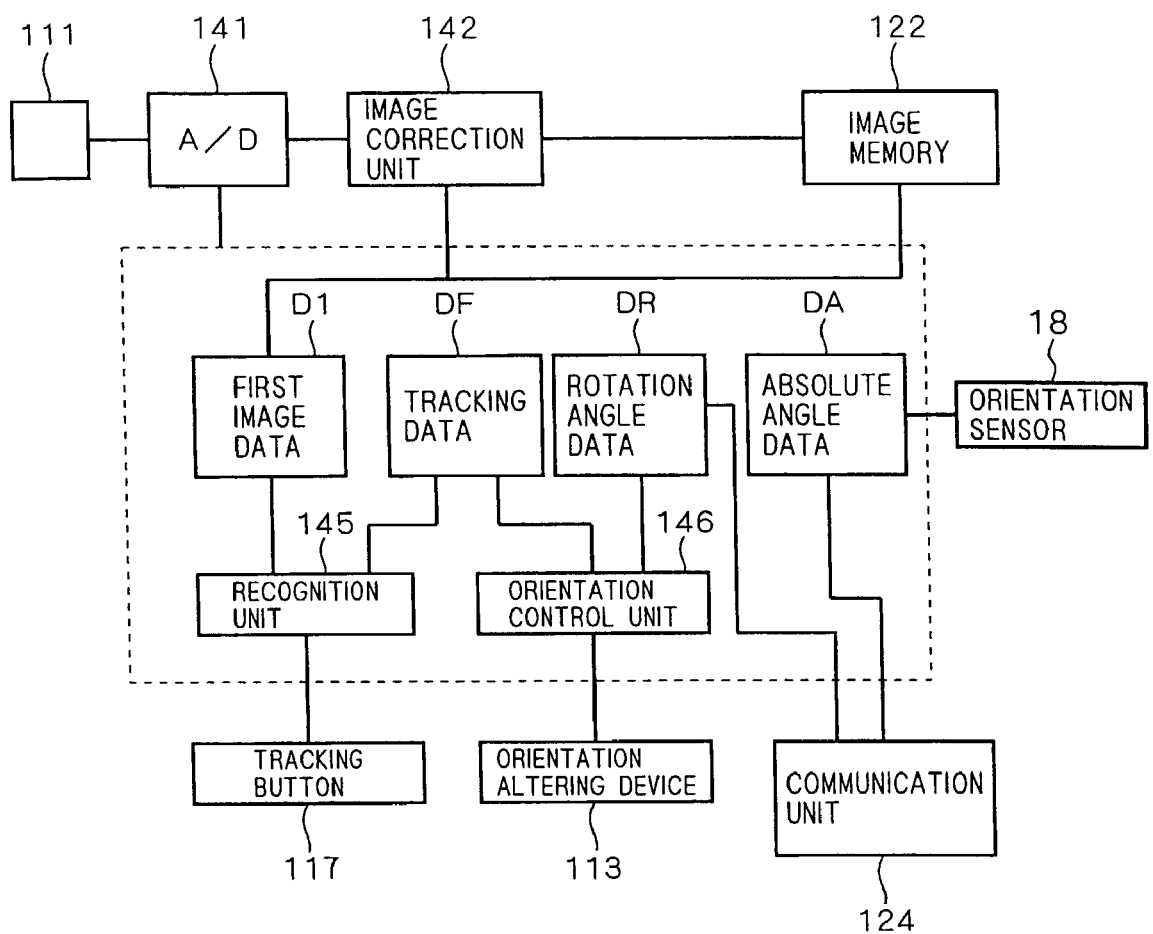

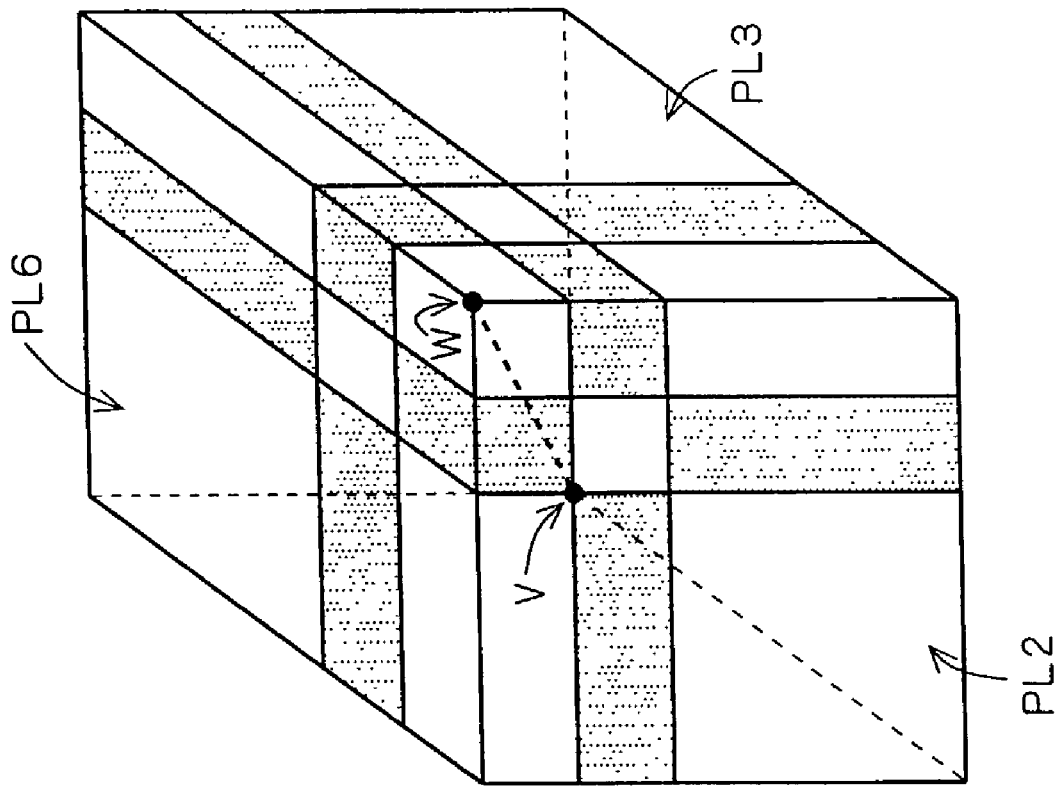
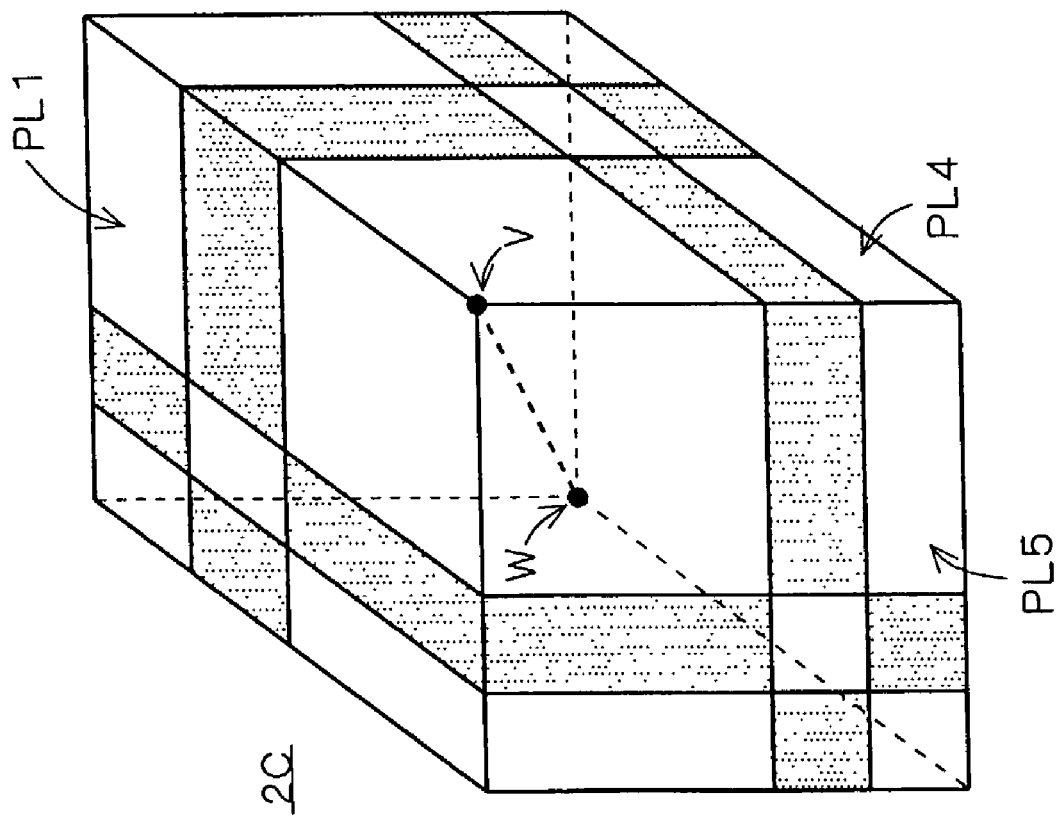

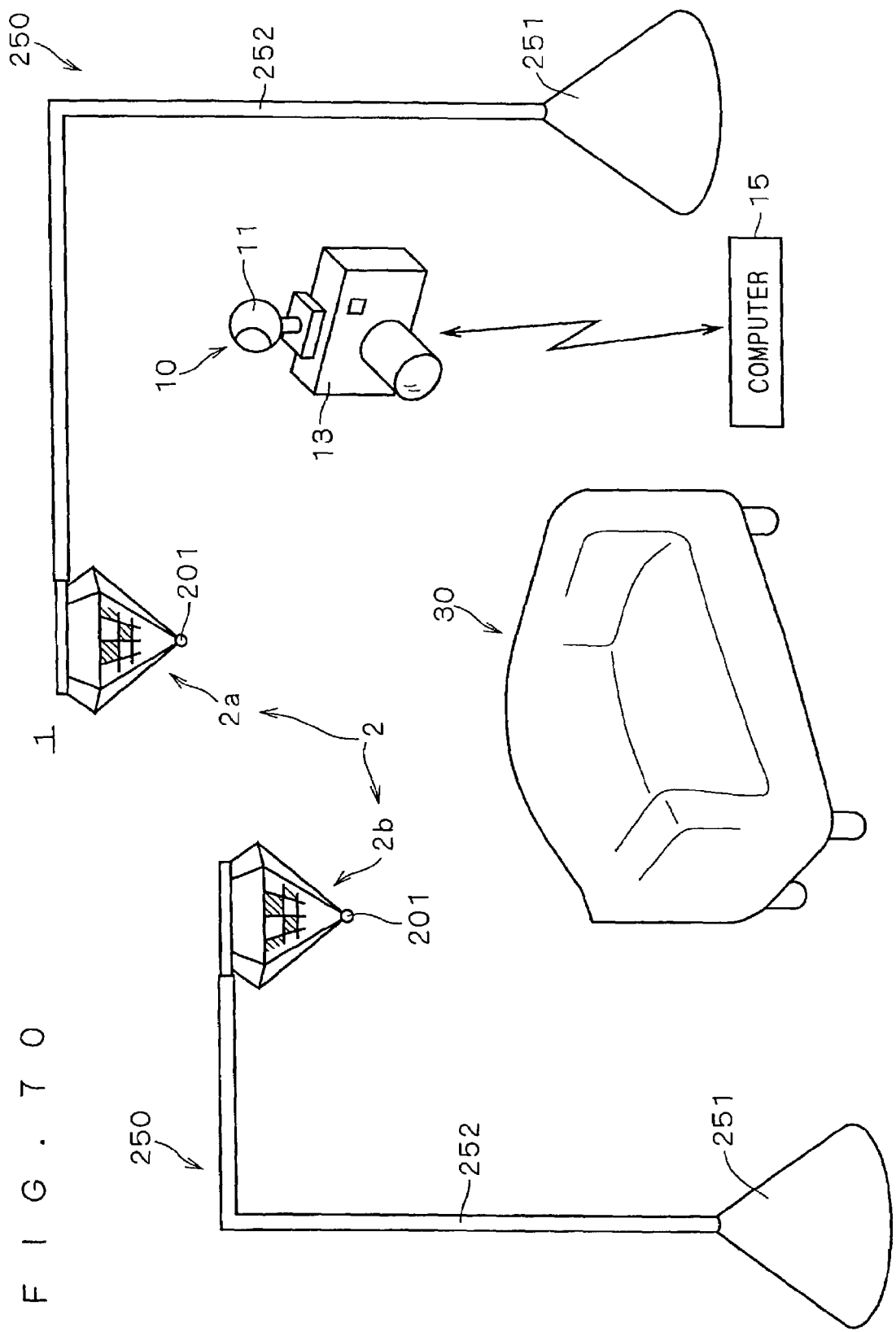

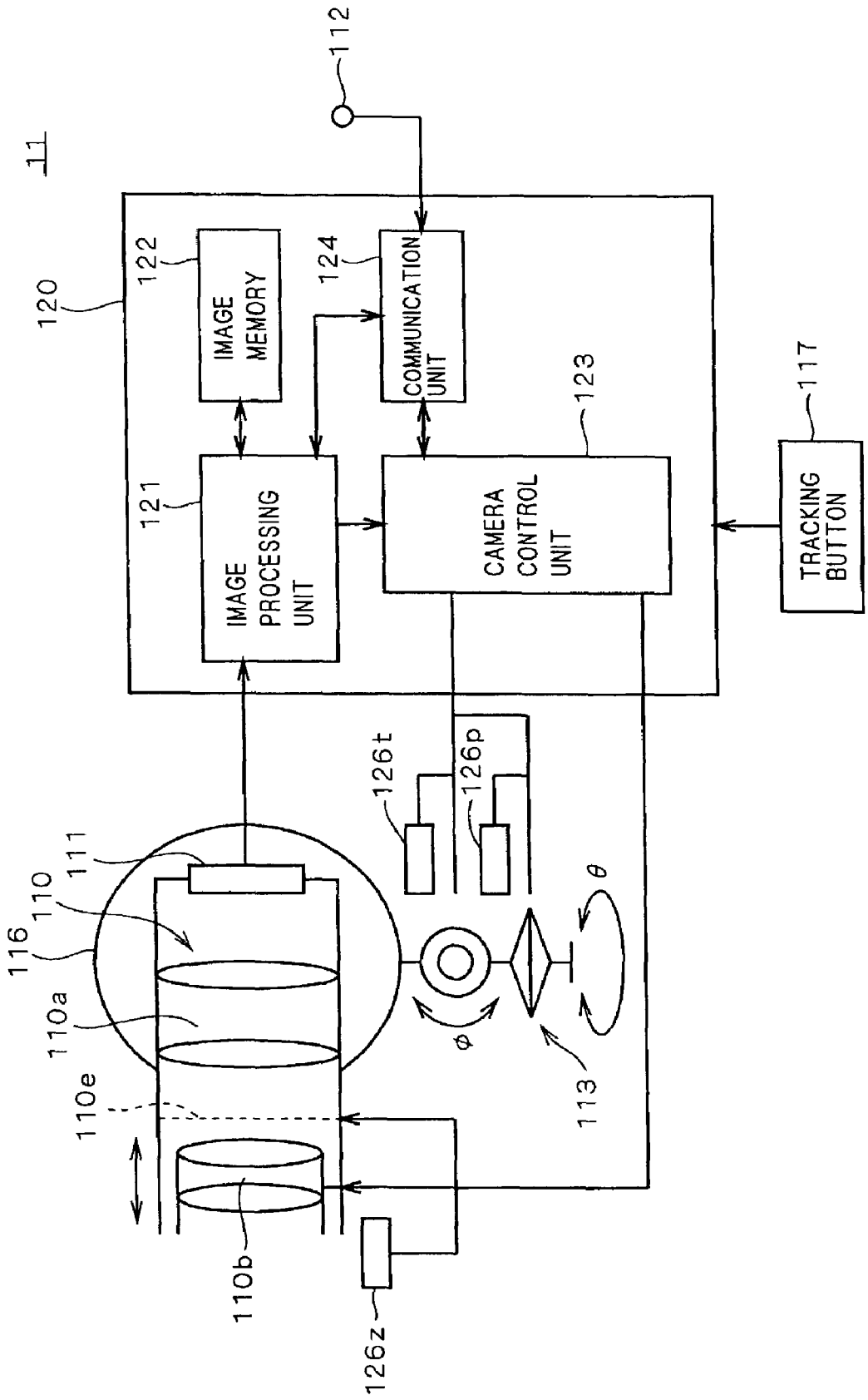

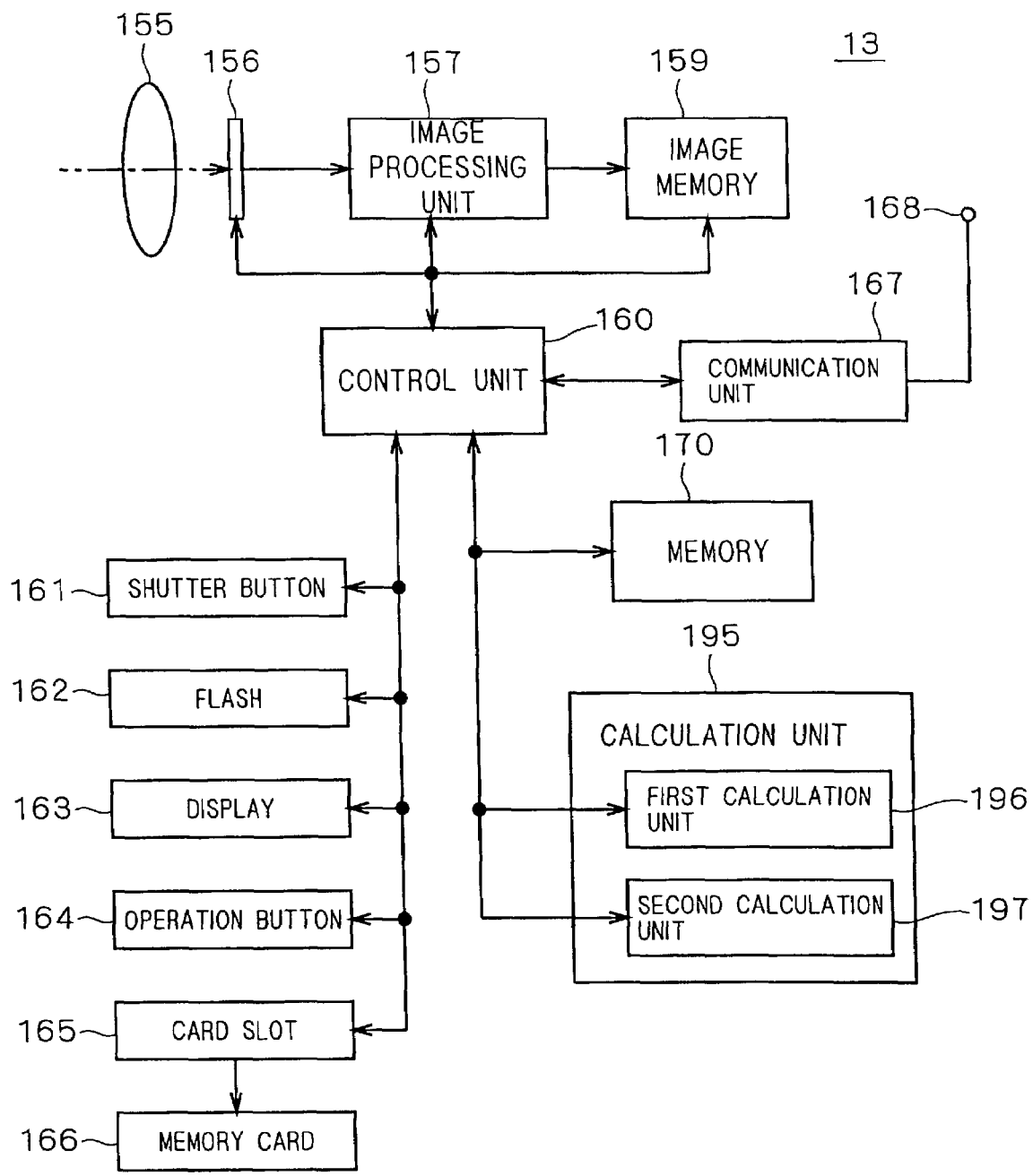
F I G . 7 2

F I G . 7 3
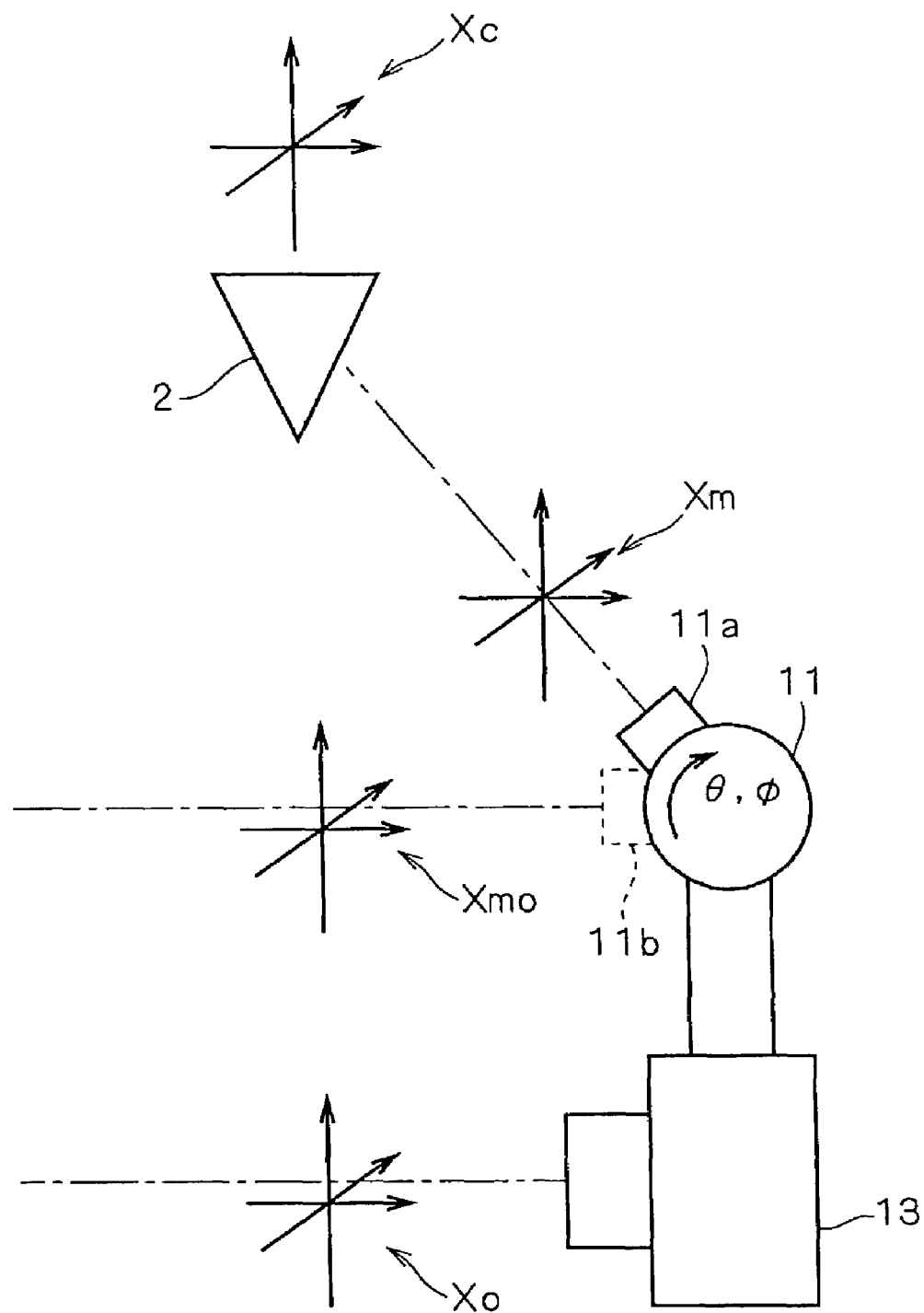

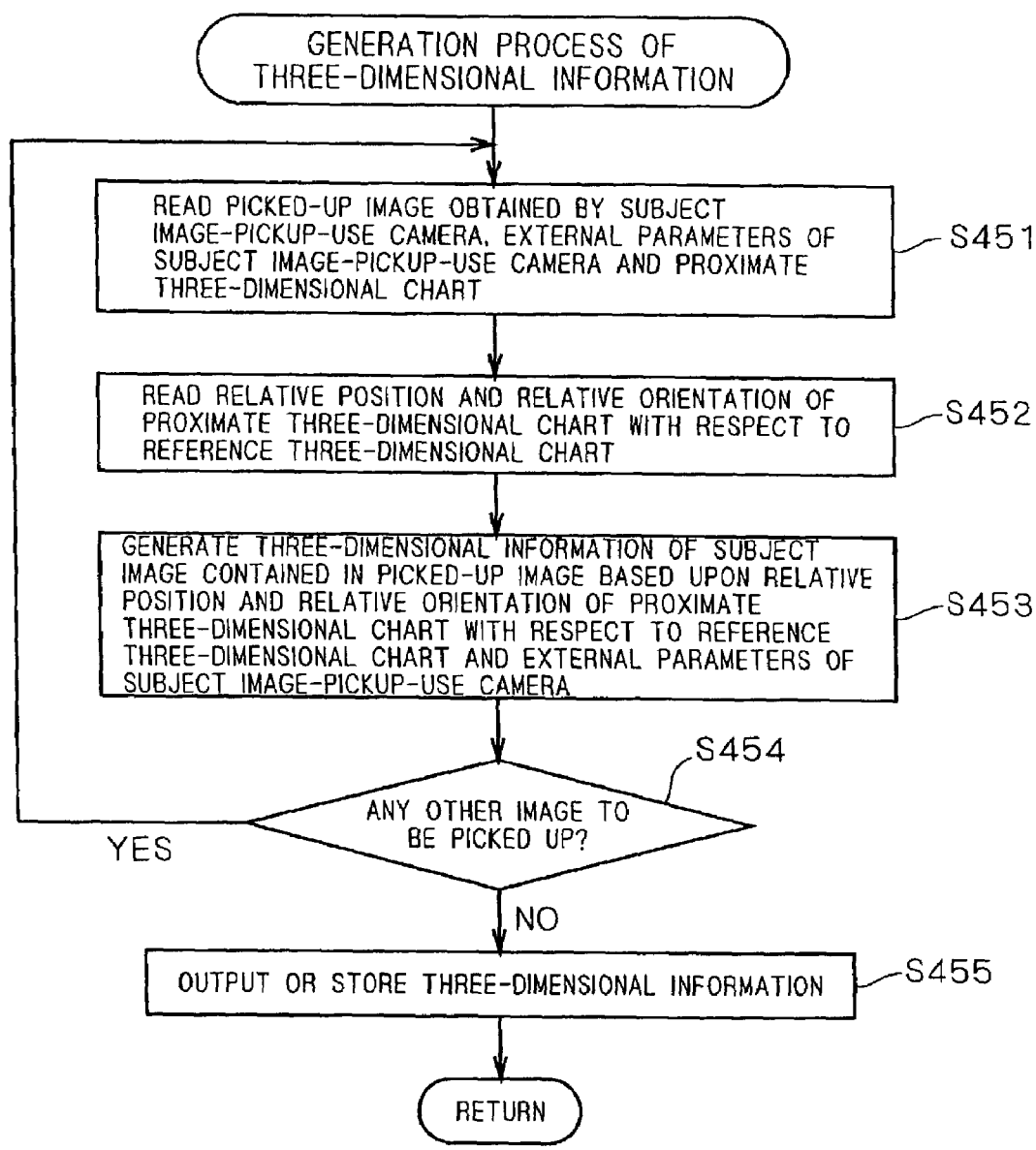

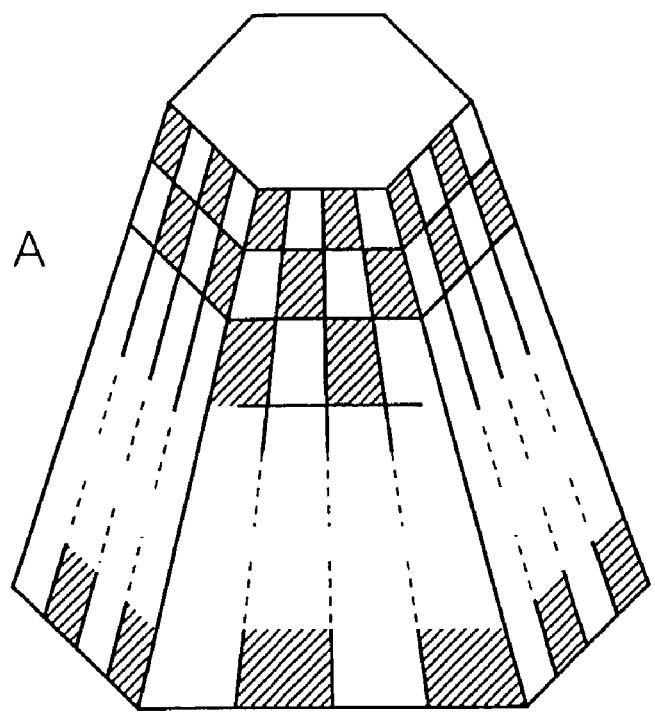
F I G . 8 4 A
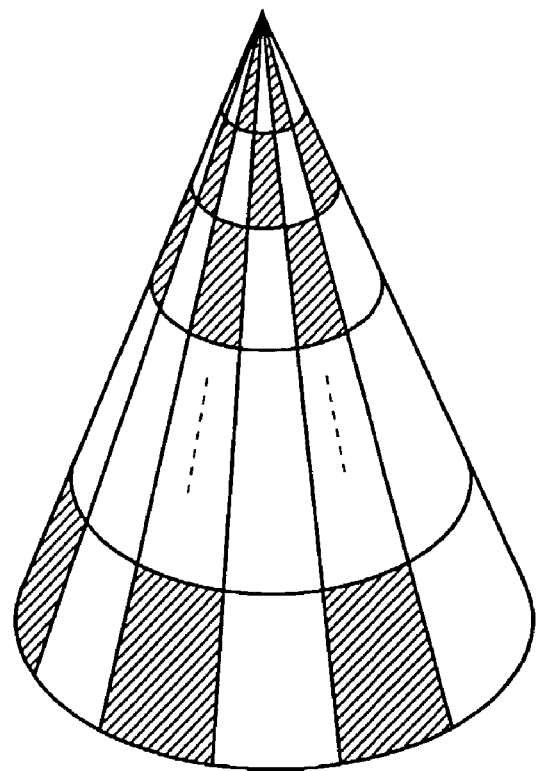
F I G . 8 4 B

IMAGE PICKUP SYSTEM EMPLOYING A THREE-DIMENSIONAL REFERENCE OBJECT

This application is based on application Nos. 2001-157822, 2001-203375, 2001-203470, 2001-204720, 2001-206822, 2001-206823 and 2001-206824 filed in Japan, the contents of which are hereby incorporated by reference.

BACKGROUND OF THE INVENTION

1. Field of the Invention

The present invention relates to a technique in which images of a subject is picked up from a plurality of directions to form a three-dimensional image model of the subject.

2. Description of the Background Art

Images of a three-dimensional subject are picked up from a plurality of directions, and a plurality of pieces of the resulting image data are composed so as to form a three-dimensional image model of the corresponding subject. In other words, when data such as camera external parameters (camera position, orientation, etc.) and inner parameters (focal length, etc.) are obtained for each of the respective images obtained by image-picking up the subject from a plurality of directions, a three-dimensional model of the subject is re-composed from silhouette images of the subject by using a Shape-From-Silhouette method. The detailed description of the Shape-From-Silhouette method is given in W. Niem, "Robust and Fast Modelling of 3D Natural Objects from Multiple Views" SPIE Proceedings Image and Video Proceeding II vol. 2182, 1994, pp. 388-397. Hereinafter, the camera external parameters and inner parameters are generally referred to as "(camera) calibration parameters", and in the case when, among these calibration parameters, the inner parameters have been known and the camera calibration processes using the inner parameters have been completed, if the external parameters of the camera are found, it is possible to compose a three-dimensional image model of the subject.

Here, one of the methods for image-picking up a subject from a plurality of directions in this manner is a fixed position method in which a plurality of cameras are placed in different positions in a fixed manner and images of the subject are taken from these positions. However, in this fixed position method, since a plurality of cameras need to be fixedly placed in a dispersed manner inside an image-pickup studio, etc., it is necessary to provide a complicated, large image-pickup facility.

Therefore, a moving image-pickup method have been proposed, in which the user successively picks up images of a subject from a plurality of directions while he or she moves around the subject with a portable camera in the hands so that all the circumferential images of the subject are obtained.

However, in this moving image-pickup method, in order to determine the external parameters of the camera, it is necessary to specify the camera position and orientation in each of the image pickup operations.

With respect to the method of measuring external parameters of a camera for such purposes, conventional methods, such as a magnetic method, an ultrasonic method and an optical method, have been proposed. Among these, in the magnetic method, the terrestrial magnetism, etc., at the camera position are detected so that the positions and orientations of the respective cameras are specified, and in the ultrasonic method, ultrasonic waves from a predetermined ultrasonic wave are detected so that these factors are specified. In the optical method, there are, for example, methods in which a stereophonic camera is used and a calibration chart which is greater than the field of view is placed.

Among these methods, in the magnetic method, it becomes difficult to measure with high precision when the subject is made of metal, and the ultrasonic method results in high costs of the apparatus.

Moreover, techniques for finding the relative position and relative orientation of a person and an object within a space has been developed in the field of virtual reality, etc. For example, an algorithm for finding these factors has been disclosed in "L. Quan, Z. Lan, "Linear N-Point Camera Pose Determination", IEEE Trans. PAMI 21(8) 1999" and "Takahashi, Ishii, Makino, Nakashizu, *A Measuring Method of Marker Position/Orientation for VR Interface by Monocular Image Processing*", Electronic Information Report Journal AJ79 1996". In accordance with these techniques, when a reference object is image-picked up, the picked-up image is used to find the relative position and relative orientation of the image-pickup position. Hereinafter, the algorithm, disclosed in these documents, is referred to as "multipoint analyzing algorithm".

Here, with respect to a conventional optical method, Japanese Laid-Open Patent Application No. 2000-270343 has disclosed a method in which a single plane chart on which an irregular matrix pattern is drawn is placed at a predetermined position, and by observing this with a camera, the relationship of the position and orientation between the camera and the plane chart are specified by using the "multipoint analyzing algorithm". In this method, since the relative relationship of the position and orientation of the camera with respect to a coordinate system fixed to the plane chart is obtained; therefore, when the relationship of the position and orientation between the plane chart and the subject is fixed so that, each time the subject is image-pick up from each of a plurality of directions, the pattern on the plane chart is observed by the camera so as to specify the position and orientation of the camera at that point on the absolute coordinate system.

However, the plane chart has only a narrow angle range from which it can be observed, and it cannot be observed from directions exceeding 90 degrees from the normal direction of the plane chart; therefore, the camera movable range is extremely limited. Moreover, even in the case when a camera is located within a range from which the plane chart can be observed, if the camera direction is greatly deviated from the normal direction of the plane chart, there is a reduction in the observation precision of the pattern, and the resulting problem is that the camera external parameter determining precision becomes poor.

In particular, when a subject is an object that is considerably larger than the plane chart, the conventional optical method fails to obtain accurate external parameters, resulting in a failure in composing a three-dimensional image model of the subject.

Moreover, in the technique of Japanese Laid-Open Patent Application No. 2000-270343, it is uncertain whether or not the obtained image has sufficient precision to be subjected to calculation processes at the time of the image-pickup process, and it is not possible to determine whether or not the image-pickup operation can be continued under the current state as it is; therefore, wasteful image-pickup operations tend to be carried out.

SUMMARY OF THE INVENTION

The present invention is directed to an image pickup system.

According to an aspect of the present invention, an image pickup system is provided with (a) a movable image-pickup apparatus; and (b) a reference object having a known shape in a three-dimensional space, the movable image-pickup apparatus including: (a-1) an image-pickup device for acquiring an image of the reference object as first image data; (a-2) a driver which rotates and drives the image-pickup device with respect to a fixed portion; and (a-3) a controller which controls the driver means in such a manner that, when the movable image-pickup apparatus is moved, the image-pickup device can pick up an image of the reference object.

According to this image processing system, the driver is controlled so that when the movable image-pickup apparatus is moved, the image-pickup device can pick up an image of the reference object; thus, the movable image-pickup apparatus picks up an image of the reference object so that it is always positioned in the center of the view angle, without using any large-scale image-pickup facility, without the necessity of any special attention of the user.

Further, in accordance with another aspect of the present invention, the image processing system is provided with: (a) a reference object that is placed with a predetermined positional relationship with respect to a subject; and (b) a portable camera system, wherein the camera system comprises: (b-1) a measuring device; (b-2) a movable image-pickup apparatus which has an image-pickup device that is capable of relatively rotating with respect to the measuring device so as to pick up an image of the reference object while tracing the image thereof; (b-3) a detection device for detecting an amount of rotation shift of the measuring device by using an orientation sensor; and (b-4) controller which, based upon the amount of rotation shift detected by the detection device, carries out a rotation driving control on the image pickup device by using the movable image-pickup apparatus so that a tracing control is carried out on the reference object, wherein based upon results of picked-up image of the reference object by the movable image-pickup apparatus, a calibration-use parameter of the measuring device is calculated.

According to this image processing system, the amount of pivotal shift of the measuring device is detected by the orientation sensor, and based upon the amount of rotation shift thus detected, the movable image-pickup device is allowed to control the rotation driving operation of the image-pickup device so that the tracing control of the reference object is carried out; thus, it is possible to obtain a picked-up image of the reference object easily at high speeds.

Moreover, the present invention is also directed to a portable camera system, and this portable camera system is provided with (a) a measuring device; (b) a movable image-pickup apparatus which has an image-pickup device that is capable of relatively rotating with respect to the measuring device so as to pick up an image of a reference object that is placed with a predetermined positional relationship with respect to a subject while tracing the image thereof; (c) a detection device for detecting an amount of rotation shift of the measuring device by using an orientation sensor; and (d) a controller which, based upon the amount of rotation shift detected by the detection device, carries out a rotation driving control on the image pickup device by using the movable image-pickup apparatus so that a tracing control is carried out on the reference object, wherein based upon results of picked-up image of the reference object by the movable image-pickup apparatus, a calibration-use parameter of the measuring device is calculated.

According to this portable camera system, it is possible to provide a camera system that is best-suited for the image-pickup system.

Furthermore, the present invention is also directed to a movable image-pickup device, and this movable image-pickup device is provided with the followings: an image pickup device which acquires an image of a reference object having a known three-dimensional shape; a driver which drives the image pickup device with respect to a fixed portion; and a controller which, in the case when the movable image-pickup device is shifted, controls the driver so as to allow the image pickup device to pick up an image of the reference object.

According to this movable image-pickup device, it becomes possible to provide a movable image-pickup device that is best-suited for the image pick-up system.

The present invention is also directed to a measuring device for measuring an object.

According to one aspect of this invention, the measuring device is provided with a first image-pickup device for picking up an image of a reference object having a known three-dimensional shape; an orientation detector which calculates an orientation of the measuring device based upon a reference object image picked up by the first image-pickup device; and a display device which displays an image picked up by the first image-pickup device.

According to this measuring device, it is possible to display an image required for operations, and consequently to improve the operability of the user.

Moreover, according to another aspect of this invention, the measuring device is provided with the followings: a first image-pickup device which picks up an image of a reference object having a known three-dimensional shape, an orientation detector which calculates an orientation of the measuring device based upon a reference object image picked up by the first image-pickup device; a detector which detects whether or not the reference object is in an operable state for an image-pickup process by the first image-pickup device; and an informing device for informing results of detection by the detector.

According to this measuring device, the first image-pickup device detects whether or not the reference object is in an operable state for an image-pickup process, and the results of the detection are informed so that the user is allowed to know a necessary operation, thereby making it possible to prevent wasteful image-pickup operations from being continuously carried out.

Moreover, according to another aspect of this invention, the measuring device is provided with the followings: a first image-pickup device which picks up an image of a reference object having a known three-dimensional shape; an orientation detector which calculates an orientation of the measuring device based upon a reference object image picked up by the first image-pickup device; and a detector which detects whether or not the reference object is in an operable state for an image-pickup process by the first image-pickup device; and an inhibition element which, when the detector has detected that the reference object is not in the operable state for the image-pickup process, inhibits a measuring operation in the measuring device.

According to this measuring device, when the inoperable state for an image-pickup process of the first image-pickup device has been detected, the measuring operation of the measuring device is inhibited so that during the period in which the measuring operation has been inhibited, the user is allowed to stop picking up wasteful images.

Moreover, in another aspect of this invention, the measuring device is allowed to measure the subject in a state where a plurality of orientation-detecting-use reference objects, each having a known shape, are placed on a periphery of the subject.

This measuring device is provided with a reference-object pickup-use camera; a first calculator which, based upon images of the plurality of orientation-detecting-use reference objects preliminarily picked up by the reference-object pickup-use camera, calculates relative positional relationships among the plurality of orientation-detecting-use reference objects; a controller which controls the reference-object pickup-use camera so as to pick up an image in synchronism with a measuring operation of the measuring device; and a second calculator which, based upon images of the orientation-detecting-use reference objects picked up by the reference-object pickup-use camera during the measuring process, calculates an orientation of the measuring device.

According to this measuring device, the relative positional relationships among the orientation-detecting-use reference objects placed on the periphery of the subject are found; therefore, it is possible to appropriately measure the subject by picking up an image of any one of the orientation-detecting-use reference objects simultaneously when the subject is image-picked up. With this arrangement, it is possible to maintain a wider movable range on the periphery of the subject for the measuring device, and also to measure the subject with high precision.

Moreover, this measuring device is provided with the followings: a subject-image pickup-use camera for picking up an image of the subject; a reference-object pickup-use camera; a first calculator which, based upon images of the plurality of orientation-detecting-use reference objects that have been preliminarily picked up by the reference-object pickup-use camera and/or the subject-image pickup-use camera, calculates a relative positional relationships among the plurality of orientation-detecting-use reference objects; a controller which controls the reference-object pickup-use camera so as to pick up an image in synchronism with an image pickup operation of the subject-image pickup-use camera; and a second calculator which, based upon images of the orientation-detecting-use reference objects picked up by the reference-object pickup-use camera during a measuring process, calculates an orientation of the measuring device, wherein predetermined measuring calculations are carried out based upon an image picked up by the subject-image pickup-use camera and an orientation at that time.

Furthermore, this measuring device is provided with the followings: a movable camera which is designed so as to alter image-pickup orientation; and a controller which controls the image-pickup orientation of the movable camera so that the movable camera is allowed to pick up an image of a proximate reference object that is closest to the movable camera among the plurality of orientation-detecting-use reference objects at time of measuring operation by the measuring device.

According to this measuring device, during the measuring operation, the image-pickup orientation of the movable camera is controlled in such a manner that the movable camera is allowed to pick up an image of the proximate reference object that is closest to the movable camera among the plurality of orientation-detecting-use reference objects; therefore, it is possible to maintain a wider movable range at the time of measuring the subject, and also to measure the subject with high precision.

Moreover, this invention is also directed to a device for finding calibration-use parameters of a measuring device or a camera.

According to one aspect of this invention, this device is provided with the followings: (a) an observer which observes at least one measuring-device-calibration-use reference object of a plurality of measuring device calibration-use reference objects that have same external features and are placed in a space in a dispersed manner so as to be distinguished in mutual orientations from external features independent of observing positions, from an observing position related to the measuring device; (b) a specifying element which specifies a relative position and a relative orientation between the at least one measuring-device-calibration-use reference object and the measuring device based upon images obtained from the observer; (c) an orientation detector which detects an orientation of the measuring device in a space to accommodate the subject by using an angle sensor attached to the measuring device; and (d) an identifying element which identifies the measuring-device-calibration-use reference object observed by the observer by collating a detected orientation of the measuring device within the space and an orientation of each of the plurality of measuring-device-calibration-use reference objects within the space that have been preliminarily found.

According to this device, the subject is image-picked up from various angles, and when a three-dimensional model of the subject is composed based upon the resulting images, a plurality of calibration-use three-dimensional charts, which have been placed in a dispersed manner with different orientations, are used so that it is possible to achieve a wide image-pickup operable range, and also to find the image-pickup positions and orientations with high precision. Moreover, since a plurality of three-dimensional charts having the same external features can be used, it is possible to reduce the costs.

Moreover, according to another aspect of this invention, this device is provided with the followings: an identifying element which extracts at least one unit graphic form from a chart image obtained by observing a camera calibration-use three-dimensional chart having a plurality of charts formed on a plurality of side faces from an observing position as a target unit graphic form, and identifies the target unit graphic form among the plurality of charts and among a plurality of unit graphic forms; and a calculator which, based upon a relationship between an actual size that has been preliminarily specified with respect to the target unit graphic form identified and an observed size of the target unit graphic form viewed from the observing position, calculates the calibration-use parameter of the camera that depends on a relative position and a relative orientation between the observing position and the camera calibration-use three-dimensional chart.

According to this device, by utilizing the three-dimensional chart, it is possible to measure calibration parameters of the camera with high measuring precision while ensuring a wide movable range.

Moreover, this invention is also directed to a camera-calibration-use three-dimensional chart.

According to one aspect of this invention, this camera calibration-use three-dimensional chart is provided with the followings: a conical body having a bottom face and a plurality of side faces; and a plurality of charts that are displayed on each of the plurality of side faces, each of the plurality of charts having a set of a plurality of unit graphic forms having respectively known sizes, wherein each of the plurality of unit graphic forms has a geometrical shape that is coded so as to be identified by an observation from the observing position with respect to both of inside of the set and the plurality of charts, independent of relative positions and relative orientations between each of unit graphic forms and the observing position.

According to this three-dimensional chart, unit graphic forms are located in respective directions, and even when the three-dimensional chart is observed from any direction, at least one unit graphic form is observed from a direction that is closer to its front face, and the unit graphic form can be identified as to which position on which side face of the conical body the unit graphic form belongs to, based upon the coding; therefore, in the measurements of the camera-calibration-use parameters, it is possible to obtain high measuring precision while maintaining a wide movable range.

Moreover, according to another aspect of this invention, this camera calibration-use three-dimensional chart is provided with the followings: a conical body having a bottom face and a side face; and a chart that is displayed along a circumferential portion of the side face, the chart having a set of a plurality of unit graphic forms having respectively known sizes, wherein each of the plurality of unit graphic forms has a geometrical shape that is coded so as to be identified by an observation from an observing position with respect to inside of the set, independent of relative positions and relative orientations between each of the plurality of the unit graphic forms and the observing position.

According to this three-dimensional chart, with respect to each of the side faces of a conical body, unit graphic forms are located in respective directions, and even when the three-dimensional chart is observed from any direction, at least one unit graphic form is observed from a direction that is closer to its front face, and the unit graphic form can be identified as to which position on the conical body the unit graphic form belongs to, based upon the coding; therefore, in the measurements of the camera-calibration-use parameters, it is possible to obtain high measuring precision while maintaining a wide movable range.

Moreover, this invention is also directed to a method.

According to one aspect of this invention, this method, which is a method for measuring a subject in a state where a plurality of orientation detecting-use reference objects having a known shape are placed on the periphery of the subject, is provided with the following steps of: (a) preliminarily picking up images of the plurality of orientation-detecting-use reference objects by a reference-object pickup-use camera and calculating relative positional relationships among the plurality of orientation-detecting-use reference objects based upon the images; (b) picking up an image of at least one of the plurality of orientation-detecting-use reference objects by using the reference-object pickup-use camera in synchronism with a measuring operation of a measuring device; and (c) calculating an orientation of the measuring device, based upon images of the orientation-detecting-use reference objects picked up by the reference-object pickup-use camera during a measuring process, Moreover, according to another aspect of this invention, this method, which is a method for measuring a subject in a state where a plurality of orientation detecting-use reference objects having a known shape are placed on the periphery of the subject, is provided with the following steps of: (a) preliminarily picking up images of the plurality of orientation-detecting-use reference objects by a reference-object pickup-use camera and/or a subject-use camera and calculating relative positional relationships among the plurality of orientation-detecting-use reference objects based upon the images; (b) picking up an image of at least one of the plurality of orientation-detecting-use reference objects by using the reference-object pickup-use camera in synchronism with an image-pickup operation of the subject-use camera; (c) calculating an orientation of the measuring device, based upon images of the orientation-detecting-use reference objects picked up by the reference-object pickup-use camera during a measuring process; and (d) carrying out a predetermined measuring calculation based upon an image picked up by the subject-use camera and an orientation thereof at that time.

Moreover, according to another aspect of this invention, this method, which is a method for measuring a subject, is provided with the following steps of: (a) placing a plurality of orientation-detecting-use reference objects having a known shape on a periphery of the subject; (b) finding a relative positional relationship among the plurality of orientation-detecting-use reference objects from images obtained by image-picking up the plurality of orientation-detecting-use reference objects; (c) specifying a proximate reference object that is closest to a movable camera that is designed so as to alter an image-pickup orientation, among the plurality of orientation- detecting-use reference objects, based upon the relative positional relationship; (d) allowing the movable camera to automatically trace the proximate reference object when a measuring operation of the subject is carried out; and (e) picking up an image of the proximate reference object by the movable camera in synchronism with the measuring operation.

Moreover, according to still another aspect of this invention, this method, which is a method for acquiring calibration-use parameters of a camera, is provided with the steps of: (a) placing a camera-calibration-use three-dimensional chart in a space to accommodate a subject; (b) observing at least one chart of a plurality of charts contained in the camera-calibration-use three-dimensional chart from an observing position related to the camera; (c) extracting at least one unit graphic form contained in an observed chart as a target unit graphic form, and identifying the target unit graphic form among the plurality of charts as well as a plurality of unit graphic forms; and (d) specifying a calibration-use parameter of the camera that depend on a relative position and a relative orientation between the observing position and the camera-calibration-use three-dimensional chart, based upon a relationship between an actual size that has been preliminarily specified with respect to the target unit graphic form identified and an observed size of the target unit graphic form viewed from the observing position.

According to still another aspect of this invention, this method, which is a method for acquiring calibration-use parameters of a measuring device, is provided with the steps of: (a) placing a plurality of measuring-device-calibration-use reference objects that have same external features in a space to accommodate a subject in a dispersed manner with different orientations so as to be distinguished in mutual orientations from external features independent of observing positions; (b) observing at least one measuring-device-calibration-use reference object of the plurality of measuring-device-calibration-use reference objects from an observing position related to the measuring device; (c) specifying a relative position and a relative orientation between the at least one measuring-device-calibration-use reference object and the measuring device based upon images obtained from the step (b); (d) detecting an orientation of the measuring device in a space to accommodate the subject by using an angle sensor attached to the measuring device; and (e) identifying the measuring-device-calibration-use reference object observed by the step (b) by collating a detected orientation of the measuring device within the space and an orientation of each of the plurality of measuring-device-calibration-use reference objects within the space that have been preliminarily found.

Moreover, this invention is also directed to a computer software product.

As described above, the present invention has been devised to solve the conventional problems, and its objective is to provide a technique for acquiring external parameters of a camera in such a manner that high measuring precision is obtained with a wide movable range being maintained by the use of an optical system, and also to achieve a technique for finding a three-dimensional shape of an object to be measured with high precision.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a front view of a movable camera.

FIGS. 15A and 15B show image-pickup examples of the movable camera and the subject-use camera, when the subject-use camera picks up an image of a subject.

FIG. 19 is a drawing that shows an example of a cross ratio used for coding.

FIG. 21 is a drawing that shows an example of coding that is used in each of the faces in the case when a three-dimensional chart in accordance with the first preferred embodiment is provided as a hexagonal pyramid.

FIGS. 23A, 23B and 23C show examples of an extracting process of a straight line from a picked-up image of the three-dimensional chart in accordance with the first preferred embodiment.

FIGS. 24A and 24B show examples of a picked-up image taken with a different distance of the same side face of the three-dimensional chart in accordance with the first preferred embodiment.

FIG. 35 is a drawing that shows an example of an image-pickup operable state displayed on the subject-use camera.

FIG. 61 is a drawing that shows a flow of data in the movable camera in accordance with the sixth preferred embodiment.

FIGS. 66A and 66B show examples in which indexes, which distinguish the absolute orientation of a three-dimensional chart based upon external appearance features of the three-dimensional chart having a cubic shape, are defined, in a ninth preferred embodiment.

FIG. 70 is a drawing that shows one structural example of an image pickup system in accordance with a tenth preferred embodiment.

FIG. 71 is a block diagram that shows an inner function of a movable camera.

FIG. 72 is a block diagram that shows an inner function of a subject-use camera.

FIG. 73 is a drawing that shows the concept of coordinate conversions in an image pickup system.

FIG. 83 is a flow chart that shows one portion of processes in the operation processes in accordance with the eleventh embodiment.

FIGS. 84A and 84B show three-dimensional charts that are modified examples.

DESCRIPTION OF THE PREFERRED EMBODIMENTS

Referring to attached drawings, the following description will discuss preferred embodiments of the present invention in detail.

First Preferred Embodiment

<Outline of System Construction>

Figure 1:
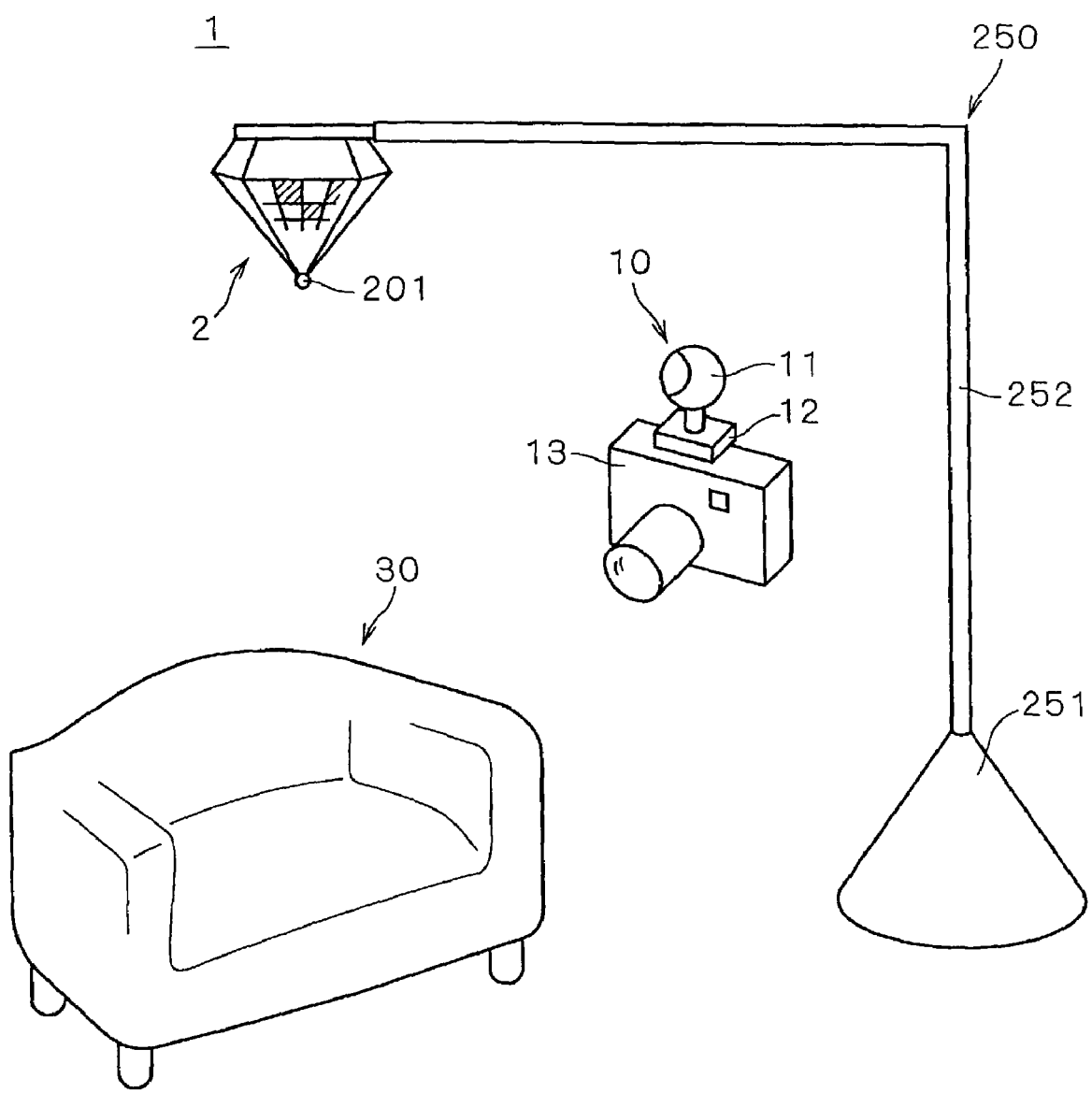
FIG. 1 is a drawing that shows one structural example of an image pickup system.
Figure 2:
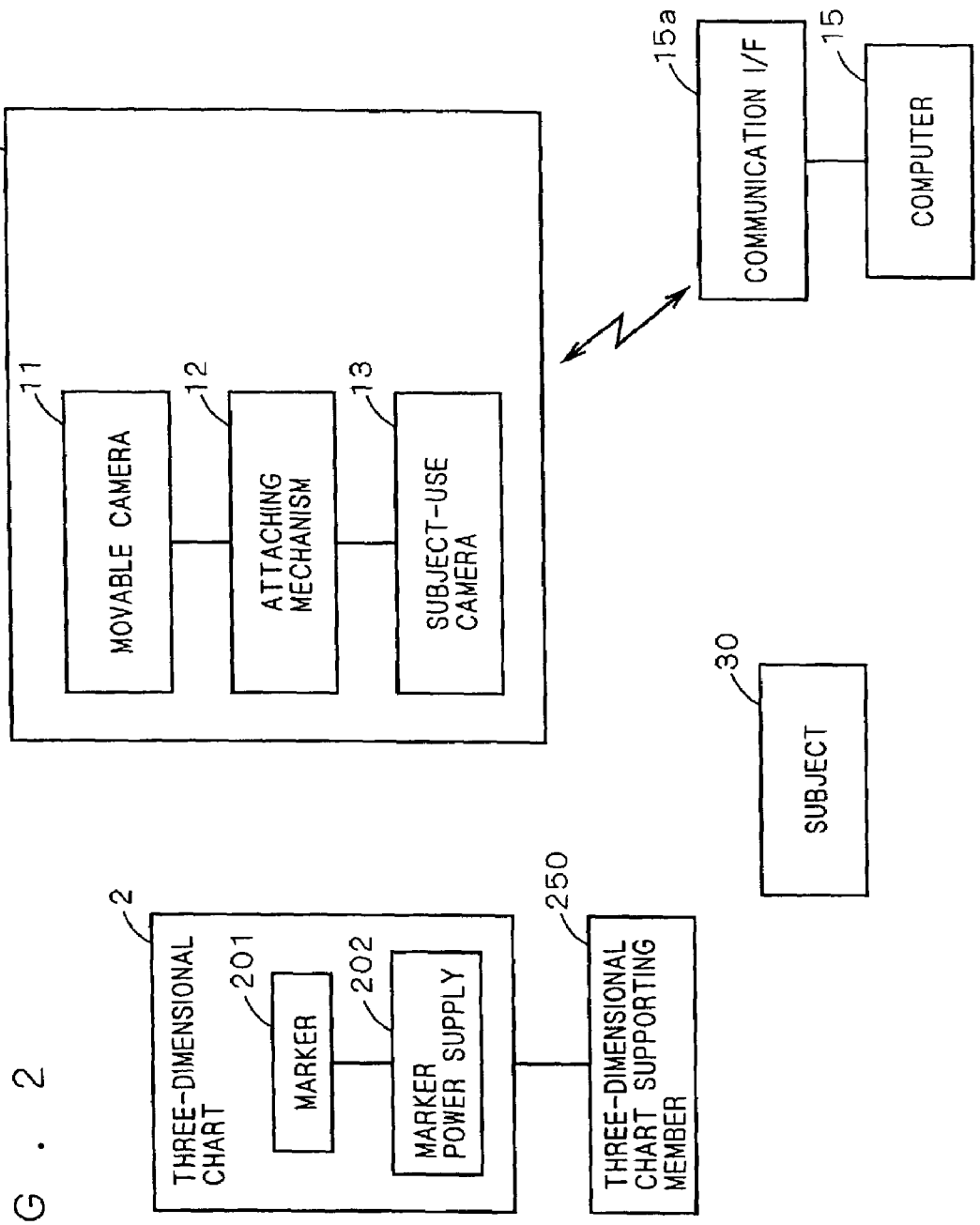
FIG. 2 is a block diagram that shows the image pickup system of FIG. 1.

FIG. 1 is a drawing that shows a construction of an image-pickup system 1 (three-dimensional information generation system) that is achieved by the first preferred embodiment, and FIG. 2 is a block diagram that shows this image-pickup system 1. In FIG. 1, image-pickup system 1 is provided with a movable camera system 10 capable of picking up an image of a three-dimensional subject 30, and a camera-calibration-use three-dimensional chart 2 that is placed in the vicinity of subject 30 within a space including three-dimensional subject 30. Three-dimensional chart 2 is a reference object that has a known shape in the three-dimensional space, and constituted by a three-dimensional object in which a chart pattern is formed on each of the side faces of a main body having virtually a pyramid shape, as will be described later in detail. This three-dimensional chart 2 is suspended from a chart supporting member 250. This chart supporting member 250 is provided with an arm 252 having a reversed L-letter shape extending from a base 251, and three-dimensional chart 2 is secured to the vicinity of the top of arm 252. Preferably, three-dimensional chart 2 is suspended virtually above subject 30.

Camera system 10 has a subject image-pickup-use camera 13 (hereinafter, referred to as "subject-use camera") that functions as a digital camera. This subject-use camera 13 also has various calculating functions, which will be described later. Moreover, a movable camera 11 is attached to the upper portion of this subject-use camera 13 through an attaching mechanism 12 in a manner so as to be oriented freely. Movable camera 11 is used so as to specify the relative positional-orientation relationship between three-dimensional chart 2 and movable camera 11 by picking an image of a plurality of unit graphic forms UP contained in the pattern (see FIG. 3) of three-dimensional chart 2, and is also used so as to detect the position and orientation of subject-use camera 13 in the absolute coordinate system that is relatively fixed with respect to three-dimensional chart 2.

As shown in FIG. 2 although not shown in FIG. 1, image-pickup system 1 may be provided with, for example, a notebook-type portable computer 15 for executing various calculation functions which will be described later. Computer 15 transmits and receives commands and data to and from camera system 10 by radio communications through a communication interface 15a.

<Outline of Three-dimensional Charts>

Figure 3:
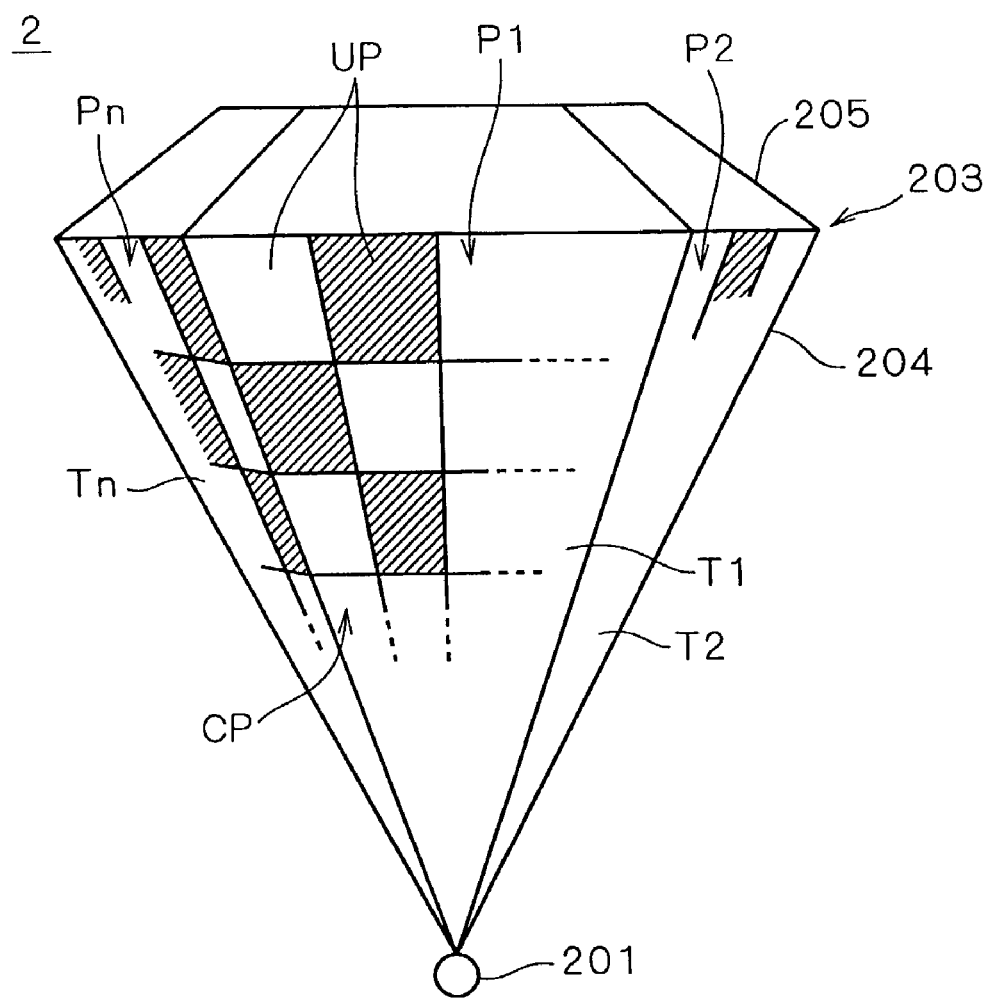
FIG. 3 is a drawing that shows an example of a side face of a three-dimensional chart.

FIG. 3 is a side view that shows three-dimensional chart 2. Three-dimensional chart 2 is provided with a three-dimensional chart main body 203 and a chart pattern CP that is formed on the surface of this three-dimensional chart main body 203.

Among these, three-dimensional chart main body 203 is integrally formed by a display unit 204 having a polygonal pyramid shape and a supporting unit 205 having a pyramid base shape with its inside being hollow. Chart patterns CP constitute a set of patterns P1 to Pn placed on the respective side faces T1 to Tn (n is an integer not less than 3) of display unit 204. More preferably, the number n of the side faces of the polygonal pyramid is set to n=3 to 36, more preferably, n=6 to 12. Each of patterns P1 to Pn formed on the respective side faces T1 to Tn is a plane pattern; however, since patterns P1 to Pn are placed three-dimensionally so that chart pattern CP serving as the set of patterns P1 to Pn is allowed to form a three-dimensional pattern. Respective patterns P1 to Pn constitute a set of a plurality of trapezoids, each functioning as a unit graphic form, which will be described later in detail.

Moreover, a light-emitting diode (LED), which serves as a marker 201 forming reference point that is used when movable camera 11 follows (tracks) chart pattern CP, is attached to the apex of the polygonal pyramid forming display unit 204; thus, this construction allows movable camera 11 to easily recognize the position of three-dimensional chart 2 accurately. Although not shown in FIG. 3, a marker-use power supply 202 (FIG. 2) is installed inside three-dimensional chart 2 so as to supply light-emission power to this light-emitting diode.

<Outline of Movable Camera 11>

Figure 5:
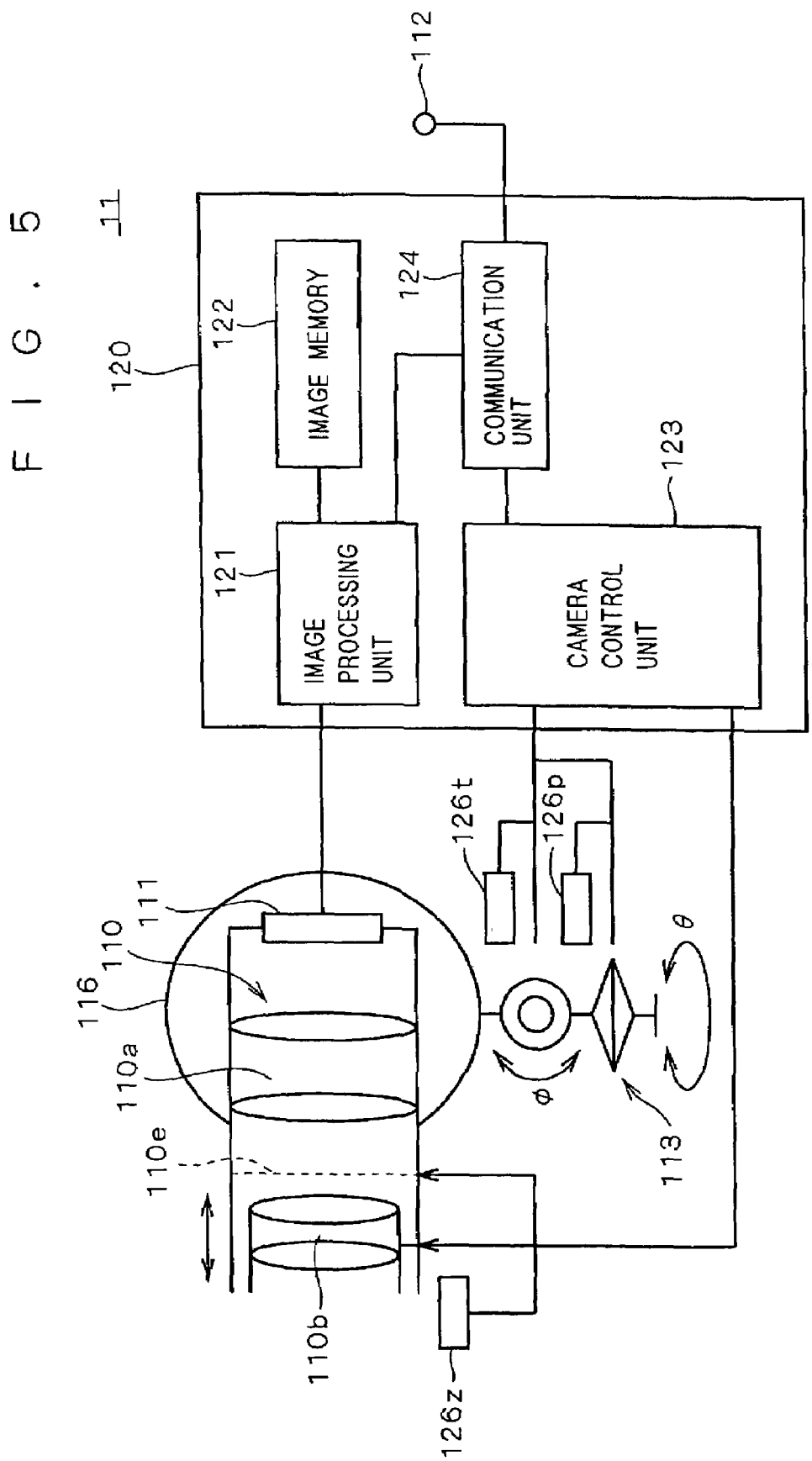
FIG. 5 is a block diagram that shows one structural example of a movable camera.

FIG. 4 is a front view of movable camera 11, and FIG. 5 is a block diagram of movable camera 11. As shown in FIG. 5, in movable camera 11, a lens unit 110 and a two-dimensional light-receiving element 111 which photo-electrically converts a two-dimensional image converged and formed by this lens unit 110 are integrally installed in a spherical unit 116. This two-dimensional light-receiving element 111 is a CCD array. Lens unit 110 is formed by a combination of a fixed lens 110a and a zoom lens 110b with a diaphragm/shutter mechanism 110e being interpolated in between.

As shown in FIG. 4, spherical unit 116 is connected to a securing portion 114 through an orientation altering device 113 in such a manner that it is allowed to pivot within a range of approximately ±70° in the panning direction (rotation of θ degrees) and also to move up and down within a range of approximately ±70° in the tilting direction (rotation of φ degrees). Thus, in order to carry out driving operations for the pivotal movement in the panning direction as well as for the pivotal movement in the tilting direction, orientation altering device 113 with a plurality of piezoelectric elements installed therein is installed in a base portion of spherical unit 116. Moreover, a zooming operation, which corresponds to a driving operation of zoom lens 110b, is also carried out by a piezoelectric element different from the above-mentioned piezoelectric elements. By applying saw-shaped wave signals to these piezoelectric elements, the target element of the driving operation by the piezoelectric elements is allowed to move slightly, and the repetition of this movement makes it possible to move the target element in a predetermined manner. The angle of the pivotal movement in the panning direction and the angle of the shifting movement in the tilting direction are respectively detected by angle sensors 126p, 126t prepared as encoders, etc., and the amount of driving operation of zoom lens 110b is also detected by a sensor 126z also constituted by an encoder. These driving mechanisms are, for example, disclosed by Japanese Laid-Open Patent Applications Nos. 11-18000 and 11-41504.

A control calculation unit 120 is provided with an image processing unit 121 for carrying out processes such as image recognition by using inputted signals from two-dimensional light-receiving element 111, and an image memory 122 for storing mage signals obtained by this image processing unit 121. Moreover, a camera control nit 123, which generates driving signals for zoom lens 110b, orientation altering device 113 and diaphragm/shutter mechanism unit 110e and sends these signals thereto, is installed, and image processing unit 121 and camera control unit 123 are allowed to wirelesscommunicate with subject-use camera 13 through a communication unit 124 and a communication device 112. These communications make it possible to transmit image data to subject-use camera 13, and also to transmit and receive various information between movable camera 11 and subject-use camera 13. In movable camera 11 of the present preferred embodiment, an infrared element, which is suitable for an IRDA (Infrared Data Association) interface for carrying out infrared-ray communications, is used as communication device 112.

As shown in FIG. 4, a first securing groove 115a and a second securing groove 115b, formed in a securing portion 114, is used for attaching securing portion 114 to subject-use camera 13. Moreover, a tracing button 117 is a button used for switching modes between a tracing mode for allowing movable camera 11 to automatically track three-dimensional chart 2 (hereinafter, referred to simply as "auto-tracing mode") and a mode for carrying out a tracing operation based upon an instruction of the user from subject-use camera 13 (hereinafter, referred to simply as "manual mode").

Figure 6:
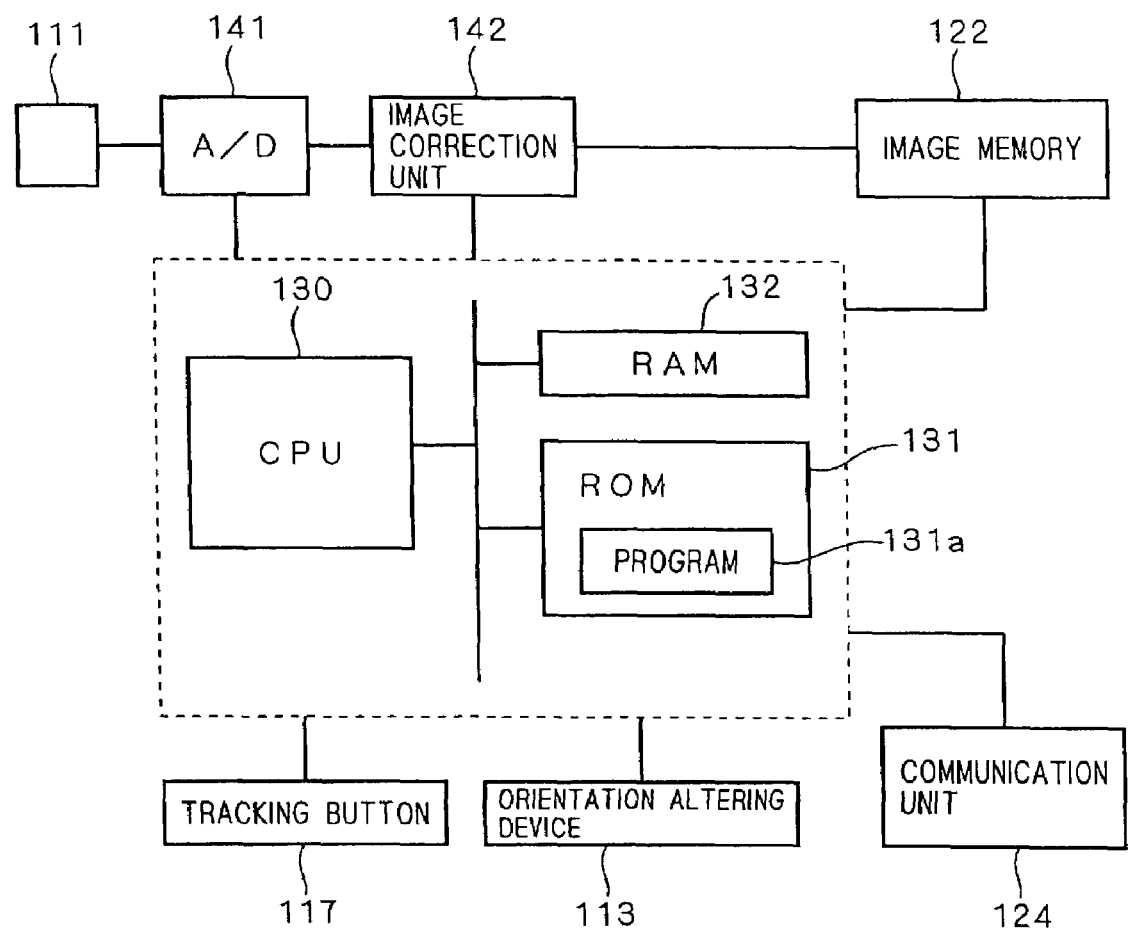
FIG. 6 is a drawing that shows an essential portion of an information processing function of the movable camera.
Figure 7:
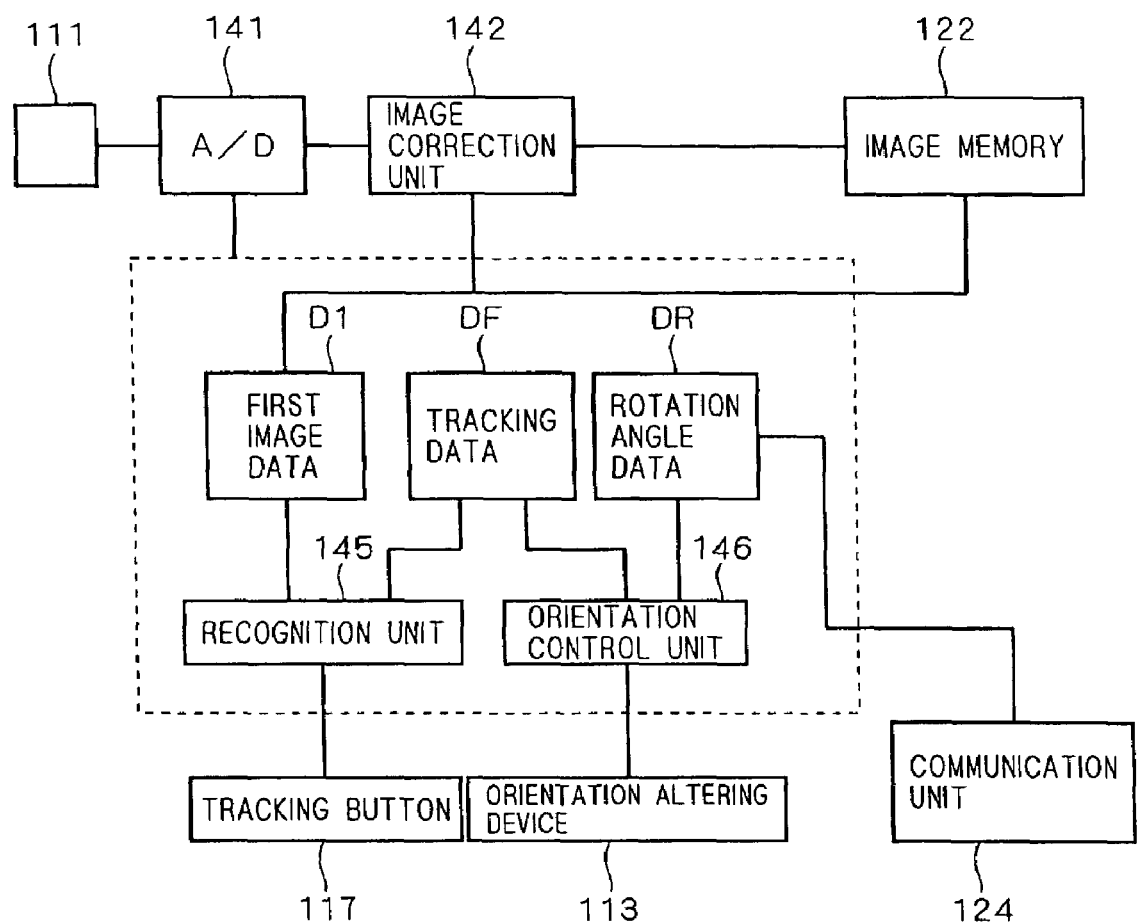
FIG. 7 is a drawing that shows a flow of data in the movable camera.

FIG. 6 is a drawing that shows an essential portion of the information processing functions of movable camera 11 from the viewpoint of the hardware structure, and FIG. 7 is a drawing that shows a flow of data in movable camera 11. In FIG. 6, control calculation unit 120 of movable camera 11 is provided with a CPU 130, a ROM 131 and a RAM 132, and program 131a, which achieves various operations as will be described later, is stored in ROM 131.

Any one of RGB filters is attached to each two-dimensional light-receiving element 111 for each pixel, and light, which has formed an image on two-dimensional light-receiving element 111, is photo-electrically converted by this two-dimensional light-receiving element 111 for each of RGB three primary color components. The signals thus obtained are converted to digital image signals by an A/D conversion unit 141, and subjected to a white-balance correcting operation, a γ-correcting operation, etc. in an image correction unit 142. An image signal, after having been subjected to the corrections, is stored in image memory 122. First image data D1, shown in FIG. 7, correspond to image signals after the corrections.

A recognition unit 145 and an orientation control unit 146 are achieved as some portions of functions given by CPU 130, ROM 131, RAM 132, etc.

Recognition unit 145, which is activated in response to an instruction from the user through tracing button 117, recognizes an image of three-dimensional chart 2 among the first image data D1 obtained by movable camera 11, and generates tracing data DF used for tracing the image of three-dimensional chart 2 in the first image data D1.

Orientation control unit 146 controls orientation altering device 113 based upon the instruction from the user received from subject-use camera 13 in the manual mode. After tracing button 117 has been pressed to make a switch to the automatic tracing mode, orientation altering device 113 is controlled so that, through processes which will be described later, the image of three-dimensional chart 2 is always converged and formed onto two-dimensional light-receiving elements 111.

CPU 130 also has a function for generating rotation angle data DR of FIG. 7 through processes described later.

Moreover, when the shutter button of subject-use camera 13 is pressed, the first image data D1 and rotation angle data DR are transmitted to subject-use camera 13 serving as a calibration-use information processing device through communication unit 124, and used in various calculations. In other words, movable camera 11 is controlled so as to acquire the first image data D1 in synchronism with the shutter button of subject-use camera 13.

<Principle of Automatic Tracing>

Figure 8:
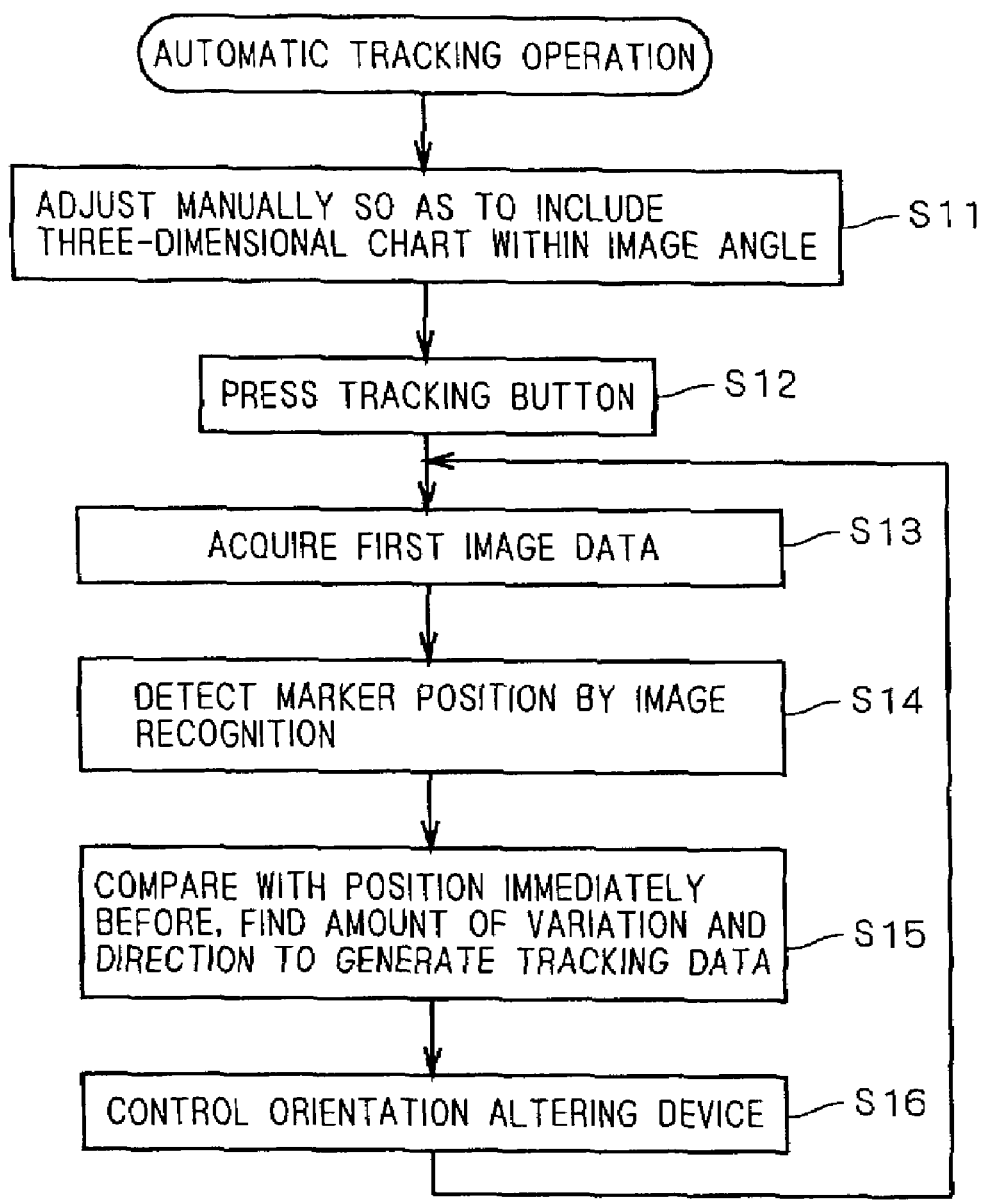
FIG. 8 is a drawing that shows a flow of an automatic tracing operation of the movable camera.

FIG. 8 shows a flow of a sequence of automatic tracing operations in movable camera 11 in detail. First, in the manual mode, an adjustment is made so that marker 201 of three-dimensional chart 2 is included in the view angle of movable camera 11 (step S11), and tracing button 117 is pressed so as to make a switch to the automatic tracing mode (step S12).

Next, movable camera 11 acquires the first image data D1 (step S13), and recognition unit 145 detects the position of the image-pickup range of marker 201 of three-dimensional chart 2 through the image recognition (step S14) so that the resulting positions are compared with the positions within the image-pickup range immediately before; thus, by finding the amount of variation and the direction, tracing data DF is generated (step S15).

Moreover, orientation control unit 146 controls orientation altering device 113 in such a manner that based upon the resulting tracing data DF, marker 201 of three-dimensional chart 2 is picked up as an image positioned in the center of the view angle (step S16). Then, processes from step S13 are further repeated so as to acquire new first image data D1.

Thus, movable camera 11 is allowed to obtain an image of three-dimensional chart 2 as the first image data D1. Moreover, even when movable camera 11 is shifted, orientation altering device 113 is controlled so that movable camera 11 can pick up an image of three-dimensional chart 2; thus, the user is allowed to pick up and obtain the first image data D1 in which three-dimensional chart 2, which is required for the processes as will be described later, is always positioned in the center of the view angle, without the necessity of any special attention.

<Outline of Subject-use Camera 13>

Figure 9:
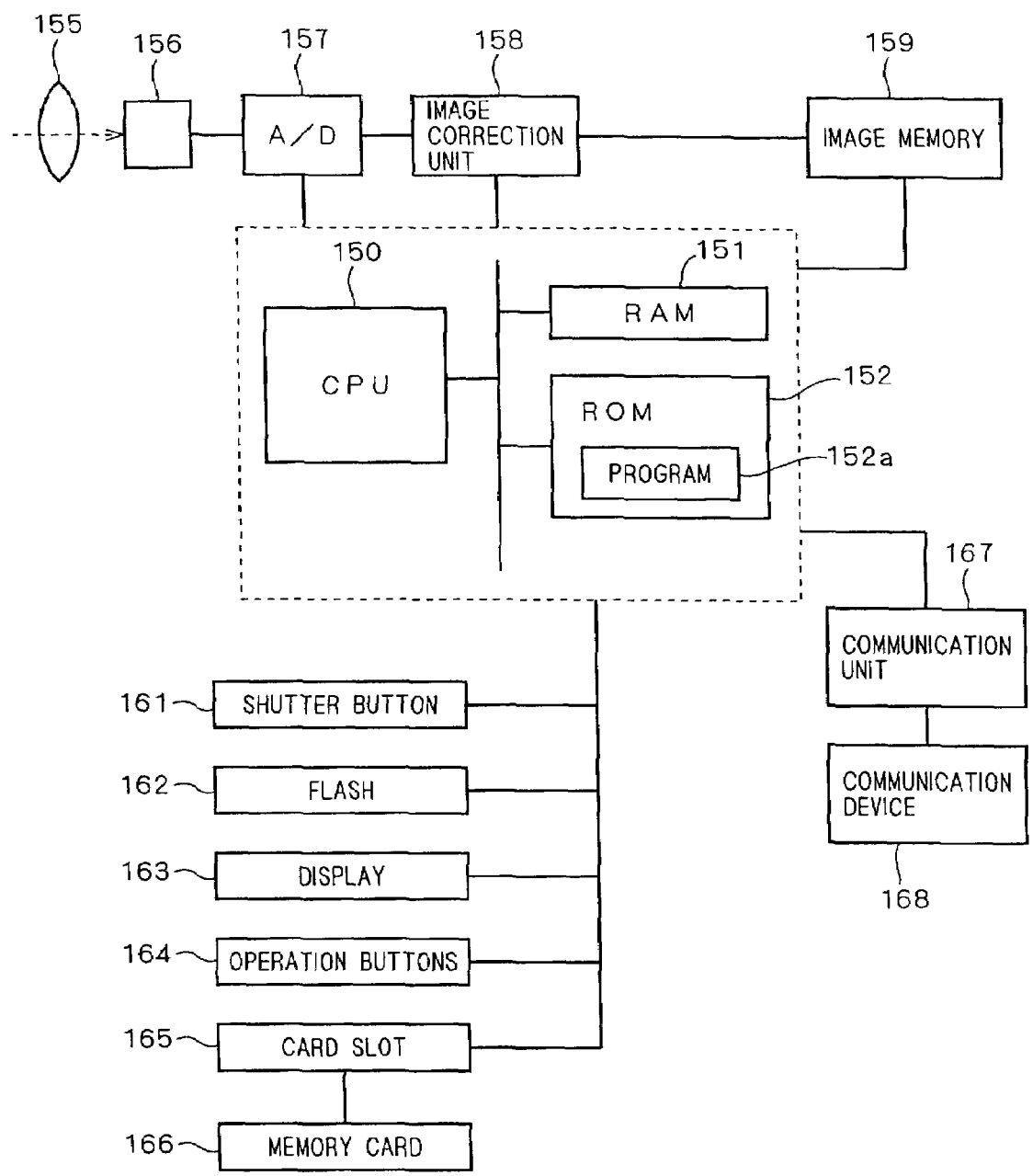
FIG. 9 is a drawing that shows an essential portion of an information processing function of a subject-use camera.
Figure 10:
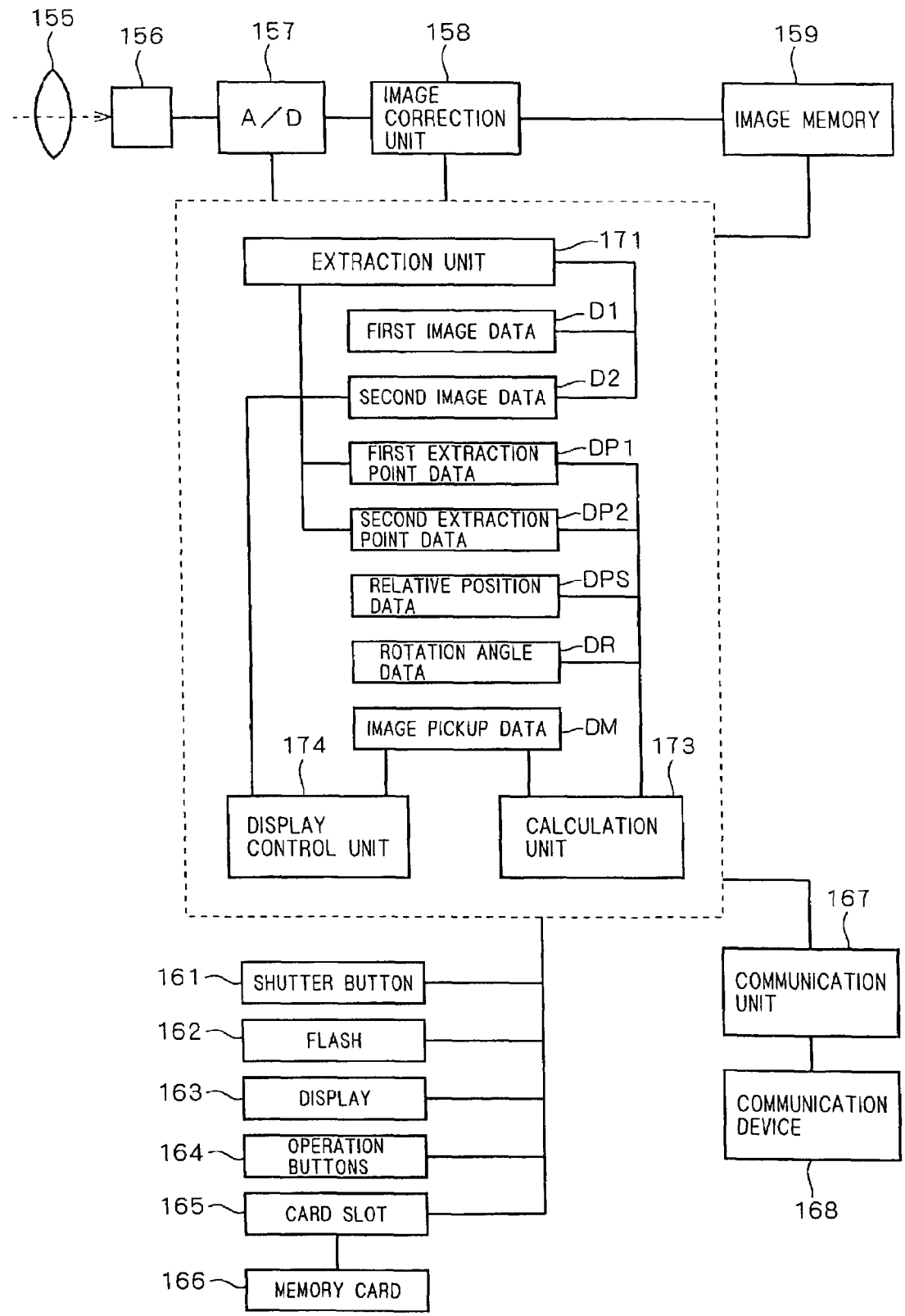
FIG. 10 is a drawing that shows a flow of data of the subject-use camera.

FIG. 9 is a drawing that shows an essential portion of the information processing functions of subject-use camera 13 from the viewpoint of the hardware structure, and FIG. 10 is a drawing that shows a flow of data in subject-use camera 13. Subject-use camera 13 is provided with a CPU 150, a RAM 151 and a ROM 152, and a program 152a, which achieves various operations of subject-use camera 13 as will be described later, is stored in ROM 152. Moreover, elements such as shutter button 161, a flash lamp 162, a monitor-use color display 163 placed on the rear face and operation buttons 164, are electrically connected to CPU 150.

As shown in FIGS. 9 and 10, light that is directed from subject 30 through lens unit 155, is made incident on two-dimensional light-receiving elements 156 such as a CCD array on which any of RGB filters is attached to each of the pixels, to form an image thereon, and photo-electrically converted by two-dimensional light-receiving element 156 for each of the RGB three primary color components. The signals thus obtained are converted to digital image signals by AD conversion unit 157, and subjected to a white-balance correcting operation, a γ-correcting operation, etc. in an image correction unit 158. An image signal, after having been subjected to the corrections, is stored in an image memory 159. An image pick-up operation is executed by pressing a shutter button 161, and the image signal stored in image memory 159 is held in RAM 151 as second image data D2.

A communication unit 167 transmits and receives various pieces of information, such as control signals of the respective units of movable camera 11 and acquired image data, to and from movable camera 11 through a communication device 168. For example, in the manual mode, a signal, obtained through the user's operation of pressing one of operation buttons 164, is transmitted to movable camera 11 so that orientation altering device 113 of movable camera 11 can be operated by the manual operation of the user. Moreover, in response to a pressing operation of shutter button 161 of subject-use camera 13, simultaneous image-pickup operations can be carried out between subject-use camera 13 and movable camera 11.

A communication device 168 is prepared as an infrared element serving as an IRDA (Infrared Data Association) interface for carrying out infrared communications to and from movable camera 11, and driven by communication unit 167.

A card slot 165 is used for attaching a memory card 166 to subject-use camera 13, and this memory card 166 is allowed to store image data, etc. that has been picked up.

An extraction unit 171, a calculation unit 173 and a display control unit 174, shown in FIG. 10, are functions that are achieved by CPU 150, RAM 151 and ROM 152, etc. of FIG. 9.

Extraction unit 171 extracts four points on three-dimensional chart 2 from the first image data D1 received from movable camera 11 through communication unit 167 to generate first extraction point data DP1. Moreover, in the same manner, extraction unit 171 extracts four points on three-dimensional chart 2 from the second image data D2 that has been obtained from subject-use camera 13 to generate second extraction point data DP2.

Calculation unit 173 finds the relative position and orientation between movable camera 11 and subject-use camera 13 from the first extraction point data DP1, rotation angle data DR and second extraction point data DP2 to generate relative position data DPS. Moreover, it also finds the relative position and orientation between subject-use camera 13 and three-dimensional chart 2 from the first extraction point data DP1, rotation angle data DR and relative position data DPS to generate image-pickup data DM. Image-pickup data DM is stored in RAM 151.

Based upon the user's instruction through operation buttons 164, display control unit 174 obtains the second image data D2 and image data DM from RAM 151, and stores the resulting data in memory card 166. Moreover, display control unit 174 also has such functions that it carries out necessary processes on various data so as to be displayed on a display 163, and reads various data stored in memory card 166 onto RAM 151.

<Principle of Camera Calibration>

When an image-pickup operation is carried out on subject 30 by subject-use camera 13 from a desired direction so that an image is obtained, it is necessary to specify the relative position and orientation of subject-use camera 13 with respect to three-dimensional chart 2 or the absolute coordinate system fixed thereto at the time of the image pickup operation, as external parameters. This is because, upon forming a three-dimensional image model of subject 30 by combining the respective images obtained through image-pickup operations from a plurality of directions, the mutual space relationship among the respective images is required.

However, when subject 30 is actually image picked up, it is sometimes difficult to insert three-dimensional chart 2 within the view angle of subject-use camera 13. Therefore, the following relationship, which is satisfied under the following conditions, is utilized.

$X_0$: coordinate system fixed to three-dimensional chart 2 (absolute coordinate system);

$X_1$: coordinate system fixed to movable camera 11 (first local coordinate system);

$X_2$: coordinate system fixed to subject-use camera 13 (second local coordinate system);

$\tau_{01}$: conversion relationship from the first local coordinate system $X_1$ to the absolute coordinate system $X_0$;

$\tau_{02}$: conversion relationship from the second local coordinate system $X_2$ to the absolute coordinate system $X_0$;

$\tau_{12}$: conversion relationship from the second local coordinate system $X_2$ to the first local coordinate system $X_1$. ($\tau_{01}$, $\tau_{02}$, $\tau_{12}$ and $Q_0$ and $Q_2$, which will be described later, are not shown in Figures).

$$\tau_{02} = \tau_{01} \cdot \tau_{12} \quad \text{(Equation 1)}$$

When conversion relationships $\tau_{01}$, $\tau_{12}$ have been known, conversion relationship $\tau_{02}$ is found. When conversion relationship $\tau_{02}$ is found, the position and orientation in the second local coordinate system $X_2$ of subject-use camera 13 that has picked up the two-dimensional image are found as the position and orientation in the absolute coordinate system $X_0$ by allowing this conversion relationship $\tau_{02}$ to function. Supposing that the matrix representing the position and orientation of subject-use camera 13 in the absolute coordinate system is defined as $Q_0$, and that the matrix representing the position and orientation of subject camera 13 in the second local coordinate system is defined as $Q_2$, the following equation holds:

$$Q_0 = \{\tau_{011} \cdot \tau_{12}\} Q_2 = \tau_{02} \cdot Q_2 \quad \text{(Equation 2)}$$

Therefore, each time subject 30 is image picked up by subject-use camera 13 while it is being shifted with respect to subject 30, the conversion relationship $\tau_{02}$ corresponding to this image-pickup is found, and this is made in association with the picked up image so that it is possible to obtain a three-dimensional image model of subject 30 by combining the images picked up in a plurality of directions at $X_0$.

The specific processes for achieving this principle (which will be described in detail later) are mainly classified into the first sub-process and the second sub-process.

*First Sub-process:

This is a sub-process for specifying the conversion relationship $\tau_{12}$ between the two camera coordinate systems.

First, three-dimensional chart 2 is image picked up simultaneously by movable-camera 11 and subject-use camera 13, and by using the results of the image-pickup operations, the external parameters of the respective cameras, that is, the position and orientation of the cameras in the absolute coordinate system $X_0$, are found.

This is equivalent to specifying the conversion relationships $\tau_{01}$, $\tau_{02}$ at the corresponding state. Then, based upon the relationship represented by the following equation 3 obtained from equation 1, the conversion relationship $\tau_{12}$ between the first local coordinate system $X_1$ and the second coordinate system $X_2$ is obtained.

$$\tau_{12} = (\tau_{01})^{-1} \tau_{02} \quad \text{(Equation 3)}$$

Moreover, since the values of rotation angles $\theta, \phi$ of movable camera 11 are known values respectively detected by angle sensors 126$p$, 126$t$, the rotation angle depending portions are separated from the conversion relationship $\tau_{12}$ so that a reference conversion relationship $\tau_{12}(0,0)$ at the time when movable camera 11 is in the reference orientation ($\theta=0$, $\phi=0$) can be found. This reference conversion relationship $\tau_{12}(0,0)$ is an operator that is unchanged even when camera system 10 is shifted or movable camera 11 is rotated. When the reference conversion relationship $\tau_{12}(0,0)$ has been determined, the conversion relationship $\tau_{12}$ is allowed to have rotation angles $\theta$, $\phi$ as variables.

The conversion relationship $\tau_{12}$ thus obtained is not dependent on the position and orientation of the entire camera system 10 in the absolute coordinate system $X_0$; therefore, even when camera system 10 is moved to another place, it is utilized in conversion calculations at this place.

*Second Sub-process:

This is a sub-process which obtains image data by picking up images of subject 30 from a plurality of directions while utilizing the results of the first sub-process, and adds information corresponding to the conversion relationship $\tau_{02}$ from the second local coordinate system $X_2$ to the absolute coordinate system $X_0$ to each pieces of the image data.

In the second sub-process, simultaneously as subject 30 is image picked up by subject-use camera 13, three-dimensional chart 2 is image picked up by movable camera 11. Based upon the image data from three-dimensional chart 2 picked up by movable camera 11, the conversion relationship $\tau_{01}$ from the first local coordinate $X_1$ to the absolute coordinate system $X_0$ is specified.

Here, since the rotation angle dependence of the conversion relationship $\tau_{12}$ from the second local coordinate system $X_2$ to the first local coordinate system $X_1$ has been specified in the first sub-process, the specific contents of the conversion relationship $\tau_{12}$ are specified from the values of the rotation angles $\theta, \phi$ at the time when subject 30 is picked up. Therefore, the conversion relationship $\tau_{02}$, formed by composing the conversion relationships $\tau_{12}$ and $\tau_{01}$, is obtained from equation 4.

$$\tau_{02} = \tau_{01} \tau_{12} \quad \text{(Equation 4)}$$

Then, information representing this conversion relationship $\tau_{02}$ is stored in association with the image obtained by subject-use camera 13.

Moreover, this second sub-process is executed each time subject 30 is image picked up from a plurality of directions, with the result that a group of information is obtained so as to provide a three-dimensional model.

<Image Pickup and Calibration Processes>

Figure 11:
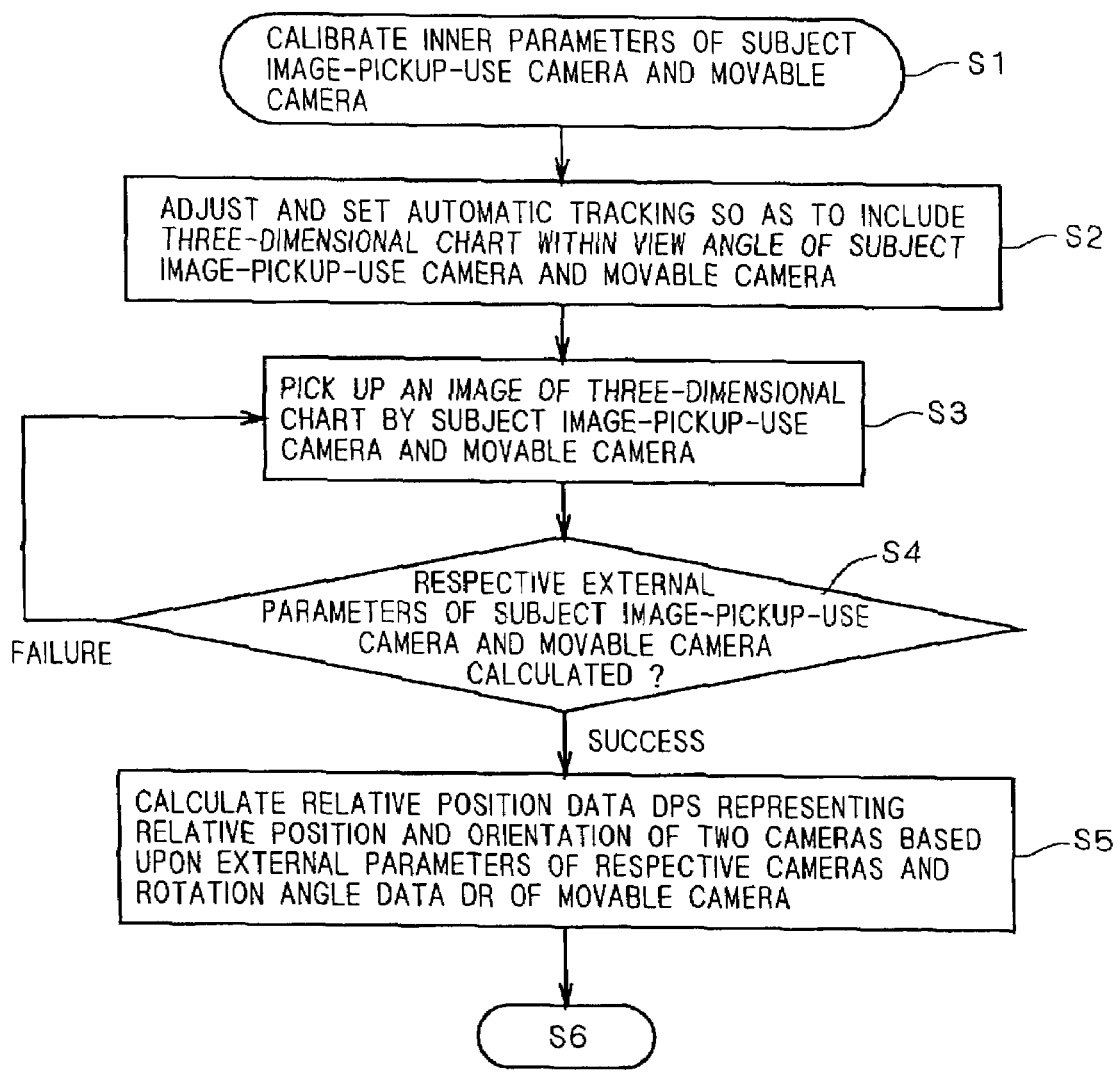
FIG. 11 is a drawing that shows a sequence corresponding to a first sub-process of image-pickup and calibration sequences using a three-dimensional chart in accordance with a first preferred embodiment.
Figure 12:
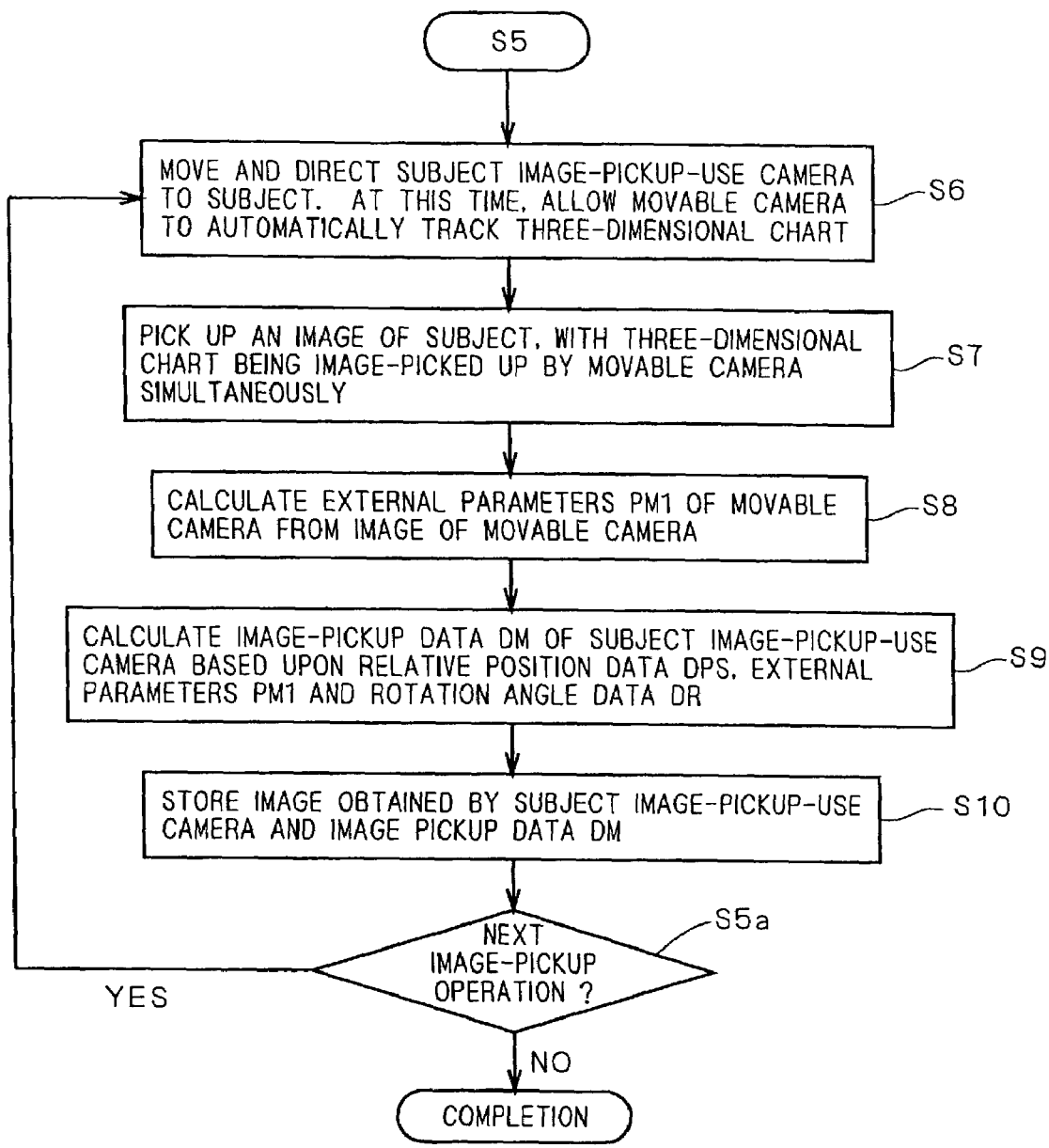
FIG. 12 is a drawing that shows a sequence corresponding to a second sub-process of image-pickup and calibration sequences using a three-dimensional chart in accordance with the first preferred embodiment.

FIGS. 11 and 12 show image pickup and calibration processes that are carried out in accordance with the above-mentioned principles. Among these, steps from step S1 to step S5 correspond to the above-mentioned first sub-process in which, by picking up images of three-dimensional chart 2 simultaneously by movable camera 11 and subject-use camera 13, the relative position and orientation of both of them are found. Moreover, steps from step S6 and thereafter correspond to the above-mentioned second sub-process for carrying out an actual image pickup process on subject 30.

(1) Determination of Relative Position Between Cameras (First Sub-process):

First, movable camera 11 and subject-use camera 13 respectively read information of inner parameters stored therein (step S1). Here, the inner parameters are parameters which specify the viewing direction of each of the pixels of the light-receiving elements, and include the focal distance of the lens system, the positional relationship between the lens light axis and the light-receiving element, the pixel pitches, etc. These parameters have been preliminarily calibrated.

Thereafter, the user holds camera system 10 in the hands and directs subject-use camera 13 to three-dimensional chart 2. Next, while maintaining this state, the user manually specifies the rotation angle of lens unit 110 so that three-dimensional chart 2 is located within the view angle of movable camera 11 (step S2). During this operation, the output image of movable camera 11 is being live-displayed on display 163 so that the user is allowed to visually confirm whether or not three-dimensional chart 2 is located within the view angle of movable camera 11.

Figure 13B:
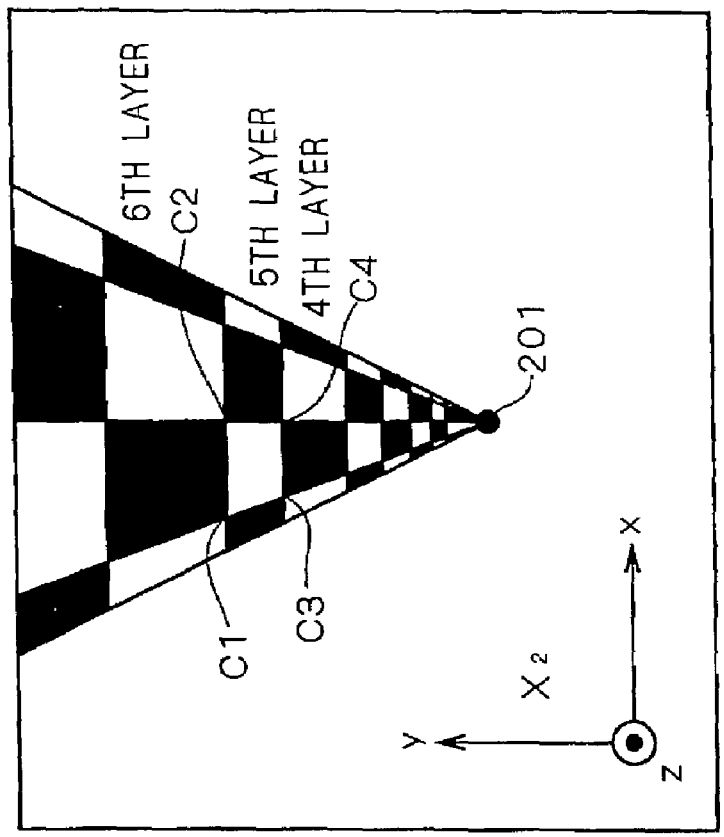
FIGS. 13A and 13B show respective image-pickup examples obtained when a movable camera and a subject-use camera simultaneously pick up images of a three-dimensional chart in accordance with the present invention.
Figure 13A:
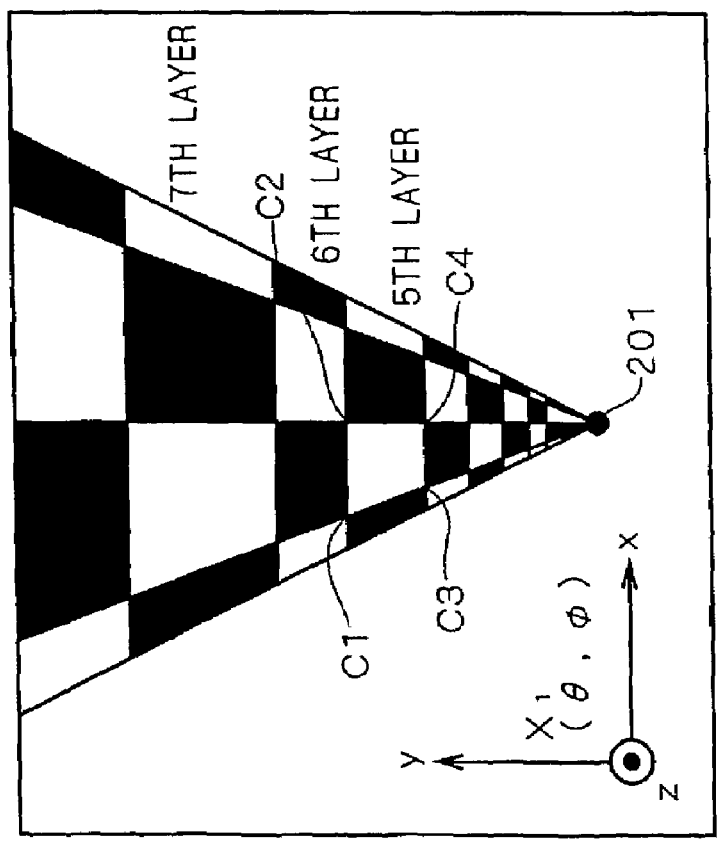

When, after three-dimensional chart 2 has been located in the view angle of movable camera 11, the user presses tracing button 117, an automatic tracing program is activated. A driving output is given to orientation altering device 113 from orientation control unit 146 so that movable camera 11 is automatically controlled so as to allow three-dimensional chart 2 to always stay in the center of the view angle, while marker 201 is being tracked (see a flow chart in FIG. 8). At this time, when the user presses shutter button 161, first image data D1 is obtained in movable camera 11, while second image data D2 is obtained in subject-use camera 13 (step S3). FIGS. 13A and 13B shows examples of image data that are simultaneously obtained from movable camera 11 and subject-use camera 13. Among these, FIG. 13A shows an example of a picked-up image from movable camera 11, and FIG. 13B shows an example of a picked-up image from subject-use camera 13. In any of the drawings of FIGS. 13A and 13B, an image plane is set as a plane defined by xy orthogonal coordinate system, and a direction that is perpendicular to the xy plane, and extends toward the front side from an image is defined as the z-axis. Here, with respect to the name, i-th layer, it is based upon the definition which will be described in FIG. 19, later.

Upon completion of the image pickup operation, the first image data D1 and the rotation angle data DR of orientation altering device 113 are transmitted to subject-use camera 13 from movable camera 11 through communications so that as commonly shown in FIGS. 13($a$) and 13($b$), two-dimensional coordinate values of four lattice points C1 to C4 are specified on the respective image planes (which is equivalent to forming first extraction point data DP1 and second extraction point data DP2), and these two-dimensional coordinate values are processed by the above-mentioned multipoint algorithm so that, based upon the first image data D1 and the second image data D2 derived from the picked-up image of three-dimensional chart 2, external parameters of the respective cameras, which depend on the relative positions and the relative orientations of the image pick-up positions of movable camera 11 and subject-use camera 13, and three-dimensional chart 2, can be calculated so that the positions and orientations of the respective cameras in the absolute coordinate system can be found (step S4). Here, in the case when information required for these calculations is not obtained, the sequence returns to step S3 where the image pickup operation of three-dimensional chart 2 is repeated.

Calculations of these external parameters are executed under the conditions that 1) the inner parameters of the cameras, and 2) the three-dimensional coordinate values of not less than 4 points on the same plane fixed to the absolute coordinate system have been known, and that 3) two-dimensional coordinate values of the points on the picked-up image corresponding to these points can be calculated.

The algorithm which can be utilized for these calculations has been disclosed in, for example, the following documents, and hereinafter, this algorithm is referred to as "multipoint analyzing algorithm".

L. Quan, Z. Lan, "Linear N-Point Camera Pose Determination", IEEE Trans. PAMI 21(8) 1999:

Takahashi, Ishii, Makino, Nakashizu, "Measurements on Marker Position and Pose from a Single-Eye Image for Artificial Realistic Interface", Electronic Information Report Journal AJ79 1996.

Next, based upon the respective external parameters from movable camera 11 and subject-use camera 13 obtained at step S4 and rotation angle data DR of movable camera 11, the relative positions and orientations between movable camera 11 and subject-use camera 13 are found (step S5).

Figure 14:
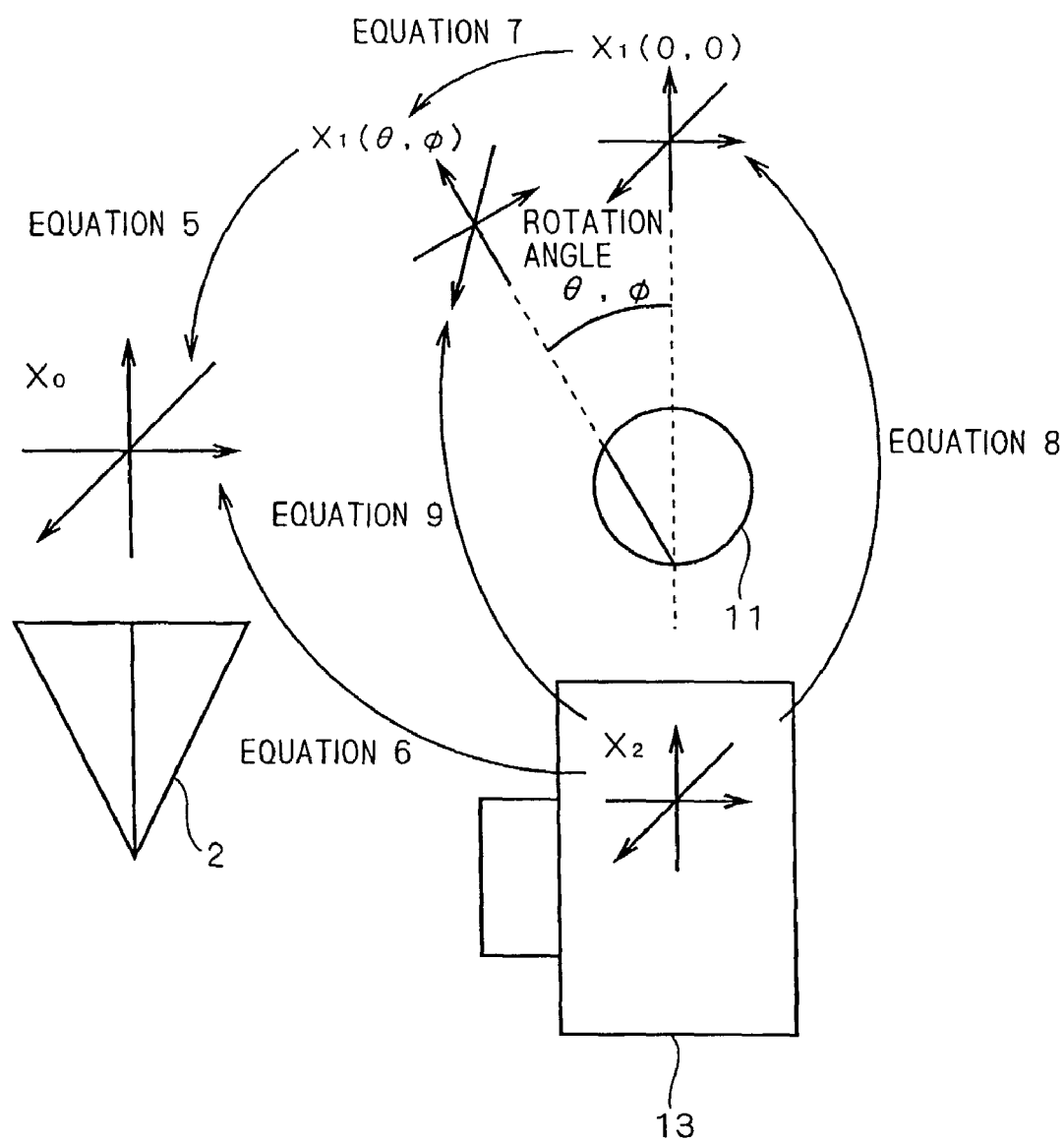
FIG. 14 is a drawing that shows coordinate conversions that are used when relative position and orientation of the subject-use camera with respect to the movable camera are calculated.

FIG. 14 shows a state of coordinate conversion used in step S5. Definitions of the respective coordinate systems in FIG. 14 are described as follows:

$X_0$ ... three-dimensional orthogonal coordinate system relatively fixed to three-dimensional chart 2 (absolute coordinate system);

$\theta$ ... pivotal angle of movable camera 11;

$\phi$ ... elevation or depression angle of movable camera 11;

$X_1 (\theta,\phi)$ ... three-dimensional orthogonal coordinate system (first local coordinate system) corresponding to an observation space from movable camera 11;

$X_{1h}$ ... the first local coordinate system when both of the angles $\theta,\phi$ are zero;

$X_2$ ... three-dimensional orthogonal coordinate system (second local coordinate system) corresponding to an observation space from subject-use camera 13.

Since the external parameters of the respective movable camera 11 and subject-use camera 13 are obtained by step S4, the position and orientation of the first local coordinate system $X_1 (\theta,\phi)$ in the absolute coordinate system $X_0$ are determined; therefore, the coordinate conversion from the first local coordinate system $X_1 (\theta,\phi)$ to the absolute coordinate system $X_0$ is defined as shown in the following equation by using the rotation matrix $R_{C1}$ and the parallel shifting vector $T_{C1}$:

$$X_0 = R_{C1}X_1(\theta,\phi) + T_{C1} \quad \text{(Equation 5)}$$

In the same manner, the coordinate conversion from the second local coordinate system $X_2$ to the absolute coordinate system $X_0$ is defined as shown in the following equation by using the rotation matrix $R_{C2}$ and the parallel shifting vector $T_{C2}$:

$$X_0 = R_{C2}X_2 + T_{C2} \quad \text{(Equation 6)}$$

These equations 5 and 6 respectively correspond to the aforementioned conversion relationships $\tau_{01}, \tau_{02}$.

In the case when both of the rotation angles $\theta,\phi$ are not zero, the rotation conversion is obtained as the following equation, from designing data of the rotation mechanism possessed by orientation altering device 113 of movable camera 11 by using the rotation matrix $R_X(\theta,\phi)$ and parallel shifting vector $T_X(\theta,\phi)$.

$$X_1 = R_X(\theta,\phi)X_{1h} + T_X(\theta,\phi) \quad \text{(Equation 7)}$$

Supposing that, when both of the rotation angles $\theta,\phi$ are zero, the coordinate conversion from the second local coordinate $X_2$ to the first local coordinate system $X_{1h}$ is represented by the following equation by using the rotation matrix $R_h$ and the parallel shifting vector $T_h$, equation 8 corresponds to the conversion relationship $\tau_{12}(0,0)$.

$$X_{1h} = R_h X_2 + T_h \quad \text{(Equation 8)}$$

Here, when equation 7 is substituted by equation 8, the following equation is obtained:

$$X_1 = R_m(\theta,\phi)X_2 + T_m(\theta,\phi) \quad \text{(Equation 9)}$$

where $$R_m(\theta,\phi) = R_X(\theta,\phi)R_h \quad \text{(Equation 10)}$$

$$T_m(\theta,\phi) = R_X(\theta,\phi)T_h + T_X(\theta,\phi) \quad \text{(Equation 11)}$$

Equation 9 to equation 11 correspond to the conversion relationship $\tau_{12}$.

Therefore, when the first extraction point data DPi and the second extraction point data DP2 are found from the respective images obtained by simultaneously image-picking up three-dimensional chart 2 by movable camera 11 and subject-use camera 13, and when the external parameters of the respective cameras are found, the conversion equations of equation 9 to equation 11 are specified as those corresponding to the aforementioned conversion relationship $\tau_{12}$. These correspond to relative positional data DPS of FIG. 10. Here, it is supposed that the external parameter of movable camera 11 is set to external parameter PM1 and that the external parameter of subject-use camera 13 upon picking up an image of the three-dimensional chart is set to external parameter PM2. Moreover, the specific values of the angles $\phi,\theta$ are detected as rotation angle data DR by angle sensors 126p, 126t.

Thus, based upon external parameter PM1, external parameter PM2 and rotation angle data DR, the relative position data DPS that depends on the relative position between the image pickup position in the reference orientation of movable camera 11 and the image pickup position of subject-use camera 13 and the relative orientation can be calculated; thus, a process (second sub-process) which will be described later is carried out by using this so that subject-use camera 13 can be calibrated.

(2) Image Picking Up Process of Subject and Camera Calibration (Second Sub-process):

Upon completion of step S5, camera system 10 is shifted on demand so as to pick up an image of subject 30. At this time, movable camera 11 always holds three-dimensional chart 2 within its view angle through the automatic tracing operation (step S6).

In a state where subject 30 can be image-picked up by subject-use camera 13 as well as in a state where three-dimensional chart 2 can be image-picked up by movable camera 11, when shutter button 161 of subject-use camera 13 is depressed, image pickup operations are simultaneously carried out on the respective cameras (step S7). FIGS. 15A and 15B show examples of images obtained by movable camera 11 and subject-use camera 13. FIG. 15A is an example of a picked-up image from movable camera 11, and FIG. 15B is an example of a picked-up image from subject-use camera 13 (the image of subject 30 is simplified, and given as an ellipse). The coordinate axes are set in the same manner as FIGS. 13A and 13B. In the state of FIG. 15A, since the distance and direction from three-dimensional chart 2 to movable camera 11 are different from those shown in FIG. 13A, movable camera 11 picks up an image of a portion of three-dimensional chart 2 different from that of FIG. 13A. However, since movable camera 11 automatically tracks marker 201, marker 201 is always displayed on the same position within the view angle of movable camera 11.

In this case, from the image obtained by movable camera 11, the position and orientation (external parameter PM1) in the absolute coordinate system $X_0$ of movable camera 11 are obtained in the same manner as step S4 (step S8).

Based upon the external parameter PM1 of movable camera 11, the relative position data DPS obtained at step S5 and the respective values $\theta',\phi'$ of the rotation angles $\theta,\phi$ of movable camera 11 at step S7, the relative position and orientation (that is, the external parameters of subject-use camera 13) of subject-use camera 13 with respect to three-dimensional chart 2 are found (step S9).

Figure 16:
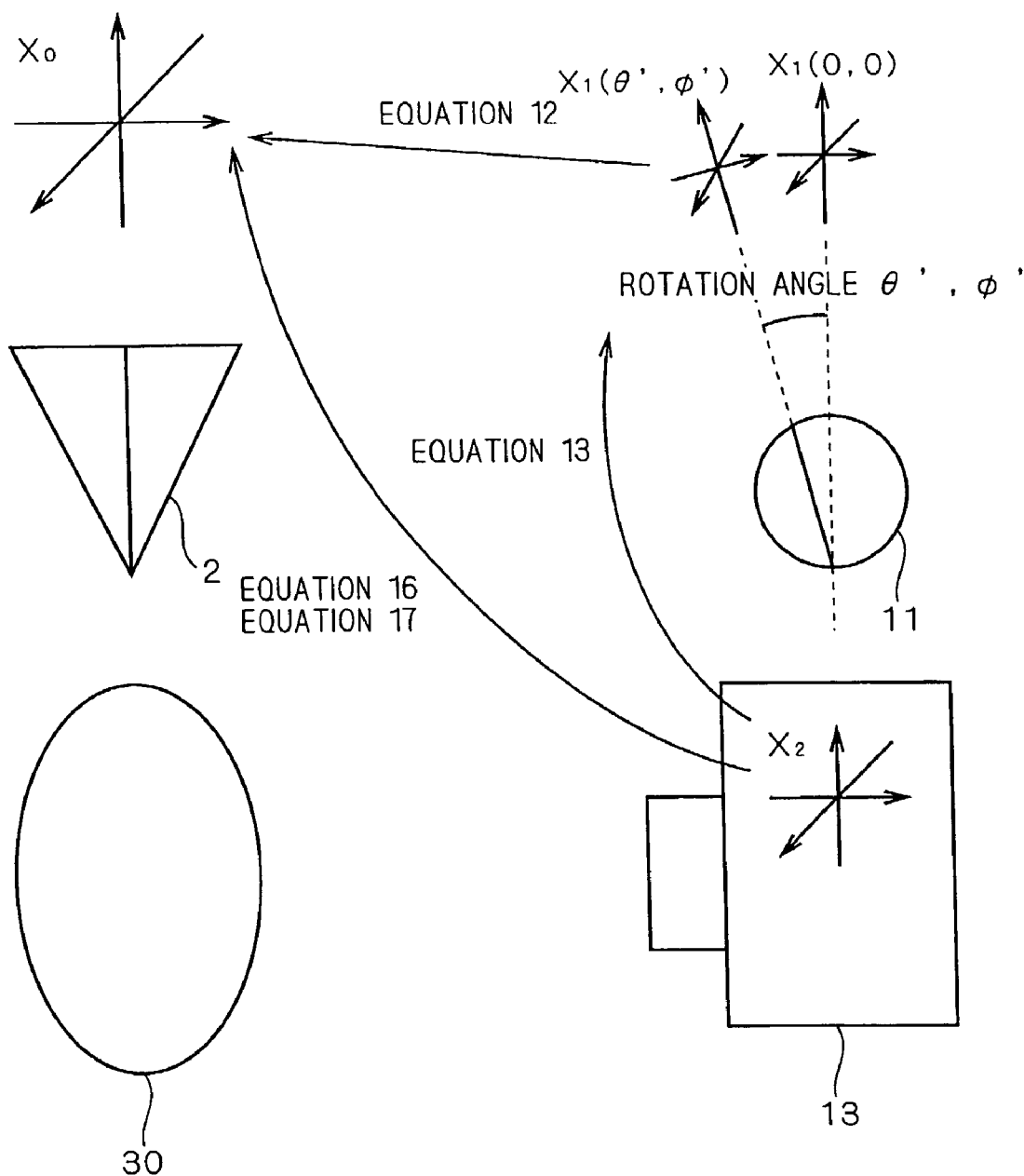
FIG. 16 is a drawing that shows coordinate conversions that are used when relative position and orientation of the subject-use camera with respect to the movable camera are calculated.

FIG. 16 shows a state of coordinate conversion used in the above-mentioned step S9. In FIG. 16, the definitions of symbols in the coordinate systems $X_0$, $X_1$ ($\theta$,$\phi$), $X_2$ are the same as FIG. 14. Here, it is supposed that the camera rotation angles of movable camera 11 at the time of an image-pickup process are set to $\theta'$,$\phi'$.

The image of three-dimensional chart 2 obtained by movable camera 11 is analyzed by a multipoint analyzing algorithm so that the position and orientation (that is, external parameter PM1 of movable camera 11) of movable camera 11 in the absolute coordinate system $X_0$ are specified, thereby making it possible to determine the following conversion relationship between the absolute coordinate system $X_0$ and the first local coordinate system $X_1(\theta',\phi')$ of movable camera 11:

$$X_0 = R_{CP1} X_1(\theta',\phi') + T_{CP1} \quad \text{(Equation 12)}$$

Moreover, the conversion relationship between the first local coordinate system $X_1$ ($\theta'$,$\phi'$) and the second local coordinate system $X_2$ is given as follows by equations 9 to 11:

$$X_1(\theta',\phi') R_m(\theta',\phi') X_2 + T_m(\theta',\phi') \quad \text{(Equation 13)}$$

$$R_m(\theta',\phi') = R_X(\theta',\phi') R_h \quad \text{(Equation 14)}$$

$$T_m(\theta',\phi') = R_X(\theta',\phi') T_h + T_X(\theta',\phi') \quad \text{(Equation 15)}$$

Therefore, in accordance with equations 12 to 15, the conversion relationship used for converting the position and orientation represented by the second local coordinate system $X_2$ to the position and orientation in the absolute coordinate system $X_0$ is obtained by the following equation:

$$X_0 = R_{CP1} R_m(\theta',\phi') X_2 + R_{CP1} T_m(\theta',\phi') + T_{CP1} \quad \text{(Equation 16)}$$

Among various values appearing in equation 16, the rotation matrix $R_{CP1}$ and parallel shifting vector $T_{CP1}$ are related to movable camera 11, and determined by the external parameter PM1 of movable camera 11. Moreover, the rotation matrix $R_m(\theta',\phi')$ and parallel shifting vector $T_m(\theta',\phi')$ are determined by substituting angle values $\theta'$,$\phi'$ detected by angle sensors 126$p$, 126$t$ into preliminarily specified functions $R_m(\theta,\phi)$, $T_m(\theta,\phi)$.

Therefore, by transforming equation 16 into the following equations, the rotation matrix $R_{CP2}$ and the parallel shifting vector $T_{CP2}$ are allowed to represent the external parameters of subject-use camera 13.

$$X_0 = R_{CP2} X_2 + T_{CP2} \quad \text{(Equation 17)}$$

$$R_{CP2} = R_{CP1} R_m(\theta',\phi') \quad \text{(Equation 18)}$$

$$T_{CP2} = R_{CP1} T_m(\theta',\phi') + T_{CP1} \quad \text{(Equation 19)}$$

These are stored together with the second image data D2 as image pickup data DM (FIG. 10), and used for combining images of subject 30 obtained from a plurality of directions, when a three-dimensional image model is formed based upon the second image data D2. The formation of this three-dimensional image model may be carried out by computer 15 or may be executed by another calculation system.

When image pickup data DM has been found, the image pickup data DM of subject-use camera 13 at the time of the image pickup operation is stored in RAM 151 or memory card 166 together with the second image data D2 of subject 30 (step S10).

Thus, based upon the external parameter PM1, the relative position data DPS and the rotation angle data DR, image pickup data DM used for calibrating subject-use camera 13, which depends on the relative position and the relative orientation between the image pickup position of subject-use camera 13 and three-dimensional chart, can be calculated so that the three-dimensional image model of subject 30 is formed by using the image pickup data DM through the aforementioned shape-from-silhouette method.

Thereafter, image-pickup operations are repeated until pieces of the second image data D2 the number of which is sufficient and the image pickup data DM related to the respective pieces are obtained (step S5$a$), thereby completing the second sub-process.

<Chart Discrimination Based Upon Coding of a Plurality of Cross Ratios>

The following description will discuss a method of coding of side faces of three-dimensional chart 2. As shown in FIG. 3, the display unit 204 of three-dimensional chart main body 203 forms a right polygonal pyramid shape and each of side faces T1 to T$n$ has the same isosceles triangle shape. On its surface, a plurality of straight lines L1 in parallel with bottom face direction DR1 (see FIG. 17) of the triangle forming the side face and a plurality of straight lines L2 that radially pass through apex x0 corresponding to the apex of three-dimensional chart 2 are drawn. Unit graphic forms UP each having a trapezoid shape (hereinafter, referred to as "unit trapezoid"), which are formed by these straight lines intersecting each other, are alternately painted with different colors with different lightness separately to form high-contrast patterns. Typically, the first set of unit trapezoids UP1 are black, and the second set of unit trapezoids UP2 are white.

Figure 18:
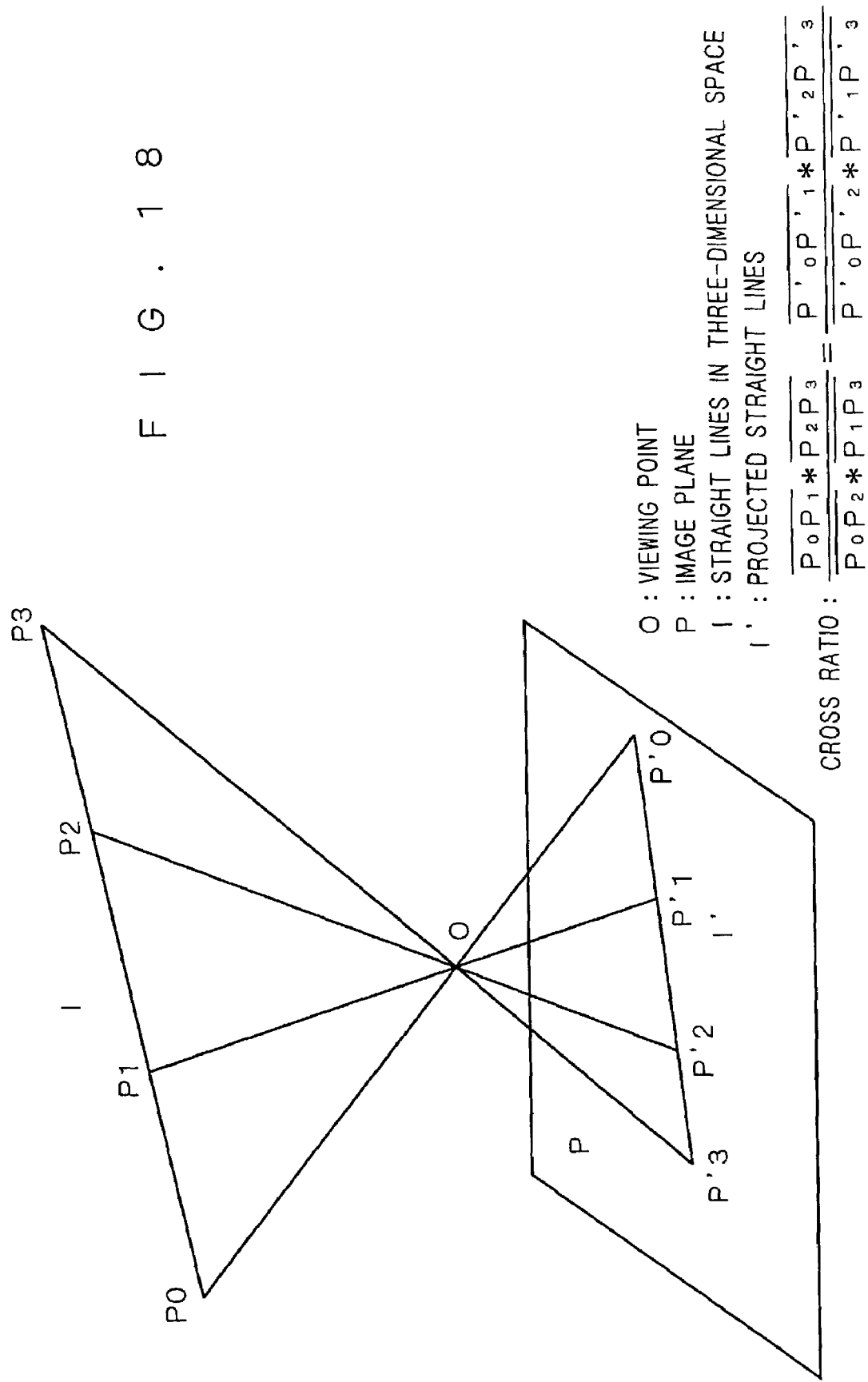
FIG. 18 is a drawing that explains that the cross ratio is not changed by projection.

Then, the sizes of these unit trapezoids UP are coded through a plurality of cross ratios. More specifically, 1) mutual distances of the group of straight lines L1 forming these unit trapezoids UP and 2) distances of crossing points (lattice points) between the group of straight lines L1 and the group of straight lines L2 in the bottom face direction DR1 are respectively coded through a plurality of cross ratios. FIG. 18 shows a concept of these cross ratios, and cross ratios are values that are unchanged by space projections passing through a desired viewing point, and it has been known that cross ratios DR found from four points P0 to P3 on a straight line located in the three-dimensional space, which are represented as follows:

$$DR = Va/Vb \quad \text{(Equation 20)}$$

$$Va = dis(P0P1) \cdot dis(P2P3) \quad \text{(Equation 21)}$$

$$Vb = dis(P0P2) \cdot dis(P1P3) \quad \text{(Equation 22)}$$

where the symbol dis(P0P1) represents a distance between point P0 and point P1, are equal to cross ratios DR' found from four points P'0 to P'3 that correspond to the four points P1 to P4, when the straight lines are projected onto a desired plane through viewing point O, the cross ratios DR' being represented by:

$$DR' = Va'/Vb' \quad \text{(Equation 23)}$$

$$Va' = dis(P'0P'1) dis(P'2P'3) \quad \text{(Equation 24)}$$

$$Vb' = dis(P'0P'2) dis(P'1P'3) \quad \text{(Equation 25)}$$

Figure 17:
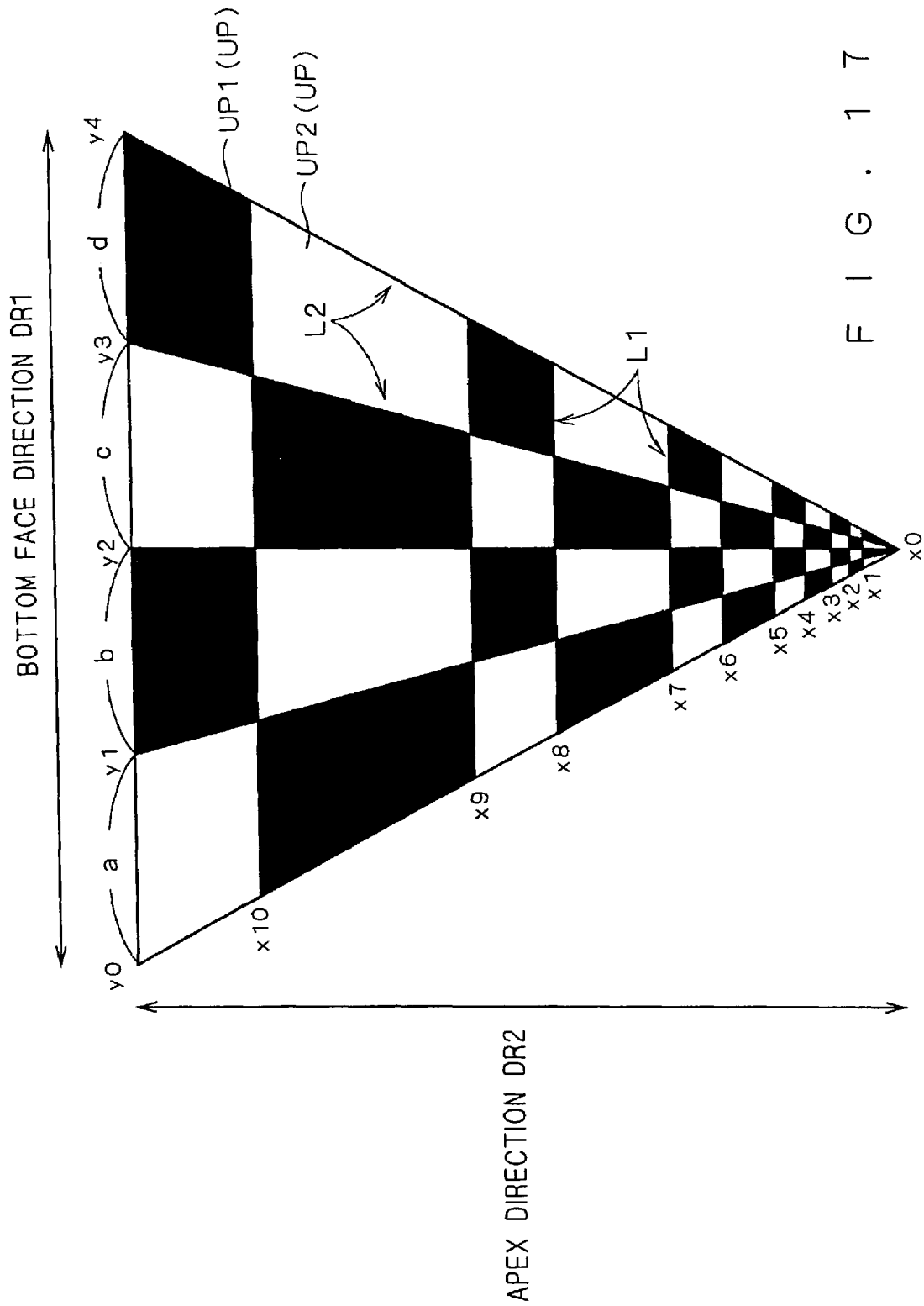
FIG. 17 is a drawing that shows an example in which the size of a unit trapezoid is coded by a cross ratio on a side face of a three-dimensional chart in accordance with the first preferred embodiment.

By utilizing the above-mentioned property, the mutual distances of the group of straight lines L1 forming unit trapezoids UP shown in FIG. 3 and FIG. 17 are coded through cross ratios for each of layers forming the respective unit trapezoids UP, and the distances between the mutual lattice points in the bottom surface direction DR1 are coded by using compound ratios that are different depending on the respective side faces T1 to T$n$; thus, it is possible to univocally recognize which unit trapezoid located on which side face of the side faces T1 to T$n$ of three-dimensional chart 2 each of the unit trapezoids UP contained in an image of three-dimensional chart 2 picked up by movable camera 11 or subject-use camera 13 is derived from. An example is given in the following description.

FIG. 17 shows an example in which the distances of straight lines L1 aligned in a direction perpendicular to the bottom face (apex direction DR2) are coded through cross ratios. Among a plurality of unit trapezoids, the cross ratios of heights of mutually continuous three unit trapezoids are coded so as to become different every set of three unit trapezoids.

In other words, when straight lines x1, x2 . . . that are in parallel with the bottom side are defined with apex x0 of three-dimensional chart 2 serving as the end point, and "first i layer" is defined as "an area between straight light x1 and straight line x(i+1)", the cross ratios DRi of the respective positions in the apex direction DR2 direction of the i layer to the (i+3) layer (i=1, 2, . . . ) are represented by:

$$DRi=Vai/(Vbi \cdot Vb(i+1)) \quad \text{(Equation 26)}$$

$$Vai=dis(xix(i+1)) \cdot dis(x(i+2)x(i+3)) \quad \text{(Equation 27)}$$

$$Vbi=dis(xix(i+1))+dis(x(i+1)x(i+2)) \quad \text{(Equation 28)}$$

$$Vb(i+1)=dis(x(i+1)x(i+2))+dis(x(i+2)x(i+3)) \quad \text{(Equation 29)}.$$

Alternatively, these are defined by rewriting these equations as follows:

$$DRi=Vai/VBi \quad \text{(Equation 30)}$$

$$Vai=dis(xix(i+1)) \cdot dis(x(i+2)x(i+3)) \quad \text{(Equation 31)}$$

$$VBi=dis(xix(i+2))+dis(x(i+1)x(i+3)) \quad \text{(Equation 32)}$$

Thus, the respective cross ratios DRi are set to values shown in FIG. 19. The sizes of the respective unit trapezoids (width and height) increase as they come closer to the bottom face of the pyramid shape.

Moreover, in the present preferred embodiment, the moving average of the distances of straight lines x1, x2 . . . in the apex direction DR2 is defined so as to be virtually proportional to the distance from the apex. In other words, from FIG. 19, the positions of the respective layers are represented by "17.000, 22.500, 31.000 . . . " and the differences of these are:

5.500(=22.500−17.000)

8.500(=31.000−22.500).

Figure 20:
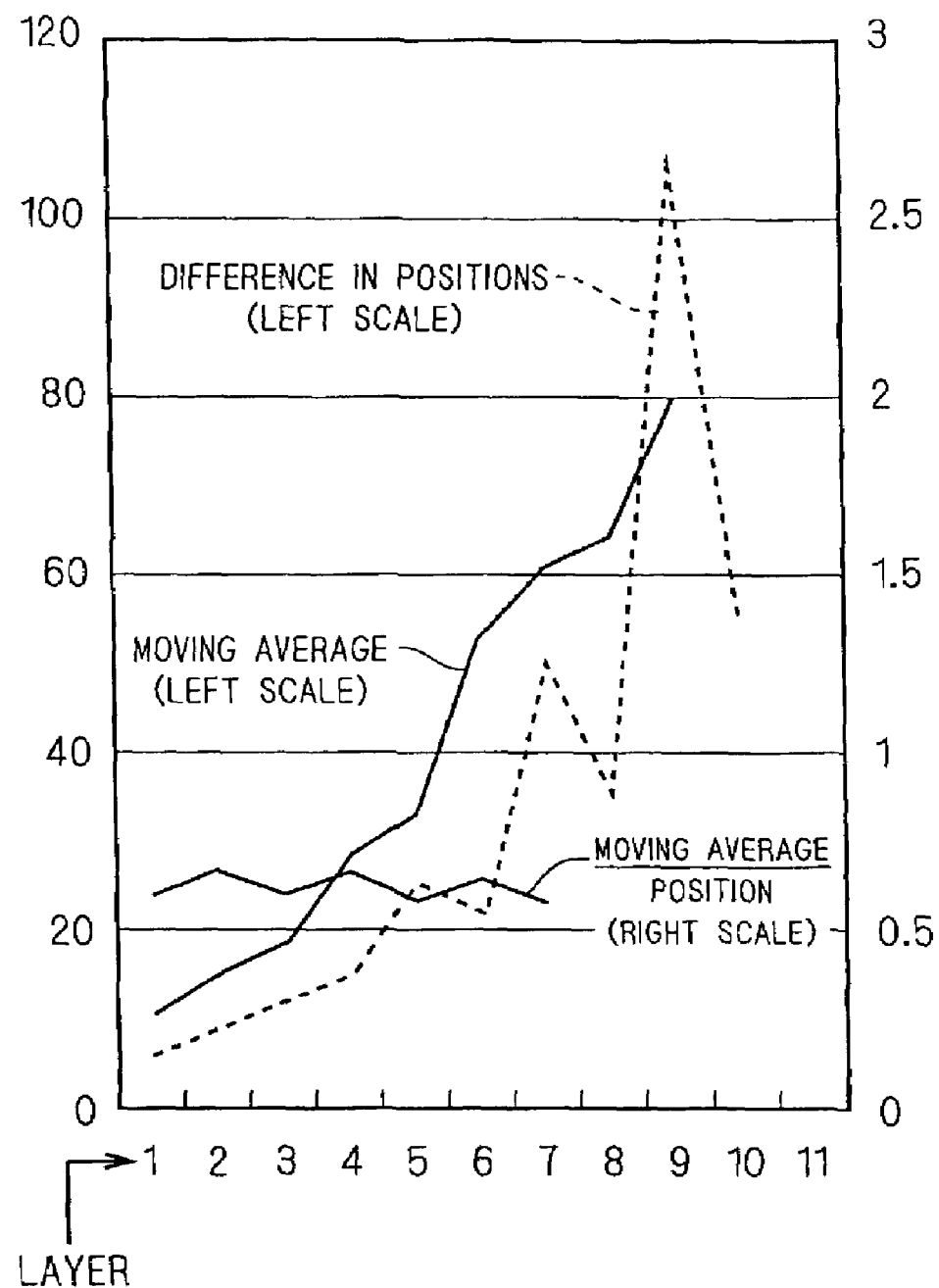
FIG. 20 is a drawing that indicates that the moving average of distances of straight lines obtained from FIG. 19 is virtually proportional to the distance from the apex.

Among these successive differences, the moving average of continuous four differences is shown in FIG. 20. As shown by FIG. 20, the moving average of the differences of positions of the respective layers (thickness of the layer) gradually increases; however, the variation of the value "moving average/position (of the layer from the apex)", that is, the value corresponding to the proportional coefficient fluctuates within approximately 20%. Therefore, the moving average is virtually proportional to the distance from the apex.

Here, with respect to the distance between the crossing points of straight lines y1, y2 . . . extending radially centered on the apex and the above-mentioned straight lines x1, x2 with respect to the bottom face direction DR1, it is determined so that the side faces T1 to Tn of three-dimensional chart 2 can be respectively discriminated. FIG. 21 shows a case in which three-dimensional chart 2 is provided as a hexagonal pyramid shape. In FIG. 17 and FIGS. 21, $a, b, c$ and $d$ respectively represent the distances between straight lines y0, y1 . . . on the bottom side.

In this example, two types of cross ratios DRα and DRβ, which are defined by the following equations, $$DR\alpha=(a \cdot c)/\{(a+b) \cdot (b+c)\} \quad \text{(Equation 33)}$$

$$DR\beta=(b \cdot d)/\{(b+c) \cdot (c+d)\} \quad \text{(Equation 34),}$$

are coded in their value so that 1) in any one of straight lines x1, x2 . . . , these ratios are in common with respect to the row of crossing points formed with any of straight lines y0, y1 . . . within each of the side faces Tj (j=1 to 6), and
2) are mutually different on the different side faces.

<Identification of Image Pickup Portion>

Figure 22:
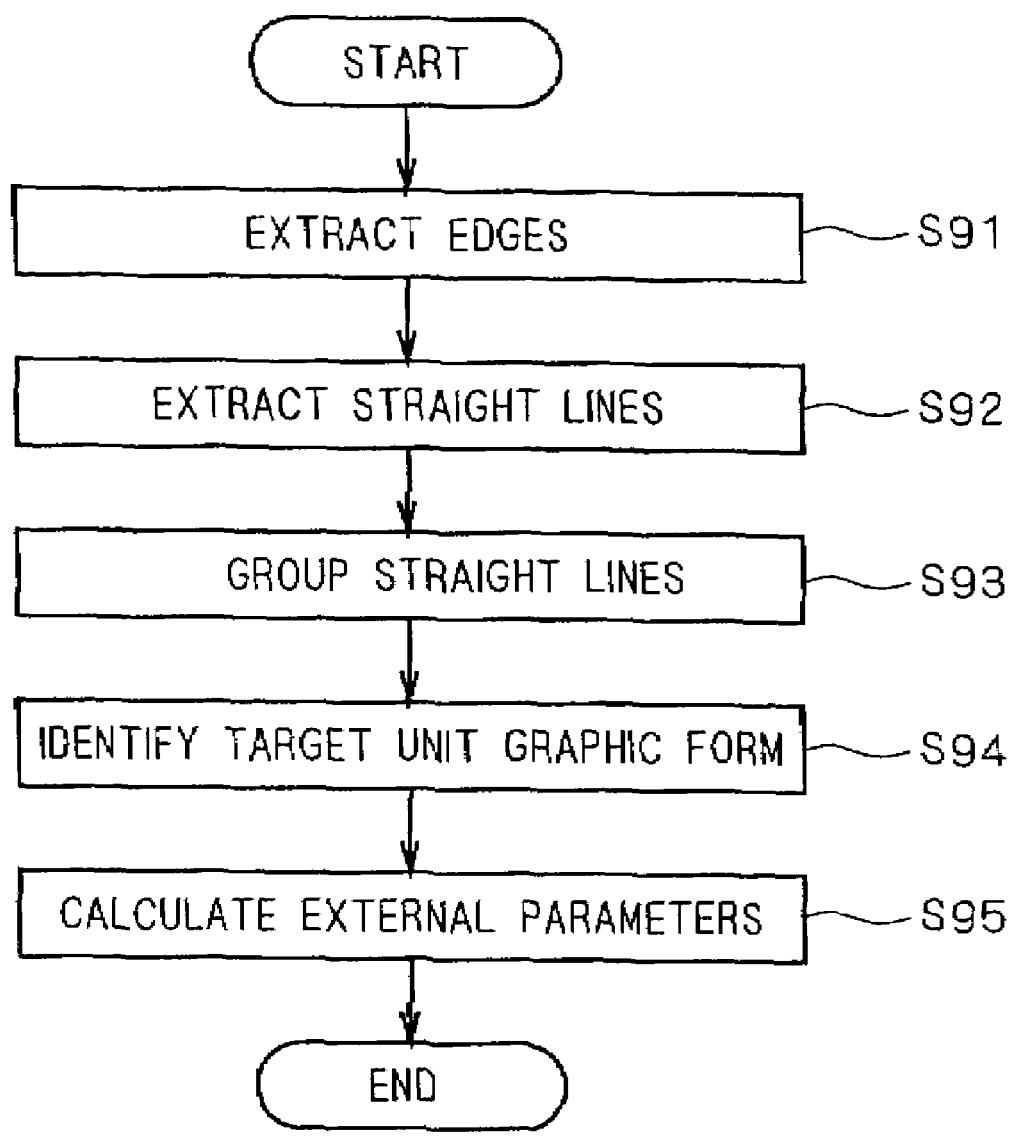
FIG. 22 is a drawing that shows a sequence of an identifying process of an image-pickup portion on the three-dimensional chart from a picked-up image of the three-dimensional chart in accordance with the first preferred embodiment.

FIG. 22 is a flow chart that shows a process that identifies which portion of three-dimensional chart 2 is subjected to an image pickup operation in the image pickup process of three dimensional chart 2 by movable camera 11 and subject-use camera 13. FIGS. 23A, 23B and 23C explain the grouping of straight lines.

*Grouping of Straight Lines:

First, edges in the density of a picked-up image are extracted (step S91). With respect to the method of extracting edges, various methods such as Sobel operator have been known, and, for example, an algorithm disclosed in "Image Recognition Method" Corona K.K., written by Makoto Nagao, 1983, is used. With respect to the image of FIG. 23A, FIG. 23B shows an example of extracted edges.

Next, straight lines are extracted from the edges thus extracted (step S92). With respect to the method of extracting straight lines, HOUGH conversion has been known as a general method, and a plurality of straight lines are extracted from the edge image by using, for example, the method described in the above-mentioned document written by Makoto Nagao, and equations of the straight lines on the two-dimensional plane on the picked-up image basis can be determined. With respect to the image of FIG. 23B, FIG. 23C shows an example of extracted straight lines.

A plurality of straight lines thus extracted are classified into a plurality of groups based upon properties of the straight lines, as described below (step S93).

A group of parallel straight lines (hereinafter, this group is referred to as αi. i represents a group of straight lines having the same gradient);

Straight lines passing through end points of the respective straight lines belonging to αi (this is referred to as β); and A group of straight lines intersecting αi (hereinafter, referred to as γi. i corresponds to i of the group of straight lines αi to be intersected).

In the example of FIG. 23C, the respective straight lines are classified into two groups of straight lines $\alpha_1$, $\alpha_2$ that have different gradients, groups of straight lines $\gamma_1$, $\gamma_2$ that correspond to these, and an intersecting straight line β.

Here, since the intersecting straight line β and $\gamma_i$ intersect each other at one point, this crossing point corresponds to marker 201 of three-dimensional chart 2. Consequently, it is defined that the straight line corresponding to a side of a pyramid shape forming three-dimensional chart 2 is straight line β, the straight line in parallel with the bottom face is straight line αi and the straight line passing through a side face of the pyramid shape is straight line $\gamma_i$. Based upon these, cross ratios of crossing points related to each of the unit trapezoids on an image can be calculated.

*Identification of Image-pickup Portion:

First, prior to an image pickup operation, with respect to groups of straight lines on the respective side faces T1 to Tn of three-dimensional chart 2, the coordinates of crossing points (lattice points) represented by the absolute coordinate system $X_0$ and data of cross ratios calculated from the distances of these crossing points are preliminarily stored in RAM 151 (FIG. 9). Then, based upon an image obtained when three-dimensional chart 2 is image-picked up by moveable camera 11 or subject-use camera 13, three continuous layers in the apex direction DR2 or unit trapezoids are specified, and cross ratios are calculated based upon the heights of these.

FIGS. 24A and 24B show examples of images that are obtained when the same side face of three-dimensional chart 2 is image-picked up from different distances. FIG. 24A is an example of a long-distance image, and FIG. 24B is an example of a short-distance image. The distances of unit trapezoids in the apex direction DR2 are virtually proportional to the distances from the apex.

In order to calculate cross ratios with respect to the distances of the straight lines, it is only necessary to observe four continuous points on the same straight line. In other words, four straight lines, which are located within the view angle and continue with distances that are sufficient to calculate the cross ratios with high precision, need to be observed in association with another single straight line that intersect these straight lines. In the case when a number of straight lines exist in an image, for example, four straight lines, which have a distance from the next straight line that is not less than a predetermined threshold distance, and are aligned in a position closest to the apex on the right upper side of the apex (marker 201), are selected. Then, four crossing points between the four straight lines and the single straight line extending along the apex direction DR2 are extracted, and the cross ratios of these distances are calculated. Among pieces of data obtained by this extracting process, the piece obtained by movable camera 11 corresponds to the first extraction point data DP1 of FIG. 10, and the pieces obtained by subject-use camera 13 corresponds to the second extraction point data DP2.

In FIG. 24A, four straight lines x7 to x10, which respectively extend in the bottom face direction DR1, and specify the respective upper and lower ends of the seventh to ninth layers, are selected as these four straight lines, and in the same manner, in FIG. 24B, four straight lines x3 to x6, which specify the respective upper and lower ends of the third to fifth layers, are selected as these four lines. In this manner, by selecting four straight lines, it becomes possible to sufficiently calculate cross ratios in any of the images. When images of a plurality of side faces have been picked up, for example, the side face that is closest to the image center is selected.

Moreover, since three-dimensional chart 2 has a pyramid shape, even when images of three-dimensional chart 2 are picked up from various directions, it is possible to sufficiently observe at least one side face as long as marker 201 is being detected by an automatic tracing process.

One of a plurality of unit trapezoids located within an area surrounded by the selected four lines is selected as a subject unit trapezoid (subject unit graphic form). This subject unit trapezoid can be selected based upon selection rules in which, for example, a unit trapezoid that is surrounded by two straight lines on the intermediate side of the above-mentioned four straight lines and located closest to the center of the screen is selected. In the example shown in FIGS. 24A and 24B, for example, unit trapezoids UPA, UPB are selected as subject unit trapezoids.

Then, with respect to the above-mentioned four straight lines, based upon distances on the image in the apex direction DR2, cross ratios are found as subject cross ratios, and these are compared and collated with cross ratio values (FIG. 19) of straight line distances of the respective side faces preliminarily stored in RAM 151. Thus, it is possible to identify what range of layers of three-dimensional chart 2 the four straight lines specify and which unit trapezoid of three-dimensional chart 2 the subject unit trapezoid corresponds to (step S94).

Here, the size of the unit trapezoid in the apex direction is increased as it comes closer to the bottom face of the pyramid shape so that the following advantages are obtained.

First, In the case when only a comparatively small number of unit trapezoids are located within an image (FIG. 24B), by picking up an image of three-dimensional chart 2 in a distance comparatively close thereto, unit trapezoids closer to marker 201 are picked up as images with comparatively large sizes.

In contrast, in the case when the picked-up image size of each unit trapezoid becomes comparatively smaller by picking up an image of three-dimensional chart 2 in a comparatively long distance, since unit trapezoids that have a large actual size and are close to the bottom face of the pyramid shape are located within the image (FIG. 24A), they are not made smaller so much in the observing size on the image.

Therefore, in both of the cases of the short distance image pickup and the long distance image pickup, unit graphic forms, which have a sufficient size so as to always maintain high precision in the image processing, are included in the image; consequently, it is possible to improve the calculation precision without depending on the image-pickup distance so much. This is the reason why the size of each unit trapezoid in the apex direction is increased as it comes closer to the bottom face of the pyramid shape, and the resulting advantages.

The subject unit trapezoid is thus identified so that it becomes possible to calculate the relative position and orientation of the camera with respect to three-dimensional chart 2, that is, external parameters in the absolute coordinate system $X_0$ (step S95). The following description will discuss this process.

First, RAM 151 preliminarily stores cross ratios of distances a, b, c, d between the respective side faces T1 to Tn of a pyramid shape shown in FIG. 21 and information indicating which directions in the absolute coordinate system $X_0$ the respective side faces T1 to Tn of the pyramid are directed, as tables in a manner so as to be associated with each other. Therefore, coordinates of four crossing points that continue in the bottom face direction DR1 on the image are specified on one of the four straight lines (for example, in the example of FIG. 24A, straight line x7 to which the side closest to the apex among the sides of the subject unit trapezoid belongs), and cross ratios of the distances thereof are calculated, and collated with the above-mentioned table so that the side face to which the subject unit trapezoid belongs is identified as an observing side face that virtually faces the camera at this point of time. Then, by determining which of the side faces T1 to Tn the observed side face belongs to, the relative orientation of the camera with respect to three-dimensional chart 2 can be obtained in the absolute coordinate system $X_0$.

In order to recognize the relative orientation of the camera with respect to three-dimensional chart 2 in more detail, for example, based upon the coordinate values of the four apexes of the subject unit trapezoid, the ratios of the lengths of the four sides that specify the outer circumference of the subject unit graphic form are found. These ratios are varied depending on how much degree the image-pickup axis line of the camera is tilted from the normal direction of the subject unit trapezoid in the absolute coordinate system. Therefore, based upon these ratios, it is possible to identify the direction of the image-pickup axis line of the camera with respect to the normal direction of the corresponding side face.

When the subject unit trapezoid has been specified and the relative orientation of the camera with respect to three-dimensional chart 2 has been found, the actual size information of a unit trapezoid corresponding to the subject unit trapezoid is read from the actual size information of the respective unit trapezoids that has been preliminarily stored in RAM 151. Then, with respect to the subject unit trapezoid, ratio r between the size on the image and the actual size is found. The ratio r is a function of distance L between three-dimensional chart 2 and the camera, and the relative orientation of the camera with respect to three-dimensional chart 2, and since the relative orientation is found as described above, the distance L is actually represented by a function f(r) of the ratio r. Therefore, an operation expression or a numeric value table corresponding to the function f(r) is stored so that the distance L can be calculated from the ratio r. Based upon the distance L and the relative orientation of the camera with respect to three-dimensional chart 2, the relative position of the camera with respect to three-dimensional chart 2 is found.

As described above, three-dimensional chart 2 of the present preferred embodiment is image-picked up as an image located in the center of the view angle by using a camera other than the subject-use camera so that it is possible to accurately acquire external parameters among calibration parameters used for calibrating the position and orientation of the camera.

2. Second Preferred Embodiment

In the first preferred embodiment, an explanation has been given of a system in which movable camera 11 is attached to subject-use camera 13 so that the position and orientation of subject-use camera 13 at the time when the second image data is obtained by subject-use camera 13 are identified so as to provide optimal data suitable for the Shape-From-Silhouette method; however, this technique is also applied to a system in which a plurality of movable cameras are attached to a human body and movements of the human body is traced in detail. Such data can be used for reproducing movements of a person in a virtual reality space.

Figure 25:
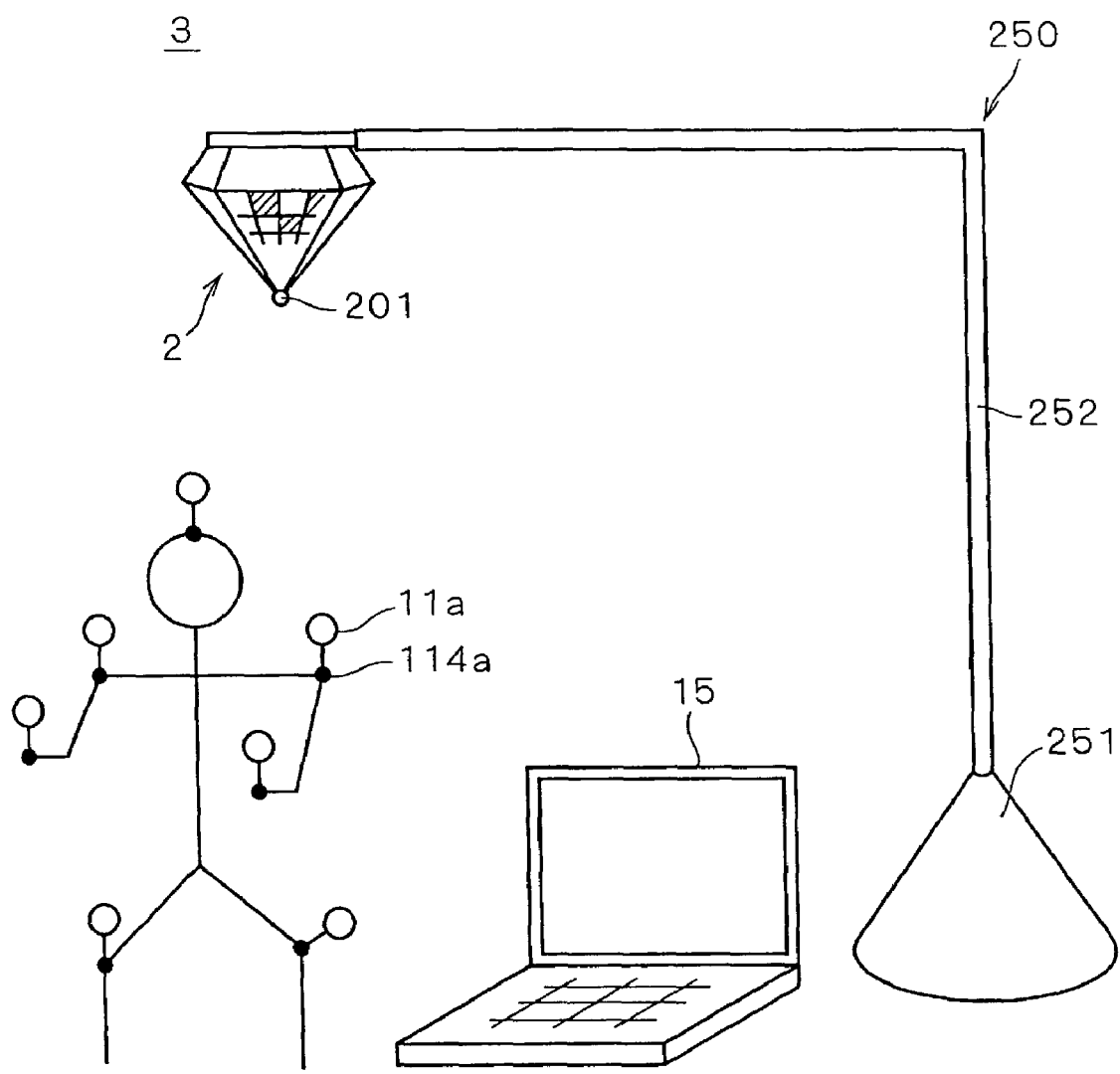
FIG. 25 is a drawing that shows a structural example of an image-pickup system using a three-dimensional chart in accordance with the second preferred embodiment.
Figure 26:
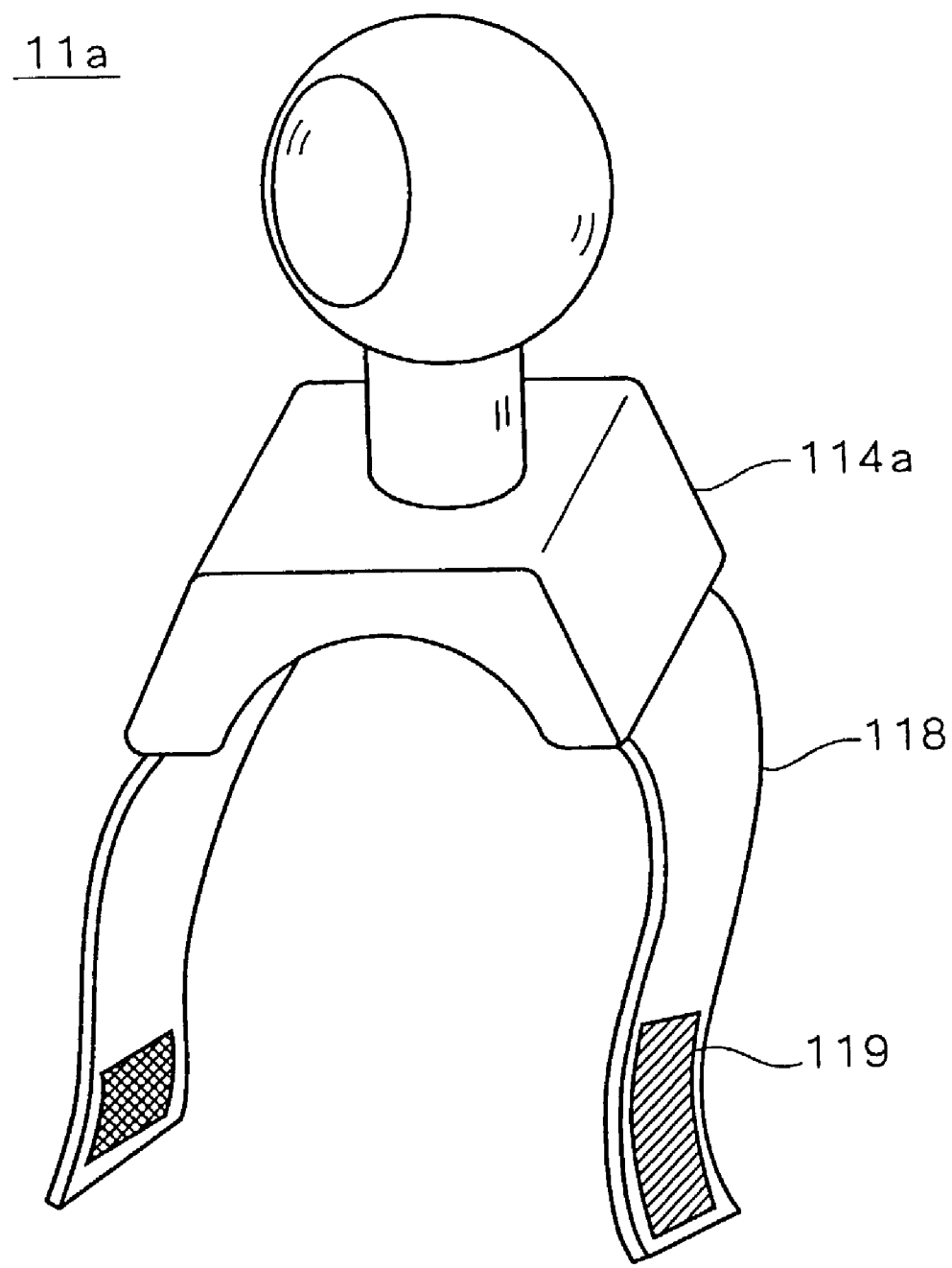
FIG. 26 is a drawing that shows an external appearance of a movable camera in accordance with the second preferred embodiment.

FIG. 25 is a drawing that shows a construction of an image pickup system 3 in a second preferred embodiment that has been designed based upon such a principle. FIG. 26 is an external view of a movable camera 11a in the present preferred embodiment. The following description will discuss the present preferred embodiment with the same construction, etc. as the first preferred embodiment being omitted on demand. Movable camera 11a in image pickup system 3 is attached to a human body with a cloth belt 118 and a freely detachable tape 119 as shown in FIG. 26, and various data such as image data, thus acquired, is transmitted to a computer 15 serving as a calibration-use information processing device through radio.

Movable camera 11a has the same functions and construction as that of the first preferred embodiment except that it is attached to a human body with cloth belt 118. However, the rotation angle data DR is not data that directly indicates the driving angle of an orientation altering device 113 with respect to the reference orientation of movable camera 11a, but data formed by taking into consideration the relative position and relative orientation of a securing portion 114a with respect to the image pickup position of movable camera 11a in the reference orientation.

Moreover, movable camera 11a carries out the same operations and processes as the first preferred embodiment. Thus, it acquires the first image data D1 and rotation angle data DR at the time of an image pickup process, and transmits the resulting data to computer 15 serving as the calibration-use image processing device. Here, the acquiring process of the first image data D1 is not carried out in synchronism with the shutter, but is automatically carried out in predetermined synchronized timing. Here, the data is transmitted to computer 15 in a manner so as to allow recognition as to which camera 11a the data is obtained from.

Figure 27:
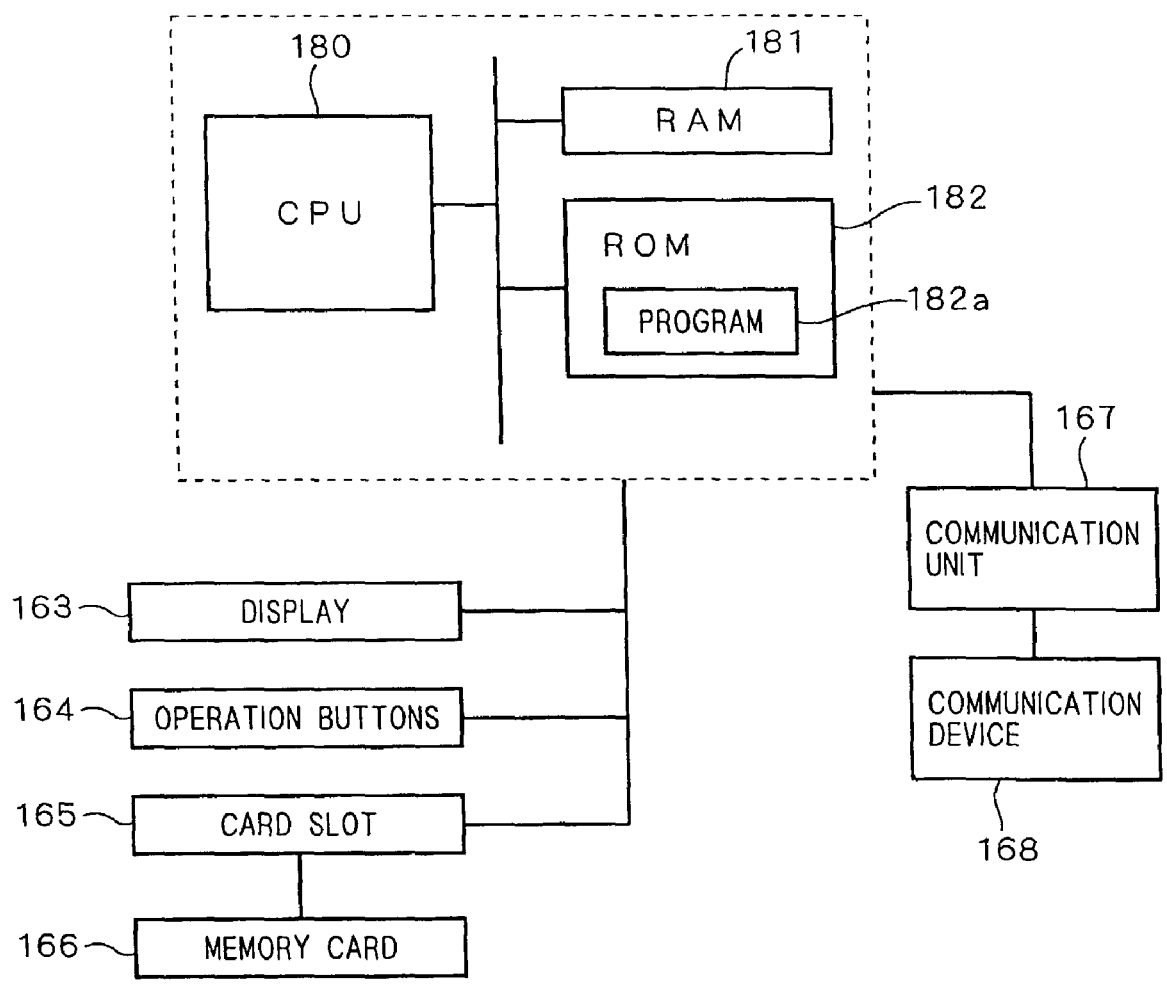
FIG. 27 is a drawing that shows an essential portion of an information processing function of the subject-use camera.
Figure 28:
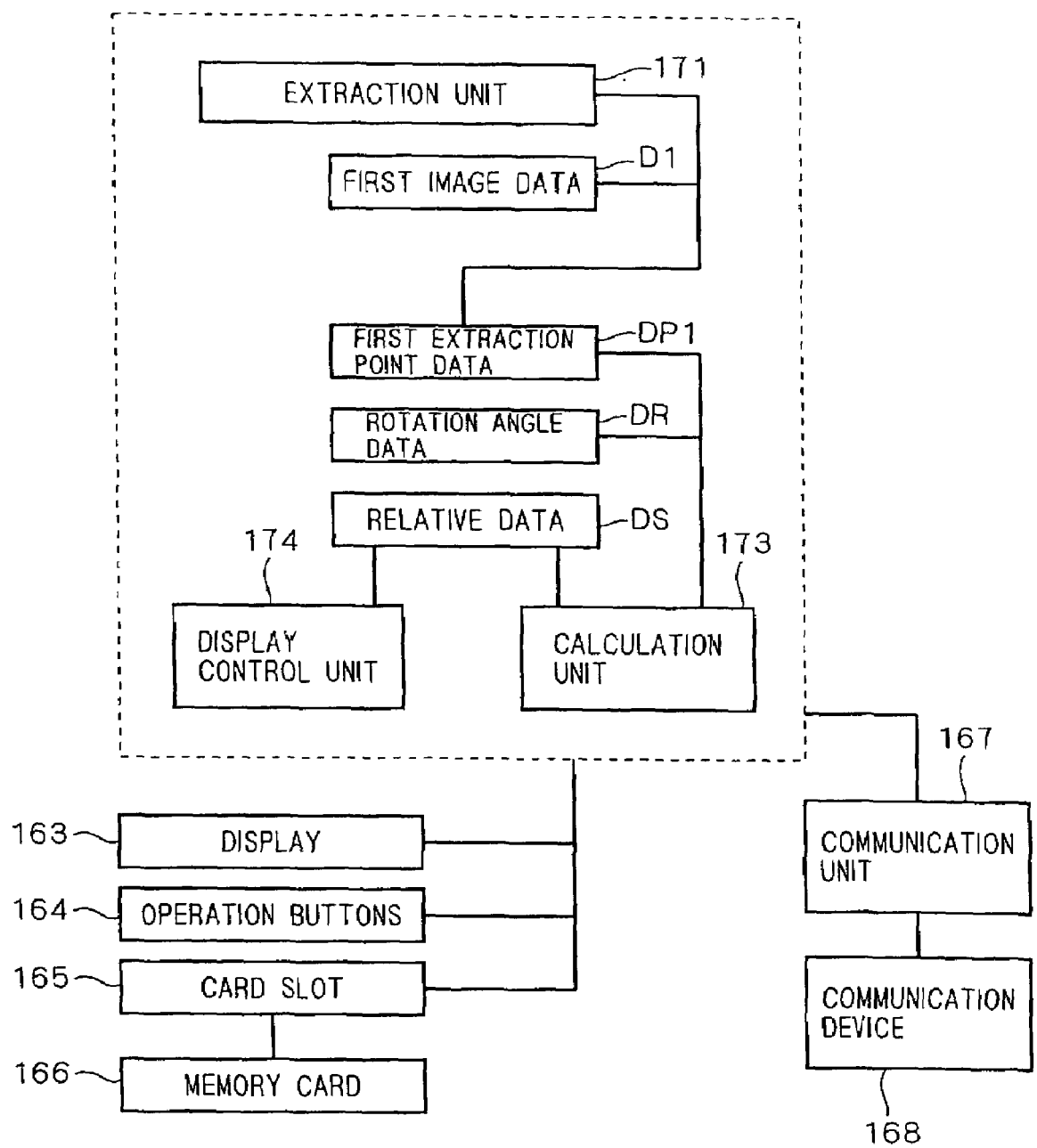
FIG. 28 is a drawing that shows a flow of data in the subject-use camera.

FIG. 27 is a drawing that shows an essential portion of the information processing functions of computer 15 from the viewpoint of the hardware structure, and FIG. 28 is a drawing that shows a flow of data in computer 15. In the following description, with respect to devices that execute the same functions as the information processing functions as subject-use camera 13 of the first preferred embodiment, those devices are indicated by the same reference numerals on demand, and the description thereof will be given.

Computer 15 is provided with a CPU 180, a RAM 181 and a ROM 182, and a program 182a which achieves various operations of computer 15 that will be described later is stored in ROM 182. Moreover, elements such as a monitor-use color display 163 placed on the front face and operation buttons 164 are also electrically connected to CPU 180.

In the same manner as the first preferred embodiment, an extraction unit 171 carries out an image recognition process on the first image data D1 to generate first extraction point data DP1. A calculation unit 173 generates relative data DS that indicates the relative relationship between the position of securing portion 114 of respective movable cameras 11a and three-dimensional chart 2 from the first extraction point data DP1 and the rotation angle data DR.

<Principle of Calibration>

$X_0$ . . . coordinate system relatively fixed to three-dimensional chart 2 (absolute coordinate system);

$X_1(\theta,\phi)$ . . . three-dimensional orthogonal coordinate system corresponding to an observation space from movable camera 11a (first local coordinate system);

$X_3$ . . . three-dimensional orthogonal coordinate system corresponding to an observation space from securing portion 114 (third local coordinate system);

$\theta$ . . . pivotal angle of movable camera 11a;

$\phi$ . . . elevation or depression angle of movable camera 11a;

When various factors are defined as described above, the following equation holds by using rotation matrix $R_{X1}$ and parallel shifting vector $T_{X1}$.

$$X_3 = R_{X1}(\theta,\phi)X_1 + T_{X1}(\theta,\phi) \quad \text{(Equation 35)}$$

The rotation matrix $R_{X1}(\theta,\phi)$ and the parallel shifting vector $T_{X1}(\theta,\phi)$ is given as rotation angle data DR, and the amount depending on the relative position and relative orientation of securing portion 114 with respect to the image pickup position of movable camera 11a in the reference orientation of orientation altering device 113 is preliminarily calibrated. In other words, equation 35 is equivalent to a conversion relationship used for converting the first local coordinate system of movable camera 11 to the third local coordinate system of securing portion.

Supposing that, based upon the aforementioned multipoint analyzing algorithm, the conversion from the first local coordinate system of movable camera 11a to the absolute coordinate system is represented by the following equation, by using the rotation matrix $R_C$ and the parallel shifting vector $T_C$:

$$X_0 = R_C X_1 + T_C \quad \text{(Equation 36)}$$

based upon equation 35 and equation 36, the conversion relationship between the absolute coordinate system and the third local coordinate system is represented by the following equation:

$$X_0 = R_C (R_{X1}(\theta,\phi))^{-1} X_3 - R_C (R_{X1}(\theta,\phi))^{-1} T_{X1}(\theta,\phi) + T_C \quad \text{(Equation 37)}$$

<Image Pickup Operation>

Figure 29:
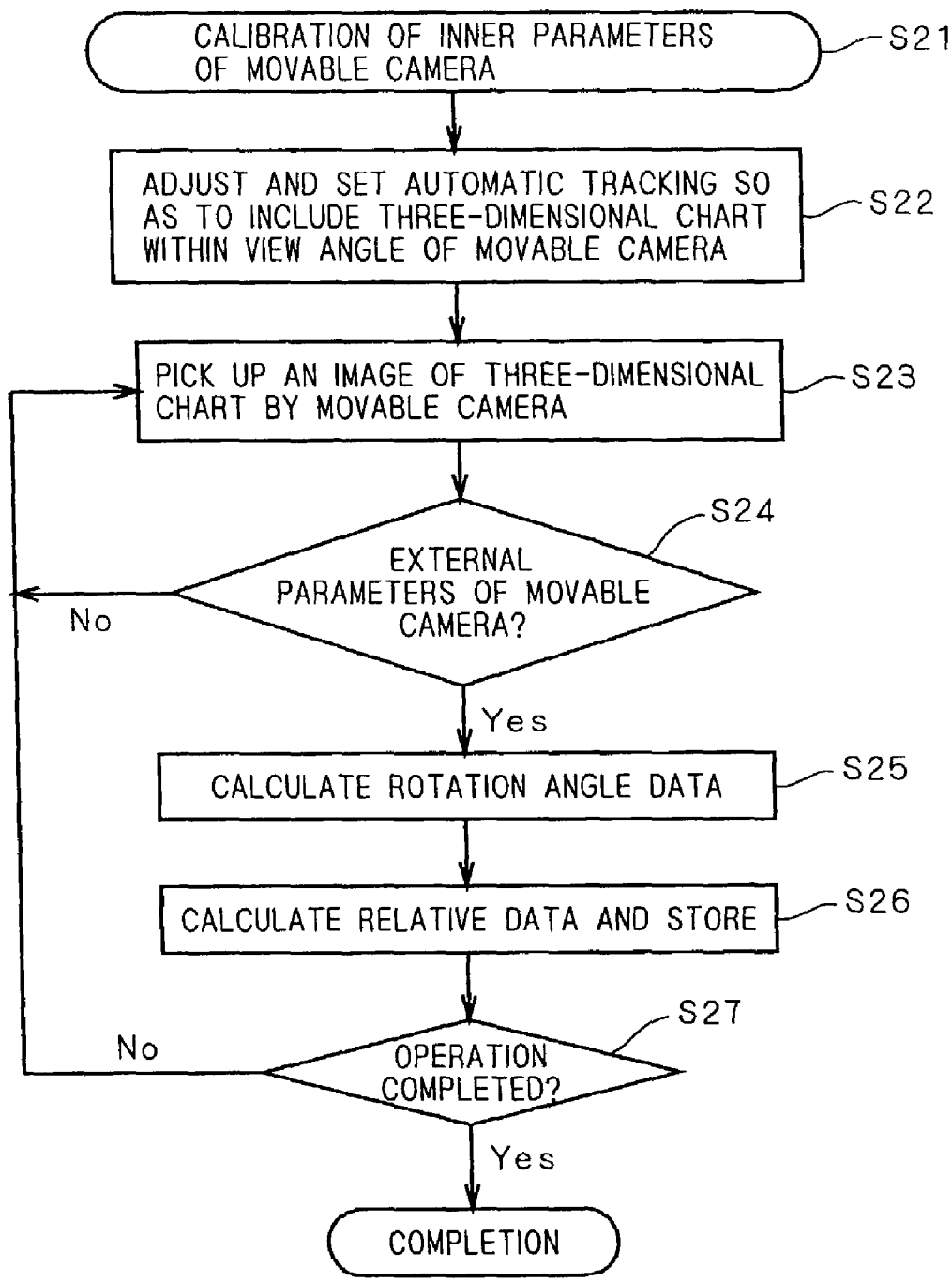
FIG. 29 is a drawing that shows a flow of the operation of the image pickup system in accordance with the second preferred embodiment.

FIG. 29 is a drawing that shows a flow of operations in image pickup system 3 in accordance with the present preferred embodiment. Referring to FIG. 29, the following description will discuss the operations of image pickup system 3. Here, for convenience of explanation, it is supposed that only one movable camera 1 a is attached.

First, inner parameters of movable camera 11a are calibrated (step S21), and the orientation of movable camera 11a is adjusted so as to maintain three-dimensional chart 2 within the view angle, thereby setting an automatic tracing operation (step S22). An image of three-dimensional chart 2 is picked up by movable camera 11a (step S23), and a determination is made as to whether or not external parameters PM1 have been calculated (step S24). If external parameters PM1 have not been calculated, the processes are repeated from step S23, and if external parameters PM1 have been calculated, rotation angle data DR is calculated (step S25).

Next, relative data DS is calculated from the external parameters PM1 and the rotation angle data DR, and stored the resulting data (step S27).

Thus, relative data DS indicating the relative position and relative orientation of the position to which movable camera 11a has been attached of a person to be traced, and the movements of the person is easily traced in detail; therefore, it becomes possible to reproduce the movements of the person in a virtual reality space or the like.

3. Third Preferred Embodiment

The following description will discuss the third preferred embodiment. The construction of image pickup system 1 of this preferred embodiment is virtually the same as that of the first preferred embodiment, and the detailed explanation thereof is omitted. However, the construction of subject-use camera 13 is slightly different from the aforementioned construction.

<Outline of Subject-use Camera 13>

Figure 30:
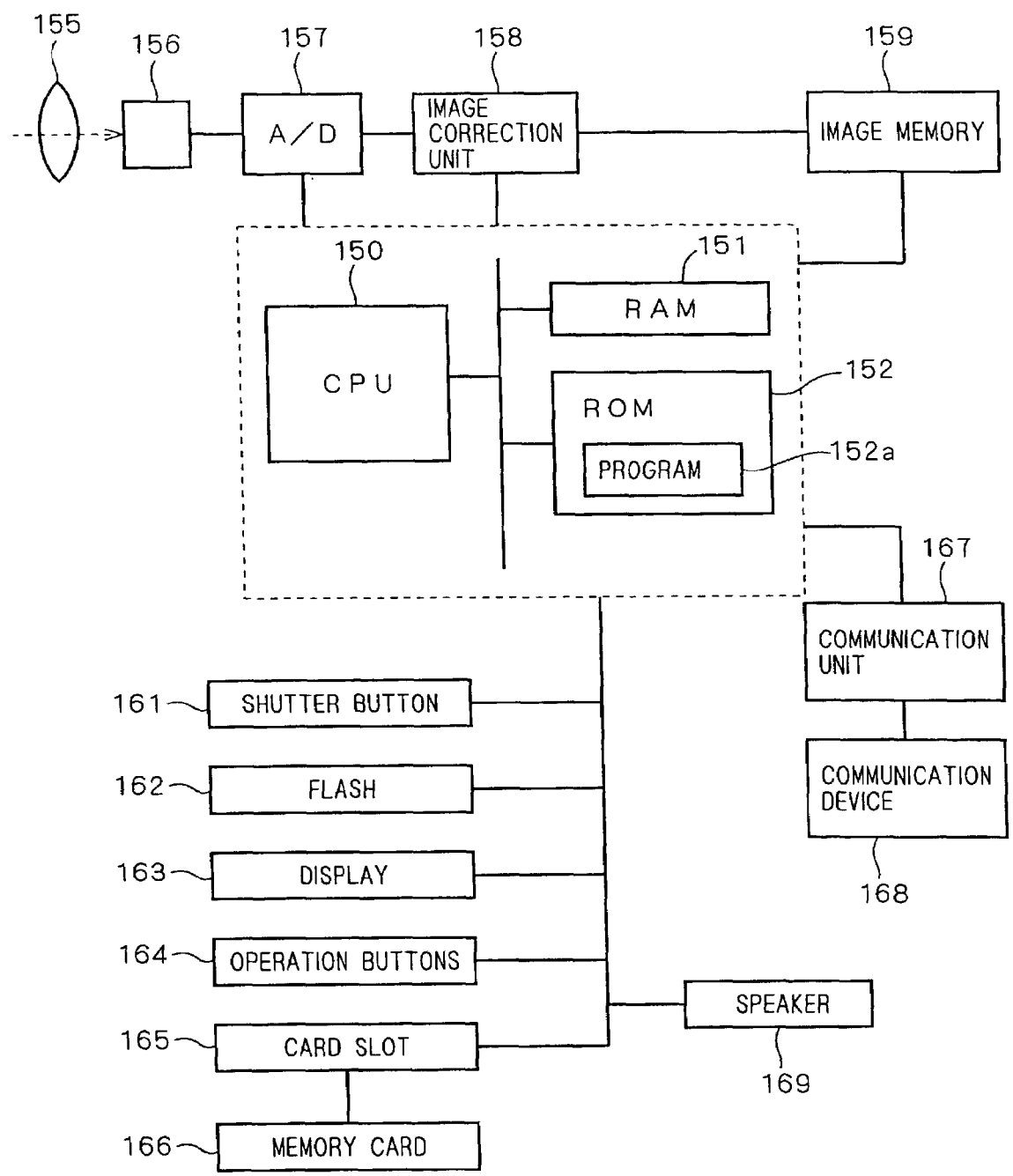
FIG. 30 is a drawing that shows an essential portion of an information processing function of the subject-use camera.
Figure 31:
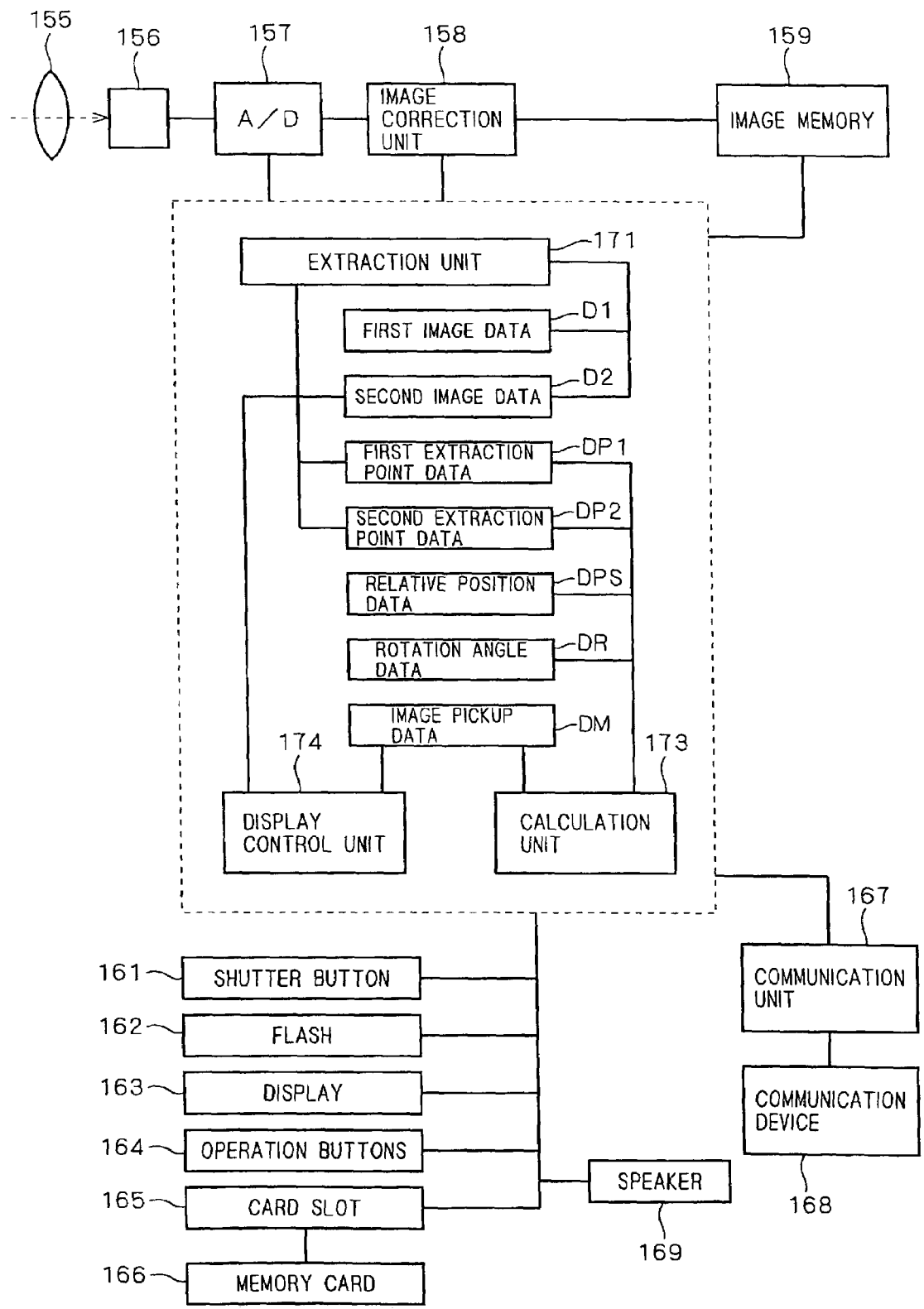
FIG. 31 is a drawing that shows a flow of data in the subject-use camera.

FIG. 30 is a drawing that shows an essential portion of information processing functions of subject-use camera (subject image-pickup-use camera) 13 from the viewpoint of hardware construction, and FIG. 31 is a drawing that shows a flow of data in subject-use camera 13. In addition to the construction as described in the first preferred embodiment, a speaker 169 is further attached to subject-use camera 13. Speaker 169 functions as a sound source used for giving a warning beep sound to the user.

<Image Pickup and Calibration Process>

Figure 32:
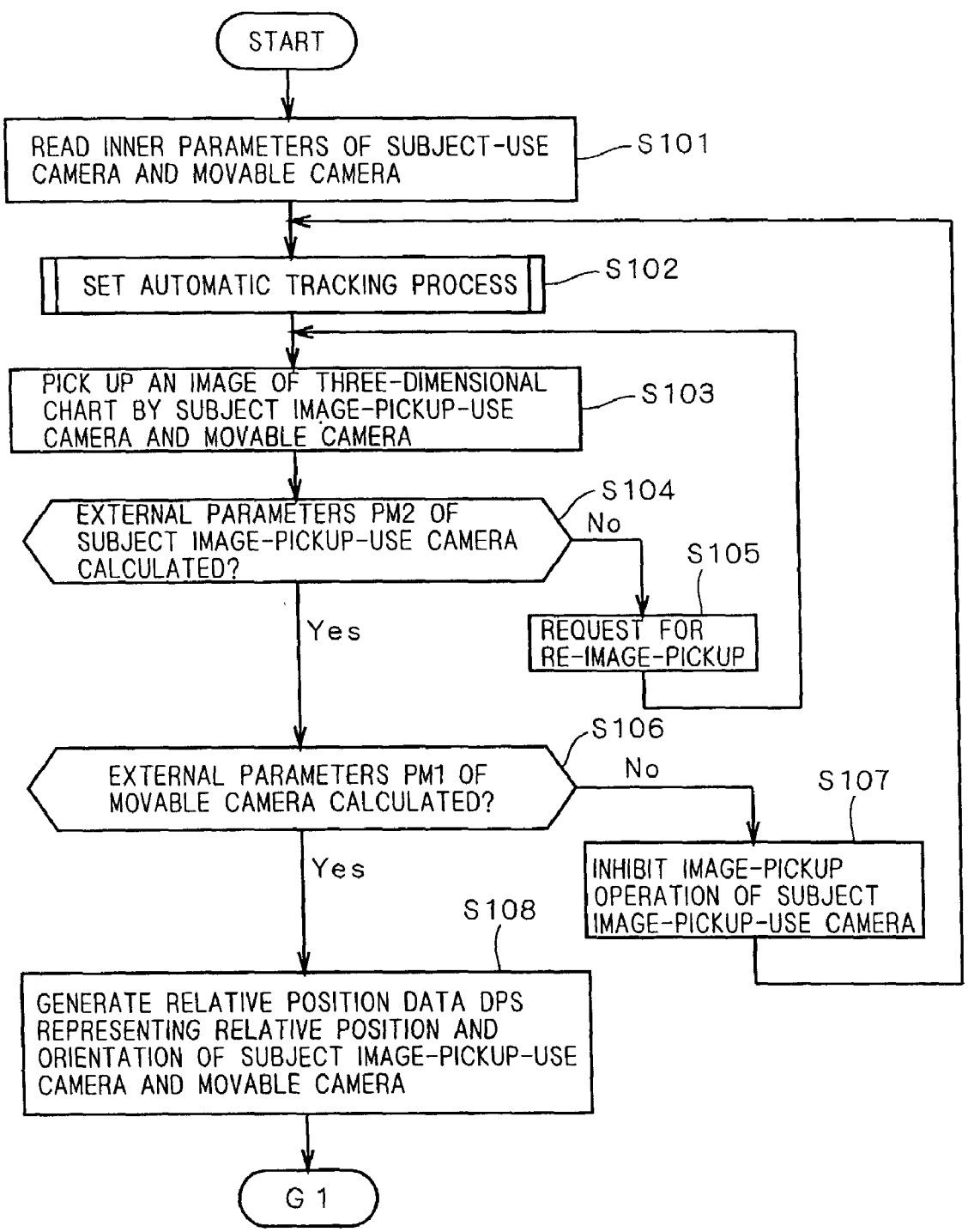
FIG. 32 is a drawing that shows a sequence corresponding to a first sub-process of image-pickup and calibration sequences using a three-dimensional chart in accordance with a third preferred embodiment.
Figure 33:
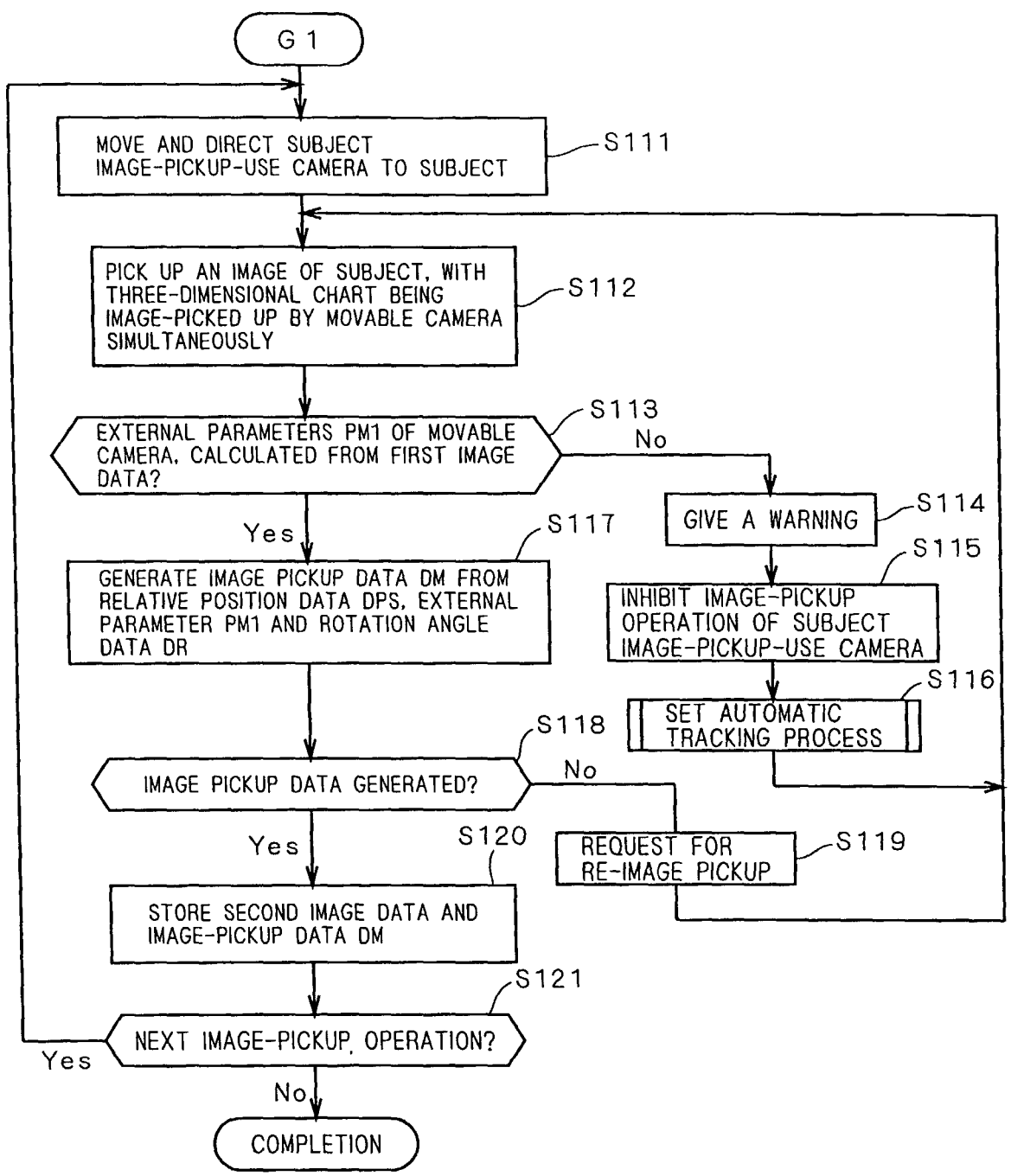
FIG. 33 is a drawing that shows a sequence corresponding to a second sub-process of image-pickup and calibration sequences using a three-dimensional chart in accordance with the third preferred embodiment.

FIGS. 32 and 33 are drawings that show image pickup and calibration processes that are carried out in accordance with the aforementioned camera calibration principle. Processes from step S101 to step S1108 correspond to the aforementioned first sub-process in which three-dimensional chart 2 is simultaneously image-picked up by movable camera 11 and subject-use camera 13 to find the relative position and orientation of the both of the cameras. Further, processes from step S111 and thereafter correspond to the aforementioned second sub-process in which an image of subject 30 is actually picked up.

(1) Determination of Relative Positions Between Cameras (First Sub-process):

First, movable camera 11 and subject-use camera 13 respectively read out inner parameter information held therein (step S101). Here, inner parameters are parameters which are used for specifying the viewing direction of each of the pixels of light-receiving element, and include factors such as a focal length of a lens system, a positional relationship between the lens light axis and the light-receiving element and pixel pitches. These parameters are preliminarily calibrated.

Figure 34:
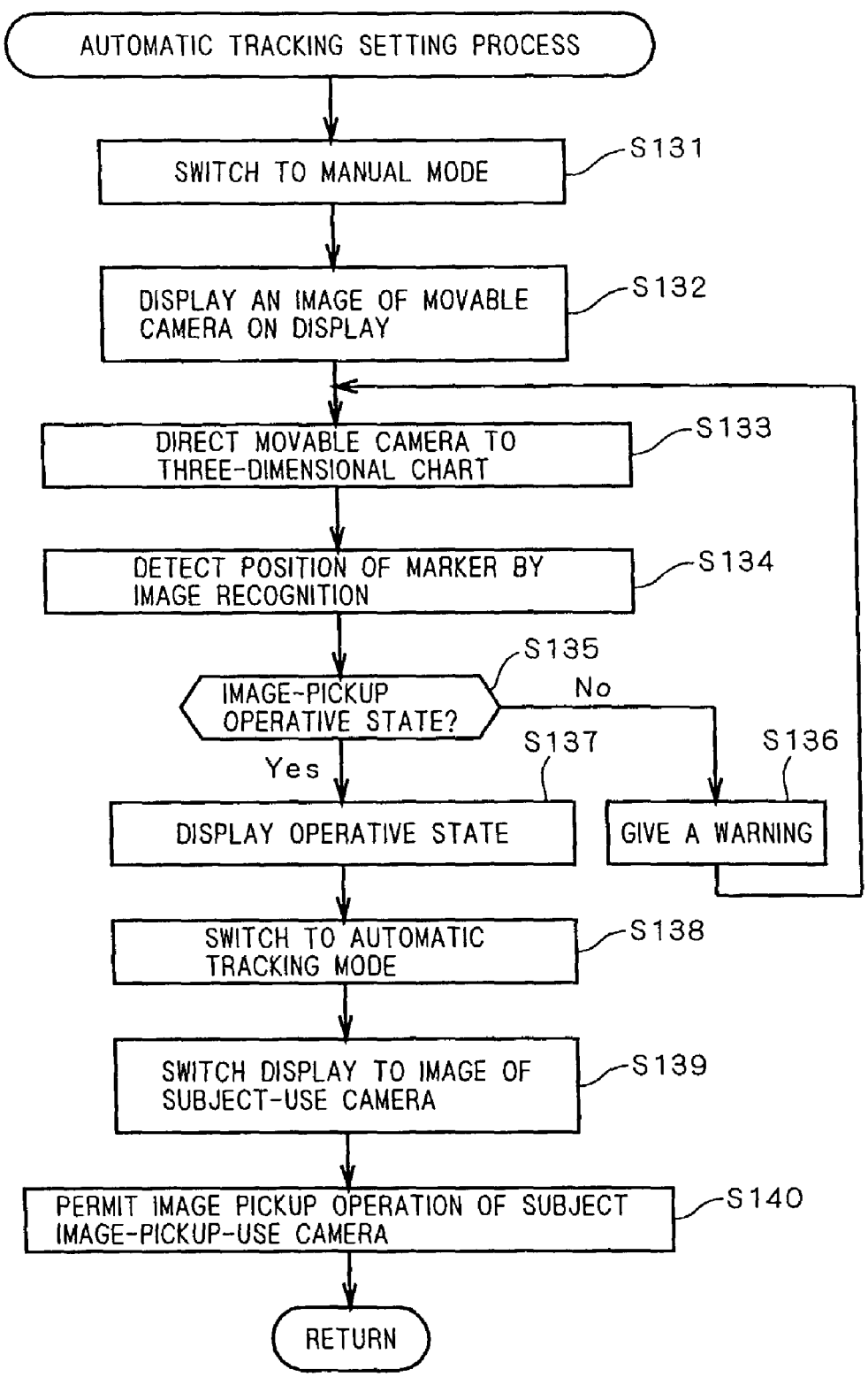
FIG. 34 is a drawing that shows a flow of the operation of automatic tracing setting processes.

Thereafter, a setting process for an automatic tracing operation is carried out (step S102). FIG. 34 is a drawing that shows a flow of the setting process for an automatic tracing operation in detail. First, the operation mode of movable camera 11 is automatically switched to a manual mode (step S131), and camera control unit 123 gives an instruction to subject-use camera 13 through a communication unit 124 so that subject-use camera 13 is allowed to display the first image data D1 of movable camera 11 onto its display 163 (step S132). Movable camera 11 is directed toward three-dimensional chart 2 through a manual operation of the user (step S133).

Thus, the user is allowed to pickup an image of three-dimensional chart 2 by using movable camera 11 through his or her manual operation, and is also allowed to switch to display the image of movable camera 11 in the case of the manual mode; therefore, even in the event of a failure, etc. in the automatic tracing operation, the user can newly adjust the system to an operative state capable of picking up an image of three-dimensional chart 2 while monitoring the image displayed on display 163. Here, the switching operation to the manual mode at step S131 may be instructed by the user's pressing operation of tracing button 117. Moreover, the manual operation may be carried out by the user's operations through operation buttons 164 on subject-use camera 13. In this case, an indicator, etc. indicating the rotation angle of orientation altering device 113 of movable camera 11 may be displayed on display 163.

When three-dimensional chart 2 is maintained within the view angle, recognition unit 145 carries out image recognition on the first image data D1 to detect the position of marker 201 (step S134). Further, a determination is made as to whether or not movable camera 11 is in an operative state capable of picking up an image of three-dimensional chart 2 (step S135). When the determination shows that no image-picking-up operation is available, an instruction is given to speaker 169 of subject-use camera 13 so as to give a warning beep sound (step S136), and the processes from step S133 are repeated. Here, the image-pickup operative state refers to a state in which four points on three-dimensional chart 2 are extracted from the picked-up first image data D1 (which will be described later) and movable camera 11 is allowed to carry out the automatic tracing operation of three-dimensional chart 2 by using tracing data DF generated based upon the position of detected marker 201. Moreover, the warning operation is not limited to the beep sound. For example, a warning display may be given to display 163 of subject-use camera 13, and any method may be used as long as it informs the user of the fact that movable camera 11 is in a state incapable of picking up an image of three-dimensional chart 2.

Here, in the case when the determination shows that image-picking-up operation is available, recognition unit 145 gives an instruction to subject-use camera 13 through communication unit 124 so as to give information showing that image-picking-up operation is available on the display of subject-use camera 13 (step S137), and the user presses tracing button 117 to switch movable camera 11 to the automatic tracing mode (step S138).

When the automatic tracing mode is turned on, first, camera control unit 123 gives an instruction to subject-use camera 13 through communication unit 124 so that the second image data D2 of subject-use camera 13 is displayed on display 163 (step S139), and allows subject-use camera 13 to pick up an image (step S140). Here, this step S138 may be automatically carried out when the image-pickup operative state is recognized at step S135.

FIG. 35 is a drawing that shows an example in which information indicating the image-pickup operative state is given on display 163 of subject-use camera 13. An image 300 is displayed on display 163 based upon the second image data D2 acquired by subject-use camera 13. Simultaneously with this, a message 301 indicating the image-pickup operative state is displayed thereon so that the user is allowed to recognize that movable camera 11 is in the automatic tracing state, and that the image pickup operation of three-dimensional chart 2 is available.

Figure 36:
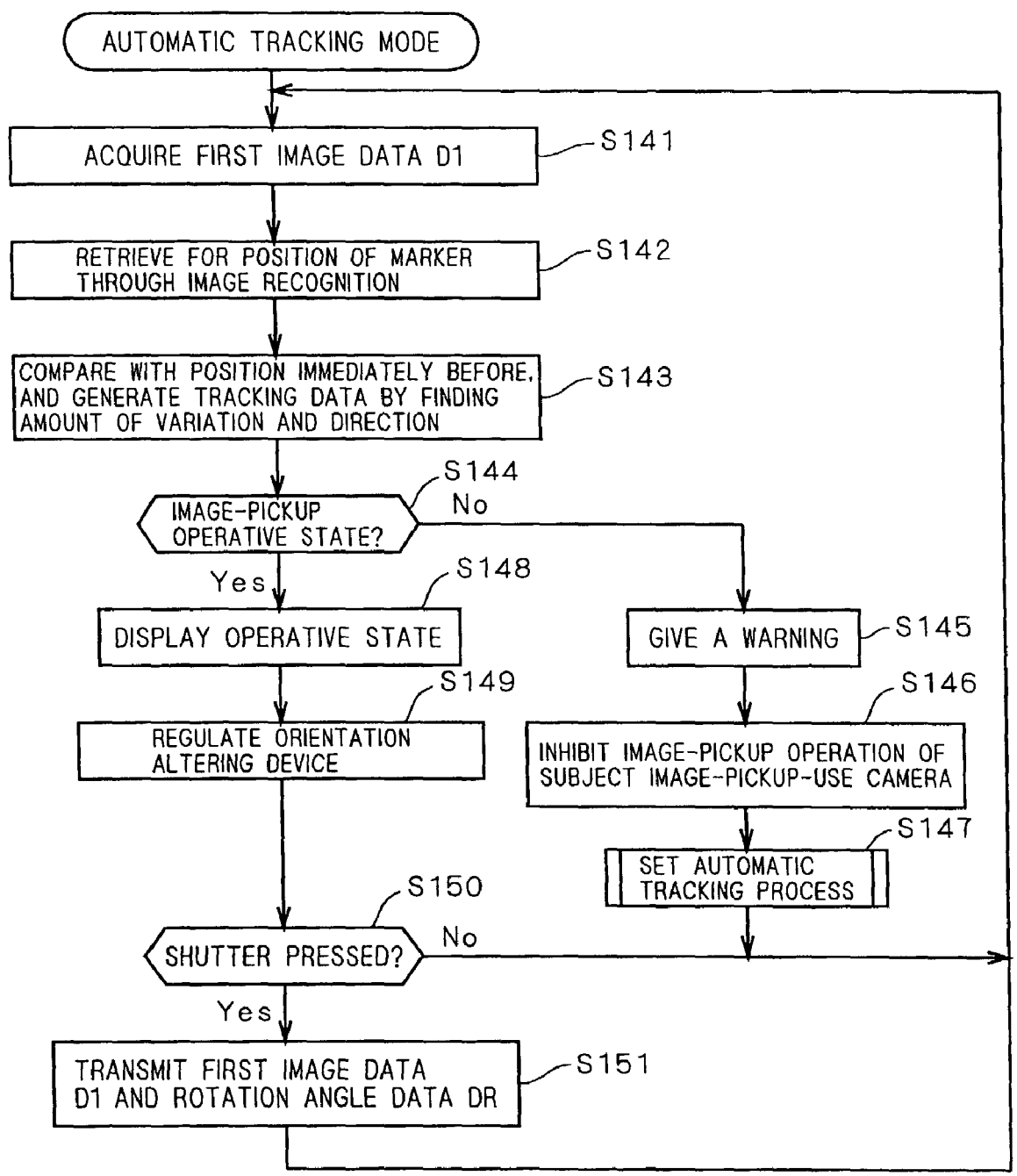
FIG. 36 is a drawing that shows a flow of the operation in an automatic tracing mode in the movable camera.

FIG. 36 shows the operations in the automatic tracing mode of movable camera 11. Movable camera 11 is designed so as to repeat the operations in the automatic tracing mode shown in FIG. 36 except for the state in which the automatic tracing setting processes, shown in FIG. 34, are being executed.

First, when the first image data D1 is acquired from image calibration unit 142 (step S141), recognition unit 145 detects the position of marker 201 through image recognition (step S142).

Next, recognition unit 145 compares this with the position of marker 201 immediately before, and finds the amount of variations and the direction of shift to generate tracing data DF so that marker 201 is picked up as an image in the center of the first image data D1 (step S143). Moreover, a determination is made as to whether or not the image-pickup operation is available (step S144), and when the determination shows that no image-picking-up operation is available, a warning beep sound is given (step S145), the image pickup operation of subject-use camera 13 is inhibited (step S146), the automatic tracing setting processes are carried out (step S147), and the mode of movable camera 11 is automatically switched to the manual mode (FIG. 34: step S131).

With this arrangement, when in the automatic tracing mode, four points of three-dimensional chart 2, required for processes that will be described later, are not extracted from the acquired first image data D1, or when there is a failure in the automatic tracing operation, the image-pickup inoperative state is detected by recognition unit 145; thus, a warning is given to the user, and the image-pickup operation by subject-use camera 13 is inhibited so that the automatic tracing mode is automatically switched to the manual mode. Thus, it becomes possible to improve the operational environments of image pickup system 1.

Here, in the image-pickup operative state, an instruction is given to subject-use camera 13 through communication unit 124 so that information indicating the image-pickup operative state is given on display of subject-use camera 13 (step S148). Moreover, orientation control unit 146 controls orientation altering device 113 based upon the tracing data DF (step S149).

Thus, movable camera 11 is allowed to acquire an image of three-dimensional chart 2 as the first image data D1. Moreover, even in the case when movable camera 11 is shifted, orientation altering device 113 is controlled so that movable camera 11 is allowed to pick up an image of three dimensional chart 2 and so that the user is allowed to pick up the first image data D1 in which three-dimensional chart 2, which is required for the processes as will be described later, is always positioned in the center of the view angle, without the necessity of special attention. In this case, the image-pickup operative state of three-dimensional chart 2 may be displayed on display 163 of subject-use camera 13 so as to inform the user of this fact.

When the automatic tracing mode of movable camera 11 is turned on, the user directs subject-use camera 13 to three-dimensional chart 2, and presses shutter button 161 so that the first image data D1 is obtained by movable camera 11, with the second image data D2 being obtained by subject-use camera 13 (step S103). The example of image data obtained at this time is the same as that shown in FIGS. 13A and 13B.

Upon completion of the image pickup operation, the first image data D1 and the rotation angle data DR of orientation altering device 113 are sent from movable camera 11 to subject-use camera 13 through communication so that two-dimensional coordinate values of lattice points C1 to C4 that are common in FIGS. 13(a) and 13(b) are specified on the respective image planes (which correspond to formation of the first extraction point data DP1 and the second extraction point data DP2), and by processing these two-dimensional coordinate values in the above-mentioned multipoint algorithm, external parameters of the respective cameras, which depend on the relative position and relative orientation of three-dimensional chart 2 with respect to the image-pickup positions of movable camera 11 and subject-use camera 13, can be calculated based upon the first image data D1 and the second image data D2 obtained by picking up an image of three-dimensional chart 2 (steps S104, S106).

Here, it is supposed that the external parameter of movable camera 11 is external parameter PM1 and that the external parameter of subject-use camera 13 obtained when three-dimensional chart 2 is image-picked up is external parameter PM2.

In the case when the external parameter PM2 is not calculated (determined as No in step S104), a request for a re-image-pickup operation of three-dimensional chart 2 by subject-use camera 13 is given on display 163 (step S105), and step S103 is repeated. Moreover, when the external parameter PM1 is not calculated, (determined as No in step S106), the image-pickup operation of subject-use camera 13 is inhibited (step S107) so that the automatic tracing setting processes (step S102) are repeated.

Next, based upon the respective external parameters of subject-use camera 13 and movable camera 11 obtained from steps S104 and S106 and the rotation angle data DR of movable camera 11, the relative position and orientation (relative position data DPS) with respect to movable camera 11 and subject-use camera 13 are found (step S108).

The concept of coordinate conversion applied to step S108 is the same as that shown in FIG. 14.

In other words, from the respective images of three-dimensional chart 2 simultaneously picked up by movable camera 11 and subject-use camera 13, the first extraction point data DP1 and the second extraction point data DP2 are found and the external parameters of the respective cameras are found so that the conversion expressions of equations 9 to 11 are specified as those corresponding to the aforementioned conversion relationship $\tau_{12}$. This forms relative position data DPS of FIG. 31. Moreover, the specific values of the angles θ,φ are detected as rotation angle data DR by angle sensors 126*p*, 126*t*.

(2) Image Picking Up Process of Subject and Camera Calibration (Second Sub-process):

Upon completion of step S108, camera system 10 is shifted, and directed toward subject 30 so as to pick up an image of subject 30 (step S111). At this time, movable camera 11 always holds three-dimensional chart 2 within its view angle through the automatic tracing operation (FIG. 36).

In a state where subject 30 can be image-picked up by subject-use camera 13 as well as in a state where three-dimensional chart 2 can be image-picked up by movable camera 11, when shutter button 161 of subject-use camera 13 is depressed, image pickup operations are simultaneously carried out by the respective cameras (step S112). The examples of images obtained at this time are the same as those shown in FIGS. 15A and 15B.

In this case, from the image obtained by movable camera 11, the position and orientation (external parameter PM1) in the absolute coordinate system $X_0$ of movable camera 11 are obtained in the same manner as step S106 (step S113).

When the external parameter PM1 is not calculable (No in step S113), a warning beep sound is given (step S114), the image-pickup operation of subject-use camera 13 is inhibited (step S115), and the automatic tracing setting processes (FIG. 34) are again carried out (step S116).

With this arrangement, in the case when calibration-use external parameter PM1 of movable camera 11, which depends on the relative position and relative orientation of three-dimensional chart 2 with respect to the image-pickup position of movable camera 11, is incalculable based upon the first image data D1, it becomes possible to inhibit the image pickup operation of subject-use camera 13, and in the case when the incalculable state of external parameter PM1 makes the processes which will be described later inoperable, it also becomes possible to inhibit the unnecessary image pickup operation of subject 30.

Based upon the external parameter PM1 of movable camera 11, the relative position data DPS found in step S108 and the respective values θ',φ' of rotation angles θ,φ of movable camera 11 in step S51, the relative position and orientation (that is, external parameters of subject-use camera 13) of subject-use camera 13 with respect to three-dimensional chart 2 are found (step S117).

The concept of coordinate conversion applied to the above-mentioned step S117 is the same as that shown in FIG. 16.

With this arrangement, it becomes possible to calculate the calibration-use image-pickup data DM of subject-use camera 13 that depends on the relative position and relative orientation of the image-pickup position of subject-use camera 13 with respect to three-dimensional chart 2, and consequently to construct a three-dimensional image model of subject 30 by using the aforementioned Shape-From-Silhouette method. The formation of this three-dimensional image model may be carried out by computer 15 or may be executed by another calculation system.

In the case when no image-pickup data DM is generated (No in step S18), a request for a re-image-pickup operation by subject-use camera 13 is given on display 163 (step S119), and the processes from step S112 are repeated.

Thus, in the case when the calculation of image-pickup data DM is not available, it is possible to request the user to carry out a re-image-pickup operation by informing the user of the fact that necessary data has not been obtained, and to allow the user to pick up an image again from the same position; thus, it becomes possible to carry out effective data collecting operation.

When the image-pickup data DM has been found, the image-pickup data DM of subject-use camera 13 at the time of the image-picking-up operation is recorded in RAM 151, or memory card 166, together with the image data D2 of subject 30 (step S120).

Thereafter, a determination is made as to whether or not the next image-picking-up operation is carried out (step S121), and when the second image data D2 the number of pieces of which is sufficient and the corresponding image-pickup data DM for the respective pieces of data are obtained, the second sub-process is completed.

Here, in the present preferred embodiment also, the chart discriminating process by the use of coding of cross ratios and the identifying process of the image-pickup portion are carried out in the same manner as the aforementioned first preferred embodiment.

Therefore, in the present preferred embodiment also, by image-picking-up three-dimensional chart 2 of the present preferred embodiment as an image located in the center of the view angle by using a camera other than the subject-use camera so that it is possible to accurately acquire external parameters among calibration parameters used for calibrating the position and orientation of the camera. Moreover, in each of the cases when necessary operations are not carried out from the acquired image data, a warning or the like is given so as to allow the user to know the fact, and a switching process of display and a mode switching process of movable camera 11 are automatically carried out so that the user is allowed to carry out the necessary operation; thus, it becomes possible to reduce loads imposed on the user, and also to prevent wasteful image-picking-up operations.

4. Fourth Preferred Embodiment

The following description will discuss the fourth preferred embodiment. The construction of image pickup system 1 of this preferred embodiment is virtually the same as that of the first preferred embodiment; however, the construction is different in that a gyro 14 is installed therein.

<Outline of System Construction>

Figure 37:
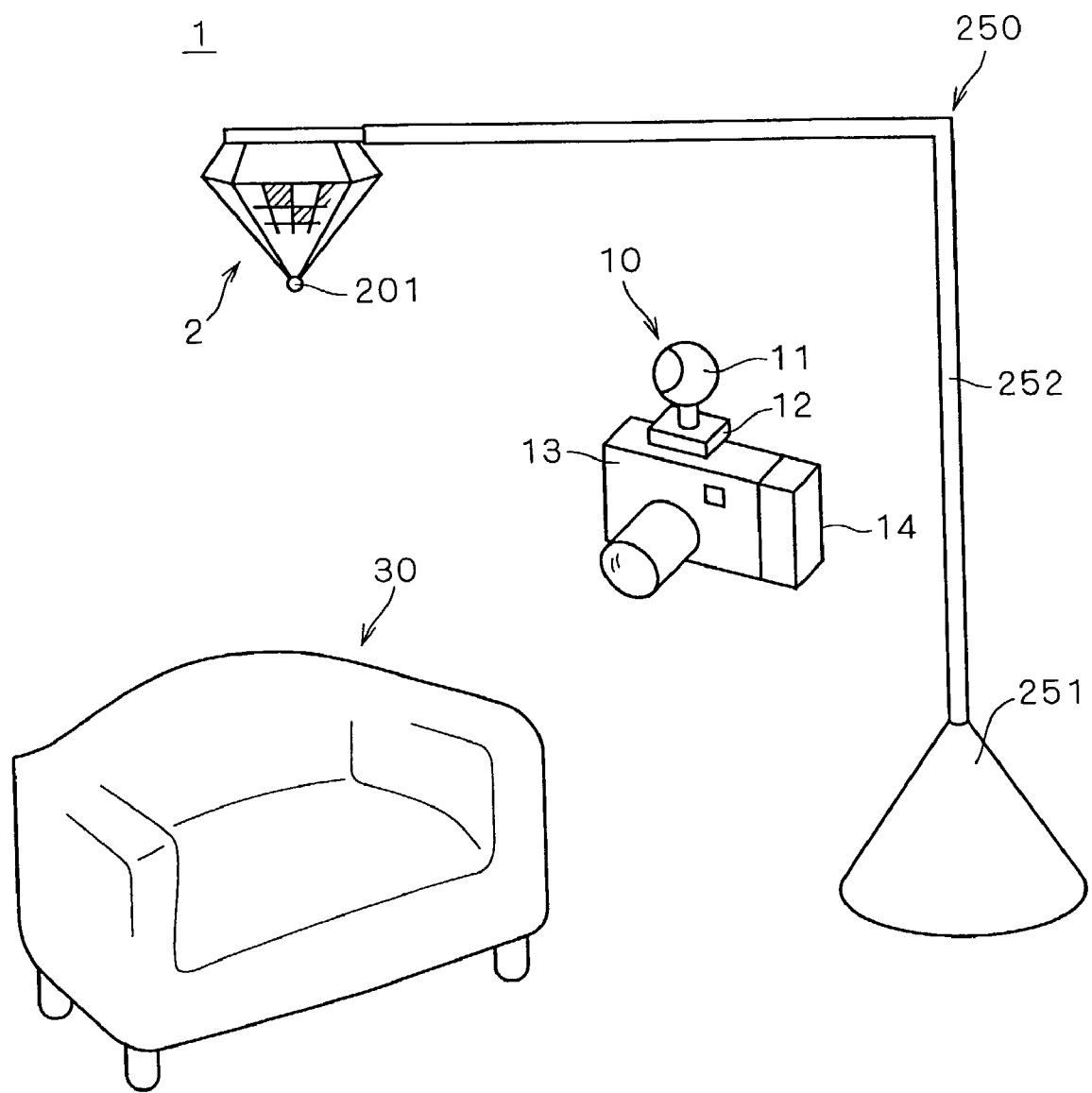
FIG. 37 is a drawing that shows a structural example of an image-pickup calculation system in accordance with a fourth preferred embodiment.
Figure 38:
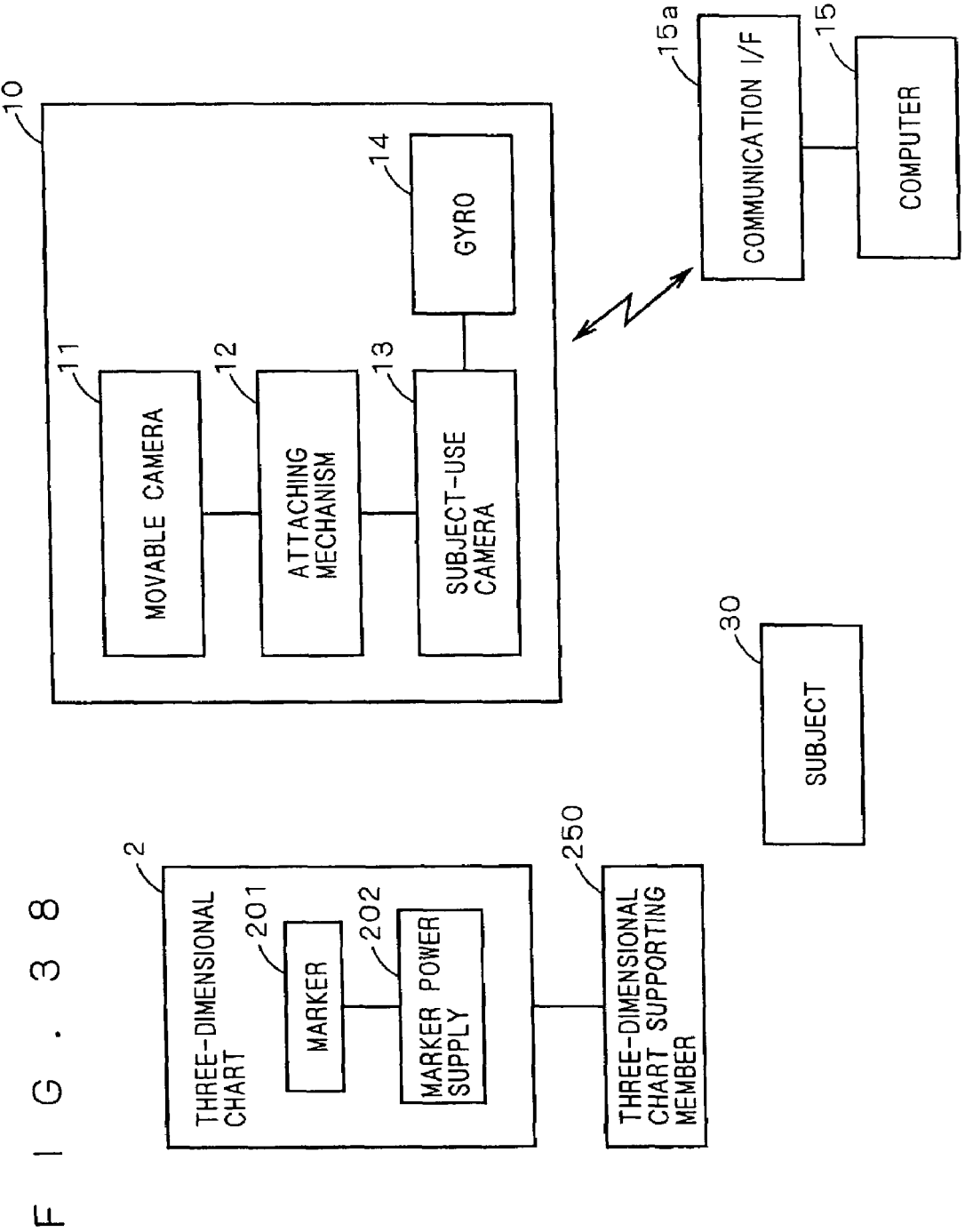
FIG. 38 is a block diagram of the image-pickup calculation system of FIG. 37.

FIG. 37 is a drawing that shows a construction of an image pickup system 1 in accordance with the fourth preferred embodiment, and FIG. 38 is a block diagram of image pickup system 1. In FIG. 37, image-pickup system 1 is provided with a movable camera system 10 capable of picking up an image of a three-dimensional subject 30, and a camera-calibration-use three-dimensional chart 2 that is placed in the vicinity of subject 30 within a space including three-dimensional subject 30. Three-dimensional chart 2 is a reference object that has a known shape in the three-dimensional space, and constituted by a three-dimensional object in which a chart pattern is formed on each of the side faces of a main body having virtually a pyramid shape, as will be described later in detail. This three-dimensional chart 2 is suspended from a chart supporting member 250. This chart supporting member 250 is provided with an arm 252 having a reversed L-letter shape extending from a base 251, and three-dimensional chart 2 is secured to the vicinity of the top of arm 252. Preferably, three-dimensional chart 2 is suspended virtually above subject 30.

Camera system 10 has a subject image-pickup-use camera 13 (subject-use camera) that functions as a digital camera. This subject-use camera 13 functions as a measurement device. This subject-use camera 13 also has various calculating functions. Moreover, a movable camera 11 is attached to the upper portion of this subject-use camera 13 through an attaching mechanism 12 in a manner so as to be oriented freely. Movable camera 11 is used so as to specify the relative positional-orientation relationship between three-dimensional chart 2 and movable camera 11 by picking an image of a plurality of unit graphic forms UP contained in the pattern (see FIG. 3) of three-dimensional chart 2, and is also used so as to detect the position and orientation of subject-use camera 13 in the absolute coordinate system that is relatively fixed with respect to three-dimensional chart 2. Moreover, a gyro 14, which is used for detecting the amount of rotation shift and the amount of parallel shift of camera system 10, is attached to on the left side face portion of subject-use camera 13. Camera system 10 is designed as a portable system as a whole, and the user is allowed to pick up an image of subject 30 while moving with the system being held by the hands.

As shown in FIG. 38 although not shown in FIG. 37, image-pickup system 1 may be provided with, for example, a note-book-type portable computer 15. Computer 15 transmits and receives commands and data to and from camera system 10 by radio communications through a communication interface 15a.

<Outline of Three-dimensional Chart 2>

Three-dimensional chart 2 of the present preferred embodiment is the same as that explained in the first preferred embodiment (see FIG. 3).

<Outline of Gyro 14>

Figure 39:
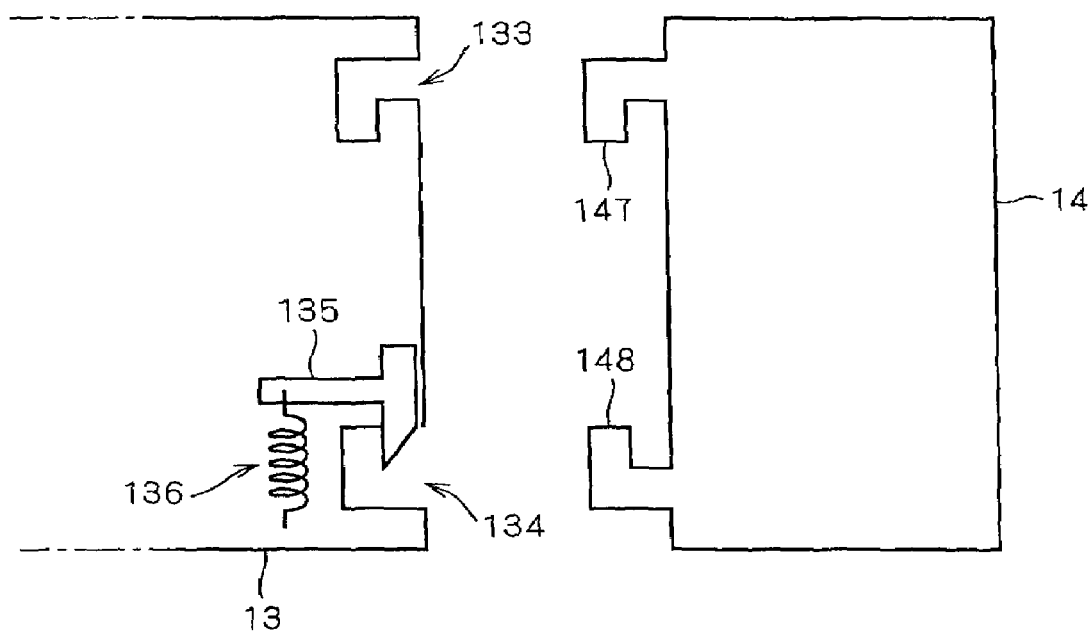
FIG. 39 is a drawing that explains an attaching mechanism of a subject-use camera and a gyro.

FIG. 39 is a drawing that shows a state in which a gyro 14 serving as a detection device in the present image pickup system 1, is attached to subject-use camera 13 (shown only the left side face). Gyro 14 is provided with a first attaching claw 147 and a second attaching claw 148. Moreover, subject-use camera 13 is provided with a third attaching groove 133, a fourth attaching groove 134, a movable claw 135 and a spring 136 that serve as an attaching mechanism. When gyro 14 is attached to subject-use camera 13, the first attaching claw 147 is first pushed into the third attaching groove 133, and the second attaching claw 148 is further pushed into the fourth attaching claw 134. In this case, movable claw 135 is shifted upward as shown in FIG. 39 because of its shape, and when the second attaching claw 148 has been pushed therein completely, it is shifted downward as shown in FIG. 39 by spring 136. Gyro 14 is attached to subject-use camera 13 by this mechanism.

Figure 40:
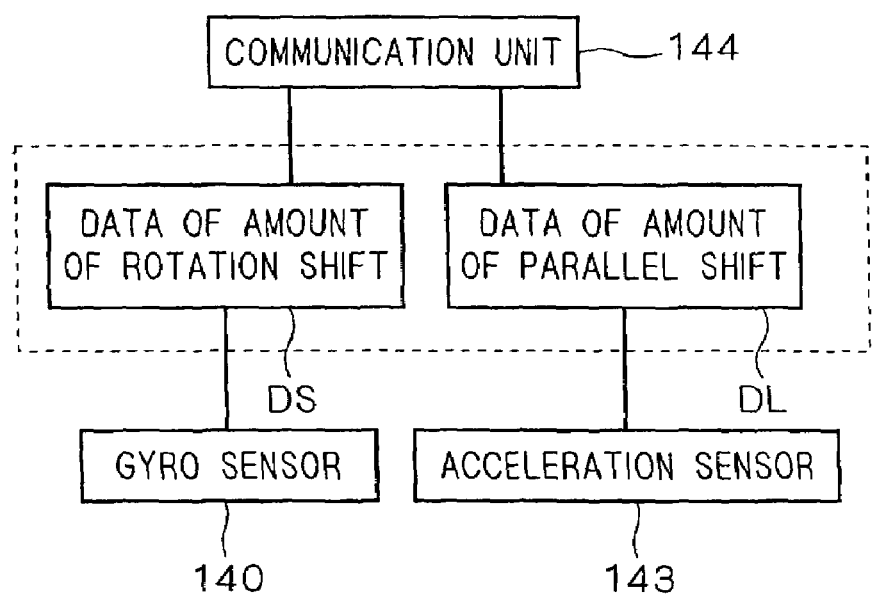
FIG. 40 is a drawing that shows the inner structure of the gyro.

FIG. 40 is a drawing that shows the inner construction of gyro 14. As shown in FIG. 40, gyro 14 is constituted by a gyro sensor 140 for detecting the amount of rotation shift, an acceleration sensor 143 for detecting the amount of parallel shift and a communication unit 144.

Gyro sensor 140, which has a function as an orientation sensor, allows a ring oscillator to vibrate, and measures variations in the vibrating direction due to a Coriolis force exerted when an angular velocity is applied thereto so that the angular velocity is detected, and based upon the orientation detection output, data DS of the amount of rotation shift is generated. Moreover, acceleration sensor 143 calculates a relative amount of parallel shift from the integrated value of the detected acceleration to generate data DL of the amount of parallel shift. With respect to the device having such a gyro sensor and an acceleration sensor, examples thereof include a VR sensor GU-3013 made by Data Tech K.K. (Ohta Ward in Tokyo).

Communication unit 144 transmits data DS of the amount of rotation shift and data DL of the amount of parallel shift to movable camera 11 through subject-use camera 13.

<Outline of Movable Camera 11>

In the present preferred embodiment also, movable camera 11 has the same construction as shown in FIGS. 4 and 6.

Figure 41:
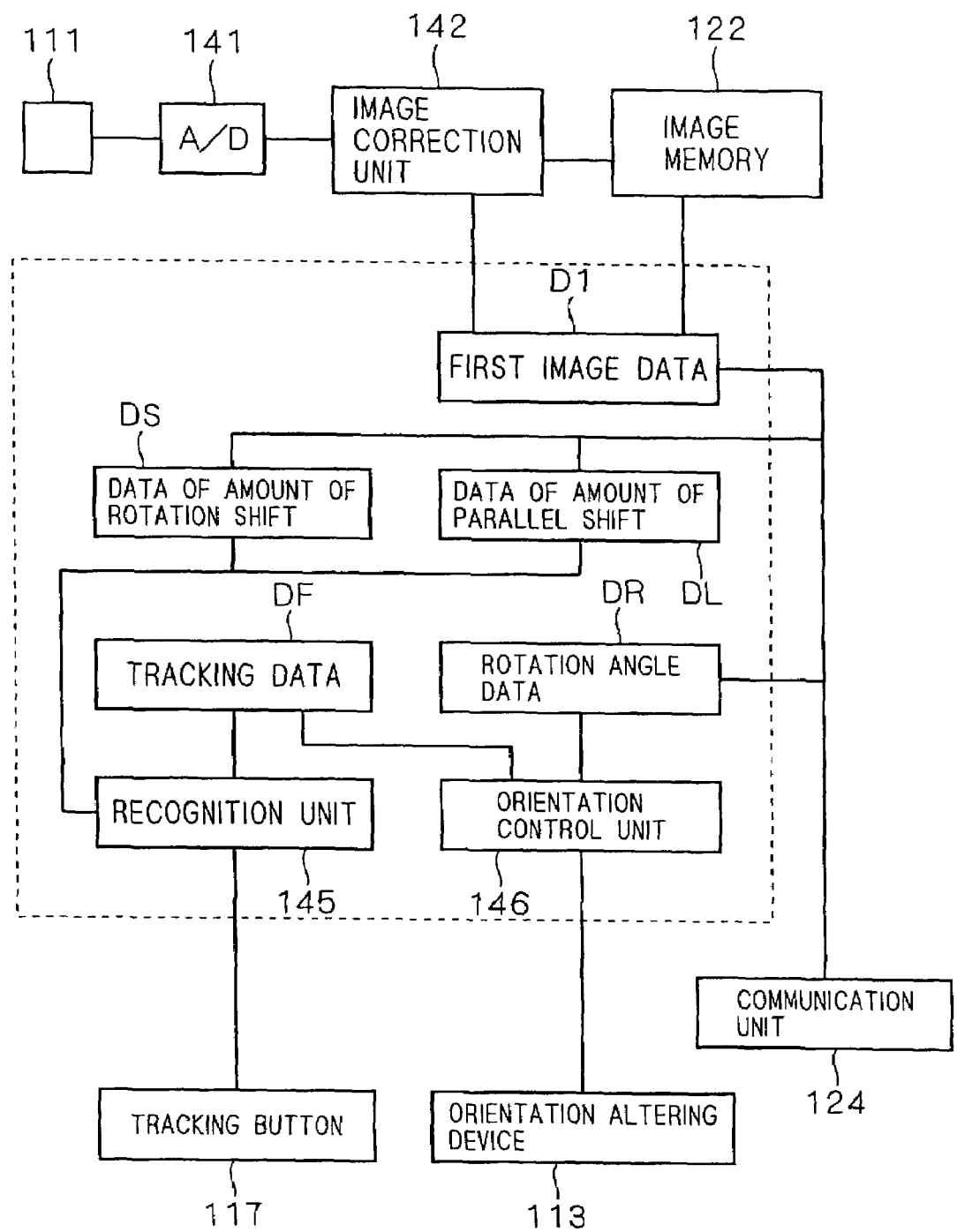
FIG. 41 is a drawing that shows a flow of data in the movable camera.

FIG. 41 is a drawing that shows a flow of data in movable camera 11 in the present preferred embodiment. Here, the first image data D1 in FIG. 41 corresponds to an image signal that has been subjected to corrections such as a white-balance correction and a γ-correction in image correction unit 142.

A recognition unit 145 and an orientation control unit 146, shown in FIG. 41, are achieved as some portions of functions given by CPU 130, ROM 131, RAM 132, etc. of FIG. 6

Recognition unit 145, which is activated in response to an instruction from the user through tracing button 117, generates tracing data DF used for tracing three-dimensional chart 2 based upon data DS of the amount of rotation shift and data DL of the amount of parallel shift that have been detected by gyro 14.

Orientation control unit 146 controls orientation altering device 113 based upon the instruction from the user received from subject-use camera 13 in the manual mode. After tracing button 117 has been pressed to make a switch to the automatic tracing mode, orientation altering device 113 is controlled based upon the tracing data DF so that, through the following processes, the image of three-dimensional chart 2 is always converged and formed onto two-dimensional light-receiving elements 111.

CPU 130 also has a function for generating rotation angle data DR of FIG. 41.

Moreover, when the shutter button of subject-use camera 13 is pressed, the first image data D1 and rotation angle data DR are transmitted to subject-use camera 13 serving as a calibration-use information processing device through communication unit 124, and used in various calculations. In other words, movable camera 11 is controlled so as to acquire the first image data D1 in synchronism with the shutter button of subject-use camera 13.

<Principle of Automatic Tracing>

Figure 42:
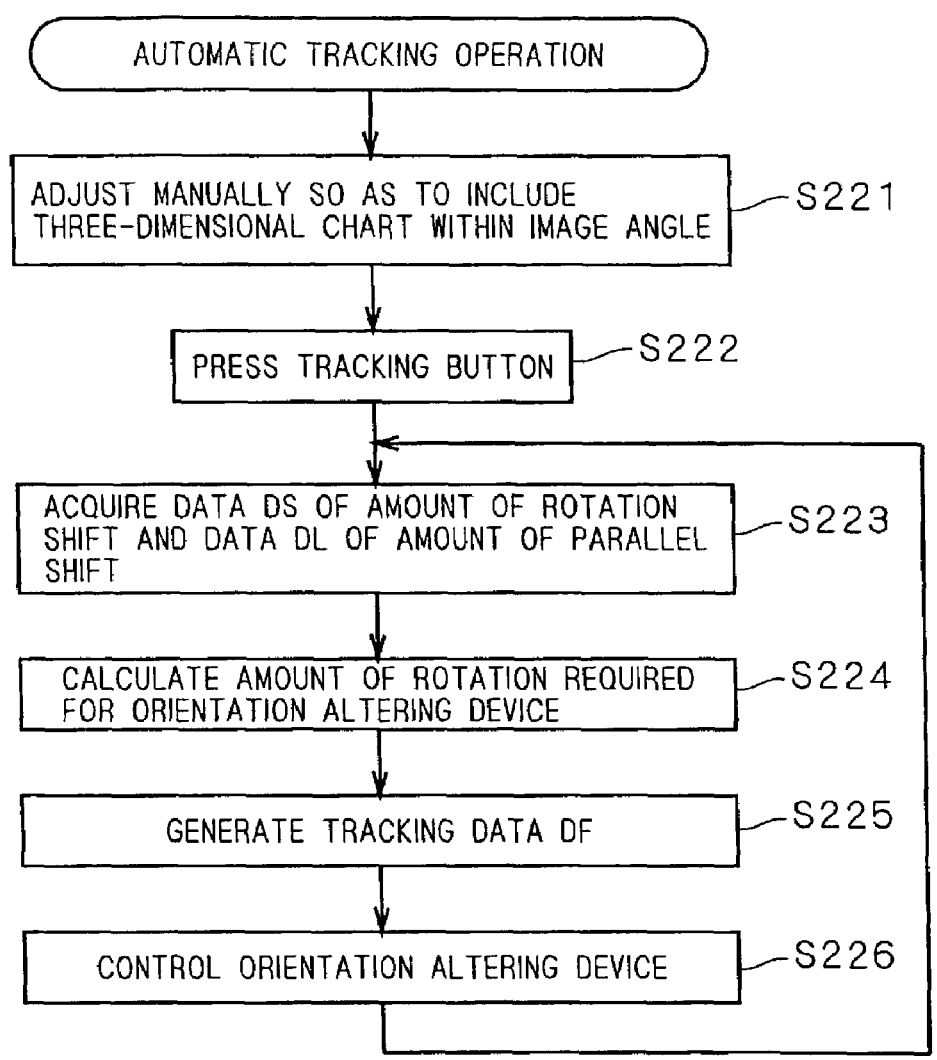
FIG. 42 is a drawing that shows a flow of the automatic tracing operation in the movable camera.

FIG. 42 shows a flow of a sequence of automatic tracing operations in movable camera 11 in detail. First, in the manual mode, an adjustment is made so that marker 201 of three-dimensional chart 2 is included in the view angle of movable camera 11 (step S221), and tracing button 117 is pressed so as to make a switch to the automatic tracing mode (step S222).

Recognition unit 145 acquires data DS of the amount of rotation shift and data DL of the amount of parallel shift detected by gyro 14 through communication unit 124 (step S223), and calculates the amount of rotation required for orientation altering device 113 (step S224) to generate tracing data DF (step S225).

Figure 43:
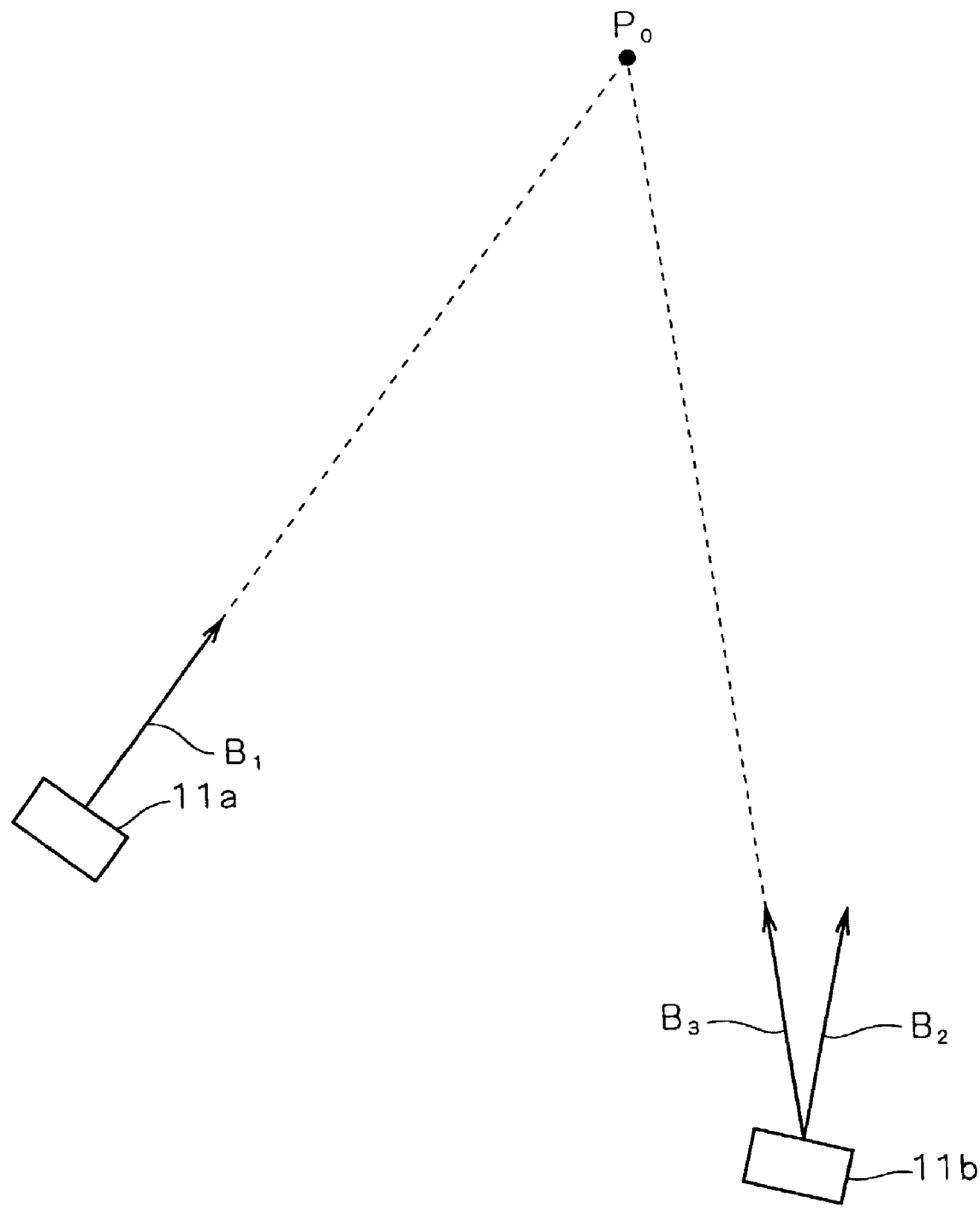
FIG. 43 is a drawing that shows a state in which the movable camera automatically traces the three-dimensional chart.

FIG. 43 is a drawing that shows a state in which movable camera 11 automatically tracks three-dimensional chart 2 based upon the data DS of the amount of rotation shift and the data DL of the amount of parallel shift detected by gyro 140. In FIG. 43, movable camera 11a holds a target point $P_0$ of three-dimensional chart 2 at position $C_{k0}$, and movable camera 11b shows a state immediately after movable camera 11a has shifted to a position $C_{k1}$ from the state shown by movable camera 11a.

In the state of movable camera 11a, vector $B_1$ indicating the image-pickup direction to be applied by orientation altering device 113 is represented by the following equation:

$$B_1 = (P_0 - C_{k0})/|P_0 - C_{k0}|  \quad \text{(Equation 38)}$$

Moreover, vector $B_2$ indicating the image-pickup direction to be applied by orientation altering device 113 in the state of movable camera 11b is not made in parallel with vector $B_1$ since a rotation matrix $R_{gc}$ of the entire camera system 10 is applied thereto, and is represented by the following equation:

$$B_2 = R_{gc} \cdot B \quad \text{(Equation 39)}$$

At position $C_{k1}$, in order to allow movable camera 11 to hold the target point $P_0$ of three-dimensional chart 2, the image-pickup direction to be applied by orientation altering device 113 needs to be represented by vector $B_3$ shown in FIG. 43. Since vector $B_3$ is represented by the following equation:

$$B_3 = (P_0 - C_{k1})/|P_0 - C_{k1}| \quad \text{(Equation 40)},$$

the rotation required for orientation altering device 113 so as to allow movable camera 11b to automatically the track target point $P_0$ is represented by the following equation by using rotation matrix R:

$$B_3 = R \cdot B_2 \quad \text{(Equation 41)}.$$

In other words, from equations 38 to 41, the following equation is obtained:

$$(P_0 - C_{k1})/|P_0 - C_{k1}| = R \cdot R_{gc} \cdot (P_0 - C_{k0})/|P_0 - C_{k0}| \quad \text{(Equation 42)}.$$

When the parallel shifting vector $T_{gc}$ (data DL of the amount of parallel shift) obtained from acceleration sensor 14 and the rotation center $C_c$ of subject-use camera 13 are applied thereto, the following equation is obtained:

$$C_{k1} = T_{gc} + R_{gc} \cdot (C_c - C_{k0}) + C_{k0} \quad \text{(Equation 43)}$$

Therefore, the rotation matrix R indicating the rotation required for controlling orientation altering device 113 is found through equations 42 and 43. Here, in the case when the viewing position of movable camera 11 and the rotation center of the lens are made coincident with each other, with respect to the rotation of orientation altering device 113, by finding θ,φ that satisfy the following equation so as to obtain the tracing data DF:

$$R \cdot R_{gc} = R(\theta, \phi) \quad \text{(Equation 44)},$$

orientation control unit 146 controls the rotation of orientation altering device 113 based upon the tracing data DF, (step S226); thus, movable camera 11 is always allowed to image-pick up three-dimensional chart 2. Then, processes from step S223 are repeated.

With this arrangement, even when movable camera 11 is shifted, it is possible to carry out tracing controls so as to make the target point on three-dimensional chart 2 coincident with a specific position within the view angle of movable camera 11 easily at high speeds based upon the data DS of the amount of rotation shift and the data DL of the amount of parallel shift obtained from gyro 14; thus, the user is allowed to pick up the first image data D1 in which three-dimensional chart 2, which is required for the processes as will be described later, is always positioned in the center of the view angle, without the necessity of special attention.

<Outline of Subject-use Camera 13>

Figure 44:
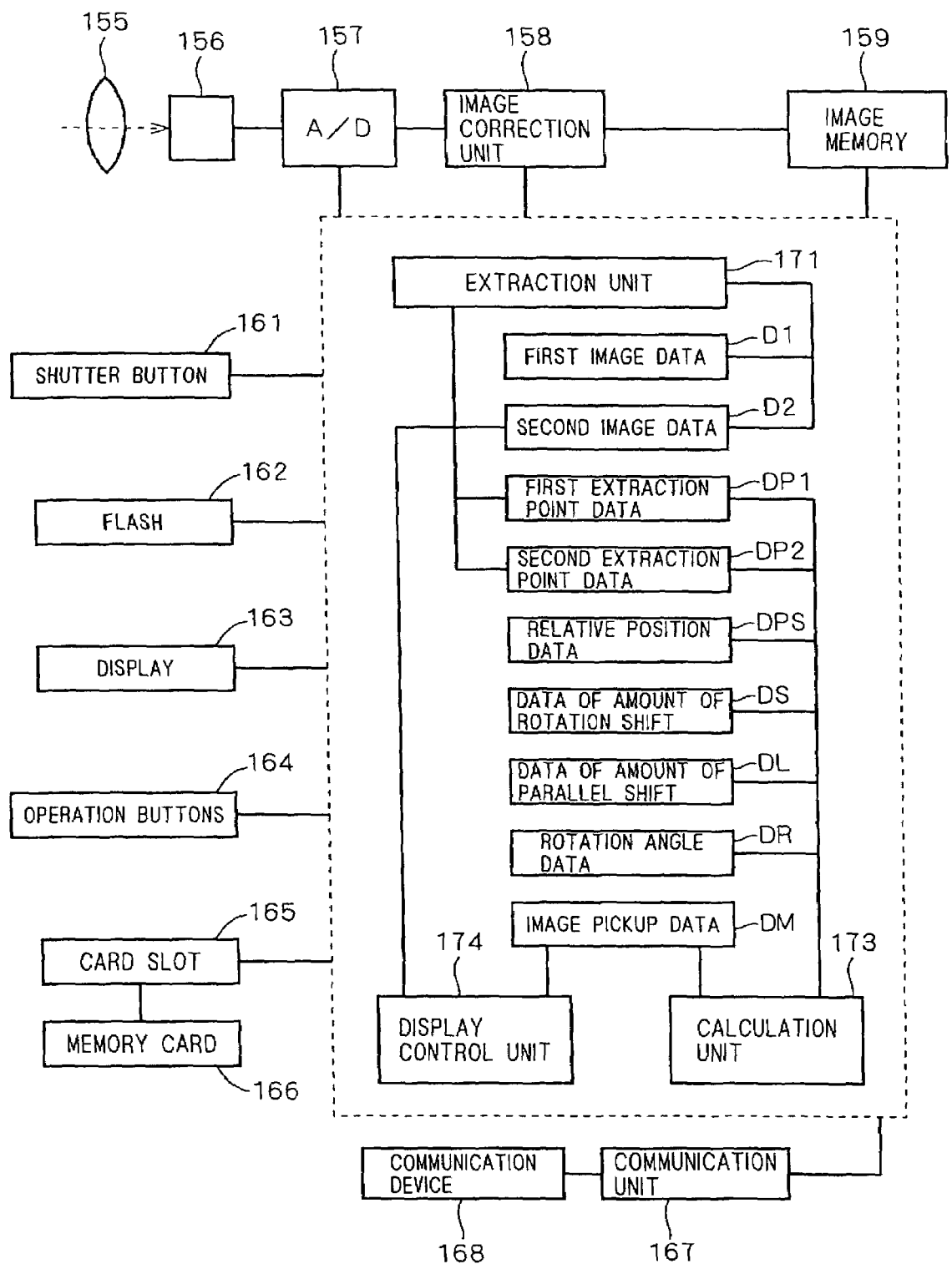
FIG. 44 is a drawing that shows a flow of data in the subject-use camera.

In the present preferred embodiment also, from the viewpoint of hardware construction, the essential construction of the information processing function of subject-use camera 13 is the same as that shown in FIG. 9. FIG. 44 is a drawing that shows a flow of data in subject-use camera 13. Subject-use camera 13 is provided with a CPU 150, a RAM 151 and a ROM 152, and a program 152a, which achieves various operations of subject-use camera 13, is stored in ROM 152. Moreover, elements such as a shutter button 161, a flash lamp 162, a monitor-use color display 163 placed on the rear face and operation buttons 164, are electrically connected to CPU 150.

An extraction unit 171, a calculation unit 173 and a display control unit 174, shown in FIG. 44, are functions that are achieved by CPU 150, RAM 151 and ROM 152, etc. of FIG. 9.

Extraction unit 171 extracts four points on three-dimensional chart 2 from the first image data D1 received from movable camera 11 through communication unit 167 to generate first extraction point data DP1. Moreover, in the same manner, extraction unit 171 extracts four points on three-dimensional chart 2 from the second image data D2 that has been obtained from subject-use camera 13 to generate second extraction point data DP2.

Calculation unit 173 finds the relative position and orientation between movable camera 11 and subject-use camera 13 from the first extraction point data DP1, rotation angle data DR and second extraction point data DP2 to generate relative position data DPS. Moreover, it also finds the relative position and orientation between subject-use camera 13 and three-dimensional chart 2 from the first extraction point data DP1, rotation angle data DR, data DS of the amount of rotation shift and relative position data DPS to generate image-pickup data DM. This image-pickup data DM is stored in RAM 151.

Based upon the user's instruction through operation buttons 164, display control unit 174 obtains the second image data D2 and image data DM from RAM 151, and stores the resulting data in memory card 166. Moreover, display control unit 174 also has such functions that it carries out necessary processes on various data so as to be displayed on a display 163, and reads various data stored in memory card 166 onto RAM 151.

<Image Pickup and Calibration Processes>

Figure 45:
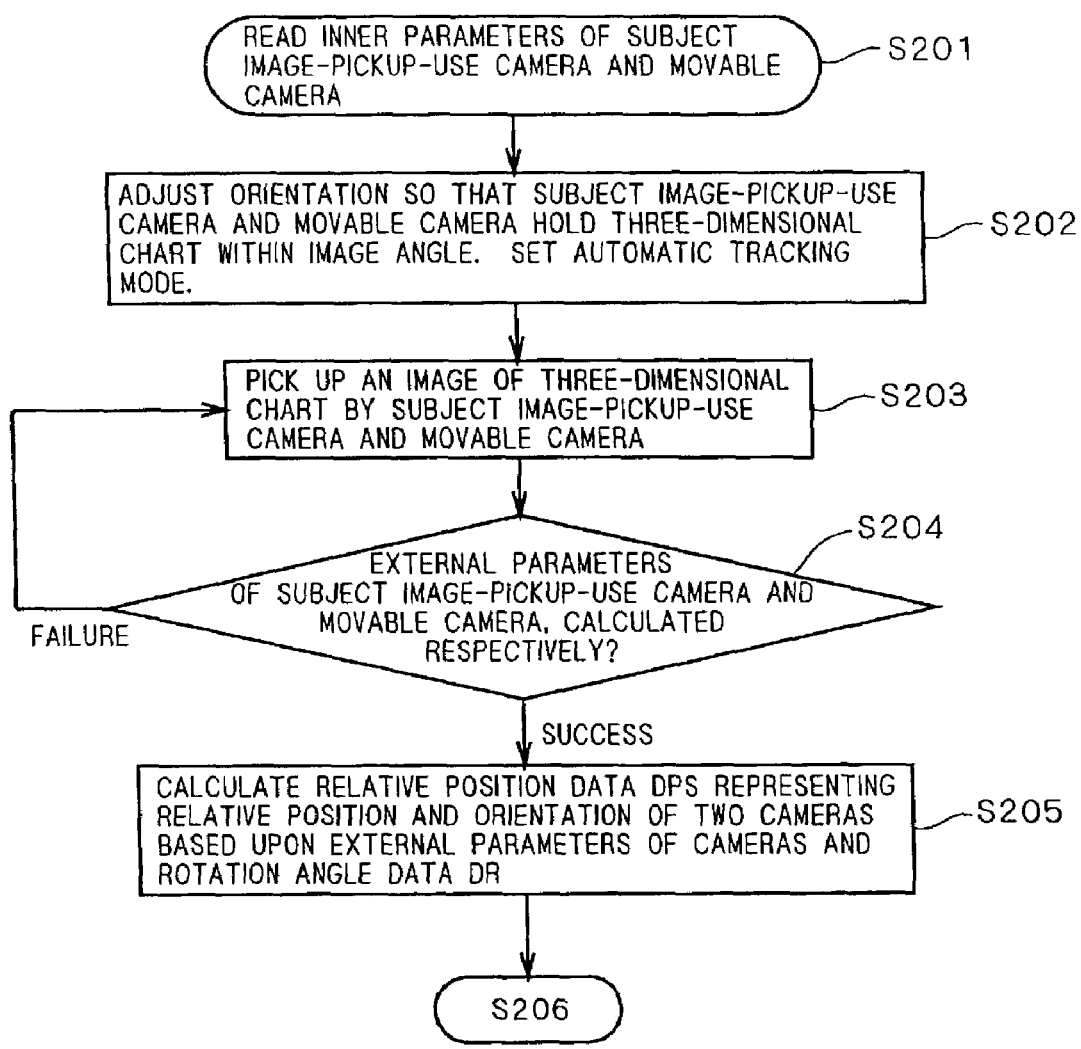
FIG. 45 is a drawing that shows a sequence corresponding to a first sub-process of image-pickup and calibration sequences using a three-dimensional chart in accordance with a fourth preferred embodiment.
Figure 46:
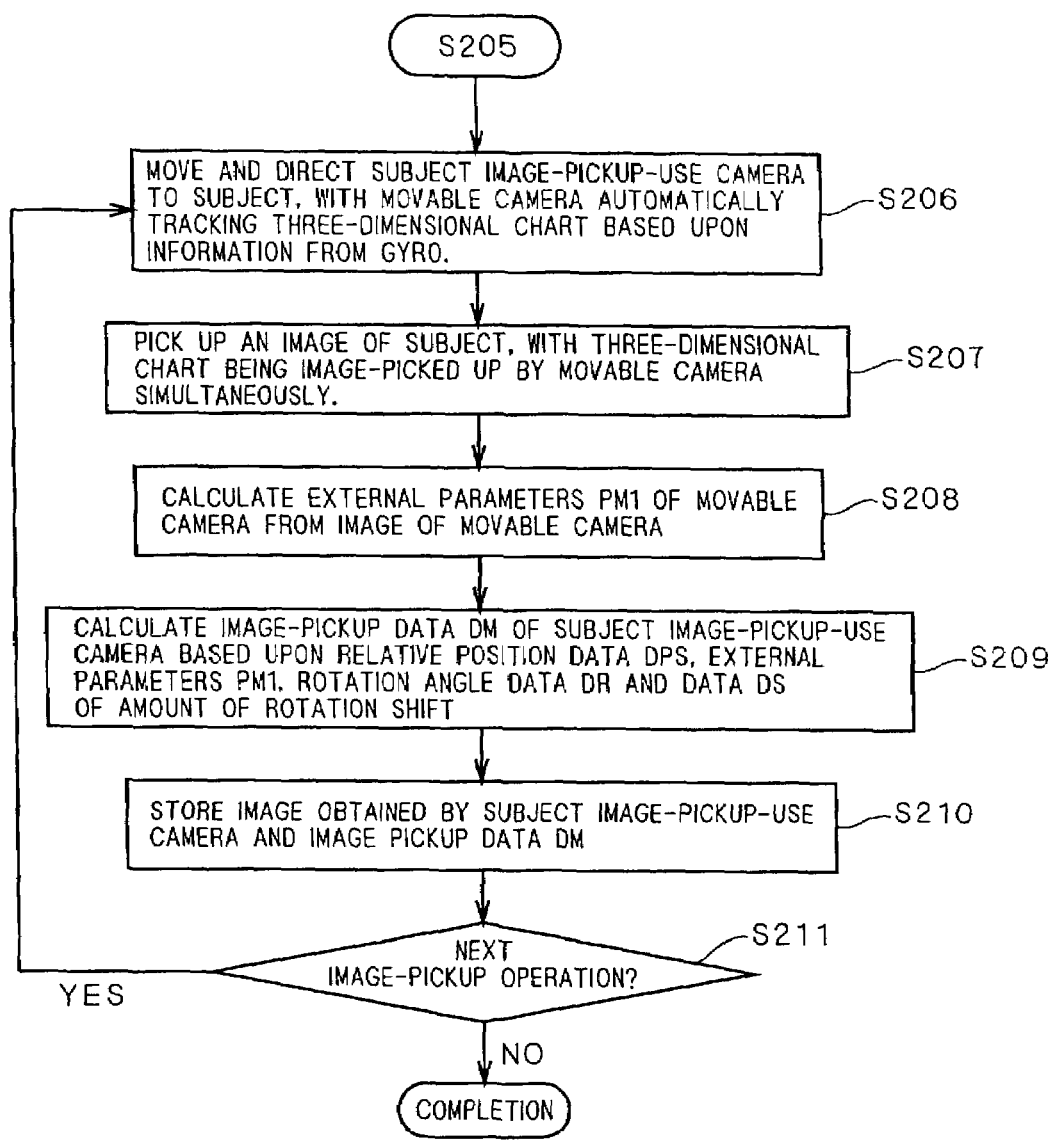
FIG. 46 is a drawing that shows a sequence corresponding to a second sub-process of image-pickup and calibration sequences using a three-dimensional chart in accordance with the fourth preferred embodiment.

FIGS. 45 and 46 show image pickup and calibration processes that are carried out in accordance with the principle of camera calibration that has been described in the first preferred embodiment. Among these, steps from step S201 to step S205 correspond to the aforementioned first sub-process in which, by picking up images of three-dimensional chart 2 simultaneously by movable camera 11 and subject-use camera 13, the relative position and orientation of both of them are found. Moreover, steps from step S206 and thereafter correspond to the aforementioned second sub-process for carrying out an actual image pickup process on subject 30.

(1) Determination of Relative Position between Cameras (First Sub-process):

First, movable camera 11 and subject-use camera 13 respectively read information of inner parameters stored therein (step S201). Here, the inner parameters are parameters which specify the viewing direction of each of the pixels of the light-receiving elements, and include the focal distance of the lens system, the positional relationship between the lens light axis and the light-receiving element, the pixel pitches, etc. These parameters have been preliminarily calibrated.

Thereafter, the user holds camera system 10 in the hands and directs subject-use camera 13 to three-dimensional chart 2. Next, while maintaining this state, the user manually specifies the rotation angle of lens unit 110 so that three-dimensional chart 2 is located within the view angle of movable camera 11 (step S202). During this operation, the output image of movable camera 13 is being live-displayed on display 163 so that the user is allowed to visually confirm whether or not three-dimensional chart 2 is located within the view angle of movable camera 11.

When, after three-dimensional chart 2 has been positioned in the view angle of movable camera 11, the user presses tracing button 117, an automatic tracing program is activated. A driving output is given to orientation altering device 113 from orientation control unit 146 so that movable camera 11 is automatically controlled so as to allow three-dimensional chart 2 to always stay in the center of the view angle, while marker 201 is being tracked (see a flow chart in FIG. 42). At this time, when the user presses shutter button 161, first image data D1 is obtained in movable camera 11, while second image data D2 is obtained in subject-use camera 13 (step S203). The examples of image data obtained at this time are the same as those shown in FIGS. 13A and 13B.

Upon completion of the image pickup operation, the first image data D1 and the rotation angle data DR of orientation altering device 113 are transmitted to subject-use camera 13 from movable camera 11 through communications so that as commonly shown in FIGS. 13(a) and 13(b), two-dimensional coordinate values of four lattice points C1 to C4 are specified on the respective image planes (which is equivalent to forming first extraction point data DP1 and second extraction point data DP2), and these two-dimensional coordinate values are processed by the aforementioned multipoint algorithm so that, based upon the first image data D1 and the second image data D2 derived from the picked-up image of three-dimensional chart 2, external parameters of the respective cameras, which depend on the relative positions and the relative orientations between the image pick-up positions of movable camera 11 and subject-use camera 13, and three-dimensional chart 2, can be calculated so that the positions and orientations of the respective cameras in the absolute coordinate system can be found (step S204). Here, in the case when information required for these calculations is not obtained, the sequence returns to step S203 where the image pickup operation of three-dimensional chart 2 is repeated.

Next, based upon the respective external parameters from movable camera 11 and subject-use camera 13 obtained at step S204 and rotation angle data DR of movable camera 11, the relative positions and orientations (between movable camera 11 and subject-use camera 13) are found (step S205).

The concept of coordinate conversion applied to step S205 is the same as that shown in FIG. 14.

In other words, from the respective images of three-dimensional chart 2 simultaneously picked up by movable camera 11 and subject-use camera 13, the first extraction point data DP1 and the second extraction point data DP2 are found and the external parameters of the respective cameras are found so that the conversion expressions of equations 9 to 11 are specified as those corresponding to the aforementioned conversion relationship $\theta_{12}$. This forms relative position data DPS of FIG. 44. Here, it is supposed that the external parameter of movable camera 11 is external parameter PM1 and that the external parameter of subject-use camera 13 upon picking up an image of the three-dimensional chart is external parameter PM2. Moreover, the specific values of the angles $\theta,\phi$ are detected as rotation angle data DR by angle sensors 126$p$, 126$t$.

Consequently, based upon external parameter PM1, external parameter PM2 and rotation angle data DR, the relative position data DPS that depends on the relative position and the relative orientation between the image pickup position in the reference orientation of movable camera 11 and the image pickup position of subject-use camera 13 can be calculated; thus, a process (second sub-process) which will be described later is carried out by using this so that subject-use camera 13 can be calibrated.

(2) Image Picking Up Process of Subject and Camera Calibration (Second Sub-process):

Upon completion of step S205, camera system 10 is shifted on demand so as to pick up an image of subject 30. At this time, movable camera 11 always holds three-dimensional chart 2 within its view angle through the automatic tracing operation, based upon the information (data DS of the amount of rotation shift and data DL of the amount of parallel shift) from gyro 14 (step S206).

In a state where subject 30 can be image-picked up by subject-use camera 13 as well as in a state where three-dimensional chart 2 can be image-picked up by movable camera 11, when shutter button 161 of subject-use camera 13 is depressed, image pickup operations are simultaneously carried out by the respective cameras (step S207). The examples of images obtained at this time are the same as those shown in FIGS. 15A and 15B.

In this case, from the first image data D1 obtained by movable camera 11, the position and orientation (external parameter PM1) in the absolute coordinate system $X_0$ of movable camera 11 are obtained in the same manner as step S204 (step S208).

Based upon the external parameter PM1 of movable camera 11, the relative position data DPS found in step S205 and the respective values $\theta',\phi'$ of rotation angles $\theta,\phi$ of movable camera 11 in step S207, the relative position and orientation (that is, external parameters of subject-use camera 13) of subject-use camera 13 with respect to three-dimensional chart 2 are found (step S209).

The concept of the coordinate conversion applied to the above-mentioned step S209 is the same as that shown in FIG. 16.

When the image-pickup data DM has been found at step S209, the image-pickup data DM of subject-use camera 13 at the time of the image-picking-up operation is recorded in RAM 151, or memory card 166, together with the image data D2 of subject 30 (step S210).

Thereafter, image-pickup operations are repeated until the second image data D2 the number of pieces of which is sufficient and the corresponding image-pickup data DM for the respective pieces of data are obtained (step S211), thereby completing the second sub-process.

Thus, based upon the data DS of the amount of rotation shift, calculation unit 173 calculates image pickup data DM used for calibrating subject-use camera 13, which depends on the relative position and the relative orientation between the image pickup position of subject-use camera 13 and the image pickup data DM so that the three-dimensional image model of subject 30 is formed by using the image pickup data DM through the aforementioned shape-from-silhouette method.

Here, in the present preferred embodiment also, the chart discriminating process by the use of coding of cross ratios and the identifying process of the image-pickup portion are carried out in the same manner as the aforementioned first preferred embodiment.

Therefore, in the present preferred embodiment also, by image-picking-up three-dimensional chart 2 as an image located in the center of the view angle by using a camera other than the camera for picking up an image of three-dimensional chart 2 so that it is possible to accurately acquire external parameters among calibration parameters used for calibrating the position and orientation of the camera. Since the camera for picking up an image of three-dimensional chart 2 is arranged to automatically track three-dimensional chart 2 based upon information from gyro 14 so that the user is allowed to pick up an image of subject 30 without the necessity of any special attention on movable camera 11. Moreover, the external parameters are calculated by utilizing information from gyro 14 so that it becomes possible to reduce the amount of calculations, and consequently to reduce processing loads imposed on image pickup system 1.

5. Fifth Preferred Embodiment

The following description will discuss a fifth preferred embodiment. In this preferred embodiment, an explanation will be given of a technique which specifies the relative relationship among a plurality of image pickup positions by utilizing a plurality of camera calibration-use three-dimensional charts.

<Outline of System Construction>

Figure 47:
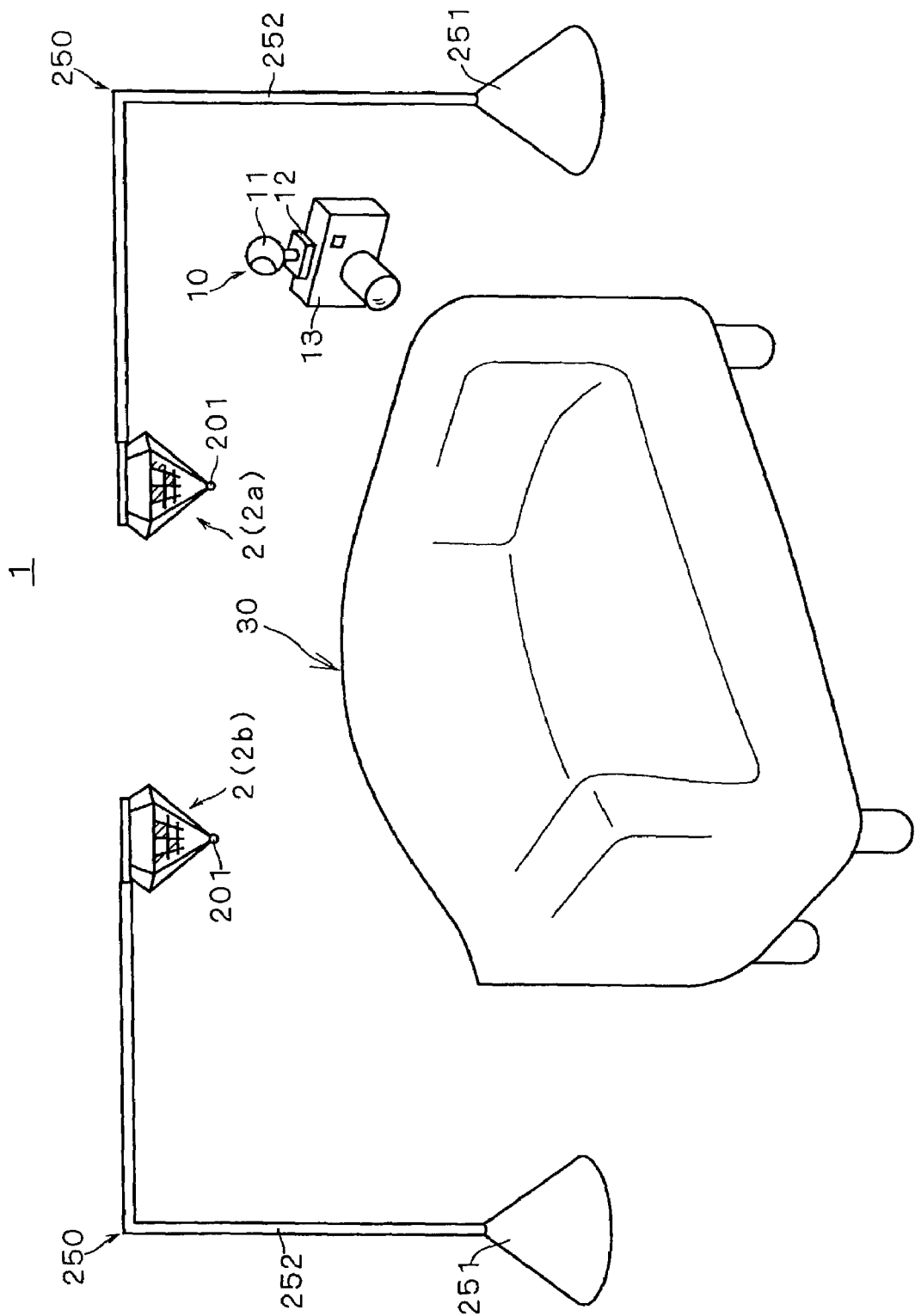
FIG. 47 is a drawing that shows a structural example of an image pickup system in accordance with a fifth preferred embodiment.

FIG. 47 is a drawing that shows a structural example of an image pickup system 1 in accordance with the present preferred embodiment. As shown in FIG. 47, image pickup system 1 of the present preferred embodiment is provided with a portable camera system 10 capable of picking up an image of a three-dimensional subject 30, and two (2a, 2b) of camera calibration-use three-dimensional charts 2 that are placed in the vicinity of subject 30.

Figure 48:
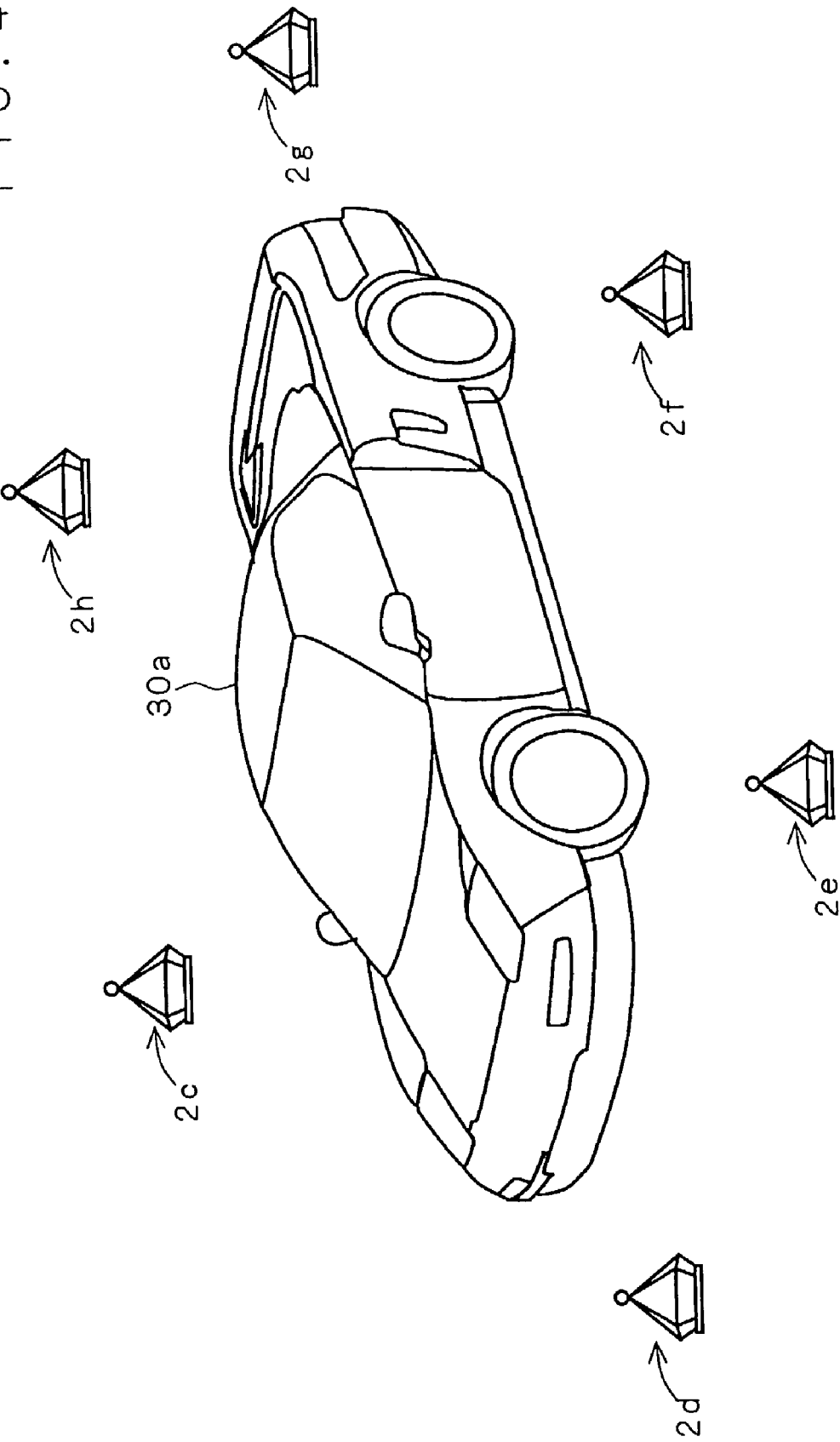
FIG. 48 is a drawing that shows an example in which a three-dimensional chart without using a supporting tool.

Three-dimensional chart 2 is a three-dimensional object having a polyhedron main body with a chart pattern being placed on each of side faces thereof, and this is allowed to function as a reference object when a camera calibration is carried out. FIG. 47 shows a case in which three-dimensional charts 2 having virtually a pyramid shape are used. In FIG. 47, three-dimensional charts 2 are suspended from a chart supporting tool 250; however, these may be directly placed on a floor face, a wall face or a ceiling, etc., in a space in which subject 30 is housed, without using chart supporting tool 250. Moreover, as shown in FIG. 48, six three-dimensional charts 2c to 2h may be placed around subject 30a on the floor face in a dispersed manner, without using chart supporting tool 250.

Camera system 10 in accordance with the present preferred embodiment has virtually the same construction as described earlier; however, a subject-use camera 13 attached to camera system 10 also functions as a measuring device in the present preferred embodiment, and a movable camera 11 is attached to the upper portion of subject-use camera 13 through an attaching mechanism 12 so as to be freely oriented. Here, the entire block diagram of image pickup system 1 of the present preferred embodiment is the same as that shown in FIG. 2.

<Outline of Three-dimensional Chart>

Figure 49:
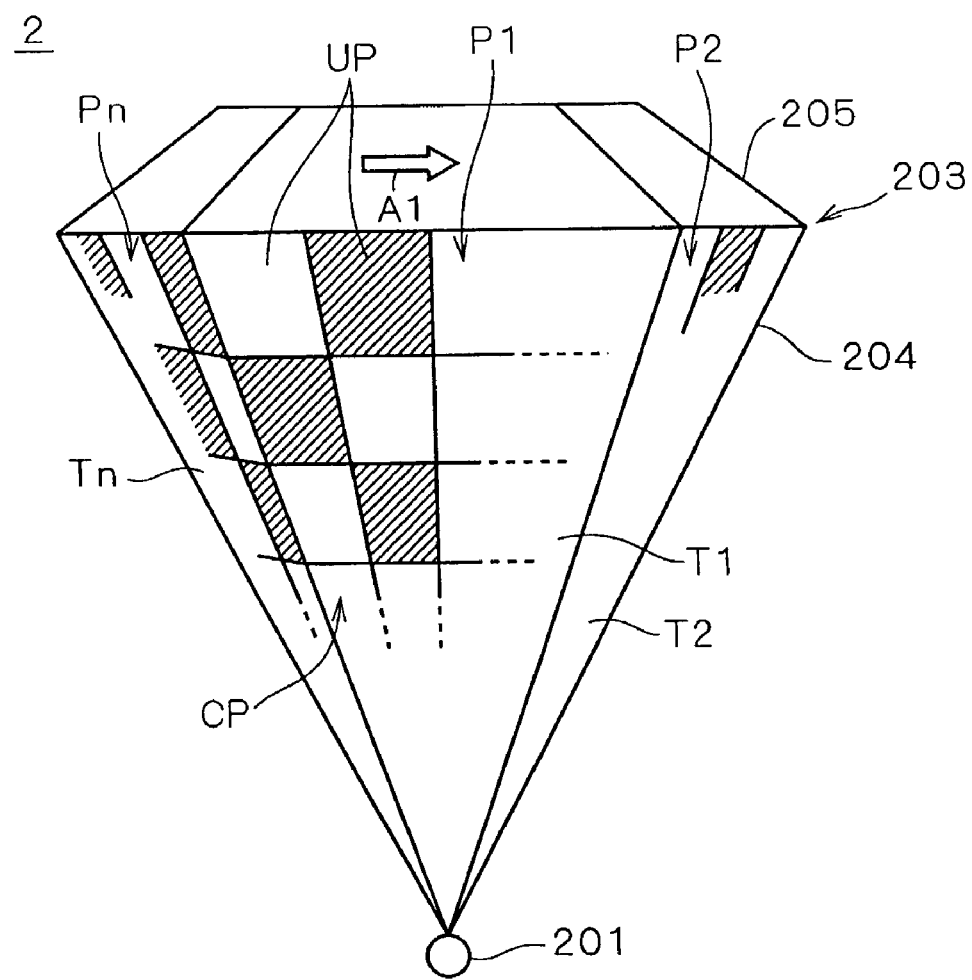
FIG. 49 is a drawing that shows an example of a side face of a three-dimensional chart in accordance with the fifth preferred embodiment.

FIG. 49 shows a side view of three-dimensional chart 2 having virtually a pyramid shape used in image pickup system 1 shown in FIG. 47. This three-dimensional chart 2 is provided with a three-dimensional chart main body 203 and a chart pattern CP formed the surface of this three-dimensional chart main body 203.

In this preferred embodiment, an arrow A1, which serves as an index when the absolute orientation of three-dimensional chart 2 is identified, is drawn on a support portion 205. However, the position and direction of arrow A1 are not limited to these, and these may be drawn on another position of three-dimensional chart 2 while being directed to another direction. The identifying method of the absolute orientation will be described later.

Here, in FIG. 47, two three-dimensional charts 2 are used; however, more of these may be added and placed in a dispersed manner depending on the size and shape of subject 30.

<Outline of Movable Camera 11>

Movable camera 11 of the present preferred embodiment has the same construction as that shown in FIGS. 4 and 5. Moreover, from the viewpoint of hardware construction, the essential portion of the information processing function of movable camera 11 is the same as that shown in FIG. 6, and the flow of data in movable camera 11 is the same as that shown in FIG. 7.

<Outline of Subject-use Camera 13>

Figure 50:
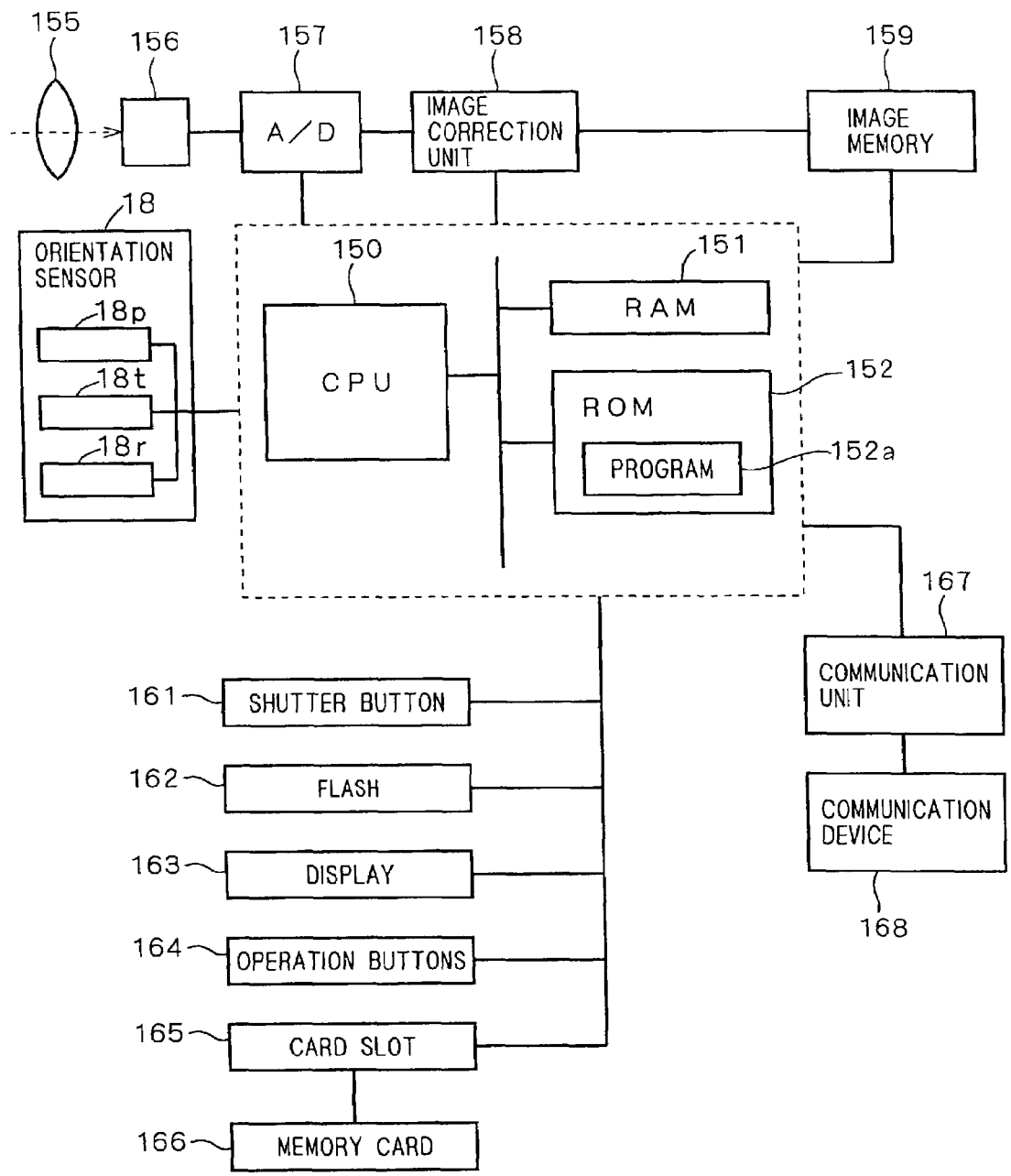
FIG. 50 is a drawing that shows an essential portion of an information processing function of the subject-use camera in accordance with the fifth preferred embodiment.
Figure 51:
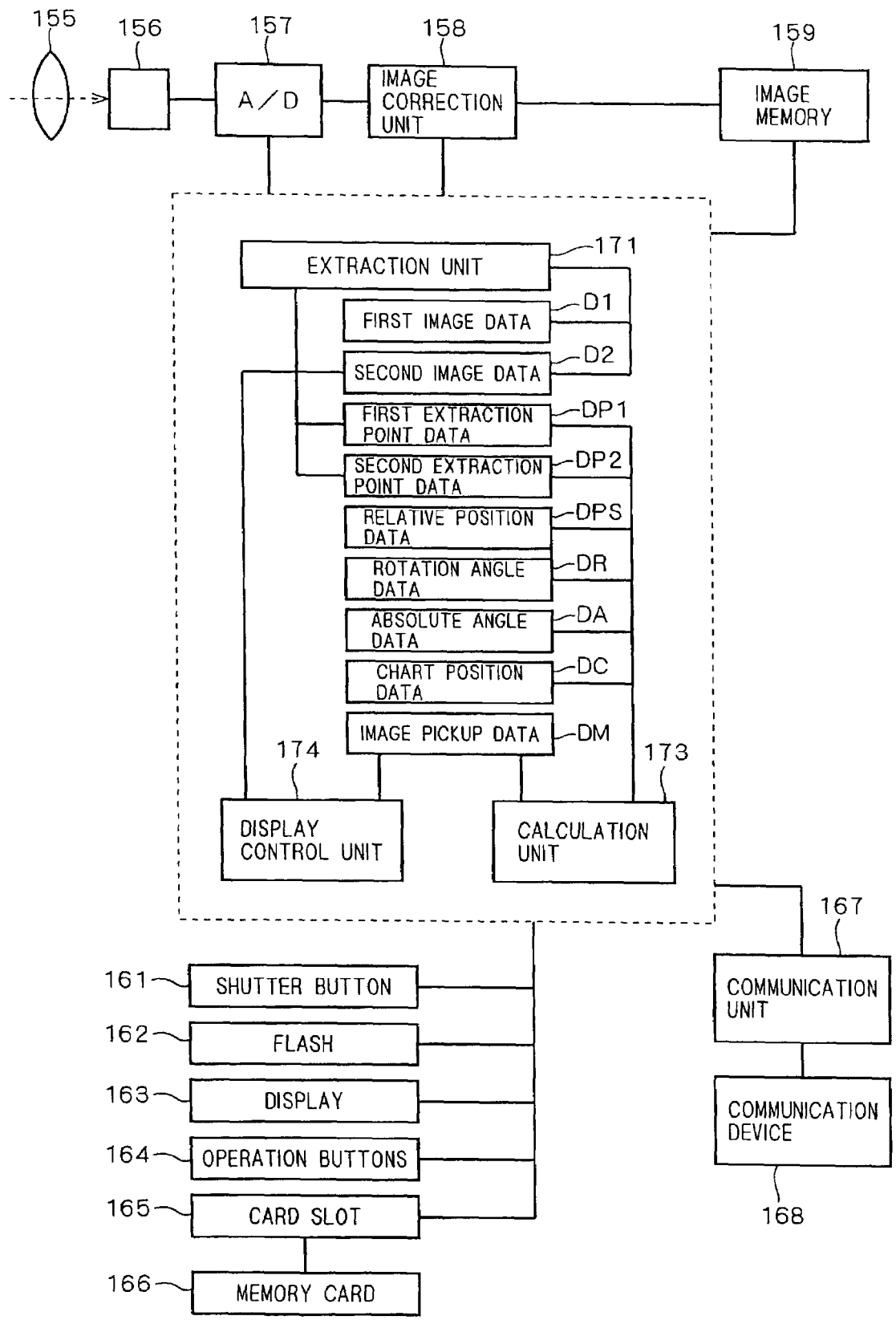
FIG. 51 is a drawing that shows a flow of data in a movable camera in accordance with the fifth preferred embodiment.

FIG. 50 is a drawing that shows an essential portion of an information processing function of subject-use camera (subject image-pickup-use camera) 13 from the viewpoint of hardware construction, and FIG. 51 is a drawing that shows a flow of data in subject-use camera 13. Subject-use camera 13 is provided with a CPU 150, a RAM 151 and a ROM 152, and a program 152a, which achieves various operations in subject-use camera 13, which will be described later, is stored in ROM 152. Moreover, elements, such as a shutter button 161, a flash lamp 162, a monitor-use color display 163 placed on the rear face, operation buttons 164 and an angle sensor 18, are electrically connected to CPU 150.

A communication unit 167 transmits and receives various pieces of information such as control signals of various parts in movable camera 11 and obtained image data, to and from movable camera 11 through a communication device 168. For example, a signal, obtained when the user operates one portion of the operation buttons 164 in the manual mode, is transmitted to movable camera 11 so that the user is allowed to operate orientation altering device 113 of movable camera 11 through the manual operations. Moreover, in response to a pressing operation of shutter button 161 of subject-use camera 13, subject-use camera 13 and movable camera 11 are allowed to simultaneously pick up images or only movable camera 11 is allowed to pickup an image, in accordance with setting given through operation buttons 164.

A card slot 165 is used for attaching a memory card 166 to subject-use camera 13, and it is possible to store picked-up image data, etc. in this memory card 166.

Angle sensor 18, which is prepared, for example, as a sensor for measuring earth magnetization and gravity, detects the orientation (absolute orientation) of subject-use camera 13 with respect to a space in which an image-pickup process is carried out. Pivotal angles in the horizontal direction are detected by a sensor $18p$, elevation and depression angles in the vertical direction are detected by a sensor $18t$, and rotation angles around the incident direction serving as the rotation direction are detected by a sensor $18r$, respectively, and the resulting angles are stored in RAM 151 as absolute angle data DA.

An extraction unit 171, a calculation unit 173 and a display control unit 174, shown in FIG. 51 have functions that are achieved by CPU 150, RAM 151, ROM 152, etc. shown in FIG. 50.

Extraction unit 171 extracts four points on three-dimensional chart 2 from the first image data D1 received from movable camera 11 through communication unit 167 to form first extraction point data DP1. Moreover, extraction unit 171 also extracts four points on three-dimensional chart 2 from the second image data D2 obtained from subject-use camera 13 to form second extraction point data DP2.

Calculation unit 173 finds the relative position and orientation between movable camera 11 and subject-use camera 13 from the first extraction point data DP1, rotation angle data DR and the second extraction point data DP2 to form relative position data DPS. Further, based upon the first extraction point data D1, rotation angle data DR, relative position data DPS and absolute angle data DA, it finds the relative position and orientation between subject-use camera 13 and three-dimensional chart 2 and the absolute orientation with respect to the space, thereby forming image pickup data DM. Moreover, calculation unit 173 calculates the relative position and orientation of another three-dimensional chart 2 with respect to a reference chart 2k, which will be described later, from the first image data D1 obtained by image-picking up plurality of three-dimensional charts 2, thereby forming chart position data DC. The image pickup data DM and chart position data DC are stored in RAM 151.

Based upon an instruction of the user through operation buttons 164, display control unit 174 acquires the second image data D2 and image pickup data DM from RAM 151 to store the resulting data in memory card 166. Moreover, display control unit 174 also has functions for subjecting various data to necessary processes so as to be displayed on display 163, and for reading various data stored in memory card 166 onto RAM 151.

In addition to the above-mentioned function-setting processes, operation buttons 164 are also used for setting various modes, as described below.

Camera position determining mode: Mode in which calculations for determining the relative position and orientation between movable camera 11 and subject-use camera 13 are executed;

Subject image-pickup mode: Mode in which an image of subject 30 is picked up by subject-use camera 13 and calculations for determining the relative position and orientation of subject-use camera 13 with respect to three-dimensional chart 2 are executed;

Chart measuring mode: Mode in which calculations for determining the relative position and orientation of another three-dimensional chart 2 with respect to a reference chart 2k, which will be described later, are executed.

Here, when any one of the modes is set by an instruction of the user, the corresponding image-pickup operation is carried out, and the corresponding calculations are then executed. The other constructions are the same as those described above.

<Outline of Camera Calibration>

When an image is taken from subject 30 by subject-use camera 13 from a desired direction, it is necessary to specify the relative position and orientation of subject-use camera 13 with respect to three-dimensional chart 2 or a chart coordinate system fixed thereto at the time of the image picking-up process as external parameters. This is because, upon composing a three-dimensional image model of subject 30 by combining respective images obtained by image-pickup processes from a plurality of directions, the spatial relative relationship among the respective images is required. However, when an image of subject 30 is actually taken, it is sometimes difficult to insert three-dimensional chart 2 within the view angle of subject-use camera 13. Therefore, in the present preferred embodiment, movable camera 11 is always allowed to trace three dimensional chart 2 so that, simultaneously when an image is picked up from subject 30 by subject-use camera 13, an image is picked up from three-dimensional chart 2 by movable camera 11, and a plurality of three-dimensional charts 2 are placed within the space; thus, it is possible to reduce the limitation to image-pickup positions. The following description will discuss the principle of camera calibration based upon this arrangement. Here, in the following explanation, in the case when n-number of three-dimensional charts 2 are used, if specific one of three-dimensional charts 2 is indicated, this is referred to as three-dimensional chart 2(i), if a set of n-number of three-dimensional charts are indicated, these are referred to as a three-dimensional chart group G, and if either of these is not particularly specified, this is simply referred to as three-dimensional chart 2.

(1) Relative position and orientation between camera and three-dimensional chart:

In the case when, image pickup processes are carried out by using a three-dimensional chart group 2G and movable camera 11 holds three-dimensional chart 2(i), supposing that:

$X_{(i)}$ ... a coordinate system (chart coordinate system) fixed to three-dimensional chart 2(i);

$X_1$ ... a coordinate system (first local coordinate system) fixed to movable camera 11;

$X_2$ ... a coordinate system (second local coordinate system) fixed to subject-use camera 13;

$\tau_{(i)1}$ ... conversion relationship from first local coordinate system $X_1$ to chart coordinate system $X_{(i)}$;

$\tau_{(i)2}$ ... conversion relationship from second local coordinate system $X_2$ to chart coordinate system $X_{(i)}$; and $\tau_{12}$ ... conversion relationship from second local coordinate system $X_2$ to first local coordinate system $X_1$, the following relationship is satisfied ($\tau_{(i)1}$, $\tau_{(i)2}$, $\tau_{12}$ and $Q_{(i)}$, $Q_2$, and $Q_{ki}$, which will be described later, are not shown).

$$\tau_{(i)2} = \tau_{(i)1} \cdot \tau_{12} \quad \text{(Equation 45)}$$

When $\tau_{(i)1}$, $\tau_{12}$ have been known, $\tau_{(i)2}$ is found. When $\tau_{(i)2}$ has been found, the position and orientation in the second local coordinate system $X_2$ of subject-use camera 13 that has picked up a two-dimensional image are found as the position and orientation in the chart coordinate system $X_{(i)}$, by applying this conversions $\tau_{(i)2}$ thereto. In other words, supposing that:

$Q_{(i)}$ ... a matrix representing the position and orientation of subject-use camera 13 in chart coordinate system $X_{(i)}$; and $Q_2$ ... a matrix representing the position and orientation of subject-use camera 13 in the second local coordinate system $X_2$, the following equation is satisfied:

$$Q_{(i)} = \{\tau_{(i)1} \cdot \tau_{12}\} Q_2 = \tau_{(i)2} \cdot Q_2 \quad \text{(Equation 46)}$$

Specific processes (which will be described in detail, later) for achieving these equations are mainly classified into the first sub-process and the second sub-process.

*First Sub-process:

This sub-process is used for specifying the conversion relationship $\tau_{12}$ between the two camera coordinate systems.

First, one three-dimensional chart 2(i) is selected from three-dimensional chart group 2G, and images of this are simultaneously picked up by movable camera 11 and subject-use camera 13; thus, by using the results of the image pickup processes, the external parameters of the respective cameras, that is, the position and orientation of the respective cameras in chart coordinate system $X_{(i)}$, are found.

This is equivalent to specifying the conversion relationships $\tau_{(i)2}$, $\tau_{(i)1}$ at that state. Then, based upon the following relationship obtained from equation 45, $$\tau_{12} = (\tau_{(i)1})^{-1} \tau_{(i)2} \quad \text{(Equation 47)},$$

it is possible to obtain the conversion relationship $\tau_{12}$ between the first local coordinate system $X_1$ and the second local coordinate system $X_2$.

Moreover, since the values of rotation angles $\theta,\phi$ of movable camera 11 are known values respectively detected by angle sensors 126p, 126t, the rotation angle depending portions are separated from the conversion relationship $\tau_{12}$ so that a reference conversion relationship $\tau_{12}(0,0)$ at the time when movable camera 11 is in the reference orientation ($\theta=0$, $\phi=0$) can be found. This reference conversion relationship $\tau_{12}(0,0)$ is an operator that is unchanged even when camera system 10 is shifted or movable camera 11 is rotated. When the reference conversion relationship $\tau_{12}(0,0)$ has been determined, the conversion relationship $T_12$ is allowed to have rotation angles $\theta$, $\phi$ as variables.

The conversion relationship $\tau_{12}$ thus obtained is not dependent on the position and orientation of the entire camera system 10; therefore, even when camera system 10 is moved to another place, it is utilized in conversion calculations at this place.

*Second Sub-process:

This is a sub-process which obtains image data by picking up images of subject 30 while utilizing the results of the first sub-process, and adds information corresponding to the conversion relationship $\tau_{(i)2}$ from the second local coordinate system $X_2$ to chart coordinate system $X_{(i)}$ to each pieces of the image data.

In the second sub-process, simultaneously as subject 30 is image picked up by subject-use camera 13, three-dimensional chart 2 is image picked up by movable camera 11. The three-dimensional chart 2 to be image-picked up by movable camera 11 is not necessarily the same as three-dimensional chart 2(i) that has been image-picked up in the first sub-process, and any three-dimensional chart 2 that can be easily held by movable camera 11 from the image-pickup position of subject 30 may be set as a target. Supposing that this is three-dimensional chart 2(j), based upon the image data of three-dimensional chart 2(j) picked up by movable camera 11, the conversion relationship $\tau_{(j)1}$ from the first local coordinate system $X_1$ to chart coordinate system $X_{(j)}$ is specified.

Here, since the rotation angle dependence of the conversion relationship $\tau_{12}$ from the second local coordinate system $X_2$ to the first local coordinate system $X_1$ has been specified in the first sub-process, the specific contents of the conversion relationship $\tau_{12}$ are specified from the values of the rotation angles $\theta,\phi$ at the time when subject 30 is picked up. Therefore, the conversion relationship $\tau_{(j)2}$, formed by composing the conversion relationships $\tau_{12}$ and $\tau_{(j)1}$, is obtained from equation 48.

$$\tau_{(j)2}=\tau_{(j)1}\cdot\tau_{12} \quad \text{(Equation 48)}$$

Then, information representing this conversion relationship $\tau_{(j)2}$ is stored in association with the image obtained by subject-use camera 13.

Moreover, this second sub-process is executed each time subject 30 is image picked up from a plurality of directions. Even when only one three-dimensional chart 2 is used, this process makes it possible to provide a group of pieces of information to obtain a three-dimensional image model.

(2) Relative Position and Orientation Between Three-dimensional Charts:

Since a plurality of three-dimensional charts 2 are placed in a dispersed manner in the present preferred embodiment, each time movable camera 11 picks up an image, the corresponding three-dimensional chart 2 might be different. Since the different three-dimensional charts 2 have respectively different chart coordinate systems, the positions and orientations of subject-use camera 13 at the respective image-pickup positions are represented by respectively different coordinate systems at the time of completion of the second sub-process. Therefore, in order to represent the respective positions and orientations as positions and orientations in the space in which the image-pickup processes have been carried out, these have to be converted to the same coordinate system. In the present preferred embodiment, either one of the three-dimensional charts 2 is selected as a reference chart 2k, and the chart coordinate system of the other three-dimensional chart 2 is converted to coordinate system (reference chart coordinate system) $X_k$ of the reference chart 2k. A process for achieving this arrangement is hereinafter referred to as the third sub-process. The following description will discuss this sub-process.

Third Sub-process:

In the case when, in the space in which subject 30 is image-picked up, a group of three-dimensional charts 2G are placed in a dispersed manner and movable camera 11 is focused on one of three-dimensional charts 2(i), supposing that:

$\tau_{k2}$ ... conversion relationship from second local coordinate system $X_2$ to reference chart coordinate system $X_k$;

$\tau_{k(i)}$ ... conversion relationship from chart coordinate system $X_{(i)}$ to reference chart coordinate system $X_k$; and $Q_k$ ... a matrix representing the position and orientation of subject-use camera 13 in the reference chart coordinate system $X_k$, the following relationship is satisfied with respect to three-dimensional chart 2(i) (i=1 to n), $$Q_{(i)}=\tau_{(i)2}\cdot Q_2 \quad \text{(Equation 49)}.$$

In particular, with respect to the reference chart 2k, the following equation holds:

$$Q_k=\tau_{k2}\cdot Q_2 \quad \text{(Equation 50)}$$

Therefore, when $Q_2$ is deleted from equations 46 and 50, the following equation is obtained:

$$Q_k=\{\tau_{k2}\cdot(\tau_{(i)2})^{-1}\}\cdot Q_2=\tau_{k(i)}\cdot Q_{(i)} \quad \text{(Equation 51)}.$$

Based upon this conversion relationship $\tau_{k(i)}$, the chart coordinate system $X_{(i)}$ of three-dimensional chart 2(i) is converted into the relative position and orientation with respect to reference chart coordinate system $X_k$. This conversion relationship is not dependent on the position and orientation of movable camera 11 and subject-use camera 13, and is a relationship that is maintained unless the reference chart 2k or three-dimensional chart 2(i) is shifted. Then, the information representing this conversion relationship $\tau_{k(i)}$ is attached to an image obtained by subject-use camera 13, and stored.

As described above, by using conversion relationships $\tau_{k(i)}$ and $\tau_{(i)2}$, the position and orientation of subject-use camera 13 are represented by the position and orientation in reference chart coordinate system $X_k$ independent of image-pickup positions.

<Identification of Three-dimensional Chart>

(1) Principle of Identification of Three-dimensional Chart

Upon utilizing the above-mentioned conversion relationships $\tau_{(i)2}$ and $\tau_{k(i)}$, it is necessary to identify which three-dimensional chart 2 is image-picked up by movable camera 11 when subject-use camera 13 picks up an image of subject 30. Each time an image-pickup process is carried out, the user can identify and record this; however, in the present preferred embodiment, group of three-dimensional charts 2G are placed in a dispersed manner so as to respectively having different orientations (absolute orientation) with respect to the space, and these are automatically identified.

Here, the coordinate system (absolute coordinate system) that a space in which subject 30 is image-picked up has is taken into consideration. The fact that three-dimensional charts 2 have different absolute orientations indicates that three-dimensional charts 2, represented by the absolute coordinate system, have different orientations. Here, supposing that:

$X_{ABS}$ ... coordinate system (absolute coordinate system) that the space in which subject 30 is image-picked up has;

$\tau_{(i)ABS}$ ... conversion relationship from absolute coordinate system $X_{ABS}$ to chart coordinate system $X_{(i)}$;

$\tau_{2ABS}$ ... conversion relationship from absolute coordinate system $X_{ABS}$ to coordinate system $X_2$ of subject-use camera 13; and $Q_{ABS}$ ... a matrix representing the position and orientation of subject-use camera 13 in the absolute coordinate system $X_{ABS}$, a matrix $Q_2$ that represents the position and orientation of subject-use camera 13 in the second local coordinate system $X_2$, and a matrix $Q_{(i)}$ that represents the position and orientation of subject-use camera 13 in the chart coordinate system 2(i) are respectively represented by the following equations:

$$Q_2 = \tau_{2ABS} \cdot Q_{ABS} \quad \text{(Equation 52)},$$

and $$Q_{(i)} = \tau_{(i)ABS} \cdot Q_{ABS} \quad \text{(Equation 53)}.$$

When $Q_{ABS}$ is deleted from equations 52 and 53, the following equation holds:

$$Q_{(i)} = \{\tau_{(i)ABS} \cdot (\tau_{2ABS})^{-1}\} \cdot Q_2 \quad \text{(Equation 54)}.$$

Here, when this is compared with equation 46, the following equation holds:

$$\tau_{(i)2} = \tau_{(i)ABS} \cdot (\tau_{2ABS})^{-1} \quad \text{(Equation 55)}.$$

When $\tau_{(i)1}$, $\tau_{12}$ have been known, $\tau_{(i)2}$ can be found, and $\tau_{2ABS}$ is determined depending on the image-pickup point as long as $X_{ABS}$ is given; therefore, it is possible to find $\tau_{(i)ABS}$ from equation 55.

Therefore, when three-dimensional charts 2 are preliminarily placed in a dispersed manner so as to have different $\tau_{(i)ABS}$ values, that is, so as to have different orientations, it is possible to identify the three-dimensional chart 2 that has been image-picked up by movable camera 11 by obtaining information of the orientation of subject-use camera 13 in the absolute coordinate system $X_{ABS}$. In this case, if three-dimensional charts 2 have external features that allow identification in the orientation depending on how to layout them, the same three-dimensional charts 2 may be utilized.

Here, the absolute coordinate system $X_{ABS}$ may be desirably determined, and this may be determined in accordance with limitations based upon performances of angle sensor 18, or may be determined based upon spatial features of image-pickup points.

(2) Layout of Three-dimensional Charts

Figure 52:
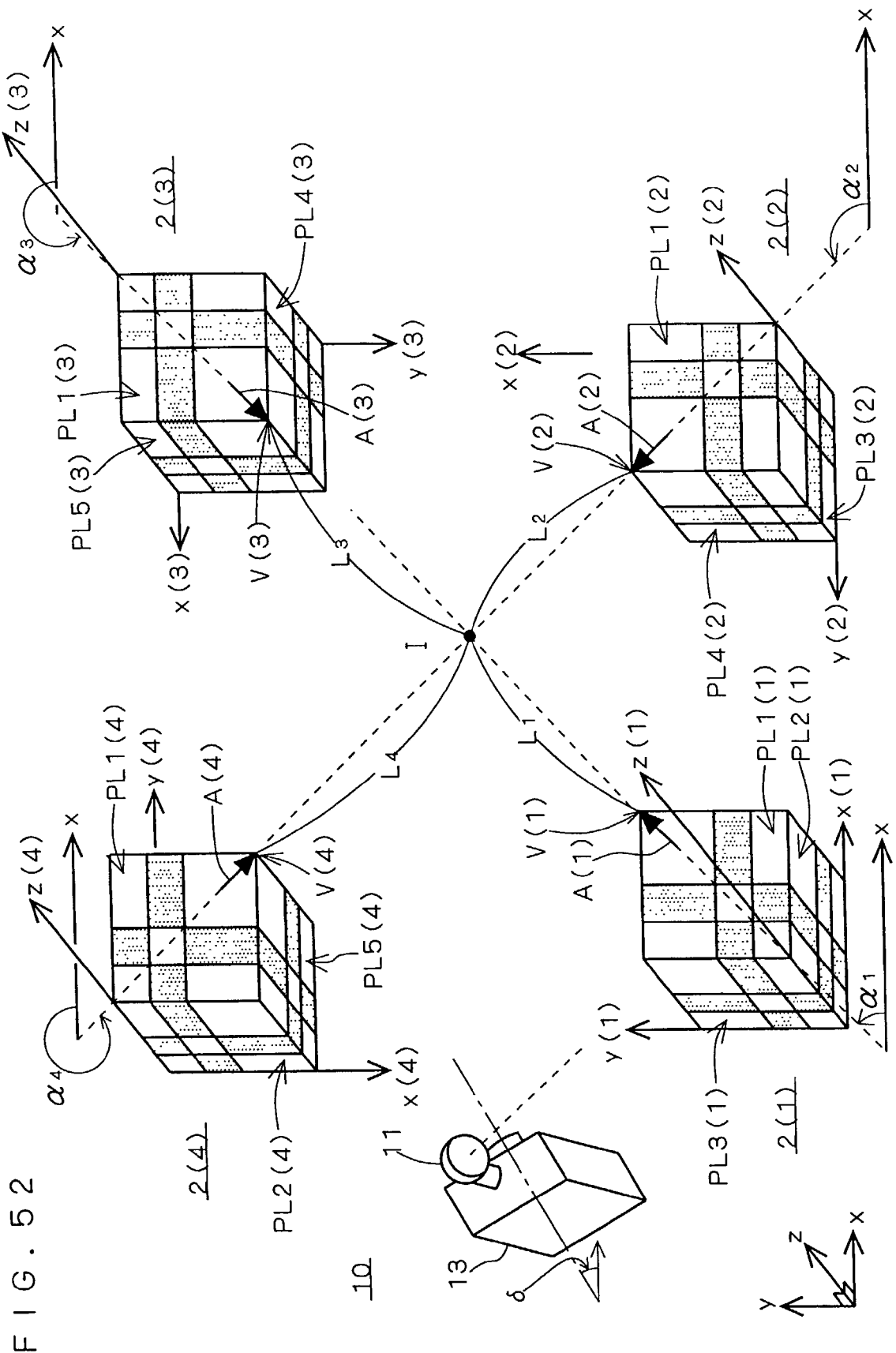
FIG. 52 is a drawing that shows a method of placing a plurality of three-dimensional charts with their orientations being distinct from each other.

In the case when, as shown in FIGS. 47 and 48, a plurality of pyramid-shaped three-dimensional charts 2 (FIG. 49) are placed, the principle used for respectively identifying these is commonly applied not only to pyramid-shaped three-dimensional charts 2, but also to various three-dimensional charts that have the same external shape and allow mutual identifications in the orientation. Therefore, the following description will discuss this principle by exemplifying a plurality of three-dimensional charts having a cubic shape (FIG. 52). Here, the following explanation is applied not only to the three-dimensional chart having a cubic shape, but also to a plurality of three-dimensional charts having a pyramid shape as shown in FIGS. 47 and 48 in the present preferred embodiment, in the same manner.

FIG. 52 shows an example in which four three-dimensional charts 2(1) to 2(4) having a cubic shape are placed. All the three-dimensional charts 2(1) to 2(4) have the same shape, and on six faces PL1 to PL6 of each three-dimensional chart 2, chart patterns in which rectangular shapes having different sizes and different lightness are alternately placed are drawn in mutually different directions. Here, only on PL1(1) to PL1(4), arrow A is also drawn as an external appearance element, and the top thereof is coincident with each of apexes V(1) to V(4). Moreover, for example, by respectively defining a crossing line between PL1 and PL2 as x(i) axis, a crossing line between PL1 and P13 as y(i) axis and a crossing line between PL2 and PL3 as z(i) axis, a local chart coordinate system $X_{(i)}$ is defined. However, the definition of the chart coordinate system $X_{(i)}$ is not limited by this, and may be different depending on respective three-dimensional charts 2.

These three-dimensional charts 2(1) to 2(4) are placed on a horizontal surface in the following manner.

1) Each of these is placed with PL6 forming a bottom face and PL1 forming a top face.

2) Directions indicated by arrows A(1) to A(4) are allowed to cross at one point.

Moreover, x-axis is taken within a plane including PL1, y-axis is set in a direction perpendicular to x-axis within the same plane, and z-axis is set in a direction perpendicular to this plane. Angles, respectively formed by arrows A(1) to A(4) and the positive direction of x-axis, are set to α1 to α4, a point at which directions indicated by arrows A(1) to A(4) intersect each other is set to 1, and distances between apexes V(1) to V(4) and point I are respectively set to L1 to L4.

When three-dimensional charts 2(1) to 2(4) are placed as described above, angles α1 to α4 within the horizontal surface (within xy face) correspond to the absolute orientations of the respective three-dimensional charts 2. Therefore, based upon the directions of arrows A(1) to A(4), the absolute orientations of three-dimensional charts 2(1) to 2(4) are identified.

Moreover, although angles α1 to α4 have different values, in order to identify them more easily, three-dimensional charts 2(1) to 2(4) are preferably placed so as not to come closer to each other so that the values of angles α1 to α4 are dispersed. For example, when these are arranged so that the values of angles α1 to α4 are respectively different, and satisfy the following equation, $$\alpha 2 - \alpha 1 = \alpha 3 - \alpha 2 = \alpha 4 - \alpha 3 = 90° \quad \text{(Equation 56)},$$

this arrangement makes it possible to place four three-dimensional charts 2(1) to 2(4) in orientations with respectively different angles by 90°. This arrangement makes the values of angles α1 to α4 dispersed furthest.

Moreover, when the arrangement is made so that all the distances L1 to L4 between apexes V(1) to V(4) and crossing point I are set to the same value, the four three-dimensional charts 2(1) to 2(4) are placed on the same circumference centered on I.

Here, not limited to three-dimensional charts 2 having a cubic shape, even in the case of three-dimensional charts 2 having a pyramid shape, the layout is made in the same manner by placing an arrow on each of the side faces.

(3) Identification of Three-dimensional Charts:

In order to identify three-dimensional charts 2(1) to 2(4) placed as shown in FIG. 52, an angle sensor 18 is utilized. Supposing that the coordinate axes in FIG. 52 serve as angle references of angle sensor 18, the absolute orientation of subject-use camera 13 within the horizontal surface is detected by sensor 18p.

Now, suppose that when subject 30 is image-picked up by subject-use camera 13, the angle (absolute angle) made by subject-use camera 13 and x-axis is 6, and that movable camera 11 is focused on, for example, three-dimensional chart 2(1). In this case, the conversion relationship $\tau_{(1)2}$ is determined by a picked up image, and the conversion relationship $\tau_{2ABS}$ is defined as a function of the absolute angle δ; therefore, it is possible to find the conversion relationship $\tau_{(1)ABS}$. In other words, the orientation data of three-dimensional chart 2(1) focused by movable camera 11 is found independent of positions of subject-use camera 13. This is applied in the same manner to a case in which movable camera 11 is focused on another three-dimensional chart 2(2) to 2(4). In the case of FIG. 52, since the absolute orientation of each of three-dimensional charts 2(1) to 2(4) is indicated by arrows A(1) to A(4), it is possible to identify the corresponding three-dimensional chart 2 by comparing and collating this with the orientation data that has been calculated.

Here, in the case when, as shown in FIG. 52, three-dimensional charts 2 are placed in a manner so as to mutually have sufficiently different orientations, it is not necessary to detect the absolute angle δ with high precision. This is because, even when the obtained orientation data has detection errors, it is possible to determine that the closest three-dimensional chart 2 is held. Supposing that the detection angle error of angle sensor 18 is ±ε (ε>0°), the number of recognizable three-dimensional charts 2 is given by 360/2ε. For example, even in the case of the sensor having a detection angle error of, for example, 10°, it can identify 18 three-dimensional charts 2 at maximum so that it is not necessary to use an angle sensor 18 with high precision.

<Image Pickup and Calibration Process>

Figure 53:
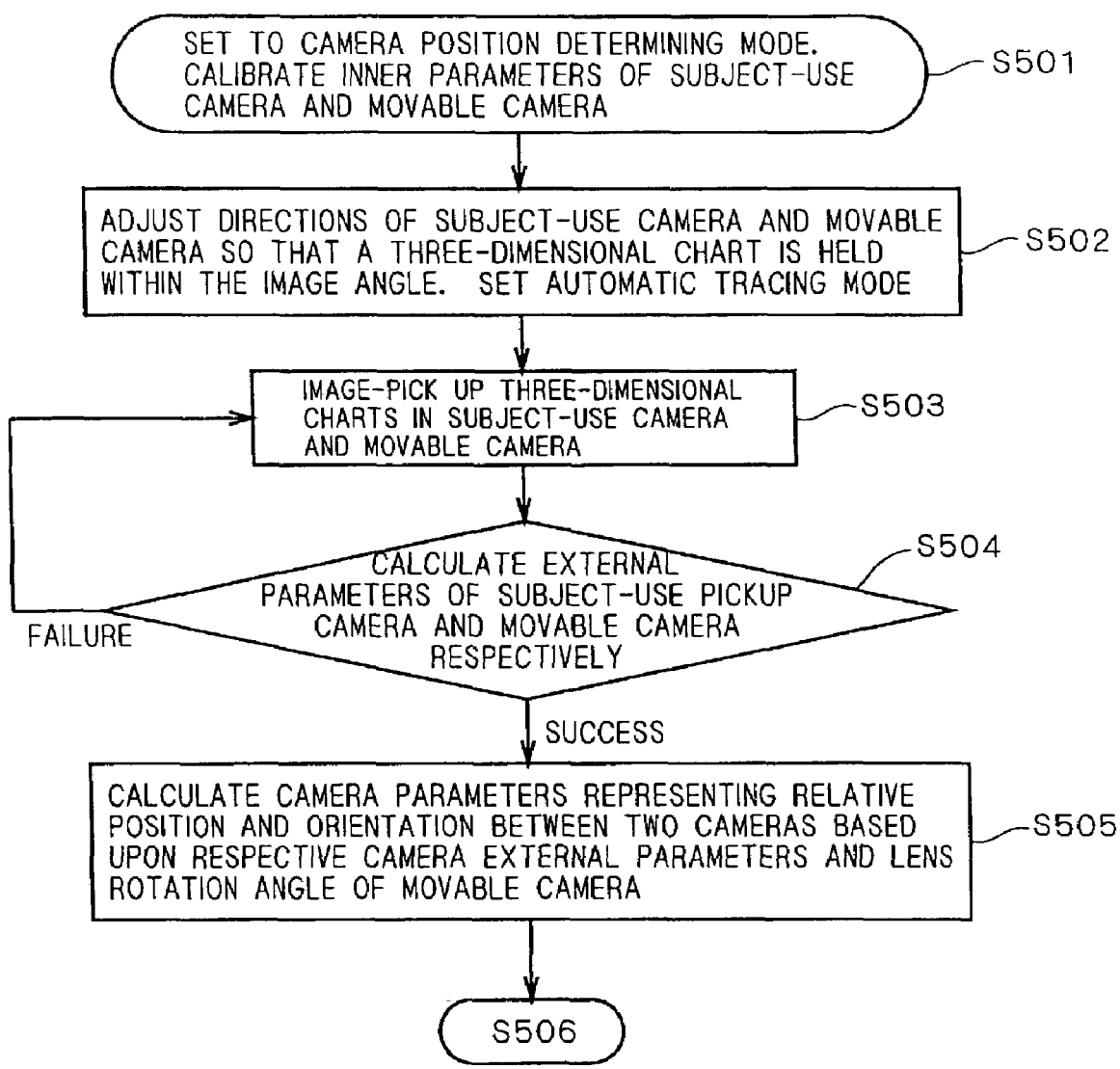
FIG. 53 is a drawing that shows a sequence corresponding to a first sub-process of image-pickup and calibration sequences using a three-dimensional chart in accordance with a fifth preferred embodiment.
Figure 54:
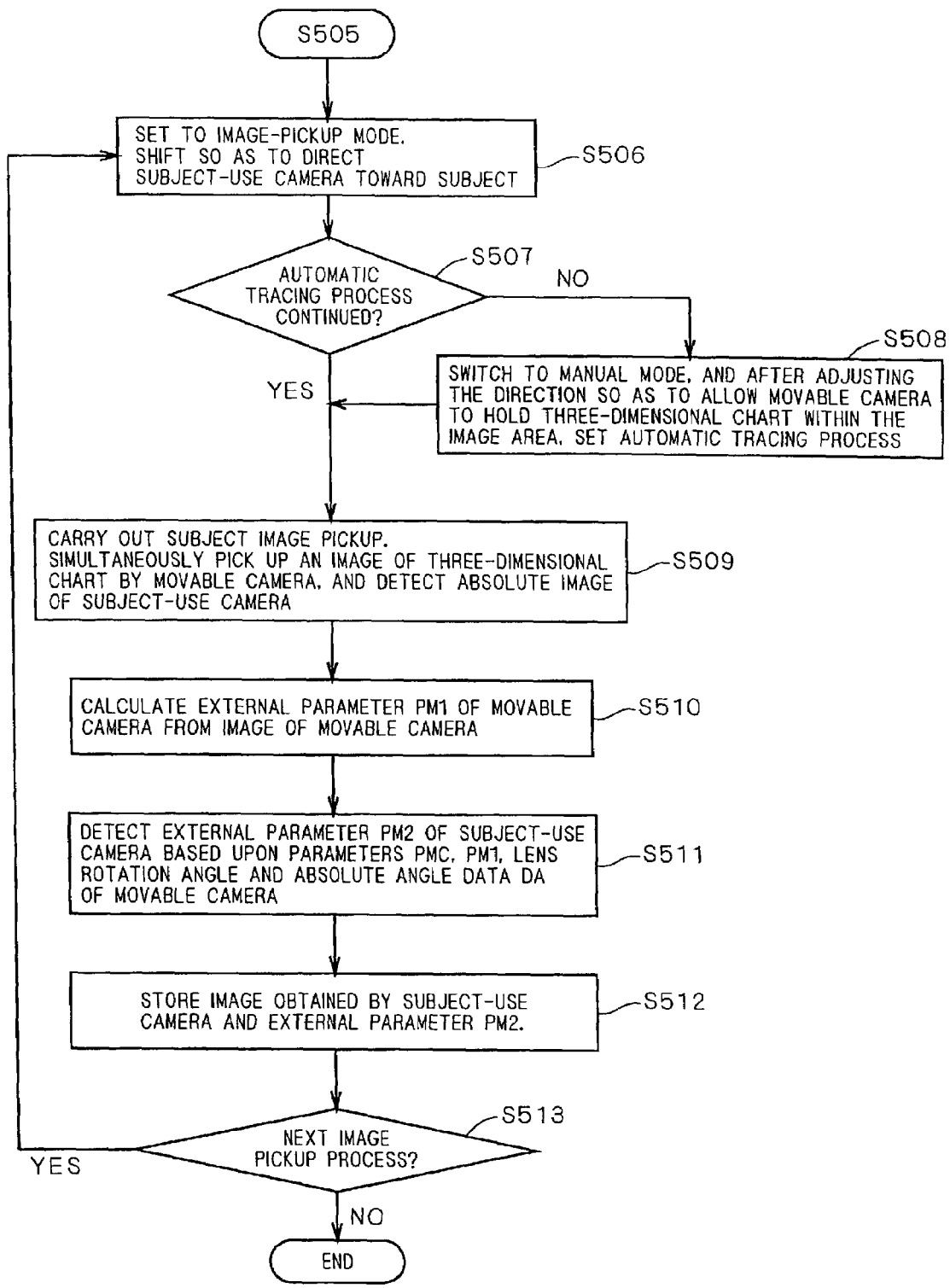
FIG. 54 is a drawing that shows a sequence corresponding to a second sub-process of image-pickup and calibration sequences using a three-dimensional chart in accordance with the fifth preferred embodiment.

(1) Determination of Camera Position and Orientation with Respect to One Three-dimensional Chart FIGS. 53 and 54 show one portion of image-pickup and calibration processes in accordance with the present preferred embodiment. Steps S501 to S505 shown in FIG. 53 correspond to the aforementioned first sub-process in which the relative position and orientation between movable camera 11 and subject-use camera 13 are obtained by simultaneously picking up images of any one 2(i) of three-dimensional chart group 2G by using them. Moreover, steps from step S506 to S512 shown in FIG. 54 correspond to the second sub-process in which an image pickup process of subject 30 is actually carried out.

(1-1) Determination of Relative Position between Cameras (First Sub-process):

First, operation buttons 164 are operated so that "camera position determination mode" is set. Movable camera 11 and subject-use camera 13 respectively read information of inner parameters held therein respectively, and carry out calibrations of the inner parameters based upon the information (step S501).

Upon completion of calibration using inner parameters, the user holds camera system 10 in his or her hands, and selects one of three-dimensional charts 2(i) from three-dimensional chart group 2G so that the selected three-dimensional chart 2(i) is held within the view angle of subject-use camera 13. Next, while maintaining this state, the user manually specifies the rotation angle of lens unit 110 so that the corresponding three-dimensional chart 2(i) is set within the view angle of movable camera 11 (step S502). During this operation, the output image from movable camera 11 is live-displayed on display 163 so that the user is allowed to visually confirm whether or not the three-dimensional chart 2(i) has entered the view angle of movable camera 11.

When, after the three-dimensional chart 2(i) has entered the view angle of movable camera 11, the user presses tracing button 117, an automatic tracing program is activated. A driving output is given to orientation altering device 113 from orientation control unit 146 so that movable camera 11 is automatically controlled so as to allow three-dimensional chart 2(i) to always stay in the center of the view angle, while marker 201 is being traced. At this time, when the user presses shutter button 161, first image data D1 is obtained in movable camera 11, while second image data D2 is obtained in subject-use camera 13 (step S503).

Upon completion of the image pickup operation, the first image data D1 and the rotation angle data DR of orientation altering device 113 are transmitted to subject-use camera 13 from movable camera 11 through communications. Based upon these subject-use camera 13, external parameters of movable camera 11, that is, the relative position and relative orientation of movable camera 11 with respect to three-dimensional chart 2(i), are calculated. Moreover, based upon the second image data D2, external parameters of pickup-use camera 13, that is, the relative position and relative orientation of subject-use camera 13 with respect to three-dimensional chart 2(i), are calculated (step S504). In the case when information required for calculations at step S504 is not obtained, the sequence returns to step S503 to repeat an image-pickup process on three-dimensional chart 2(i).

These external parameters can be calculated by utilizing the aforementioned multipoint analyzing algorithm.

Next, based upon the external parameters of the respective cameras 11 and 13 obtained at step S504 and the rotation angle data DR of movable camera 11, the relative position and orientation (hereinafter, referred to as "camera-to-camera parameter PMC") between movable camera 11 and subject-use camera 13 are found (step S505).

Figure 55:
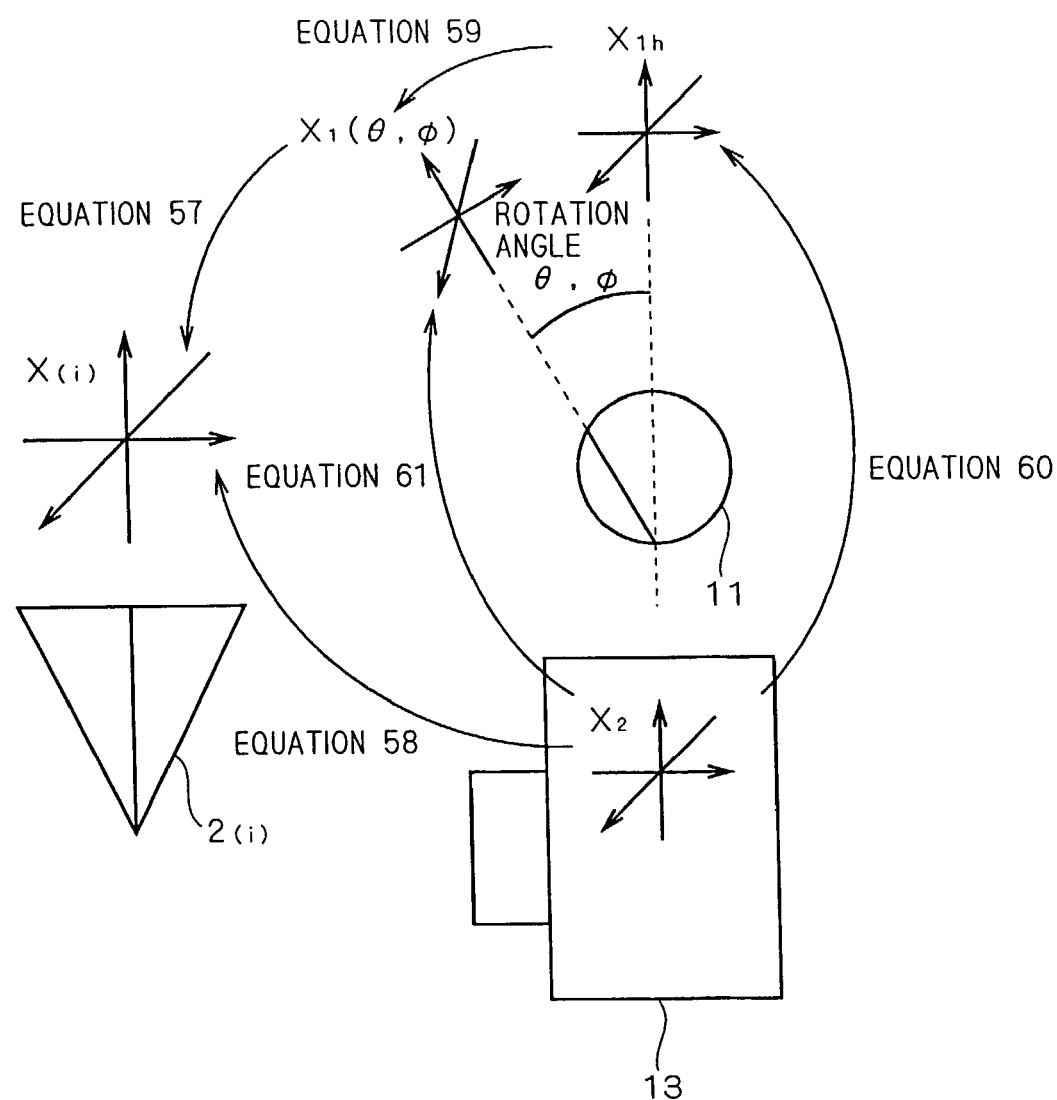
FIG. 55 is a drawing that shows coordinate conversions that are used when relative position and orientation of the subject-use camera with respect to the movable camera are calculated.

FIG. 55 shows the coordinate conversions used at step S505. The following description will explain this step. In FIG. 55, definitions on the respective coordinate systems, etc. are given as follows:

$X_{(i)}$ . . . three-dimensional orthogonal coordinate system relatively fixed to three-dimensional chart 2(i) (chart coordinate system);

$\theta_{(i)}$ . . . pivotal angle of movable camera 11, when focused on three-dimensional chart 2(i);

$\phi_{(i)}$ . . . elevation or depression angle of movable camera 11, when focused on three-dimensional chart 2(i);

$X_1(\theta_{(i)}, \phi_{(i)})$ . . . three-dimensional orthogonal coordinate system (first local coordinate system) corresponding to an observation space from movable camera 11;

$X_{1h}$ . . . the first local coordinate system when both of the angles $\theta_{(i)}, \phi_{(i)}$ are zero;

$X_2$ . . . three-dimensional orthogonal coordinate system (second local coordinate system) corresponding to an observation space from subject-use camera 13.

Since the external parameters of the respective movable camera 11 and subject-use camera 13 are obtained by step S504, the position and orientation of the first local coordinate system $X_1$ ($\theta_{(i)}, \phi_{(i)}$) in the chart coordinate system $X_{(i)}$ are determined; therefore, the coordinate conversion from the first local coordinate system $X_1$ ($\theta_{(i)}, \phi_{(i)}$) to the chart coordinate system $X_{(i)}$ is determined as shown in the following equation by using the rotation matrix $R_{C(i)1}$ and the parallel shifting vector $T_{C(i)1}$:

$$X_{(i)} = R_{C(i)1} X_1(\theta_{(i)}, \phi_{(i)}) + T_{C(i)1} \quad \text{(Equation 57)}$$

In the same manner, the coordinate conversion from the second local coordinate system $X_2$ to the chart coordinate system $X_{(i)}$ is determined as shown in the following equation by using the rotation matrix $R_{C(i)2}$ and the parallel shifting vector $T_{C(i)2}$:

$$X_{(i)} = R_{C(i)2} X_2 + T_{C(i)2} \quad \text{(Equation 58)}$$

These equations 57 and 58 respectively correspond to the aforementioned conversion relationships $\tau_{(i)1}, \tau_{(i)2}$.

In the case when both of the rotation angles $\theta_{(i)}, \phi_{(i)}$ are not zero, the rotation conversion is obtained as the following equation, from designing data of the rotation mechanism possessed by orientation altering device 113 of movable camera 11 by using the rotation matrix $R_X$ ($\theta_{(i)}, \phi_{(i)}$) and parallel shifting vector $T_X$ ($\theta_{(i)}, \phi_{(i)}$).

$$X_1(\theta_{(i)}, \phi_{(i)}) = R_X(\theta_{(i)}, \phi_{(i)}) X_{1h} + T_X(\theta_{(i)}, \phi_{(i)}) \quad \text{(Equation 59)}$$

Supposing that, when both of the rotation angles $\phi_{(i)}, \phi_{(i)}$ are zero, the coordinate conversion from the second local coordinate $X_2$ to the first local coordinate system $X_{1h}$ is represented by the following equation by using the rotation matrix $R_h$ and the parallel shifting vector $T_h$, equation 60 corresponds to the conversion relationship $\tau_{(i)12}$ (0,0).

$$X_{1h} = R_h X_2 + T_h \quad \text{(Equation 60)}$$

Here, when equation 59 is substituted by equation 60, the following equation is obtained:

$$X_1 = R_m(\theta_{(i)}, \phi_{(i)}) X_2 + T_m(\theta_{(i)}, \phi_{(i)}) \quad \text{(Equation 61)}$$

where $$R_m(\theta_{(i)}, \phi_{(i)}) = R_X(\theta_{(i)}, \phi_{(i)}) R_h \quad \text{(Equation 62)}$$

$$T_m(\theta_{(i)}, \phi_{(i)}) = R_X(\theta_{(i)}, \phi_{(i)}) T_h + T_X(\theta_{(i)}, \phi_{(i)}) \quad \text{(Equation 63)}.$$

Equations 61 to 63 correspond to the conversion relationship $\tau_{(i)12}$.

Therefore, when the external parameters of the respective cameras are found from the respective images of three-dimensional chart 2(i) simultaneously picked up by movable camera 11 and subject-use camera 13, the conversion equations of equations 17 and 18 are specified as those corresponding to the aforementioned conversion relationship $\tau_{12}$. These correspond to relative positional data DPS of FIG. 51. Moreover, the specific values of the angles $\theta_{(i)}, \phi_{(i)}$ are detected as rotation angle data DR by angle sensors 126p, 126t.

(1-2) Subject-image Pickup and Calibration of Camera (Second Sub-process):

Upon completion of step S505, the sequence proceeds to the "subject image pickup mode" in order to pick up an image of subject 30. This may be carried out by manually changing modes through operation buttons 164 or automatically proceeding thereto upon completion of the camera position determining mode. Further, camera system 10 is properly shifted to a desired point for an image pickup process (step S506).

In this state, movable camera 11 always holds three-dimensional chart 2(i) that has been image-picked up in the first sub-process by using the automatic tracing process; and in the case when three-dimensional chart 2(i) becomes further from the image-pickup position due to the shift caused by the change in the image pickup point, tracing button 117 is pressed to switch to the manual mode so that the automatic tracing process is once stopped. After the shift, another three-dimensional chart 2(j) closer to the image pickup point is properly selected and adjusted so that this is held within the view angle of movable camera 11; and tracing button 117 is again pressed so as to return to the automatic tracing process (step S507, S508).

In a state where subject-use camera 13 can pick up an image of subject 30 and movable camera 11 can pick up an image of three-dimensional chart 2(j), shutter button 161 of subject-use camera 13 is pressed so that image pickup operations are simultaneously carried out by the respective cameras, and the absolute angle data DA of subject-use camera 13 is also acquired (step S509). In this case, in the same manner as step S504, from the image obtained by movable camera 11, the position and orientation (external parameters PM1) in the chart coordinate system $X_{(j)}$ of movable camera 11 are found (step S510).

Based upon the external parameter PM1 of movable camera 11, the camera-to-camera parameter PMC found at step S505 and rotation angles $\phi_{(j)}, \phi_{(j)}$ of movable camera 11 in step S507, the relative position and orientation of subject-use camera 13 with respect to three-dimensional chart 2(j) are found. Moreover, based upon these relative position and orientation and the absolute angle data DA of subject-use camera 13 obtained at step S509, the absolute orientation of three-dimensional chart 2(j) is found (step S511). These are defined as external parameters PM2 of subject-use camera 13.

After the image-pickup operation, the values of external parameters PM2 of subject-use camera 13 at the time of the image-pickup operation are recorded in RAM 151 or memory card 176 together with the second image data D2 of subject 30 (step S512).

Image-pickup processes from step S506 are repeated several times with the direction of camera system 10 with respect to subject 30 being changed (step S513). When the second image data D2 the number of pieces of which is sufficient so as to form a three-dimensional image model of subject 30 and the values of the respective external parameters PM2 have been obtained, the second sub-process is completed. The external parameters PM2 correspond to image-pickup data DM of FIG. 51.

Figure 56:
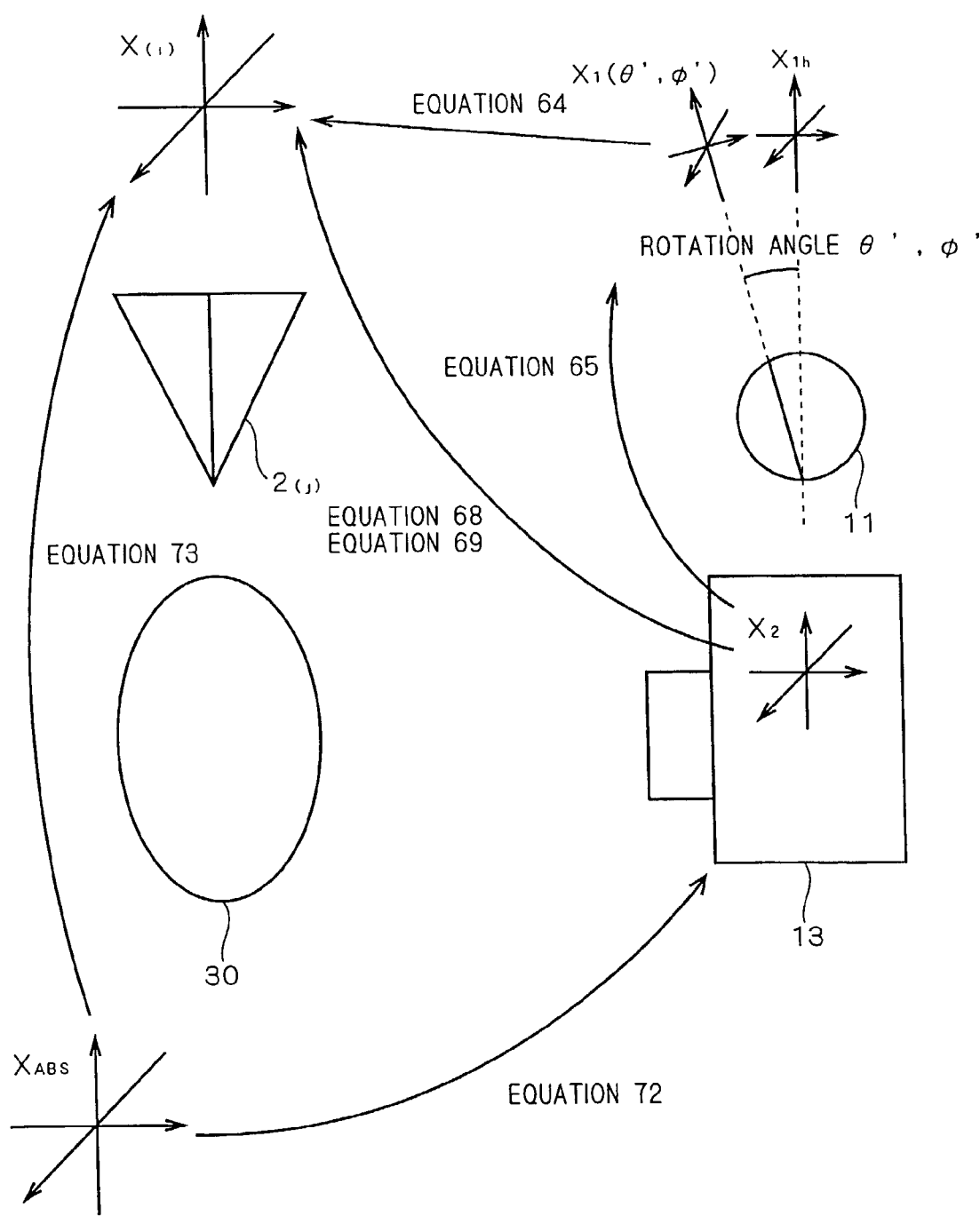
FIG. 56 is a drawing that shows coordinate conversions that are used when relative position and orientation of the subject-use camera and the absolute orientation of the three-dimensional chart with respect to the three-dimensional chart are calculated, in the fifth preferred embodiment.

FIG. 56 shows the coordinate conversions used at step S511. The following description will explain this step. In FIG. 56, definitions on the respective coordinate systems, such as $X_{(i)}, X_1(\theta_{(i)}, \phi_{(i)}), X_2$, etc. are the same as those shown in FIG. 55.

The image of three-dimensional chart 2(j) obtained by movable camera 11 is analyzed by the multipoint algorithm so that the position and orientation (that is, external parameters PM1 of movable camera 11) of movable camera 11 in chart coordinate system $X_{(j)}$ are specified; thus, it is possible to determine the conversion relationship of movable camera 11 with respect to the first local coordinate system $X_1$ ($\theta_{(j)}, \phi_{(j)}$):

$$X_{(j)} = R_{C(j)1} X_1(\theta_{(j)}, \phi_{(j)}) + T_{C(j)1} \quad \text{(Equation 64)}$$

The conversion relationship between the first local coordinate system $X_1(\theta_{(j)}, \phi_{(j)})$ and the second local coordinate system $X_2$ is given as the following equation by equations 61 to 63:

$$X_1(\theta_{(j)}, \phi_{(j)}) = R_m(\theta_{(j)}, \phi_{(j)}) X_2 + T_m(\theta_{(j)}, \phi_{(j)}) \quad \text{(Equation 65)}$$

where $$R_m(\theta_{(j)}, \phi_{(j)}) = R_X(\theta_{(j)}, \phi_{(j)}) R_h \quad \text{(Equation 66)}$$

$$T_m(\theta_{(j)}, \phi_{(j)}) = R_X(\theta_{(j)}, \phi_{(j)}) T_h + T_X(\theta_{(j)}, \phi_{(j)}) \quad \text{(Equation 67)}.$$

Therefore, from equations 64 and 65, the conversion relationship for converting the position and orientation represented by the second local coordinate system $X_2$ to the position and orientation in the chart coordinate system $X_{(j)}$ is given as the following equation:

$$X_{(j)} = R_{C(j)1} R_m(\theta_{(j)}, \phi_{(j)}) X_2 + R_{C(j)1} T_m(\theta_{(j)}, \phi_{(j)}) + T_{C(j)1} \quad \text{(Equation 68)}$$

Among various values appearing on equation 68, the rotation matrix $R_{C(j)1}$ and the parallel shifting vector $T_{C(j)1}$ are related to movable camera 11, and these are determined by the external parameters PM1 of movable camera 11. Moreover, the rotation matrix $R_m(\theta_{(j)}, \phi_{(j)})$ and the parallel shifting vector $T_m(\theta_{(j)}, \phi_{(j)})$ are determined by substituting angle values $\theta_{(j)}, \phi_{(j)}$ detected by angle sensors 126p, 126t to functional forms $R_m(\theta, \phi)$, $T_m(\theta, \phi)$.

Therefore, when equation 68 is transformed into the following equation:

$$X_{(j)} = R_{CP(j)2} X_2 + T_{CP(i)2} \quad \text{(Equation 69)},$$

the rotation matrix $R_{CP(j)2}$ and the parallel shifting vector $T_{CP(i)2}$ are allowed to correspond to conversion relationship $\tau_{(i)2}$. Here, in equation 69, the following equations are satisfied, and $R_{CP(j)2}$ corresponds to the relative orientation with respect to three-dimensional chart $2(j)$.

$$R_{CP(j)2} = R_{C(j)1} R_m(\theta_{(j)}, \phi_{(j)}) \quad \text{(Equation 70)}$$

$$T_{CP(j)2} = R_{C(j)1} T_m(\theta_{(j)}, \phi_{(j)}) + T_{C(j)1} \quad \text{(Equation 71)}$$

Moreover, with respect to the absolute coordinate system $X_{ABS}$ belonging to the space, supposing that the rotation matrix indicating the absolute orientation taken by subject-use camera 13 is $R_{ABS}$ and that the vector indicating the absolute position is $T_{ABS}$, $R_{ABS}$ is a matrix obtained from the absolute angle data DA, and the second local coordinate system $X_2$ is represented by the following equation.

$$X_2 = R_{ABS} X_{ABS} + T_{ABS} \quad \text{(Equation 72)}$$

When this is substituted to equation 69, the following equation is obtained:

$$X_{(j)} = R_{CP(j)2} R_{ABS} X_{ABS} + R_{CP(j)2} T_{ABS} + T_{CP(j)2} \quad \text{(Equation 73)}$$

Thus, the rotation matrix $R_{CP(j)2} R_{ABS}$, obtained here, forms a matrix representing the absolute orientation of three-dimensional chart $2(j)$.

As described above, equations 69 and 73 have the contents representing external parameters PM2. These are stored as image-pickup data DM (FIG. 51) together with the second image data D2.

(2) Relative Position and Orientation Between Three-dimensional Charts and Absolute Orientation of Three-dimensional Chart The following description will discuss a process in which, in the case when a plurality of three-dimensional charts 2 are placed, the relative position and orientation of the other charts with respect to the reference chart are calculated. This process corresponds to the aforementioned third sub-process, and at the time of an actual image-picking up process, prior to the first and second sub-processes for picking up an image of subject 30, the relative position and orientation of each of the three-dimensional chart 2 may be determined by this third sub-process, or in the case when the three-dimensional charts 2 used in the image-pickup processes are clearly known, after the image-pickup processes, only the corresponding three-dimensional charts 2 may be subject to the third sub-process so as to find the relative position and orientation thereof.

Figure 57:
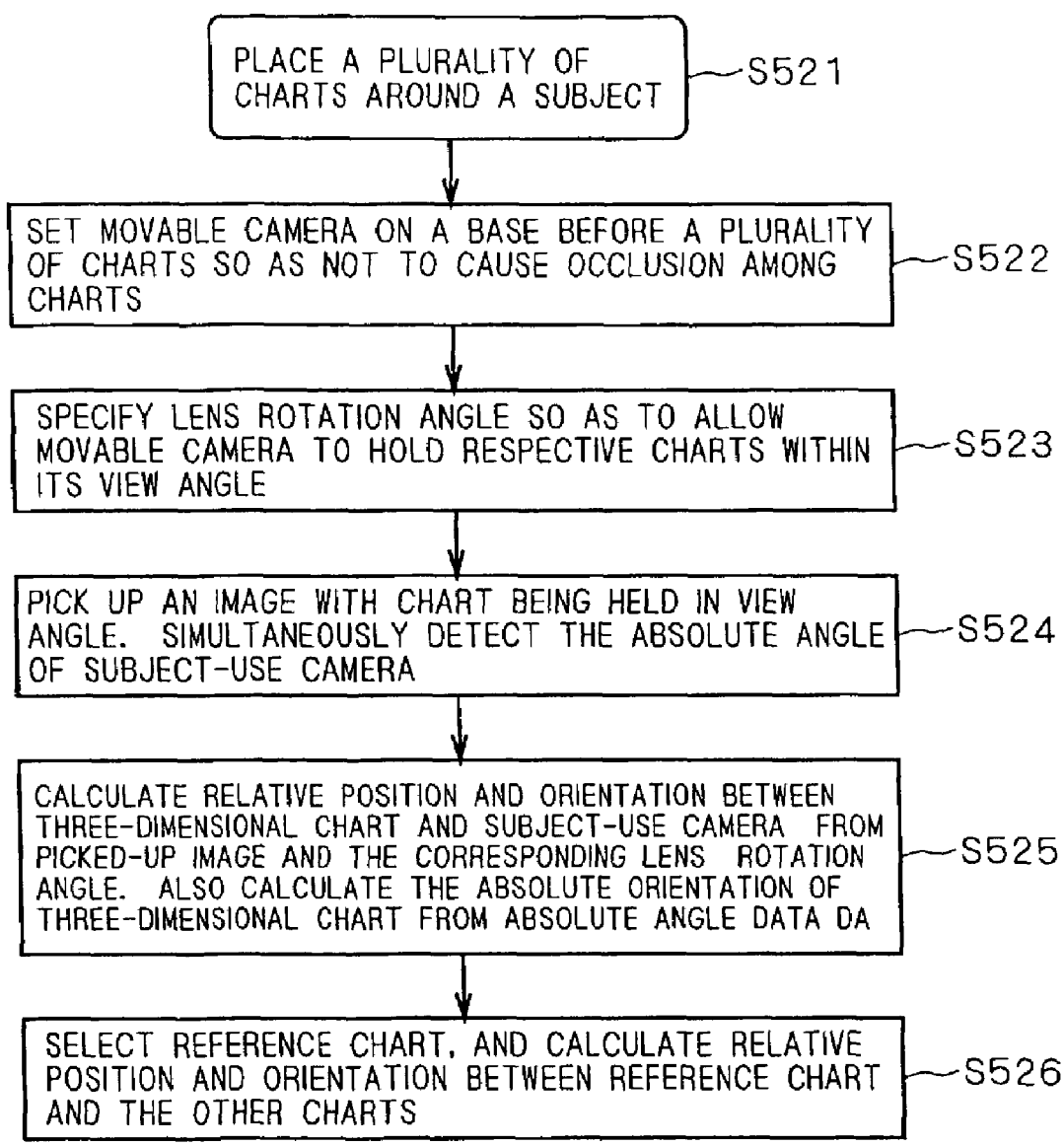
FIG. 57 is a drawing that shows a sequence corresponding to a third sub-process of image-pickup and calibration sequences using a three-dimensional chart in accordance with the fifth preferred embodiment.

FIG. 57 is a drawing that shows this process. In a state where a plurality of three-dimensional charts 2 are placed around a subject (step S521), camera system 10 is placed at a position from which the respective three-dimensional charts 2 can be image-picked up (step S522). Here, it is necessary to place camera system 10 at a position in which, when an image of a three-dimensional chart is picked up, another three-dimensional chart does not cover the three-dimensional chart 2 (that is, free from occlusion). After movable camera 11 has been placed, operation buttons 164 are operated so as to set to "chart measuring mode". While the lens rotation angle is set appropriately, the individual three-dimensional charts 2 are successively held within the view angle so that image-pickup operations are carried out (step S523, S524). Simultaneously with these operations, the absolute angle data DA is also obtained. In this chart measuring mode, when shutter button 161 is depressed, only the movable camera 11 is used for picking up images. Moreover, the absolute angle data DA is supposed to form the same data as long as camera system 10 is not moved; however, when angle sensor 18 used for the detection has low precision, errors might occur. As described earlier, even when errors are included, any one of the resulting detected values may be used if no adverse effects are given to identification of three-dimensional chart 2, and if it is necessary to increase the precision, the average value of the individual detection values may be used as a typical value of the absolute angle data DA.

Based upon the resulting images, the relative position and orientation of movable camera 11 with respect to the individual three-dimensional charts 2 are calculated (step S525). Simultaneously, by using the absolute angle data DA, the absolute orientation with respect to space is calculated. The resulting data is stored in RAM 151.

Upon completion of step S525, one of three-dimensional charts 2 to be used as a reference chart 2k is selected. Based upon the relative position and orientation data between reference chart 2k and movable camera 11 and the relative position and orientation data between the other charts 2 and movable camera 11, the relative position and orientation of the other three-dimensional charts 2 with respect to reference chart 2k are calculated (step S526). The resulting data is stored in RAM 151.

Figure 58:
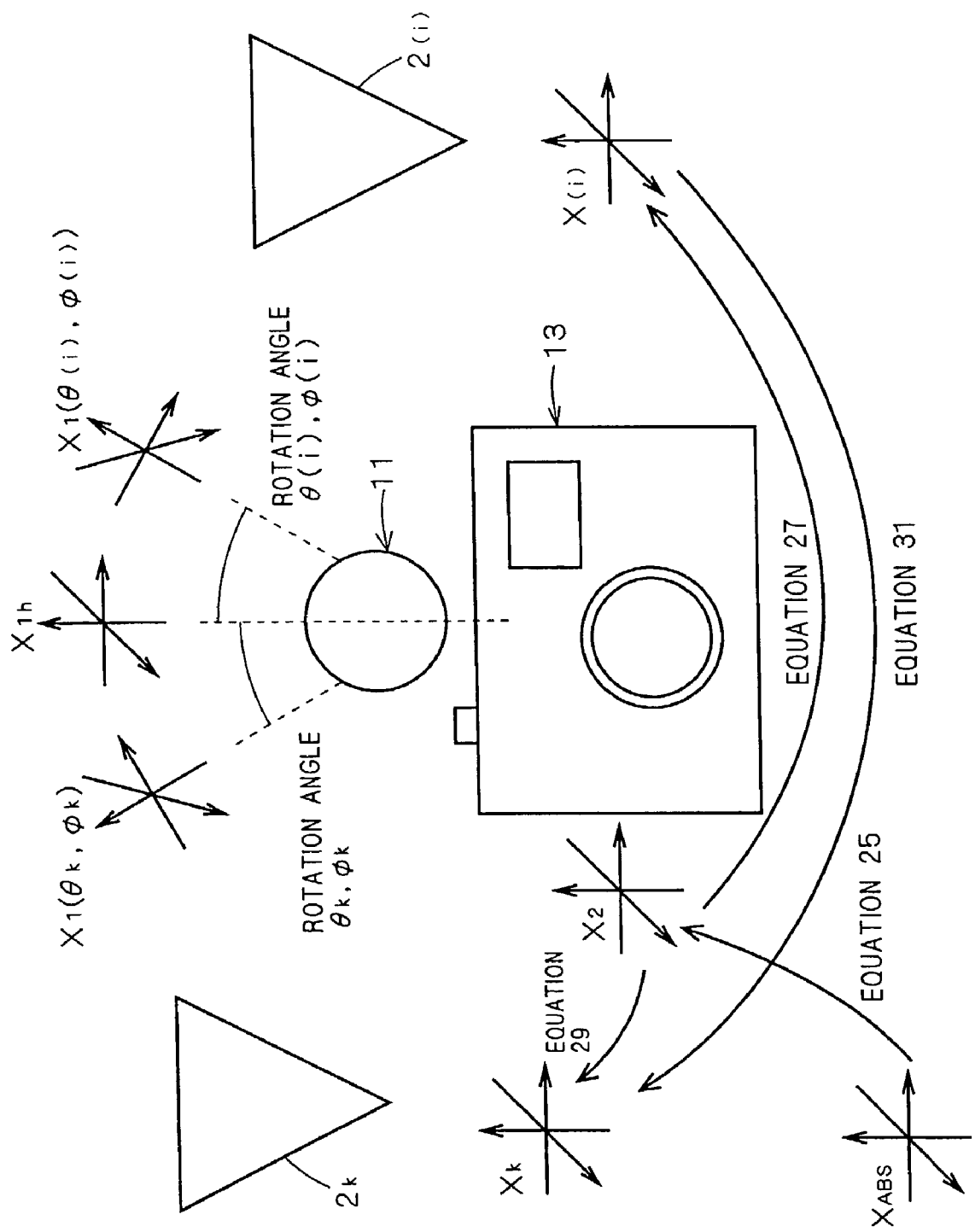
FIG. 58 is a drawing that shows coordinate conversions that are used when relative position and orientation of another three-dimensional chart and the absolute orientation of each of the three-dimensional charts with respect to a reference chart are calculated, in the fifth preferred embodiment.

FIG. 58 shows coordinate conversions used for directing the relative position and orientation in steps S525 and S526. The following description will discuss these conversions. The definitions of symbols in the drawing are explained as follows:

$\theta_k$ . . . pivotal angle of movable camera 11, when movable camera 11 is focused on reference chart 2k;

$\phi_k$ . . . elevation or depression angle of movable camera 11, when movable camera 11 is focused on reference chart 2k;

$X_k$ . . . three-dimensional orthogonal coordinate system relatively fixed to reference chart 2k.

When movable camera 11 picks up an image of three-dimensional chart $2(i)$, the coordinate conversion from the second local coordinate system $X_2$ belonging to subject-use camera 13 to the chart coordinate system $X_{(i)}$ is represented by the following equation by using the rotation matrix $R_{CP(i)}$ and parallel shifting vector $T_{CP(j)}$ in the same manner as equation 69.

$$X_{(i)} = R_{CP(i)} X_2 + T_{CP(i)} \quad \text{(Equation 74)}$$

Here, in the same manner as equations 70 and 71, the following equations are supposed to be satisfied:

$$R_{CP(i)} = R_{C(i)} R_m(\theta_{(j)}, \phi_{(j)}) \quad \text{(Equation 75)}$$

$$T_{CP(i)} = R_{C(i)} T_m(\theta_{(j)}, \phi_{(j)}) + T_{C(j)} \quad \text{(Equation 76)}$$

After image pickup processes have been carried out on the respective three-dimensional charts 2 with the resulting conversion equation of equation 74 being obtained, any one of the three-dimensional charts 2 is defined as reference chart 2k. With respect to reference chart 2k, the subscripts of equations 74 to 76 are replaced as follows:

$$X_k = R_{CPk} X_2 + T_{CPk} \quad \text{(Equation 77)}$$

$$R_{CPk} = R_{Ck} R_m(\theta_k, \phi_k) \quad \text{(Equation 78)}$$

$$T_{CPk} = R_{Ck} T_m(\theta_k, \phi_k) + T_{Ck} \quad \text{(Equation 79)},$$

these equations correspond to conversion relationship $\tau_{k2}$. Since $X_2$ of equations 74 and 77 are the same, the deletion of $X_2$ from both of the equations forms the following equation:

$$X_k = R_{CPk} R_{CP(j)}^{-1} (X_{(i)} - X_{CP(j)}) + T_{CPk} \quad \text{(Equation 80)}.$$

This equation 80 corresponds to conversion relationship $\tau_{k(i)}$. Thus, the chart coordinate system $X_{(i)}$ of three-dimensional chart 2(i) is converted to the reference chart coordinate system $X_k$ belonging to the reference chart 2k.

By executing this conversion, the relative position and orientation of subject-use camera 13 with respect to any one of three-dimensional charts 2(i) of three-dimensional chart group 2G, obtained when subject 30 is image-picked up, is represented by coordinate system $X_k$ belonging to the reference chart 2k.

Moreover, in the same manner as the second sub-process, by substituting equation 72 representing the absolute position and orientation to equation 74, the following equation is obtained:

$$X_{(i)} = R_{CP(i)} R_{ABS} X_{ABS} + R_{CP(i)} T_{ABS} + T_{CP(i)} \quad \text{(Equation 81)}.$$

$R_{CP(i)} R_{ABS}$ in equation 81 represents the absolute orientation with respect to the space of each of three-dimensional charts 2(i).

The relative position and orientation of the other three-dimensional charts 2 with respect to the reference chart 2k, and the absolute orientation of all the three-dimensional charts 2 found as described above are stored in RAM 151 as chart position data DC, and used in the identification of each of three-dimensional charts 2 and the conversion of the position and orientation of subject-use camera 13 at the image-pickup point to the reference chart coordinate system $X_k$.

(3) Identification of Charts and Specification of Image-pickup Point

The information on the absolute orientation of the image-pickup data DM, obtained when subject 30 is image-picked up in the second sub-process, is compared and collated with the information of the absolute orientation of the chart position data DC obtained in the third sub-process so that it is possible to identify which three-dimensional chart 2 corresponds to the three-dimensional chart 2 image-picked up by movable camera 11 simultaneously when subject 30 was image-picked up by subject-use camera 13. Consequently, the relative position and orientation at the image-pickup point with respect to the reference chart 2k for each of the image-pickup operations carried out on subject 30 repeatedly from different image-pickup points are determined. In other words, since the spatial relative relationship of images obtained from a plurality of directions is determined so that a three-dimensional model of subject 30 can be generated.

Sixth Preferred Embodiment

<Apparatus Construction>

The following description will discuss the sixth preferred embodiment of the present invention. In the fifth preferred embodiment, angle sensor 18 is fixed to subject-use camera 13; however, the method of detecting the absolute orientation with respect to a space is not limited to this. In the apparatus construction of the present preferred embodiment, angle sensor 18 is attached not to subject use camera 13, but to movable camera 11.

Figure 59:
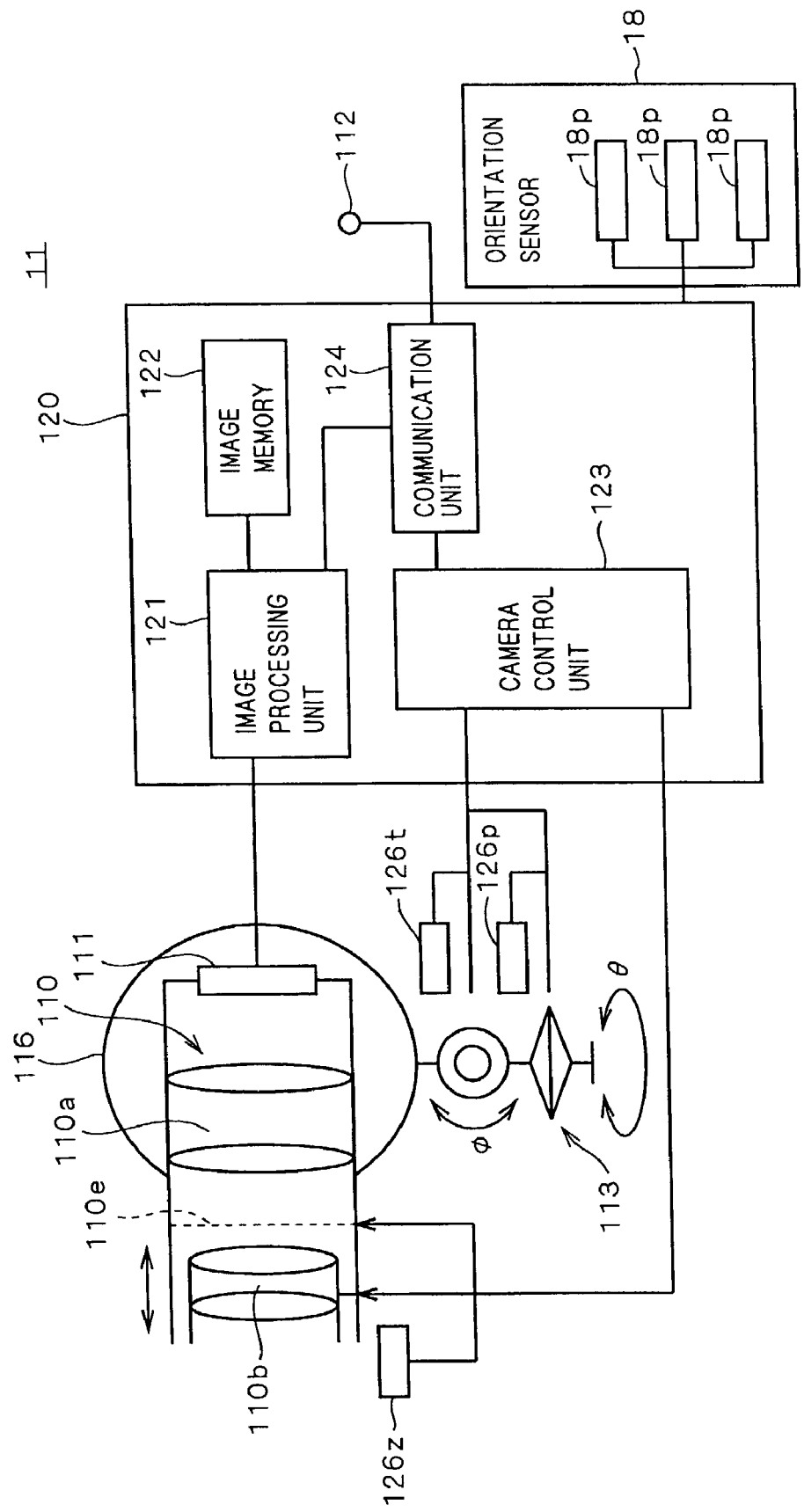
FIG. 59 is a block diagram of a movable camera in accordance with a sixth preferred embodiment.
Figure 60:
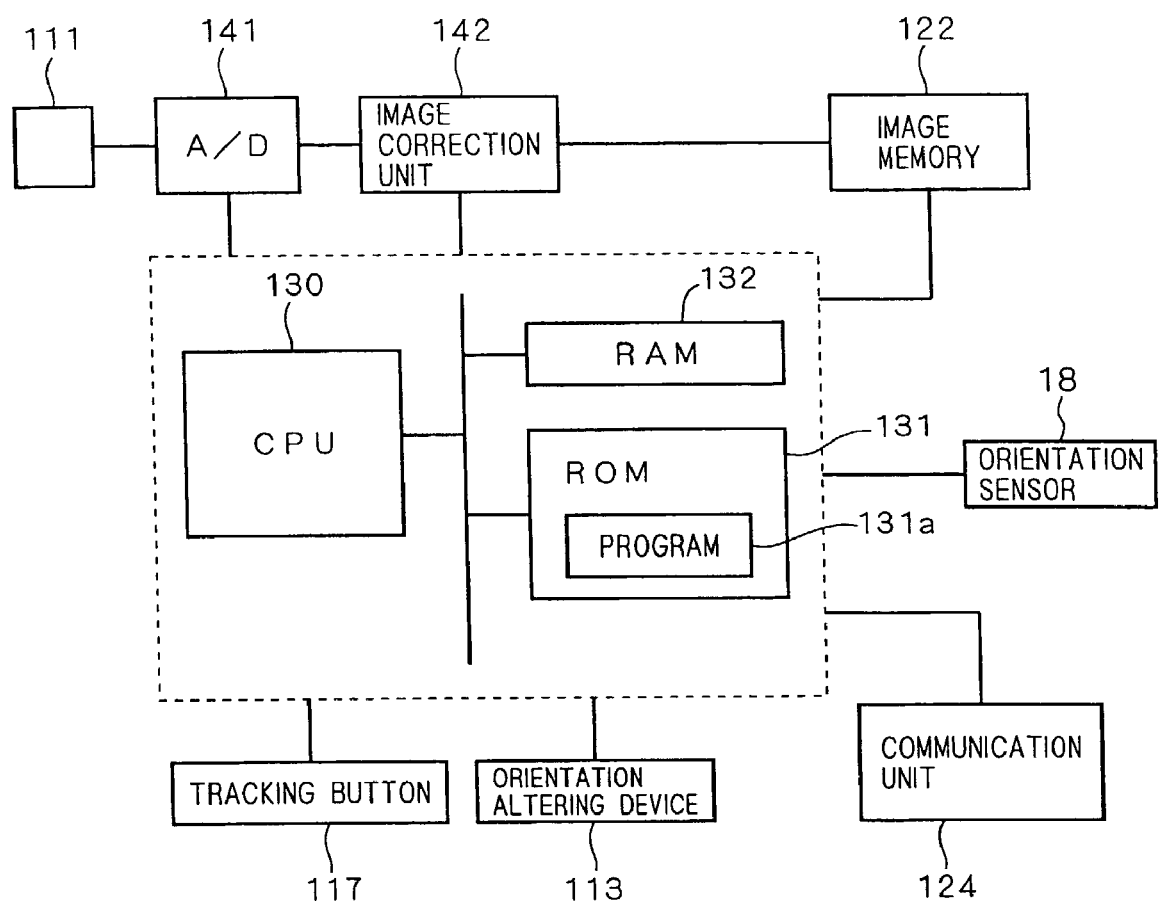
FIG. 60 is a drawing that shows an essential portion of an information processing function of the movable camera in accordance with the sixth preferred embodiment.

In the present preferred embodiment, although not shown in the Figure, angle sensor 18 is placed in a securing portion 114 (FIG. 4). FIG. 59 shows a block diagram of movable camera 11 in the present preferred embodiment, and FIG. 60 is a drawing that shows an essential portion of the information processing function of movable camera 11 from the viewpoint of hardware construction of movable camera 11. Moreover, FIG. 61 is a drawing that shows a flow of data in movable camera 11. Here, an essential portion of the information processing function of subject-use camera 13 from the viewpoint of hardware construction of subject-use camera 13 is the same as that shown in FIG. 9.

<Identification of Absolute Orientation of Picked-up Three-dimensional Chart>

In the present preferred embodiment, the first sub-process for determining the relative position and orientation between movable camera 11 and subject-use camera 13 is the same as that of the fifth preferred embodiment. Moreover, in the second sub-process, the processes up to determination of the relative position and orientation of subject-use camera 13 with respect to one three-dimensional chart 2(j) are the same as those of the fifth preferred embodiment. However, since angle sensor 18 is attached to securing portion 114 of movable camera 11, the method of specifying the absolute orientation of a three-dimensional chart 2(j) used for an image-pickup process is different from that of the fifth preferred embodiment.

Figure 62:
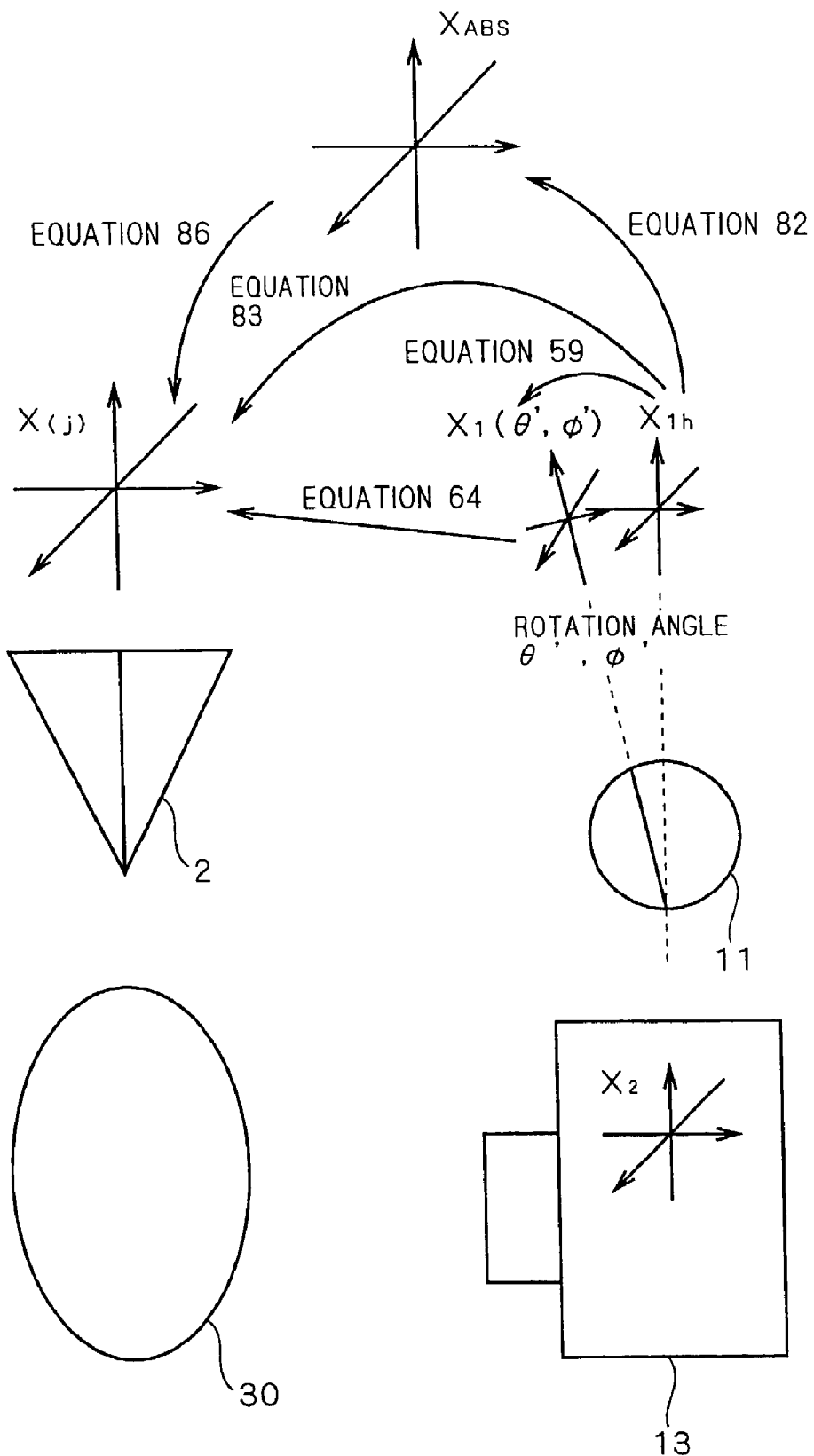
FIG. 62 is a drawing that shows coordinate conversions that are used when relative position and orientation of a subject-use camera with respect to a three-dimensional chart and the absolute orientation of the three-dimensional chart are calculated, in the sixth preferred embodiment.

FIG. 62 shows coordinate conversions used when the absolute orientation of the three-dimensional chart 2(j) used for an image-pickup process is specified. The following description will explain this process.

The angle to be detected by angle sensor 18 attached to securing portion 114 is the absolute angle concerning a space with respect to the position at which both of the rotation angles $\theta_{(j)}, \phi_{(j)}$ of movable camera 11 are zero. In other words, the absolute orientation with respect to the space of the first local coordinate system $X_{1h}$ at the time when both of the of the rotation angles $\theta_{(j)}, \phi_{(j)}$ are zero is detected. In this case, in place of equation 72 in the fifth preferred embodiment, the following equation holds:

$$X_{1h} = R_{ABS} X_{ABS} + T_{ABS} \quad \text{(Equation 82)}$$

Here, the following equation holds between the chart coordinate system $X_{(j)}$ of three-dimensional chart $2(j)$ and the first local coordinate system $X_{1h}$, based upon equations 59 and 64:

$$X_{(j)} = R_{F(j)} X_{1h} + T_{F(j)} \quad \text{(Equation 83)}.$$

Here, the following equations are satisfied:

$$R_{F(j)} = R_{C(j)1} R_X(\theta_{(j)}, \phi_{(j)}) \quad \text{(Equation 84)}$$

$$T_{F(j)} = R_{C(j)1} T_X(\theta_{(j)}, \phi_{(j)}) + T_{C(j)1} \quad \text{(Equation 85)}.$$

Therefore, from equations 82 and 83, the following equation holds:

$$X_{(j)} = R_{F(j)} R_{ABS} X_{ABS} + R_{F(j)} T_{ABS} + T_{F(j)} \quad \text{(Equation 86)}.$$

Therefore, in the present preferred embodiment, in place of equation 73, equation 86 represents the absolute position and orientation of three-dimensional chart $2(j)$ that was held by movable camera 11 at the time of the image-pickup process of subject, and in this equation, the rotation matrix $R_{F(j)} R_{ABS}$ forms a matrix representing the absolute orientation. Since $R_{F(j)}$ is a matrix that is determined by the image and the lens rotation angle of movable camera 11, the rotation matrix $R_{F(j)} R_{ABS}$ is determined by determining $R_{ABS}$ by the absolute angle data DA obtained by the angle sensor 18; thus, it is possible to find the absolute orientation of the three-dimensional chart $2(j)$ held by movable camera 11 at the time of the image-pickup process of subject 30.

<Relative Position and Orientation Between Three-dimensional Charts and Identification of Absolute Orientation of Three-dimensional Chart>

Figure 63:
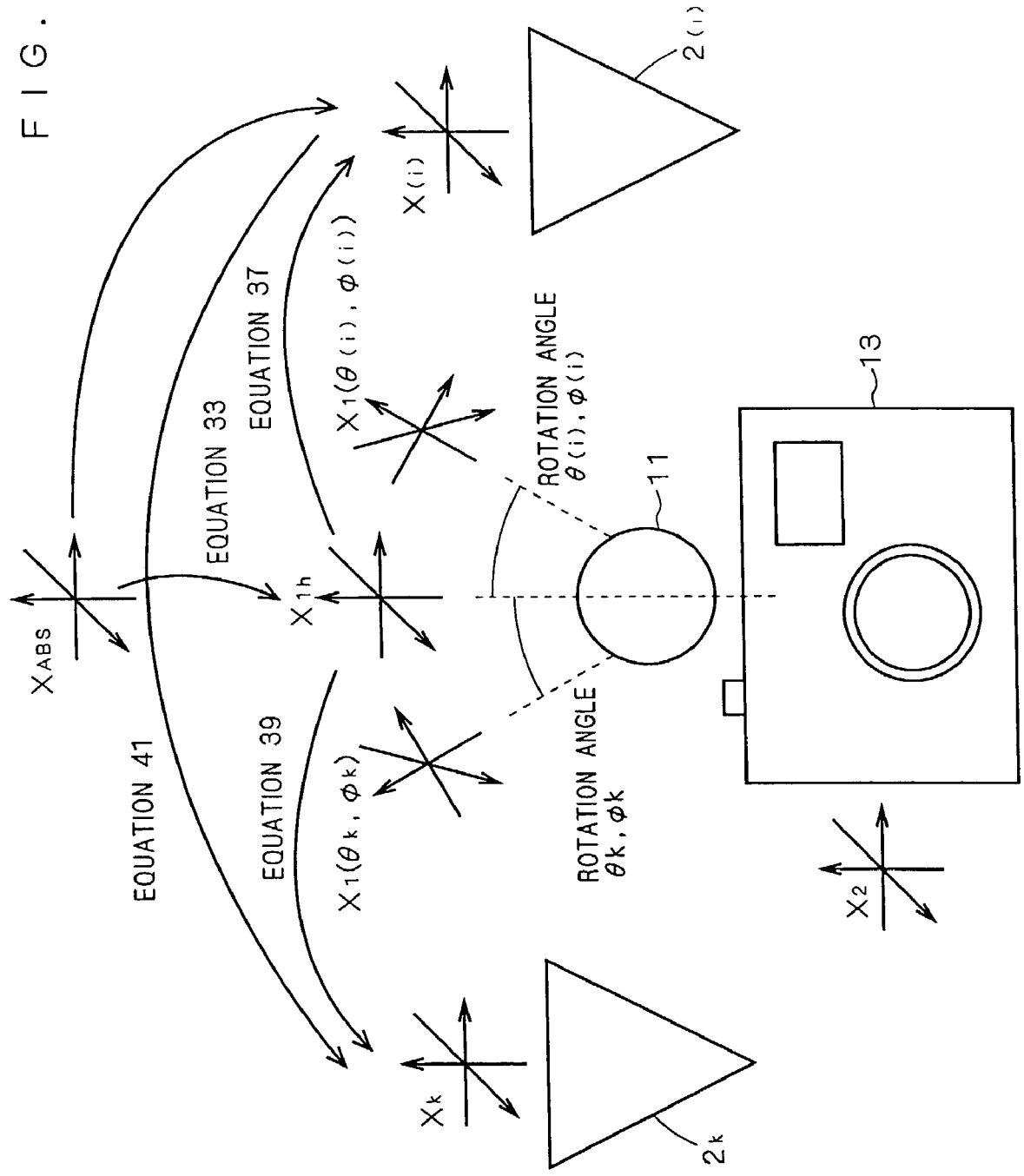
FIG. 63 is a drawing that shows coordinate conversions that are used when relative position and orientation of another three-dimensional chart and the absolute orientation of each of the three-dimensional charts with respect to a reference chart are calculated, in the sixth preferred embodiment.

FIG. 63 is a drawing that shows coordinate conversions used at the time of specifying the relative position and orientation between three-dimensional charts and identifying the absolute orientation of three-dimensional charts in the present preferred embodiment. The following description will discuss this process.

In the present preferred embodiment, the relationship of the relative position and orientation between the chart coordinate system $X_{(i)}$ belonging to three-dimensional chart $2(i)$ and the first local coordinate system $X_{1h}$ at the time when both of the rotation angles $\theta_{(i)}, \phi_{(i)}$ are zero is represented by the following equations in the same manner as equations 83 to 85:

$$X_{(i)} = R_{F(i)} X_{1h} + T_{F(i)} \quad \text{(Equation 87)}$$

$$R_{F(i)} = R_{C(i)1} R_X(\theta_{(i)}, \phi_{(i)}) \quad \text{(Equation 88)}$$

$$T_{F(i)} = R_{C(i)1} T_X(\theta_{(i)}, \phi_{(i)}) + T_{C(i)1} \quad \text{(Equation 89)}.$$

When the reference chart $2k$ is selected, the reference chart coordinate system $X_k$ belonging to the reference chart $2k$ is particularly represented by the following equations:

$$X_k = R_{Fk} X_{1h} + T_{Fk} \quad \text{(Equation 90)}$$

$$R_{Fk} = R_{Ck} R_X(\theta_k, \phi_k) \quad \text{(Equation 91)}$$

$$T_{Fk} = R_{Ck} T_X(\theta_k, \phi_k) + T_{Ck} \quad \text{(Equation 92)}.$$

Therefore, the relative position and orientation of the chart coordinate system $X_{(i)}$ belonging to the other three-dimensional charts $2(i)$ with respect to the reference chart coordinate system $X_k$ are represented by the following equation from equations 87 and 90:

$$X_k = R_{Fk} R_{F(i)}^{-1}(X_{(i)} - X_{F(i)}) + T_{Fk} \quad \text{(Equation 93)}.$$

In the present preferred embodiment, this equation 93 corresponds to the conversion relationship $\tau_{k(i)}$. In accordance with this, the chart coordinate system $X_{(i)}$ of the three-dimensional chart $2(i)$ is converted to the reference chart coordinate system $X_k$ belonging to the reference chart $2k$. In the same manner as the fifth preferred embodiment, by executing this conversion, the relative position and orientation of subject-use camera 13 are represented by the coordinate system $X_k$ belonging to the reference chart $2k$.

Moreover, based upon equations 82 and 87, the absolute position and orientation of the chart coordinate system $X_{(i)}$ is represented by the following equation:

$$X_{(i)} = R_{F(i)} R_{ABS} X_{ABS} + R_{F(i)} T_{ABS} + T_{F(i)} \quad \text{(Equation 94)}.$$

Therefore, the rotation matrix $R_{F(i)} R_{ABS}$ forms a matrix representing the absolute orientation of the three-dimensional chart $2(i)$. In the same manner as the fifth preferred embodiment, based upon the absolute orientation obtained from this matrix, it is possible to identify the respective charts.

Here, in the present preferred embodiment, angle sensor 18 is attached to movable camera 11; therefore, when the third sub-process is executed in the chart measuring mode, it is not necessary to execute the process with movable camera 11 being fixed to subject-use camera 13. At step S522 in FIG. 57, instead of securing the entire camera system 10, only the movable camera 11, which has been removed from subject-use camera 13 or has been prepared separately, is secured to any base, and in this arrangement, a plurality of three-dimensional charts 2 may be successively image-picked up. In this case, in the same manner as the fifth preferred embodiment, data and commands are transmitted and received to and from subject-use camera 13 through radio communications, and the image processing and calculation processes may be carried out in subject-use camera 13, or these processes may be carried out in computer 15 by communicating with computer 15.

7. Seventh Preferred Embodiment

As described in the sixth preferred embodiment, in the case when angle sensor 18 is attached to movable camera 11, the method of determining the relative position with respect to the reference chart $2k$ of three-dimensional chart 2 is not limited by the method of the sixth preferred embodiment. In the present preferred embodiment, the relative position of three-dimensional chart 2 with respect to the reference chart $2k$ is determined in a method different from the sixth preferred embodiment.

Figure 64:
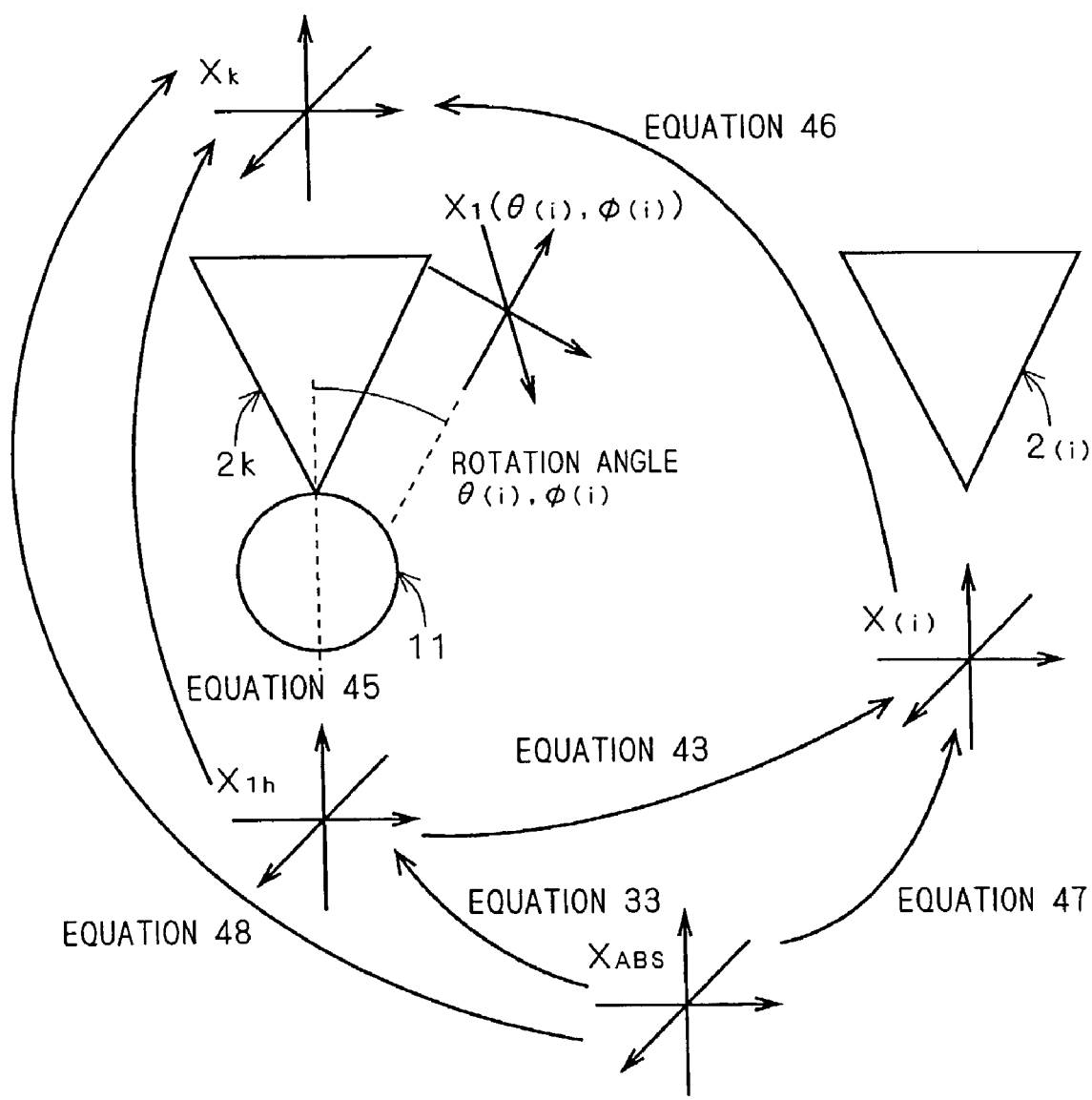
FIG. 64 is a drawing that shows coordinate conversions that are used when relative position and orientation of another three-dimensional chart and the absolute orientation of each of the three-dimensional charts with respect to a reference chart are calculated, in a seventh preferred embodiment.

FIG. 64 is a drawing that shows coordinate conversions that are used in the present preferred embodiment. In the present preferred embodiment, a reference chart $2k$ has been preliminarily selected from three-dimensional chart group $2G$ used for the image-pickup process, and movable camera 11a is secured to this reference chart $2k$. In this case, the relationship between the chart coordinate system $X_{(i)}$ belonging to three-dimensional chart $2(i)$ and the relative position and orientation of secured movable camera 11a in the coordinate system $X_{Th}$ at the time when both of the rotation angles $\theta_{T(i)}, \phi_{T(i)}$ are zero is represented by the following equations in the same manner as equations as equations 87 to 89:

$$X_{(i)} = R_{FT(i)} X_{Th} + T_{FT(i)} \quad \text{(Equation 95)}$$

$$R_{FT(i)} = R_{C(i)T} R_X(\theta_{T(i)}, \phi_{T(i)}) \quad \text{(Equation 96)}$$

$$T_{FT(i)} = R_{C(i)T} T_X(\theta_{T(i)}, \phi_{T(i)}) + T_{C(i)T} \quad \text{(Equation 97)}.$$

Here, the relative position and orientation of the reference chart coordinate system $X_k$ belonging to the reference chart $2k$ and the coordinate system $X_{Th}$ of movable camera $11a$ are preliminarily determined in accordance with the secured position of movable camera $11a$, and these are represented the following equation:

$$X_k = R_S X_{Th} + T_S \quad \text{(Equation 98)}$$

Here, the following equation is obtained from equations 95 and 98:

$$X_k = R_S R_{FT(i)}^{-1}(X_{(i)} - X_{FT(i)}) + T_S \quad \text{(Equation 99)}$$

This forms an equation for converting the chart coordinate system $X_{(i)}$ of three-dimensional chart $2(i)$ to the reference chart coordinate system $X_k$. In the same manner as the fifth and sixth preferred embodiments, in the present preferred embodiment also, the application of this equation makes it possible to represent the image-pickup point of subject-use camera 13 by using the reference chart coordinate system $X_k$.

Moreover, based upon equations 82 and 95, the absolute position and orientation of the chart coordinate system $X_{(i)}$ with respect to the space is represented by the following equation:

$$X_{(i)} = R_{FT(i)} R_{ABS} X_{ABS} + R_{FT(i)} T_{ABS} + T_{FT(i)} \quad \text{(Equation 100)}.$$

Here, with respect to the reference chart, the following equation holds from equations 82 and 98:

$$X_k = R_S R_{ABS} X_{ABS} + R_S T_{ABS} + T_S \quad \text{(Equation 101)}.$$

These rotation matrixes $R_{FT(i)} R_{ABS}$, $R_S R_{ABS}$ form matrixes representing the absolute orientations of the respective three-dimensional charts 2. Based upon these matrixes, it is possible to identify the respective charts 2.

8. Eighth Preferred Embodiment

As shown in FIG. 47 in which two three-dimensional charts 2 are used, the method of determining the relative positions and orientations of the respective three-dimensional charts is not limited by the fifth through seventh preferred embodiments. The present preferred embodiment is effectively applied to such a case using two three-dimensional charts.

In the present preferred embodiment, different from an arrangement in which three-dimensional charts 2 are image-picked up with movable camera 11 being secured, movable camera 11 and subject-use camera 13 are allowed to simultaneously pick up images of respectively different three-dimensional charts 2, by utilizing a camera-position determining mode. Based upon the resulting images, the relative position and orientation between the respective cameras and the image-picked-up three-dimensional charts 2 are calculated.

Figure 65:
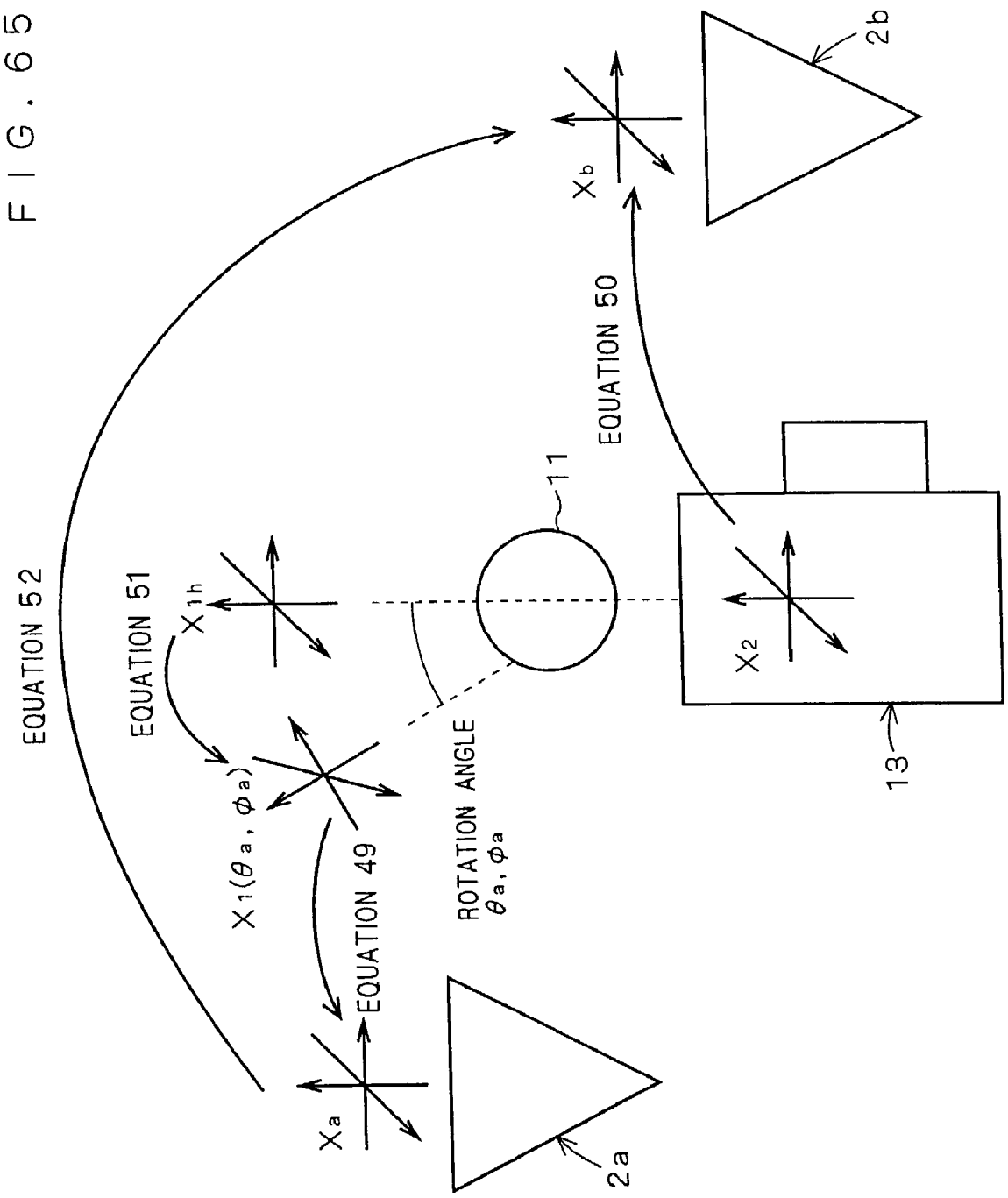
FIG. 65 is a drawing that shows coordinate conversions that are used when the relationship of relative position and orientation between two three-dimensional charts are calculated, in an eighth preferred embodiment.

The following description will discuss a case in which, with respect to two three-dimensional charts $2a$, $2b$ shown in FIG. 47, the relative positions and orientations of the respective charts are calculated. FIG. 65 shows the coordinate conversions in this case.

Here, suppose that movable camera 11 picks up an image of three-dimensional chart $2a$ and subject-use camera 13 picks up an image of three-dimensional chart $2b$. Moreover, in this case, supposing that:

$X_{a0}$ ... chart coordinate system of three-dimensional chart $2a$;

$X_{b0}$ ... chart coordinate system of three-dimensional chart $2b$;

$\theta_a$ pivotal angle of movable camera 11;

$\phi_a$ ... elevation or depression angle of movable camera 11, the following equations hold in the same manner as equations 57 to 59:

$$X_{a0} = R_{Ca1} X_1(\theta_a, \phi_a) + T_{Ca1} \quad \text{(Equation 102)}$$

$$X_{b0} = R_{Cb2} X_2 + T_{Cb1} \quad \text{(Equation 103)}$$

$$X_1(\theta_a, \phi_a) = R_X(\theta_a, \phi_a) X_{1h}(\theta_a, \phi_a) + T_{Ca1} \quad \text{(Equation 104)}.$$

Based upon these and equations 60, 62 and 63, the following equation holds:

$$X_{a0} = R_{Ca1}(R_m(\theta_a, \phi_a) R_{Cb2}^{-1}(X_{b0} - T_{Cb2}) + T_m(\theta_a, \phi_a)) + T_{Ca1} \quad \text{(Equation 105)}.$$

The relative positions and orientations of two three-dimensional charts 2 are determined by this equations.

With respect to the calculations of the absolute orientation, in the case of angle sensor 18 attached to subject-use camera 13, these are carried out in the same manner as the fifth preferred embodiment, and in the case of angle sensor 18 attached to movable camera 11, these are carried out in the same manner as the sixth preferred embodiment.

9. Ninth Preferred Embodiment

In the present preferred embodiment, explanations will be given with respect to modified examples of the above-mentioned fifth through eighth preferred embodiments.

In the fifth preferred embodiment, with respect to three-dimensional chart group 2G having the same external feature, arrows A are drawn on three-dimensional charts 2 so as to be placed within a space with their absolute orientations being distinguished; and as long as their absolute orientations are distinguishable, no other marks need to be drawn.

Figure 67:
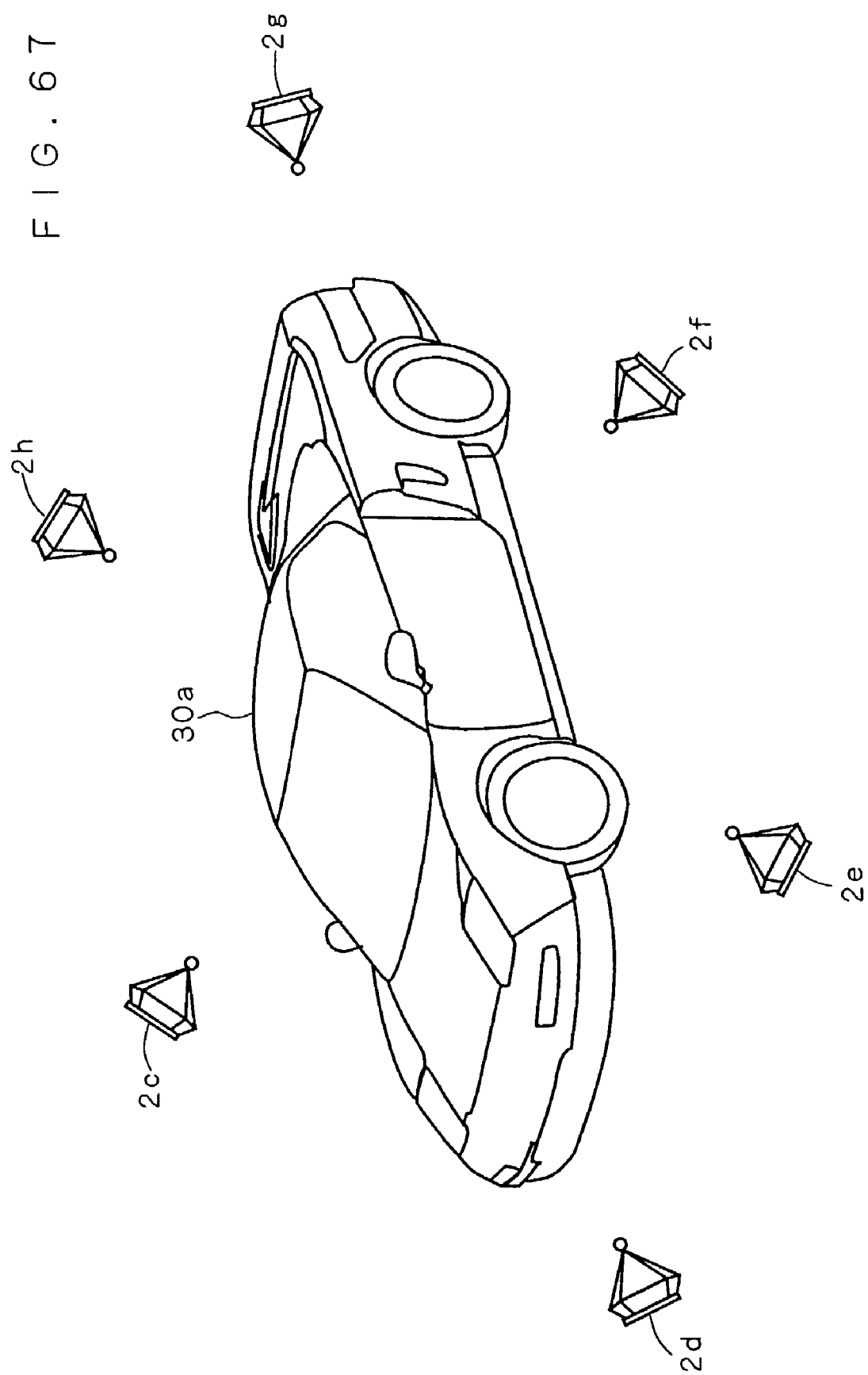
FIG. 67 is a drawing that shows an example in which three-dimensional charts having a pyramid shape are placed so as to have different absolute orientations based upon the external appearance features of the three-dimensional charts having a pyramid shape.

Without particularly using marks such as arrows, the absolute orientations may be distinguished upon arranging them based upon the basic portion of the external features of three-dimensional charts 2. FIGS. 66A and 66B show a case in which the shape of three-dimensional charts 2 is a cubic shape. In FIGS. 66A and 66B, three-dimensional charts 2C having the same chart pattern as that of FIG. 52 are shown with different directions in FIGS. 66A and 66B respectively. For example, since apex V which is a crossing point of faces PL1, PL4 and PL5 and apex W which is a crossing point of faces PL2, PL3 and PL6 are distinguishable from the other apexes from the chart patterns, the straight line connecting the two apexes, that is, a body diagonal line VW, can be distinguished from the other body diagonal lines formed by connecting the other apexes. Therefore, this body diagonal line VW can be used as an index for identifying the absolute orientation of three-dimensional chart 2. Moreover, FIG. 67 shows a case in which the shape of three-dimensional chart 2 is a pyramid shape. Different from FIG. 48, in FIG. 67, the absolute orientations of three-dimensional charts $2c$ to $2h$ are distinguished by directions that pass through the apexes of the pyramid and are perpendicular to the respective bottom faces. Here, the method of distinguishing the absolute orientations of three-dimensional charts 2 that have the same external appearance is not limited to the above-mentioned methods, and may be properly designed depending on the shapes and external features of the respective three-dimensional charts 2.

Figure 68:
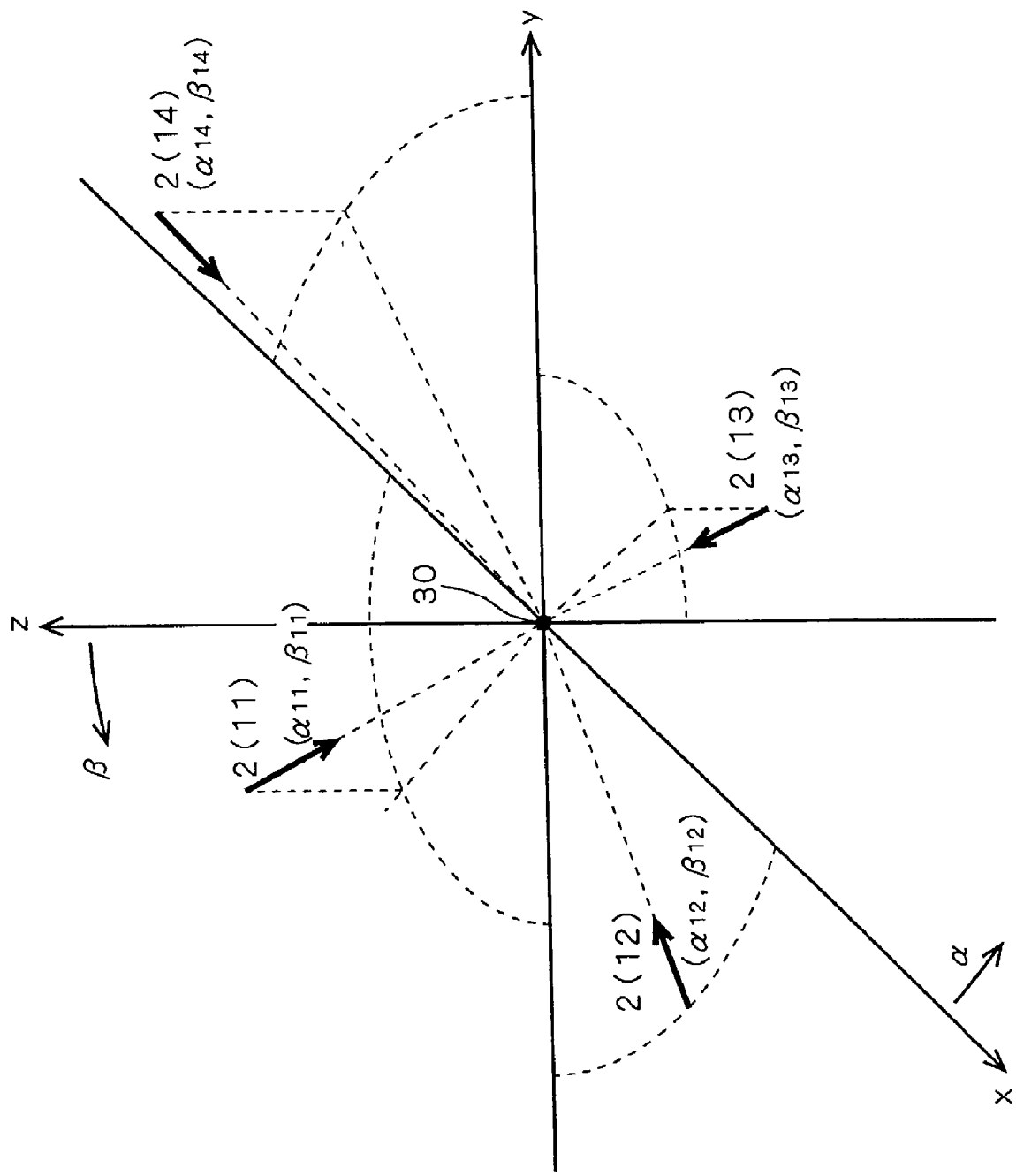
FIG. 68 is a drawing that shows an example in which no three-dimensional chart is located within a horizontal face.

The layout of three-dimensional group 2G in a space is not limited to a layout on the same horizontal surface as described above. FIG. 68 shows an example in which four three-dimensional charts 2(1) to 2(4) are placed in a space. For convenience of explanation, subject 30 is indicated as a point and three-dimensional chart group 2G are indicated by arrows. The directions of the arrows respectively show the absolute orientations of the respective three-dimensional charts 2. Moreover, the origin of the absolute coordinate system of the space is made coincident with subject 30. The absolute orientation of three-dimensional chart 2 is represented by an angle a made by the direction of each arrow and the x-axis and an angle β made by the direction of each arrow and the z-axis. In this case, the pair of angles α and β is found by angle sensor 18. Based upon the pairs of angles α and β, the absolute orientation may be specified and the corresponding three-dimensional chart 2 may be identified, or provision may be made so that, as the size of angle α increases, the number of three-dimensional charts 2(11) to 2(14) becomes greater; thus, three-dimensional charts 2 may be identified depending on only the size of angle α. By arranging three-dimensional chart group 2G in a space three-dimensionally, it is possible to reduce limitations due to the shape of subject 30 or an image-pickup place.

Figure 69:
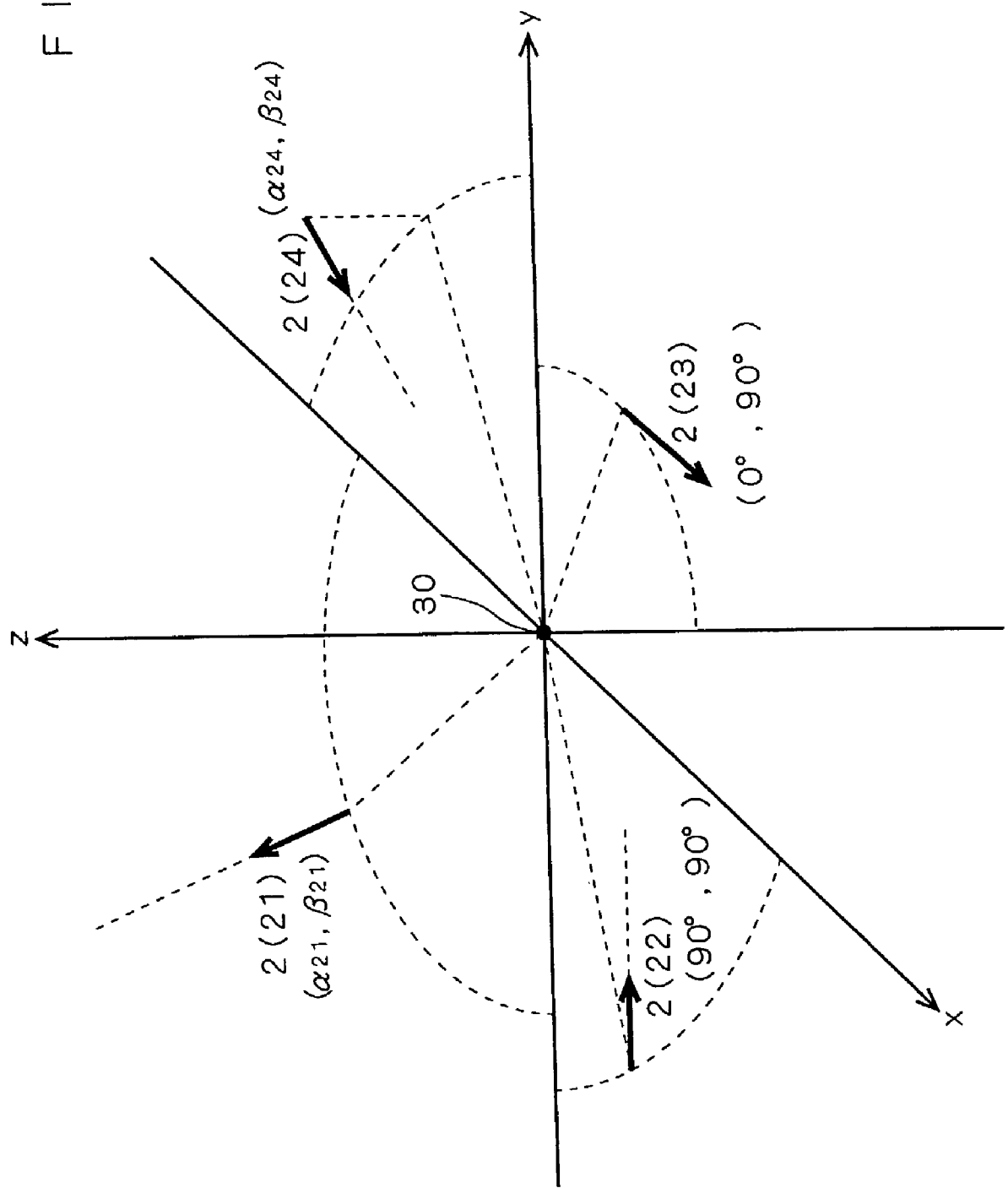
FIG. 69 is a drawing that shows an example in which the directions indicated by the absolute orientations of three-dimensional charts do not cross at one point.

Moreover, as long as the absolute orientations of a plurality of three-dimensional charts are not parallel to each other, the directions indicated by the absolute orientations of respective three-dimensional charts 2 are not necessarily made to cross at one point. FIG. 69 shows an example in which four three-dimensional charts 2(21) to 2(24) are placed in such a manner that the directions indicated by the absolute orientations are not allowed to cross at one point. The definitions of symbols are the same as those of FIG. 68. In this case also, although the correspondence between the size of the angle and the absolute orientation becomes complex, it is possible to identify three-dimensional chart 2 by finding the pairs of α and β using angle sensor 18. With this arrangement, for example, in the case when, with respect to a specific portion of subject 30, the shape thereof needs to be found with precision, that is, in the case when the calculations of the position and orientation using three-dimensional charts 2 need to be carried out with precision, only specific three dimensional charts 2 are placed in orientations suitable for calculations, and subjected to image-pickup processes.

10. Tenth Preferred Embodiment

The following description will discuss the tenth preferred embodiment. In this preferred embodiment, a plurality of three-dimensional charts 2 are placed around subject 30 so that it becomes possible to achieve a system which can form a three-dimensional model with high measuring precision while maintaining a wider movable range.

<Construction of Image Pickup System>

FIG. 47 is a drawing that shows a structural example of an image pickup system 1 in accordance with the present preferred embodiment. This image-pickup system 1 is provided with a movable camera system 10 capable of picking up an image of a three-dimensional subject 30, and a plurality of camera-calibration-use three-dimensional charts 2 that are placed in the vicinity of subject 30 within a space including subject 30. Here, FIG. 47 shows an example in which two three-dimensional charts 2a, 2b are placed as the three-dimensional charts 2.

In this manner, in the present preferred embodiment, since a plurality of three-dimensional charts 2 are placed around subject 30, it is possible to widen a shiftable range (movable range) in which the user moves around subject 30 while picking up an image of subject 30 with camera system 10 held in the hands.

As described earlier, each of three-dimensional charts 2 is a three-dimensional object in which a chart pattern is formed on each of the side faces of a main body having virtually a pyramid shape, and serves as an orientation-detecting reference object. Each three-dimensional chart 2 is suspended from a chart supporting member 250. This chart supporting member 250 is provided with an arm 252 having a reversed L-letter shape extending from a base 251, and each three-dimensional chart 2 is secured to the vicinity of the top of arm 252. Preferably, three-dimensional chart 2 is suspended virtually above subject 30.

Camera system 10 is a three-dimensional information generating apparatus having a subject image-pickup-use camera 13 (subject-use camera) that functions as a digital camera, and also functions as a measuring apparatus for measuring a subject. Moreover, a movable camera 11, which functions as a reference-object pickup camera, is attached to the upper portion of this subject-use camera 13 in a manner so as to be oriented freely. Movable camera 11 is used so as to specify the relative positional-orientation relationship between three-dimensional chart 2 and movable camera 11 by picking an image of a plurality of unit graphic forms UP contained in the chart pattern (see FIG. 3) of three-dimensional chart 2, and is also used so as to detect the position and orientation of subject-use camera 13 with respect to three-dimensional chart 2.

As shown in FIG. 70, image-pickup system 1 may be provided with, for example, a note-book-type portable computer 15. In this case, computer 15 transmits and receives commands and data to and from camera system 10 through communication means, such as radio communication through a communication interface, data communication through cables, or data exchange through recording media such as memory cards.

<Outline of Three-dimensional Charts>

In the present preferred embodiment also, each three-dimensional chart 2 is designed in the same manner as that explained in the first preferred embodiment (see FIG. 3).

<Construction of Movable Camera 11>

FIG. 71 is a block diagram that shows inner functions of movable camera 11. As shown in FIG. 4 and FIG. 48, in movable camera 11, a lens unit 110 and a two-dimensional light-receiving element 111 which photo-electrically converts a two-dimensional image converged and formed by this lens unit 110 are integrally installed in a spherical unit 116. This two-dimensional light-receiving element is a CCD array, etc. in which a plurality of pixels are arranged on a light-receiving face. Lens unit 110 is formed by a combination of a fixed lens 110a and a zoom lens 110b with a diaphragm/shutter mechanism 110e being interpolated in between.

As shown in FIG. 4, spherical unit 116 is connected to a securing portion 114 through an orientation altering device 113 in such a manner that it is allowed to pivot within a range of approximately ±70° in the panning direction (rotation of θ degrees) and also to move up and down within a range of approximately ±70° in the tilting direction (rotation of φ degrees). Thus, in order to carry out driving operations for the pivotal movement in the panning direction as well as for the pivotal movement in the tilting direction, orientation altering device 113 with a plurality of piezo-elements installed therein is installed in a base portion of spherical unit 116. Moreover, a zooming operation, which corresponds to a driving operation of zoom lens 110b, is also carried out by a piezo-element different from the above-mentioned piezo-element. By applying saw-shaped wave signals to these piezo-elements, the target element of the driving operation by the piezo-elements is allowed to move slightly, and the repetition of this movement makes it possible to move the target element in a predetermined manner. The angle of the pivotal movement in the panning direction and the angle of the shifting movement in the tilting direction are respectively detected by angle sensors 126p, 126t prepared as encoders, etc., and the amount of driving operation of zoom lens 110b is also detected by a sensor 126z also constituted by an encoder.

Spherical unit 116 is driven in such a manner that as described above, its position and orientation with respect to subject-use camera 13 is set to a desired state within the movable range by orientation altering device 113 as described above.

Moreover, movable camera 11, which carries out data processing such as image processing by using inputted image signals derived from two-dimensional light-receiving element 111, is provided with data a data processing unit 120 for controlling orientation altering device 113 and a tracing button 117.

Data processing unit 120 is provided with an image processing unit 121 that carries out processes such as image recognition by using input signals from two-dimensional light-receiving element 111, and an image memory 122 that stores an image signal obtained in this image processing unit 121. Moreover, a camera control unit 123, which generates driving signals for a zoom lens 110b, an orientation altering device 113 and a diaphragm/shutter mechanism unit 110e and outputs the resulting signals to these devices respectively, is installed therein, and image processing unit 121 and camera control unit 123 can radio-communicate with subject-use camera 13 through communication unit 124 and communication device 112. Image data is transmitted to subject-use camera 13 through this communication, and various pieces of information are transmitted and received to and from movable camera 11 and subject-use camera 13. In movable camera 11 of the present preferred embodiment, an infrared element which is applicable to an IRDA (Infrared Data Association) interface for infrared ray communications is used as communication device 112.

As shown in FIG. 4, the first attaching groove 115a and the second attaching groove 115b formed in securing portion 114 are used for attaching securing portion 114 to subject-use camera 13. Securing portion 114 is attached to subject-use camera 13 so that it becomes possible to secure movable camera 11 to subject-use camera; thus, for example, supposing that the pivotal angle and the elevation or depression angle of movable camera 11 are 0°, the relative positions and orientation relationship between movable camera 11 and subject-use camera 13 are set to a predetermined state.

Moreover tracing button 117 is a button for switching modes to the mode that allows movable camera 11 to automatically track three-dimensional chart 2 (hereinafter, referred to as "automatic tracing mode") and to the mode that allows movable camera 11 to track it in response to the user's instruction from subject-use camera 13 (hereinafter, referred to as "manual mode".

Next, the following description will discuss the operation of movable camera 11 having the above-mentioned arrangement.

Any one of filters of R(red), G(green) and B(blue) is attached to each two-dimensional light-receiving element 111 for each pixel, and light, which has formed an image on two-dimensional light-receiving element 111, is photo-electrically converted by this two-dimensional light-receiving element 111 for each of RGB color components. Image signals obtained by two-dimensional light-receiving elements 111 are A/D converted to image data that is digital signal by image processing unit 121, and subjected to various image processings such as a white-balance correcting operation and a γ-correcting operation.

In the case when the user presses tracing button 117 to set the automatic tracing mode, image processing unit 121 analyzes the image data to detect marker 201, and supplies a signal indicating, for example, what degree the image component of marker 201 deviates from the image center to camera control unit 123. Consequently, camera control unit 123 is allowed to find the amount of drive (that is, tracing data) of orientation altering device 113 used for shifting the image component of maker 201 to the image center, and based upon the amount of drive, controls the driving operation of orientation altering device 113. Thus, orientation altering device 113 is controlled so that the image of three-dimensional chart 2 is always converged and formed on two-dimensional light-receiving element 111.

Here, in the case of the manual mode, in response to a user's instruction received from subject-use camera 13, camera control unit 123 controls orientation altering device 113.

Moreover, camera control unit 123 is designed so as to receive inputted detection results from the respective sensors 126t, 126p, 126z; thus, based upon information inputted from angle sensors 126t, 126p, it generates rotation angle information, and based upon information inputted from sensor 126z, it generates zoom information. Camera control unit 123 is designed to output the information to subject-use camera 13 through communication unit 124.

When the shutter button of subject-use camera 13 is pressed, movable camera 11 receives an image-pickup command from subject-use camera 13, and in response to the receipt of the image pickup command, carries out an image-pickup operation by using two-dimensional light-receiving element 111 to generate image data. Then, the image data and lens rotation angle information, obtained at this time, are transmitted to subject-use camera 13 through communication unit 124.

<Construction of Subject-use Camera 13>

The following description will discuss the construction of subject-use camera 13. FIG. 49 is a block diagram that shows an inner construction of subject-use camera 13. As shown in FIG. 49, subject-use camera 13 is constituted by a lens unit 155, a two-dimensional light-receiving element 156, an image processing unit 157, an image memory 159, a control unit 160, a shutter button 161, a flash lamp 162, a display 163, operation buttons 164, a card slot 165, a memory card 166, a communication unit 167, a communication device 168, a memory 170 and a calculation unit 195. Moreover, calculation unit 195 is provided with a first calculation unit 196 and a second calculation unit 197.

Light from subject 30 is made incident on subject-use camera 13 through lens unit 155, and converged on two-dimensional light-receiving element 156 as an image. Two-dimensional light-receiving element 156 is constituted by a CCD array, etc., in which a plurality of pixels are arranged on a light-receiving face. Two-dimensional light-receiving element 156 photo-electrically converts received light for each of the pixels. Any one of RGB filters is placed on each pixel on the light-receiving face of two-dimensional light-receiving element 156, and an image signal having the corresponding color component of any one of RGB is generated from each pixel through the photo-electric conversion function of two-dimensional light-receiving element 156.

Image processing unit 157 A/D converts the image signal from two-dimensional light-receiving element 156 to generate image data that is made from digital signals. Moreover, image-processing unit 157 further subjects image data to various image processes such as a white balance correction and a γ-correction. Image data, generated in image-processing unit 157, is stored in image memory 159 that is constituted by a semiconductor memory, etc.

Shutter button 161 is a button that allows the user to instruct an image pickup operation, and flash lamp 162 is used for illuminating subject 30 upon picking up an image of subject 30. Moreover, display 163 is a display device that displays an operation menu screen that serves as a user interface and also displays a picked-up subject image, and operation buttons 164 are a group of buttons through which the user carries out input operations, etc., so as to change the position and orientation of movable camera 11 by manual operations. A freely detachable memory card 166 is attached to card slot 165, and data exchanges can be carried out with computer 15 through memory card 166. Communication unit 167 carries out data communications with movable camera 11 through communication device 168. Here, memory 170 is a storing unit for temporarily storing image data inputted from movable camera 11 and calculation-subject data of calculation unit 195 such as lens rotation angle information. Moreover, memory 170 also preliminarily stores information related to inner parameters (focal length, etc.) of movable camera 11.

Control unit 160 is composed of a CPU, and designed to control operations of the above-mentioned respective parts. When the user presses shutter button 161, control unit 160 controls an image pickup operation by two-dimensional light-receiving element 156 and image processing unit 157. Moreover, in response to the pressing operation of shutter button 161 by the user, control unit 160 forms an image pickup command, and transmits the image pickup command to movable camera 11 through communication unit 167 so as to make it in synchronism with subject-use camera 13.

Moreover, control unit 160 stores picked-up image data, which has been stored in image memory 159 by the image pickup operation of subject-use camera 13, in memory 170, and after the image pickup command has been transmitted, image data and lens rotation angle information, received from movable camera 11, are also stored in memory 170.

Furthermore, calculation unit 195 is also composed of a CPU, and executes a predetermined operation program so that it functions as first calculation unit 196 and second calculation unit 197. Such an operation program may be preliminarily stored in a memory, etc., in the manufacturing process, or may be inputted from an external device later.

When image data preliminarily obtained by picking up images of a plurality of three-dimensional charts is inputted thereto, the first calculation unit 196 achieves a calculating function (first calculation means) which finds a relative positional relationship among three-dimensional charts 2 based upon image components of the respective three-dimensional charts 2 contained in the image data.

Moreover, in synchronism with the image-picking-up operation of subject-use camera 13 on subject 30, based upon image data obtained from movable camera 11 when the movable camera 11 picks up an image of at least one three-dimensional chart (referred to as "image-pickup subject three-dimensional chart") of the three-dimensional charts, the second calculation unit 197 finds the image pickup position and the image pickup orientation of movable camera 11 with respect to the image-pickup subject three-dimensional chart. Further, the second calculation unit 197 achieves a calculating function (second calculation means) which finds three-dimensional information of subject 30 from picked up images obtained from subject-use camera 13, based upon the image-pickup position and image-pickup orientation of movable camera 11 with respect to the image-pickup subject three-dimensional chart, the relative position and relative orientation between movable camera 11 and subject-use camera 13, and the relative positional relationship between the image-pickup subject three-dimensional chart and another three-dimensional chart 2.

Moreover, control unit 160 makes a determination as to whether movable camera 11 is in the manual mode or the automatic tracing mode, and in the case of the manual mode, the signal obtained by the user's operation of pressing one portion of the operation buttons 164 is outputted and transmitted to movable camera 11 through communication unit 167. Thus, orientation altering device 113 of movable camera 11 can be controlled by the user's manual operation.

<Principle of Generation of Three-dimensional Information>

With respect to image pickup system 1 arranged as described above, an explanation will be given of the principle of data calculations carried out when three-dimensional information of subject 30 is generated.

When inner parameters of a camera (focal length, pixel density, etc.) have been known, it is possible to determine which positions respective points of a subject image formed on two-dimensional light-receiving element are located in an image-pickup space of the camera, based upon calculations. For example, a certain point of a subject image is converged as an image on one pixel of two-dimensional light-receiving element, two dimensional coordinate values can be found based upon image-forming position, etc., in the two-dimensional element.

Therefore, by picking up images of three-dimensional chart 2 formed so as to have a known structure by using movable camera 11, external parameters of movable camera 11, that is, relative position and orientation of movable camera 11 with respect to three-dimensional chart 2, can be specified.

In general, calculations of external parameters of a camera can be carried out under conditions that the inner parameters of the camera are known, that the three-dimensional coordinates values of not less than four points on the same plane fixed to the absolute coordinate system are known, and that two-dimensional coordinate values of points on the picked-up image corresponding to the above-mentioned points of not less than four can be calculated.

With respect to such a calculation method, for example, techniques disclosed in, for example, the above-mentioned document "L. Quan. Z. Lan. "Linear N-Point Camera Pose Determination" IEEE Trans. PAMI 21(8) 1999" and "Takahashi, Ishii, Makino, Nakashizu, "Measurements of Marker Position and Orientation from Single-Eye Image for Artificial Reality Interface", Electronic Information Report Journal A179 1996", etc. In these techniques, points of not less than four whose coordinate values have been known are image-picked up by a camera, and based upon the known three-dimensional coordinate values of the not less than four points and the two-dimensional coordinate values found from the image obtained by the camera, the relative position and relative orientation of the camera are calculated.

In this preferred embodiment also, in the case when an image of three-dimensional chart 2 is picked up by movable camera 11, based upon image data obtained from two-dimensional light-receiving element 111, apex coordinate values of each unit graphic form that belongs to three-dimensional chart 2 can be found. However, in this case, the apex coordinate values are coordinate values with respect to an inherent local coordinate system in a state in which movable camera 11 has picked up three-dimensional chart 2.

Here, three-dimensional chart 2 is fixed in a state where it is placed on the periphery of subject 30. By setting a three-dimensional coordinate system inherent to this three-dimensional chart 2, (referred to as "chart coordinate system"), it becomes possible to define apex positions of the respective unit graphic forms in three-dimensional chart 2 based upon the set values of three-dimensional chart 2.

When coordinate values of at least four points of chart pattern CP are found based upon image data picked up by movable camera 11, the measured four points of three-dimensional chart 2 are identified from the correlation among the respective points. Therefore, based upon the designed coordinate values of the four points in the chart coordinate system and coordinate values of four points in the local coordinate system of movable camera 11, it is possible to specify relative position and orientation of movable camera 11 with respect to three-dimensional chart 2. Further, based upon the relationship between the local coordinate system of movable camera 11 and the chart coordinate system, a parameter is defined so as to convert the local coordinate system of movable camera 11 to the chart coordinate system.

Supposing that the chart coordinate system is Xc, the local coordinate system of movable camera 11 is Xm, the rotation shift matrix for converting the local coordinate system Xm to the chart coordinate system Xc is Rc and the parallel shifting vector is Tc, coordinate values represented by the local coordinate system Xm of movable camera 11 can be converted to coordinate values represented by the chart coordinate system Xc by using the following equation:

$$Xc = Rc \cdot Xm + Tc \qquad \text{(Equation 106)}.$$

In other words, the coordinate values of at least four points of chart pattern CP found by picking up an image of three-dimensional chart 2 using movable camera 11 and the designed value of chart pattern CP, the relative orientation and relative position of movable camera 11 with respect to three-dimensional chart 2 can be specified so that the rotation shift matrix Rc in equation 106 and the parallel shift vector Tc can be found; thus, it becomes possible to define a coordinate conversion expression.

FIG. 73 is a drawing that shows the concept of coordinate conversion in image pickup system 1. As shown in FIG. 73, the coordinate conversion expression of equation 106 is an expression used for making a conversion from the local coordinate system Xm set in movable camera 11 to chart coordinate system Xc set in three-dimensional chart 2. In other words, by allowing movable camera 11 to pick up an image of three-dimensional chart 2, the relative orientation and relative position of movable camera 11 with respect to three-dimensional chart 2 are specified so that the expression of equation 106 based upon the relative orientation and relative position can be defined as a conversion equation from the local coordinate system Xm to the chart coordinate system Xc.

Moreover, in the case when movable camera 11 is changed in its orientation to a pivotal angle θ and an elevation or depression angle φ by orientation shift device 113 and in the case when it is set to a pivotal angle of 0° and an elevation or depression angle of 0°, if image pickup operations are respectively carried out by movable camera 11, the coordinate values directed by the respective images are related to different coordinate systems. As shown in FIG. 50, the coordinate value, directed by the image picked up when movable camera 11 is set to a pivotal angle of 0° and an elevation or depression angle of 0° (11*b*), is represented by local coordinate system Xmo, and the coordinate value, directed by the image picked up when movable camera 11 is set to have a pivotal angle θ and an elevation or depression angle φ (11*a*), is represented by local coordinate system Xm. These local coordinate systems Xmo and Xm are generated by changes in the orientation of movable camera 11; therefore, the coordinate conversion parameter between local coordinate system Xmo and Xm may be preliminarily found as an inner parameter, or may be found through calculations.

Supposing that the rotation shift matrix and the parallel shift vector, used for converting local coordinate system Xmo to local coordinate system Xm, are respectively set to R(θ,φ) and T(θ,φ), coordinate values, represented by local coordinate system Xmo can be converted to coordinate values represented by local coordinate system Xm, by using the following equation:

$$Xm = R(\theta,\phi) \cdot Xmo + T(\theta,\phi) \qquad \text{(Equation 107)}.$$

Here, the rotation shift matrix R(θ,φ) and the parallel shift vector T(θ,φ) are values that are univocally determined when θ,φ are respectively set. In movable camera 11, lens rotation angular information, that is, information relating to θ and φ, is generated by angle sensors 126*t*, 126*p* so that the rotation shift matrix R(θ,φ) and the parallel shift vector T(θ,φ) can be found by using this lens rotation angle information.

Moreover, in the case when the pivotal angle and the elevation or depression angle of movable camera 11 are 0°, if an image-pickup operation is carried out by movable camera 11, the coordinate values derived from the image system are related to a coordinate system different from the coordinate system of coordinate values directed from a picked-up image obtained by subject-use camera 13. As shown in FIG. 50, coordinate values, derived from an image that is picked up when movable camera 11 is set to a pivotal angle of 0° and an elevation or depression angle of 0° (11*b*), are represented by local coordinate system Xmo, and coordinate values, derived from an image that is picked up by subject-use camera 13, are represent by local coordinate system Xo. In other words, since the orientation and position at which movable camera 11 picks up an image are different from the orientation and position at which subject-use camera 13 picks up an image are different, even when the image-pickup direction is simply the same, coordinate values obtained from the respective images are related to different coordinate systems.

With respect to coordinate conversion from local coordinate system Xo to local coordinate system Xmo, the corresponding parameter can be preliminarily found from designed values, etc. given when movable camera 11 is secured to subject-use camera 13. However, since it is assumed that, when in an actual operation, movable camera 11 is attached to subject-use camera 13, a slight error might occur, it is preferable to find a conversion parameter for carrying out coordinate conversion at the time of a subject-image picking-up process.

For example, prior to an image-pickup operation of subject 30, movable camera 11 and subject-use camera 13 pick up the same three-dimensional chart 2 with the pivotal angle and the elevation or depression angle of movable camera 11 being set to 0°, and the coordinate values of the same apex on three-dimensional chart 2 are found based upon the respective images; thus, the relative orientation and relative position of subject-use camera 13 with respect to movable camera 11 can be specified. Then, a coordinate converting process is carried out based upon the relative orientation and relative position so that local coordinate system Xo can be converted to local coordinate system Xmo.

More specifically, supposing that the rotation shift matrix and the parallel shift vector, used for converting local coordinate system Xo to local coordinate system Xmo, are respectively set to Rh and Th, coordinate values, represented by local coordinate system Xmo can be converted to coordinate values represented by local coordinate system Xm, by using the following equation:

$$Xmo = Rh \cdot Xo + Th \qquad \text{(Equation 108)}.$$

Here, the rotation shift matrix Rh and the parallel shift vector Th are a matrix and a vector that are defined based upon the relative orientation and relative position of subject-use camera 13 with respect to movable camera 11.

In this manner, coordinate conversions are carried out between the respective coordinate systems. Further, in synchronism with subject-use camera 13 picks up an image of subject 30, movable camera 11 picks up an image of an image-pickup subject three-dimensional chart 2 among a plurality of three-dimensional charts 2 so that coordinate values derived from a picked-up image of subject-use camera 13 can be converted to coordinate values represented by the chart coordinate system of image-pickup subject three-dimensional chart 2.

More specifically, the following equation is obtained from the above-mentioned equations 106 to 108:

$$Xc = Rc \cdot R(\theta,\phi) \cdot Rh \cdot Rc(R(\theta,\phi) \cdot Th + T(\theta,\phi)) + Tc \qquad \text{(Equation 109)}.$$

This equation converts the coordinate values obtained from local coordinate system Xo of subject-use camera 13 to coordinate values represented by chart coordinate system Xc.

In the present preferred embodiment, a plurality of three-dimensional charts are placed on the periphery of subject 30 as described earlier. Then, upon picking up an image of subject 30 by subject-use camera 13, movable camera 11 can use desired one of three-dimensional charts 2 as the image-pickup subject three-dimensional chart 2. For this reason, when a certain side face (first side face) of subject 30 is image-picked up by using subject-use camera 13, movable camera 11 may use a three-dimensional chart 2a (see FIG. 70) as an image-pickup subject three-dimensional chart, while, when another side face (second side face) of subject 30 is image-picked up by using subject-use camera 13, movable camera 11 may use a three-dimensional chart 2b (see FIG. 70) as an image-pickup subject three-dimensional chart.

Even in the case when, from the picked-up image of subject 30 taken by subject-use camera 13, coordinate values are found, and coordinate conversions are carried out based upon the above-mentioned equation 109, with respect to the first side face, conversions are made to coordinate values of chart coordinate system Xca relating to three-dimensional chart 2a, while, with respect to the second side face, conversions are made to coordinate values of chart coordinate system Xcb relating to three-dimensional chart 2b. For this reason, even when these coordinate values are composed, it is not possible to generate three-dimensional information accurately relating to subject 30.

Therefore, in this preferred embodiment, the relative positional relationship of a plurality of three-dimensional charts placed around subject 30, and based upon the relative positional relationship, provision is made so that the chart coordinate system with respect to each three-dimensional chart is converted to a chart coordinate system (referred to as "reference coordinate system") related to a specific one of three-dimensional charts.

Figure 74:
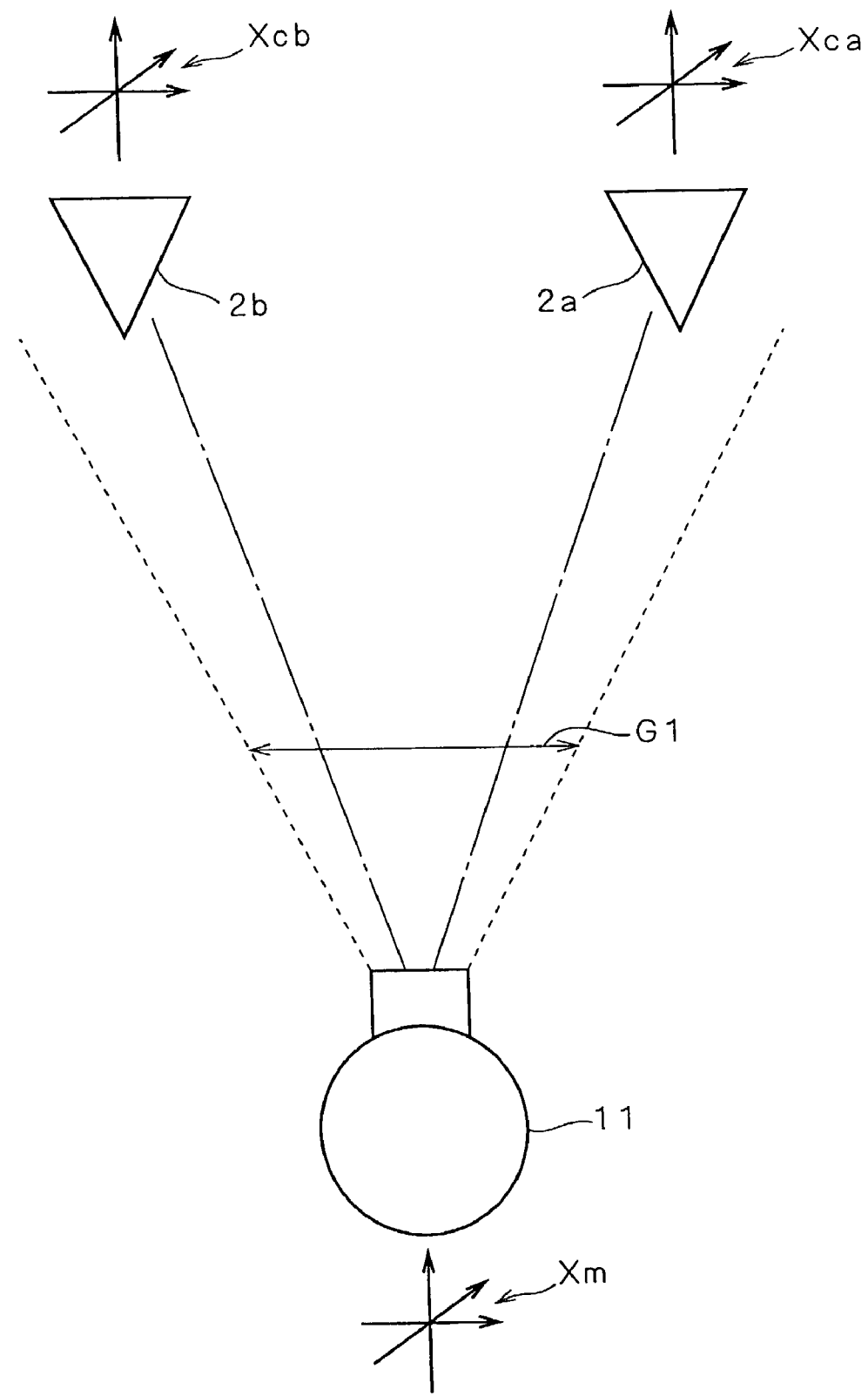
FIG. 74 is a drawing that shows the concept of coordinate conversions that is used when a chart coordinate system is converted to a reference coordinate system.

FIG. 74 is a drawing that shows the concept of coordinate conversions for converting a chart coordinate system to the reference coordinate system. Here, in the example of FIG. 74, it is supposed that the chart coordinate system Xca of three-dimensional chart 2a is set to the reference coordinate system.

When the relative positional relationship among a plurality of three-dimensional charts 2 is find, for example, movable camera 11 is used to image-pick up a plurality of three-dimensional charts 2 in a state where a plurality of three-dimensional charts 2 are held inside the view angle G1 of movable camera 11.

When three-dimensional chart 2a is image-picked up by movable camera 11, the coordinate values in the local coordinate system Xm based upon the image. Here, since three-dimensional chart 2a is formed with a known structure so that the coordinate values in the chart coordinate system (reference coordinate system) Xca have been known on the design basis.

For this reason, based upon coordinate values of at least four points of a chart pattern CP found by image-picking up three-dimensional chart 2a by using movable camera 11 and the designed values of the corresponding four points of chart pattern CP, it is possible to specify the relative position and relative orientation of movable camera 11 with respect to three-dimensional chart 2a.

Therefore, in the same manner as the above-mentioned equation 106, the coordinate conversion equation from the local coordinate system Xm to the reference coordinate system Xca is defined by the following equation:

$$Xca = Rca \cdot Rm + Tca \qquad \text{(Equation 110)}$$

Here, Rca and Tca in equation 110 are a rotation shifting matrix and a parallel shifting vector respectively from the local coordinate system Xm to the reference coordinate system Xca; therefore, these can be found by the relative orientation and relative position of movable camera 11 with respect to three-dimensional chart 2a.

In the same manner, when three-dimensional chart 2b is image-picked up by using movable camera 11, the coordinate values in the local coordinate system Xm are obtained from the image. Here, since three-dimensional chart 2b is also formed with a known structure so that the coordinate values in the chart coordinate system Xcb have been known on the design basis.

For this reason, based upon coordinate values of at least four points of a chart pattern CP found by image-picking up three-dimensional chart 2b by using movable camera 11 and the designed values of the corresponding four points of chart pattern CP, it is possible to specify the relative position and relative orientation of movable camera 11 with respect to three-dimensional chart 2b.

Therefore, in the same manner as the above-mentioned equation 106, the coordinate conversion equation from the local coordinate system Xm to the reference coordinate system Xcb is defined by the following equation:

$$Xcb = Rcb \cdot Rm + Tcb \qquad \text{(Equation 111)}$$

Here, Rcb and Tcb in equation 111 are a rotation shifting matrix and a parallel shifting vector respectively from the local coordinate system Xm to the reference coordinate system Xcb; therefore, these can be found by the relative orientation and relative position of movable camera 11 with respect to three-dimensional chart 2b.

Then, based upon coordinate conversion equations of equations 110 and 111, conversion equation from the chart coordinate system Xcb to the reference coordinate system Xca is found, and represented by the following equation:

$$Xca = Rca \cdot Rcb^{-1} \cdot (Xcb - Tcb) + Tca \qquad \text{(Equation 112)}$$

This equation 112 forms an equation indicating the relative positional relationship between three-dimensional charts 2a and 2b. By taking into consideration a case in which many three-dimensional charts 2 are placed, equation 112 is generalized to the following equation:

$$Xci = Rci - Rci^{-1} \cdot (Xci+1 - Tci+1) + Tci \qquad \text{(Equation 113)}$$

Here, in equation 113, i represents i-numbered three-dimensional chart 2(i), and Rci and Tci are a rotation shifting matrix and a parallel shifting vector respectively from the local coordinate system Xm to chart coordinate system Xci, and these can be found from the relative orientation and relative position of movable camera 11 with respect to three-dimensional chart 2(i).

Then, based upon coordinate conversion equation of equation 109 and coordinate conversion equation of equation 113, coordinate values of subject 30 from the picked-up image obtained from subject-use camera 13, and in this case, the coordinate values can be converted to coordinate values in the reference coordinate system (that is, world coordinate system in image-pickup system 1) so that it is possible to properly compose a three-dimensional model of subject 30.

Here, in the above-mentioned example, in order to provide easy understanding of the calculation principle, the description has exemplified a case in which a plurality of three-dimensional charts 2 are image-picked up in a manner so as to be held within the view angle G1 of movable camera 11; however, the present invention is not intended to be limited by this arrangement.

For example, in the case when many three-dimensional charts 2 are installed, all the three-dimensional charts 2 are not held within the view angle G1, but two three-dimensional charts 2 are held within the view angle G1, and in this state, image-pickup operations are repeated so that the relative positional relationship between the two three-dimensional charts held in each image is successively found; thus, this method may be adopted. When image-pickup processes are carried out with two three-dimensional charts 2 being held within the view angle G1, the resulting advantage is that the relative positional relationship between the two three-dimensional charts 2 can be easily found from the image.

Here, as the number of three-dimensional charts 2 to be held within the view angle G1 increases, it is assumed that the image components of each three-dimensional chart 2 in the image will decrease. In such a case, there is degradation in the precision at which the relative positional relationship between the respective three-dimensional charts is found. For this reason, it is preferable to set the number of three-dimensional charts 2 to be held within the view angle G1 at one time of image-pickup process as small as possible.

From such a point of view, with respect to the method of finding the relative positional relationship among a plurality of three-dimensional charts 2, it is most preferable to individually pick up three-dimensional charts 2 one by one by using movable camera 11. For example, if, when movable camera 11 is altered in its orientation within the movable range, all the three-dimensional charts can be individually image-picked up, the respective three-dimensional charts 2 are image-picked up individually, and based upon the rotation angle and the elevation or depression angle at the time of the image-pickup process of each image, coordinate conversions are carried out so that the relative positional relationship of the respective three-dimensional charts 2 can be found. In this case, since movable camera 11 picks up an image of one three-dimensional chart 2, it is possible to pick up an image with the image components of the three-dimensional chart 2 contained in the picked-up image being maintained greater, with the result that the position and orientation of movable camera 11 with respect to three-dimensional chart 2 with high precision.

<Operation Process of Image Pickup System 1>

The following description will discuss the operation process of image-pickup system 1. FIGS. 75 to 79 shows flow charts that show the operation process of image pickup system 1.

First, a plurality of three-dimensional charts 2 are placed around subject 30 (step S301). At this time, the arrangement of three-dimensional charts 2 may be made at random; however, it is preferable to place them around subject 30 with virtually an even interval. Moreover, the three-dimensional charts 2 placed around subject 30 are maintained in a fixed state until the completion of the operation process, more specifically, until the completion of the subject-image-pickup processes of step S304.

Figure 76:
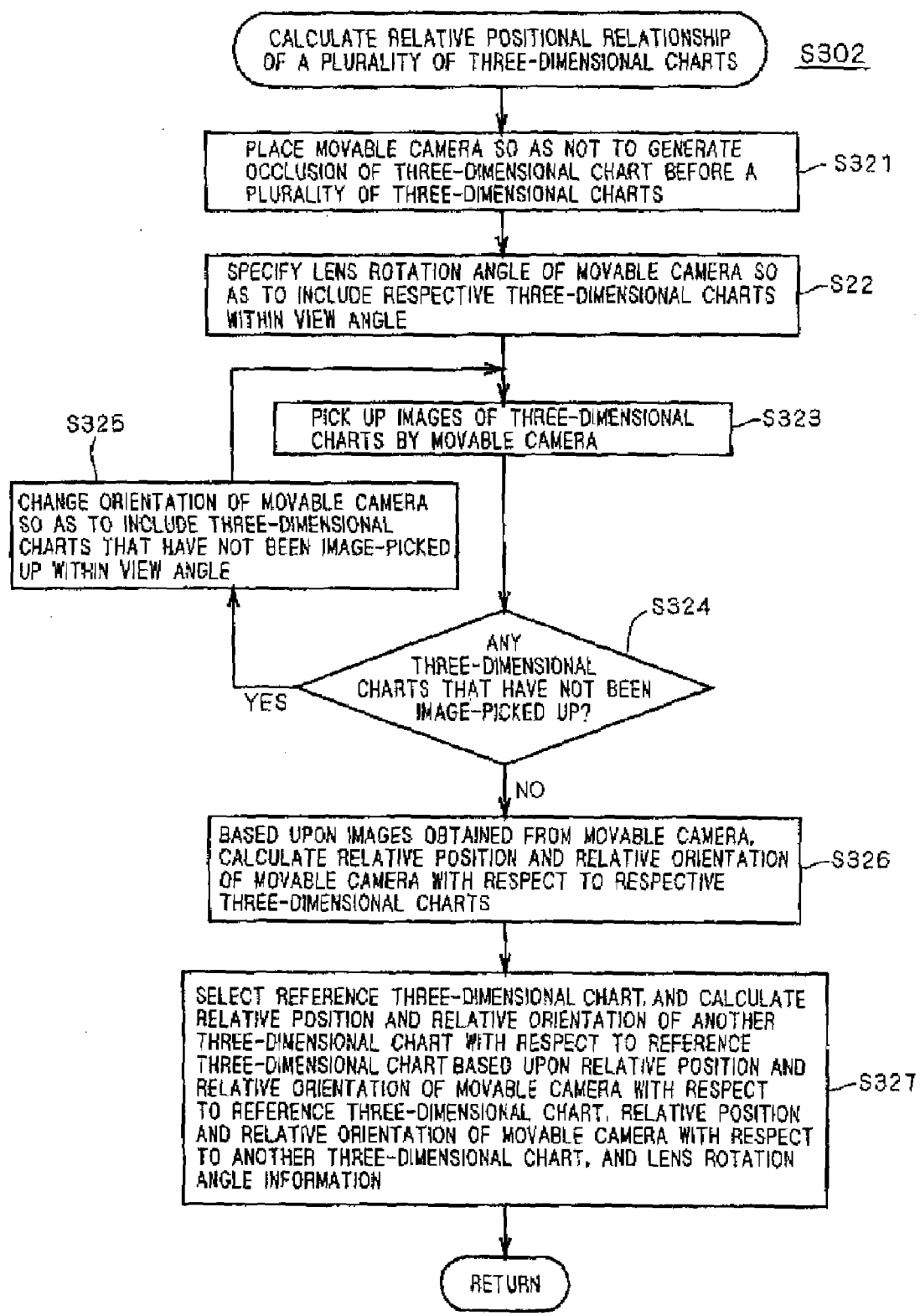
FIG. 76 is a flow chart that shows one portion of processes in the operation processes in the image pickup system.

Next, calculation processes for calculating the relative positional relationship among the three-dimensional charts 2 are carried out (step S302). FIG. 76 shows these processes in detail by means of a flow chart.

First, the user places camera system 10 before the three-dimensional charts 2 so as not to cause occlusion among the three-dimensional charts 2, that is, so as not to allow a three-dimensional chart 2 to cover another three-dimensional chart 2 (step S321). In this case, although camera system 10 is secured, movable camera 11 is set in such a state that its view angle can be altered by the function of orientation altering device 113.

Then, the user sets movable camera 11 to the manual move, and by operating operation buttons 164 of subject-use camera 13 so that the lens rotation angle of movable camera 1 is specified so as to hold a three-dimensional chart 2 inside the view angle of movable camera 11 (step S322). Consequently, an orientation altering instruction is given from subject-use camera 13 to movable camera 11 so that the image-pickup direction of movable camera 11 is directed to the specified image-pickup direction with three-dimensional chart 2 being held within the view angle of movable camera 11. Here, in this case, it is preferable to specify the image-pickup direction so as to hold one three-dimensional chart within the view angle.

The user gives an image-pickup instruction of three-dimensional chart 2 by movable camera 11 (step S323). Consequently, an image-pickup operation is carried out by movable camera 11, and picked-up image data of three-dimensional chart 2 is transmitted from movable camera 11 to subject-use camera 13. In this case, the lens rotation angle information is simultaneously transmitted together with the image data. Subject-use camera 13 stores the image data and lens rotation angle information transmitted from movable camera 11 in memory 170.

Further, the user makes a determination as to whether or not any unpicked-up three-dimensional chart 2 exists (step S324), and if there is any, sets movable camera 11 so as to allow the unpicked-up three-dimensional chart 2 to enter the view angle at step S325. Thus, movable camera 11 is allowed to change the orientation so that one unpicked-up three-dimensional chart 2 is held within the view angle of movable camera 11.

Then, by repeating processes of steps S323 to S325, images of all the three-dimensional chart 2 placed around subject 30 are picked up by movable camera 11. Upon completion of image-pickup processes on all the three-dimensional charts 2, the user inputs the corresponding information through operation buttons 164 of subject-use camera 13.

The first calculation unit 196 in calculation unit 195 functions in subject-use camera 13. Thus, the first calculation unit 196 acquires the image data obtained from movable camera 11 stored in memory 170, and calculates the relative position and relative orientation of movable camera 11 with respect to each three-dimensional chart 2 at the time of the image-pickup process of each three-dimensional chart 2 (step S326). In other words, through this process, the respective parameters indicated by the above-mentioned equations 110 and 111 (rotation shifting matrix and parallel shifting vector) are found.

Next, the first calculation unit 196 selects one reference three-dimensional chart indicating the reference coordinate system among a plurality of three dimensional charts 2, and based upon the relative position and relative orientation of movable camera 11 with respect to the reference three-dimensional chart, the relative position and relative orientation of movable camera 11 with respect to the other three-dimensional charts and the lens rotation angle information, it calculates the relative position and relative orientation of the other three dimensional charts with respect to the reference three-dimensional chart, and stores the resulting data in memory 170 (step S327). Through this process, the respective parameters indicated by the above-mentioned equation 112 or 113 are found. Here, with respect to the selection of the reference three-dimensional chart 2, calculation unit 195 may automatically select a desired one of the three-dimensional charts 2, or the user may specify one through operation buttons 164.

After the above-mentioned processes, a plurality of three-dimensional charts 2 have been classified to one reference three-dimensional chart and the other three-dimensional charts, and the relative positional relationship of all the other three-dimensional charts with respect to the reference three-dimensional chart has been determined, thereby completing the processes of step S302.

Figure 75:
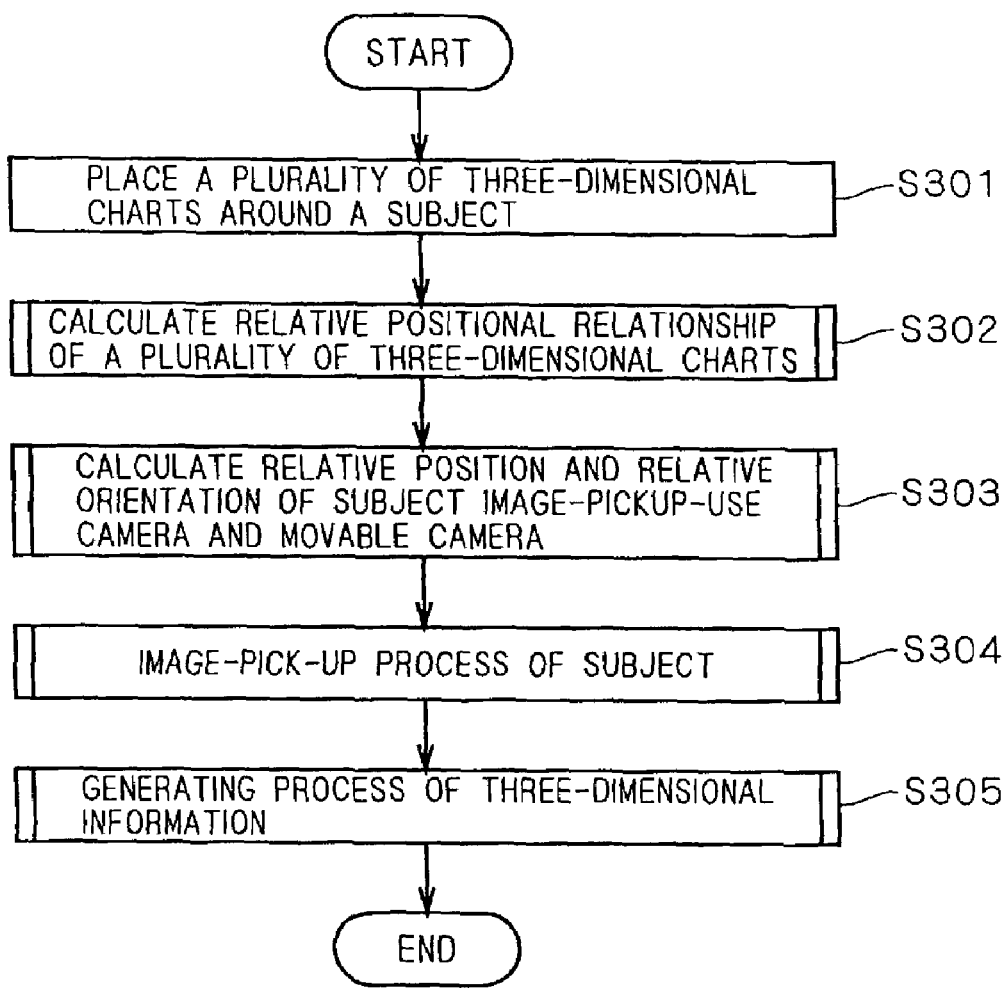
FIG. 75 is a flow chart that shows the entire operation processes in an image pickup system.
Figure 77:
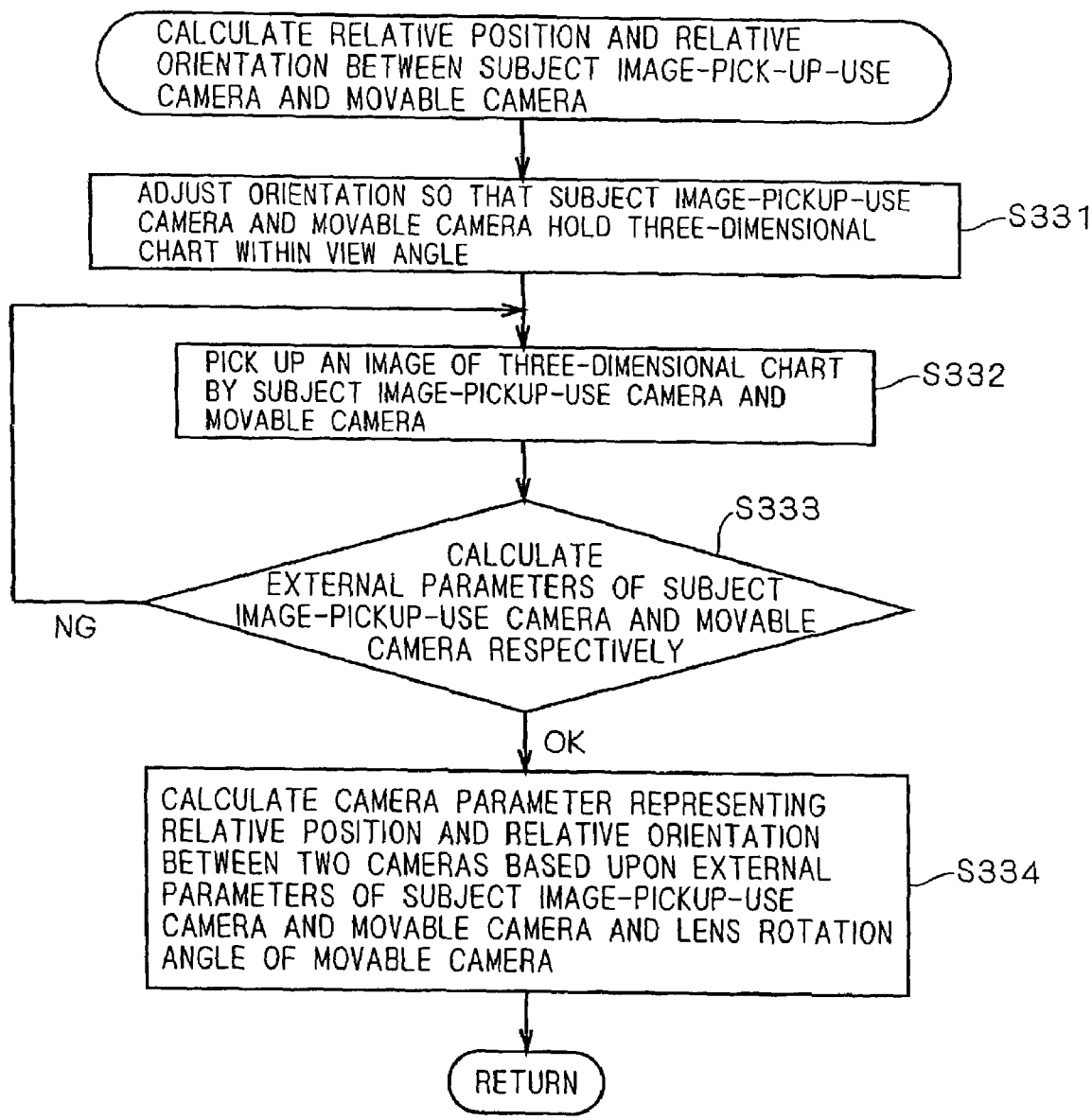
FIG. 77 is a flow chart that shows one portion of processes in the operation processes in the image pickup system.

Next, processes for calculating the relative position and relative orientation between subject-use camera 13 and movable camera 11 are carried out (see FIG. 75; step S303). FIG. 77 shows a flow chart of these processes in detail.

First, the user adjusts the orientation of camera system 10 so that subject-use camera 13 and movable camera 11 hold the same three-dimensional chart 2 within the respective view angles (step S331).

Next, the user gives an instruction for an image-pickup process of the same three-dimensional chart 2 by subject-use camera 13 and movable camera 11 (step S332). For example, when shutter button 161 of subject-use camera 13 is pressed, image-pickup operations are carried out by subject-use camera 13 and movable camera 11 of camera system 10 in synchronism with each other. Consequently, an image-pickup operation is carried out by movable camera 11, and picked-up image data of three-dimensional chart 2 is transmitted from movable camera 11 to subject-use camera 13, and the image data is stored in memory 170 in subject-use camera 13. Moreover, image data of three-dimensional chart 2 picked up by subject-use camera is also stored in memory 170 in subject-use camera 13.

Here, in subject-use camera 13, the second calculation unit 197 of calculation unit 195 functions so that, based upon picked-up images of three-dimensional chart 2 by movable camera 11, the relative position and relative orientation of movable camera 11 with respect to three-dimensional chart 2, that is, external parameters of movable camera 11, are calculated (step S333). Simultaneously, based upon picked-up images of three-dimensional chart 2 by subject-use camera 13, the relative position and relative orientation of subject-use camera 13 with respect to three-dimensional chart 2, that is, external parameters of subject-use camera 13, are calculated (step S333). Calculation unit 195 makes a determination as to whether or not the external parameters have been appropriately calculated with respect to movable camera 11 and subject-use camera 13. Then, in the case when the external parameters have not been calculated, processes are repeated from the image-pickup operation (step S332) of three-dimensional chart 2 by the two cameras. In contrast, in the case when the external parameters have been appropriately calculated, the sequence proceeds to step S334.

Then, based upon the external parameters of subject-use camera 13 and movable camera 11 and the lens rotation angle at the time of the image-pickup process of movable camera 11, the second calculation unit 197 calculates camera parameters representing the relative position and relative orientation of the two cameras (step S334). In other words, since, based upon the external parameters found at step S333, the relative position and orientation of the two cameras with respect to the same three-dimensional chart 2 are clearly indicated, the relative positional relationship between the two cameras is found through calculations using the relationship. Here, when, upon picking up images of the same three-dimensional chart 2, the rotation angle and the elevation or depression angle of movable camera 11 are 0°, it is possible to calculate camera parameters that represent the relative position and relative orientation of the two cameras most easily without the necessity of taking the lens rotation angle into consideration. With this process, respective parameters indicated by conversion equation of the above-mentioned equation 108, or parameters corresponding to composite conversion equations of equations 107 and 108, are found.

Consequently, it becomes possible to determine the relative position and relative orientation between subject-use camera 13 and movable camera 11 with movable camera 11 being fixed to subject-use camera 13, thereby completing the processes of step S303.

Figure 78:
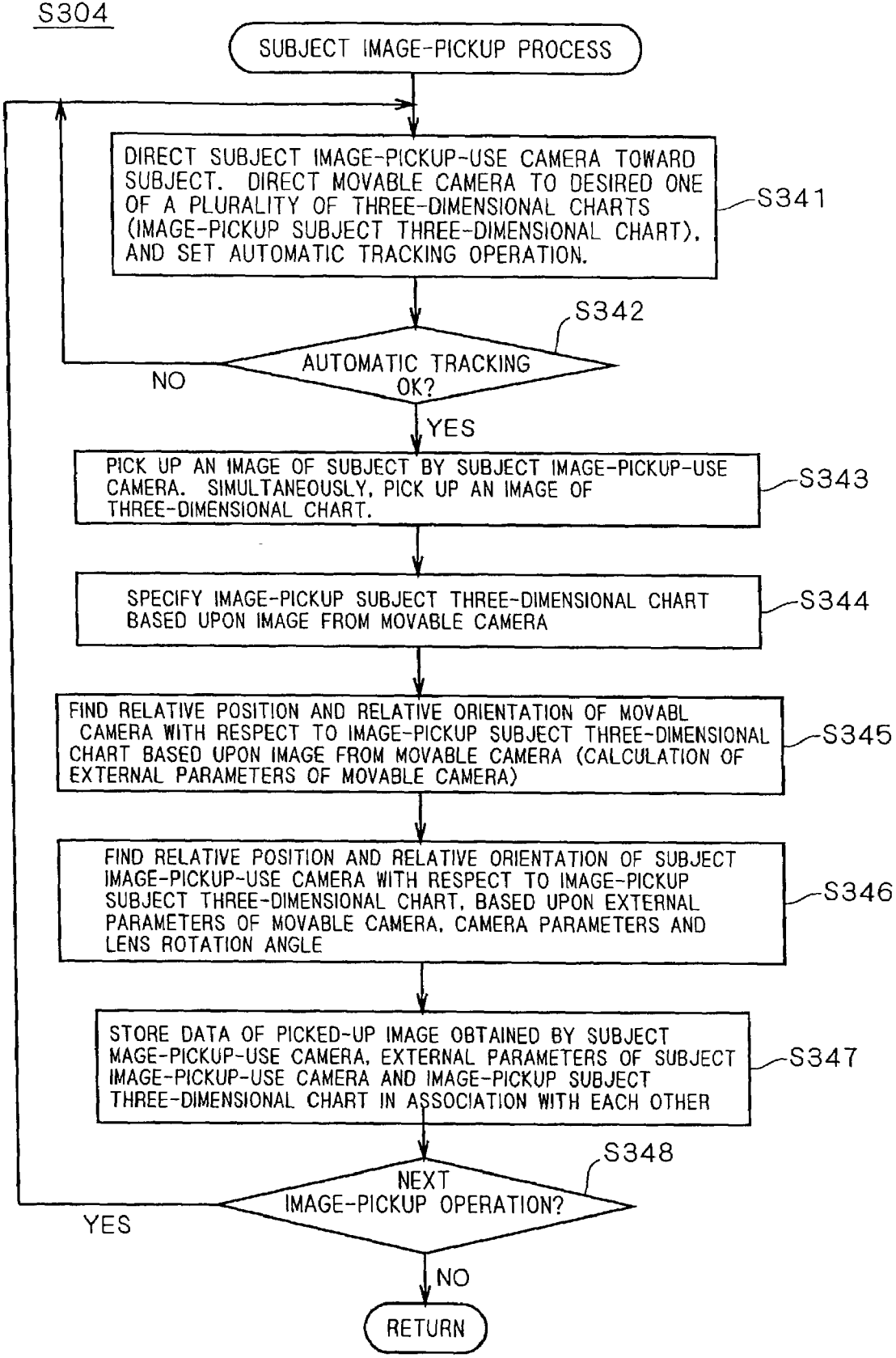
FIG. 78 is a flow chart that shows one portion of processes in the operation processes in the image pickup system.

Next, subject-image pickup processes for subject 30 that is a target for generating three-dimensional information are carried out (see FIG. 75; step S304). FIG. 78 shows these processes by means of a flow chart.

At step S341, the user places camera system 10 at a desired position on the periphery of subject 30, and directs subject-use camera 13 to subject 30. Then, the user sets movable camera 11 to the manual mode, and directs movable camera 11 to a desired one (image-pickup target three-dimensional chart) of a plurality of three-dimensional charts 2. In this case, with respect to the image-pickup target three-dimensional chart, it is preferable to select the one closest to camera system 10 among the three-dimensional charts 2. By selecting the closest three-dimensional chart as the image-pickup target three-dimensional chart, it becomes possible to find the relative position and relative orientation of movable camera 11 with respect to the image-pickup target three-dimensional chart with high precision. Then, at the time when the image-pickup target three-dimensional chart is held within the view angle of movable camera 11, the user sets movable camera 11 to the automatic tracing mode.

The user carries out operations such as framing adjustments on subject-use camera 13 for picking up an image of subject 30 by using subject-use camera 13. During this time, movable camera 11 automatically traces the image-pickup target three-dimensional chart 2 so as to always hold the image-pickup target three-dimensional chart within the view angle of movable camera 11.

Here, when the automatic tracing operation is desirably carried out, the sequence proceeds to step S343, while in the case of a failure in the automatic tracing operation, the sequence returns to step S341 and manual operations are again carried out to hold the image-pickup target three-dimensional chart within the view angle of movable camera 11 (step S342).

After the framing adjustments of subject-use camera 13 have been completed, the user presses shutter button 161 of subject-use camera 13 to give an instruction for an image-pickup operation of subject 30. In response to this action, subject-use camera 13 picks up an image of subject 30, and simultaneously, movable camera 11 picks up an image of the image-pickup target three-dimensional chart 2 (step S343).

Then, the picked-up image of subject 30 obtained by subject-use camera 13 is stored in memory 170, and the data of the picked-up image of the image-pickup target three-dimensional chart obtained by subject-use camera 13 and the lens rotation angle information are also stored in memory 170.

Here, in subject-use camera 13, the second calculation unit 197 functions. The second calculation unit 197 reads images obtained by movable camera 11 stored in memory 170, and specifies which three-dimensional chart has been image-picked up as the image-pickup target three-dimensional chart among the three-dimensional charts 2 (step S344).

The following description will discuss one example in which the image-pickup target three-dimensional chart is specified among the three-dimensional charts. For example, chart patterns CP of a plurality of three-dimensional charts 2 are formed so as to have respectively different colors. Then, calculation unit 195 identifies the color of the image-pickup target three-dimensional chart in the images obtained by movable camera 11 so that it becomes possible to identify the three-dimensional chart that has been image-picked up as the image-pickup target three-dimensional chart among the three-dimensional charts.

Moreover, by forming chart patterns CP of the three-dimensional charts 2 with different colors as described above, it is possible to specify each three-dimensional chart 2 when the relative positional relationship among the three-dimensional charts 2 is found.

Then, based upon the image of the image-pickup target three-dimensional chart 2 obtained from movable camera 11, the second calculation unit 197 finds the relative position and relative orientation of movable camera 111 with respect to the image-pickup target chart 2 (step S345). Thus, the external parameters of movable camera 11 at the time when movable camera 11 has image-picked up the image-pickup Further, based upon the external parameters of movable camera 11 found at step S345 (the respective parameters in equation 106), the camera parameters obtained at step S334 (the respective parameters in equation 108) and the lens rotation angle information at the time of the image-pickup process at step S343 (the respective parameters in equation 107), the second calculation unit 197 finds the relative position and relative orientation of subject-use camera 13 with respect to the image-pickup target three-dimensional chart (step S346). In other words, the external parameters of subject-use camera 13 are obtained. Consequently, the respective parameters in the above-mentioned equation 109 have been found so that it becomes possible to convert the coordinate values of subject 30 obtained from the picked-up image of subject 30 to the coordinate values in the chart coordinate system Xc of the image-pickup target three-dimensional chart.

Then, the picked-up image obtained by subject-use camera 13, the external parameters of subject-use camera 13 and the image-pickup target three-dimensional chart are stored in memory 170 as data in association with each other.

With the processes of steps S341 to S347, parameters, which are used for converting images obtained from picked-up images of subject 30 by subject-use camera 13 to the chart coordinate system of the image-pickup target three-dimensional chart, are obtained. By repeating such processes in a manner so as to obtain divided images from all the circumference of subject 30, it is possible to generate parameters related to all the circumference of subject 30.

At step S348, in the case when the user has decided to pick up an image of another side face of subject 30, the processes from step S341 are carried out repeatedly. Moreover, when the user has carried out image-pickup operations from all the circumference of subject 30, the user instructs completion of the image-pickup operations by giving a predetermined input through operation buttons 164. In the case when this instruction input for the completion of the image-pickup operations is given, camera system 10 completes the subject image-pickup processes (step S304).

Here, in the case when the user repeatedly picks up images of subject 30 while moving around subject 30, in each image-pickup operation, a different three-dimensional chart is specified as the image-pickup target three-dimensional chart to be picked up by movable camera 11. For this reason, the external parameters of subject-use camera 13 found at the time of each image-pickup operation are related to a different three-dimensional chart serving as a reference.

Figure 79:
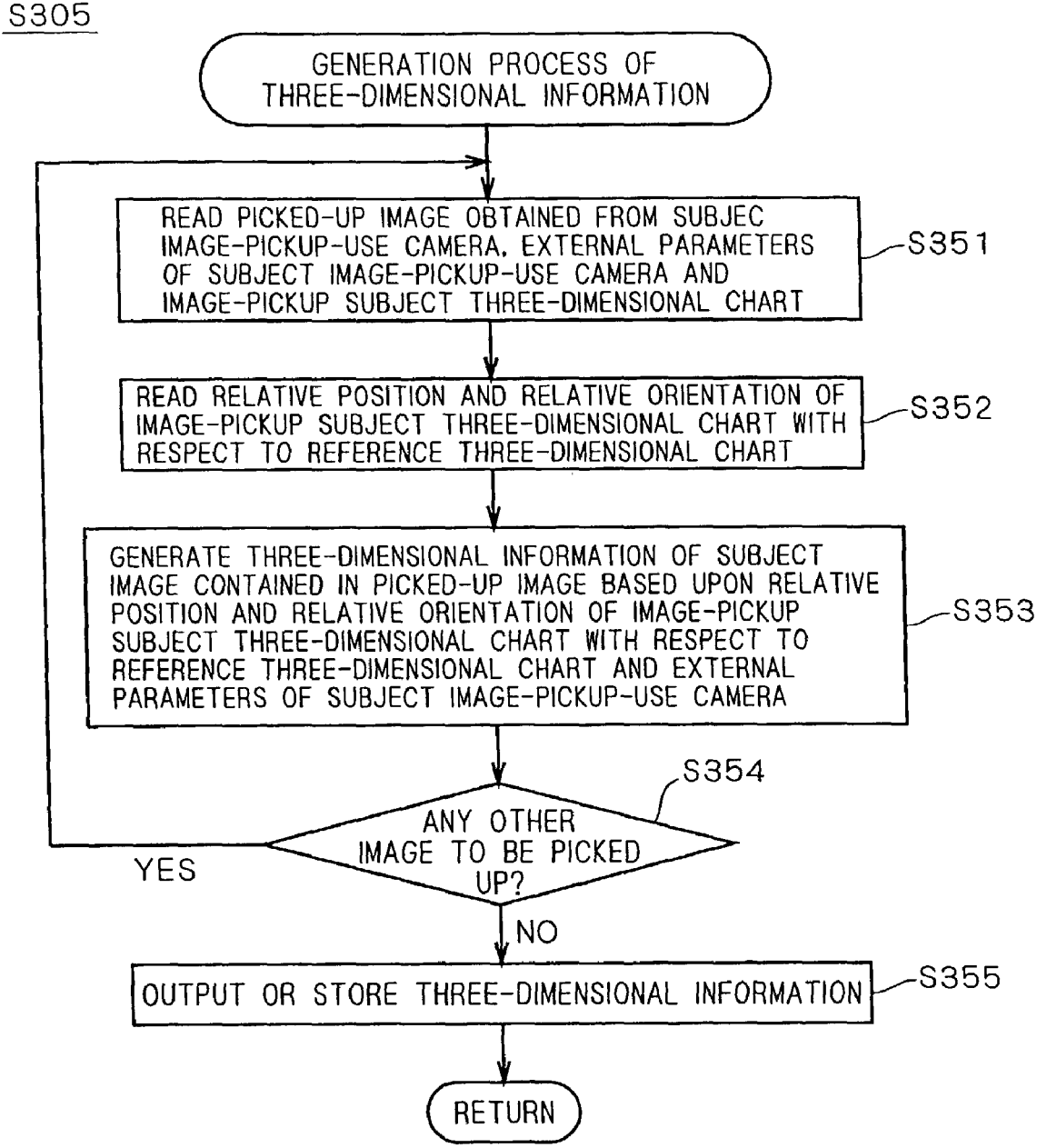
FIG. 79 is a flow chart that shows one portion of processes in the operation processes in the image pickup system.

Next, in image-pickup system 1, a generating process for three-dimensional information is carried out (see FIG. 75; step S305). FIG. 79 shows this step in detail by means of a flow chart.

In image-pickup camera 13, the second calculation unit 197 functions. Then, the second calculation unit 197 reads the picked-up images of subject 30 obtained by subject-use camera 13, the external parameters of subject-use camera- 13-at the time of the image-pickup operation and information for identifying the image-pickup target three-dimensional chart at the time of the image-pickup operation from memory 170 (step S351).

Moreover, the second calculation unit 197 accesses memory 170 reads the relative position and relative orientation of the image-pickup target three-dimensional chart with respect to the reference three-dimensional chart from the relative positional relationship of the plurality of three-dimensional charts 2 that have been preliminarily found by the first calculation unit 196 at step S2 (step S352). At this time, based upon information used for identifying the image-pickup target three-dimensional chart at the time of the image-pickup operation thereof obtained at step S351, the second calculation unit 197 reads the relative position and relative orientation of the image-pickup target three-dimensional chart with respect to the reference three-dimensional chart.

Here, the external parameters of subject-use camera 13, which have been found at the time of the image-pickup operation, and obtained at step S351, correspond to respective parameters indicated in the above-mentioned equation 109. Moreover, the relative position and relative orientation of the image-pickup target three-dimensional chart with respect to the reference three-dimensional chart, obtained at step S352, correspond to respective parameters indicated by the above-mentioned equations 112 and 113. Therefore, when calculations are carried out based upon these parameters, the coordinate values of subject 30, obtained from the picked-up images of subject 30 by subject-use camera 13, can be coordinate-converted to coordinate values represented by the reference coordinate system of the reference three-dimensional chart. In other words, by finding a composite conversion equation between the coordinate conversion equation between equation 109 and the coordinate conversion equation of equation 112 or equation 113, it is possible to find a conversion equation capable of finding coordinate values in the reference coordinate system (world coordinate system) of subject 30.

The second calculation unit 197 finds the above-mentioned composite conversion equation based upon the relative position and relative orientation of the image-pickup target three-dimensional chart with respect to the reference three-dimensional chart and the external parameters of subject-use camera 13 to generate three-dimensional information of the subject image contained in the picked-up images (step S353).

Then, the second calculation unit 197 makes a determination as to whether or not any other picked-up image exists in memory 170, and in the case when if there is any, the processes of step S351 to S353 are repeated (step S354). By this repetition, coordinate values in the reference coordinate system (world coordinate system) from all the images obtained by picking up divided images along the circumference of subject 30; thus, it becomes possible to generate three-dimensional information related to all the circumference of the subject image.

When three-dimensional information related to all the circumference of subject 30 has been generated finally, the corresponding three-dimensional information is outputted or stored, thereby completing all the processes (step S355).

Here, in the above-mentioned operation processes, the order of the respective sequences may be changed slightly. For example, the process (step S302) for calculating the relative positional relationship of among a plurality of three-dimensional charts 2 may be changed so as to be carried out after the process of step S303 or the process of step S304.

As described above, in image pickup system 1 in accordance with this preferred embodiment, a plurality of three-dimensional charts 2 formed so as to have a known structure are placed on the periphery of subject 30. Further, based upon the respective three-dimensional charts contained in images derived from a plurality of three-dimensional charts 2 preliminarily picked up by movable camera 11, the first calculation unit 196 is allowed to find the relative positional relationship among the three-dimensional charts 2, and based upon the image-pickup position and image-pickup orientation of movable camera 11 that has picked up an image of the image-pickup target three-dimensional chart, the relative position and relative operation between movable camera 11 and subject-use camera 13 and the relative positional relationship between the image-pickup target three-dimensional chart and the other three-dimensional charts 2, the second calculation unit 197 is allowed to generate three-dimensional information from the picked-up images obtained from subject-use camera 13.

For this reason, it is possible to greatly widen the movable range of camera system 10, and also to construct a three-dimensional image model with high measuring precision. In other words, in the case when the size of subject 30 is large, the number of three-dimensional charts to be placed on the periphery of subject 30 may be increased in accordance with the subject size. Moreover, even in the case when the number of three-dimensional charts has increased, since the relative positional relationship between the respective three-dimensional charts is found with high precision, it is possible to generate high-precise three-dimensional information even with the expanded movable range of camera system 10.

Moreover, at the time when the relative positional relationship among the plurality of three-dimensional charts placed on the periphery of subject 30, an image-pickup operation is carried out so as to hold at least two three-dimensional charts 2 within the view angle of movable camera 11; thus, it is possible to find the relative positional relationship between at least two three-dimensional charts easily from images obtained by the image-pick-up processes, and consequently to provide an efficient system.

Moreover, in the case when the relative positional relationship among the three-dimensional charts 2 placed on the periphery of subject 30 is found, a plurality of three-dimensional charts 2 may be image-picked up by movable camera 11 while the image-pickup direction (that is, image-pickup orientation) of movable camera 11 is changed. Even in the case of such image-pickup operations, it is possible to appropriately find the relative positional relationship among the three-dimensional charts 2 based upon the respective images obtained by movable camera 11 and the image-pickup direction (the image-pickup orientation) of movable camera 11 at the time of picking up each of the images. Moreover, in the case when at least two three-dimensional charts are held within the view angle of movable camera 11 as described above, the layouts of a plurality of three-dimensional charts 2 come to have limitations by the view angle of movable camera 11; however, in the case when a plurality of three-dimensional charts 2 are image-picked up by movable camera 11 while changing the image-pickup direction of movable camera 11, the layouts of the three-dimensional charts 2 are not subjected to limitation from the view angle of movable camera 11 so that it is possible to increase the degree of freedom in the layout of three-dimensional charts 2.

11. Eleventh Embodiment

The following description will discuss an eleventh preferred embodiment of the present invention. In the present preferred embodiment also, a plurality of three-dimensional charts are placed on the periphery of subject 30, and it is possible to achieve a system which can construct a three-dimensional model with high measuring precision while maintaining a wide movable range. Here, the image pickup system in the present embodiment is virtually the same as the construction explained in the tenth preferred embodiment, and the detailed explanation thereof is omitted.

<Construction of Movable Camera 11>

Figure 80:
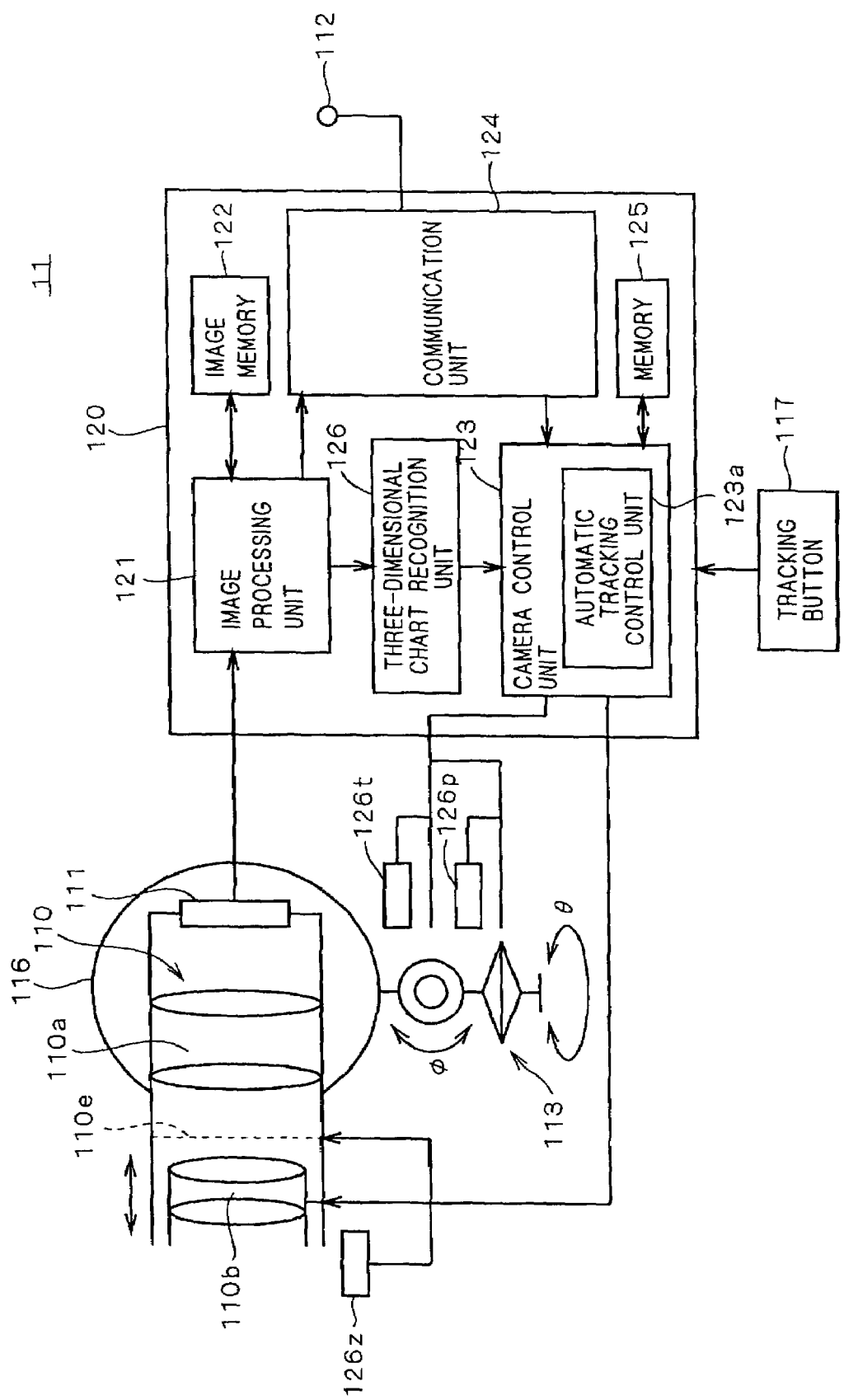
FIG. 80 is a block diagram that shows an inner function of a movable camera in accordance with an eleventh embodiment.

FIG. 80 shows a block diagram that shows an inner function of movable camera 11. As shown in FIG. 80, in movable camera 11, a lens unit 110 and a two-dimensional light-receiving element 111 for photo-electric converting a two-dimensional image formed by this lens unit 110 are integrally housed in a spherical unit 116. Two-dimensional light-receiving element 111 is constituted by a CCD array or the like in which a plurality of pixels are arranged on a light-receiving face. Lens unit 110 is a combination between a fixed lens 110a and a zoom lens 110b, and a diaphragm/shutter mechanism unit 110e is located between these.

Spherical unit 116 is driven by orientation altering device 113 so as to form a desired state in its position and orientation with respect to subject-use camera 13, as described earlier.

Moreover, movable camera 11 receives inputted image signals obtained by two-dimensional light-receiving element 111 so as to carry out data processing such as image processing, and is provided with a control calculation unit 120 and a tracing button 117.

Control calculation unit 120 is provided with an image-processing unit 121, an image memory 122, a camera control unit 123, a communication unit 124, a memory 125 and a three-dimensional chart recognition unit 127. Image processing unit 121 receives an inputted image from two-dimensional light-receiving element 111, and carries out various image-processing operations. Image memory 122 stores image signals obtained in image processing unit 121.

Camera control unit 123 generates driving signals for a zoom lens 110b, orientation-altering device 113 and diaphragm/shutter mechanism unit 110e, and is designed to control the respective parts by outputting these signals. Further, an automatic tracing control unit 123a is installed in camera control unit 123, and automatic tracing control unit 123a achieves an automatic tracing function which drives orientation altering device 113 so as to hold one three-dimensional chart 2 of a plurality of three-dimensional charts 2 within the image pickup range of movable camera 11. Moreover, automatic tracing control unit 123a also has a function for specifying the three-dimensional chart that is the closest to movable camera 11 among the plurality of three-dimensional charts 2. For this reason, when subject-use camera 13 picks up an image of subject 30, camera control unit 123 functions as a controller for controlling the image-pickup orientation of movable camera 11 so as to allow movable camera 11 to pick up an image of the proximate three-dimensional chart (proximate reference object) that is the closest to movable camera 11 among the three-dimensional charts 2.

Three-dimensional chart recognition unit 127 makes a determination as to whether or not image components of three-dimensional chart 2 are contained in an image obtained from image-processing unit 121, and in the case when any image components of three-dimensional chart 2 are included therein, it specifies the position of image components of three-dimensional chart 2 in an image. The recognition of image components in three-dimensional chart 2 is carried out by identifying marker 201 of three-dimensional chart 2. Here, in the case when no image components of three-dimensional chart 2 are specified in an image, three-dimensional chart recognition unit 127 gives a predetermined warning to the user.

Moreover, memory 125 is used for storing the relative positional relationship of a plurality of three-dimensional charts 2 inputted from subject-use camera 13.

Here, when movable camera 11 picks up an image of a desired one of three-dimensional charts 2, automatic tracing control unit 123a finds the relative position and relative orientation of movable camera 11 with respect to the corresponding three-dimensional chart 2 so that the distance between the three-dimensional chart 2 and movable-camera 11. Then, it acquires the relative positional relationship among the three-dimensional charts stored in memory 125, finds the distance between movable camera 11 and another three-dimensional chart 2 so that the three-dimensional chart (proximate three-dimensional chart) that is closest to movable camera 11 is specified. Thereafter, automatic tracing control unit 123a drives and controls orientation-altering device 113 so as to hold the specified proximate three-dimensional chart 2 within the image-pickup range of movable camera 11.

Therefore, in the case when the relative positional relationship of a plurality of three-dimensional charts 2 is preliminarily given to movable camera 11, movable camera 11 specifies the proximate three-dimensional chart 2 that is the closest to movable camera 11 among the three-dimensional charts 2 so that it is possible to automatically trace the proximate three-dimensional chart 2.

Image-processing unit 121 and camera control unit 123 can radio-communicates with subject-use camera 13 through communication unit 124 and communication device 112. With this communication, image data is transmitted to subject-use camera 13, and various information is transmitted and received between movable camera 11 and subject-use camera 13. Movable camera 11 in the present preferred embodiment uses an infrared-ray element that is compatible with IRDA (Infrared Data Association) interface for carrying out infrared communication as communication device 112.

Moreover, as shown in FIG. 4, the first securing groove 115a and the second securing groove 115b formed in securing portion 114 are used for attaching securing portion 114 to subject use camera 13. By attaching securing portion 114 to subject-use camera 13, it is possible to secure movable camera 11 to subject-use camera 13 so that, for example, in the case when the pivotal angle and the elevation or depression angle of movable camera 11 is 0°, the relative position and orientation relationship between movable camera 11 and subject-use camera 13 are set in a predetermined state.

Moreover, tracing button 117 is a button used for switching between a mode for allowing movable camera 11 to automatically trace one three-dimensional chart 2 of a plurality of three-dimensional charts 2 (hereinafter, referred to simply as "automatic tracing mode") and a mode for carrying out a tracing operation by a user's instruction from subject-use camera 13 (hereinafter, referred to simply as "manual mode"). In the case when the automatic tracing mode is set, the above-mentioned automatic tracing control unit 123a in camera control unit 123 is allowed to function.

Next, the following description will discuss the operation of movable camera 11 having the above-mentioned arrangement.

Any one of filters of R (red), G (green) and B (blue) is attached to each two-dimensional light-receiving element 111 for each pixel, and light, which has formed an image on two-dimensional light-receiving element 111, is photo-electrically converted by this two-dimensional light-receiving element 111 for each of RGB color components. Image signals obtained by two-dimensional light-receiving elements 111 are AID converted to image data that is digital signal by image processing unit 121, and subjected to various image processings such as a white-balance correcting operation and a γ-correcting operation. This image data is stored in image memory 122, or transmitted to subject-use camera 13 through communication unit 124, or given to three-dimensional chart recognition unit 127.

In the case when the user presses tracing button 117 to set the automatic tracing mode, three-dimensional chart recognition unit 127 analyzes the image data to detect marker 201, and supplies a signal indicating, for example, what degree the image component of marker 201 deviates from the image center to camera control unit 123. Consequently, camera control unit 123 is allowed to find the amount of drive (that is, tracing data) of orientation altering device 113 used for shifting the image component of maker 201 to the image center, and based upon the amount of drive, controls the driving operation of orientation altering device 113. Here, when subject-use camera 13 picks up an image of subject 30, the above-mentioned function of automatic tracing control unit 123a carries out such a process that movable camera 11 automatically traces the proximate three-dimensional chart 2 that is the closest to movable camera 11. Thus, orientation altering device 113 is controlled so that the image of three-dimensional chart 2 is always converged and formed on two-dimensional light-receiving element 111.

Here, in the case of the manual mode, in response to a user's instruction received from subject-use camera 13, camera control unit 123 controls orientation altering device 113.

Moreover, camera control unit 123 is designed so as to receive inputted detection results from the respective sensors 126t, 126p, 126z; thus, based upon information inputted from angle sensors 126t, 126p, it generates rotation angle information, and based upon information inputted from sensor 126z, it generates zoom information. Camera control unit 123 is designed to output the information to subject-use camera 13 through communication unit 124.

When the shutter button of subject-use camera 13 is pressed, movable camera 11 receives an image-pickup command from subject-use camera 13, and in response to the receipt of the image pickup command, carries out an image-pickup operation by using two-dimensional light-receiving element 111 to generate image data. Then, the image data and lens rotation angle information, obtained at this time, are transmitted to subject-use camera 13 through communication unit 124.

<Construction of Subject-use Camera 13>

The following description will discuss the construction of subject-use camera (subject image-pickup-use camera) 13. The construction of subject-use camera 13 is the same as that shown in the tenth preferred embodiment (see FIG. 72).

When image data preliminarily obtained by picking up images of a plurality of three-dimensional charts is inputted thereto, the first calculation unit 196 achieves a calculating function (first calculator) which finds a relative positional relationship among three-dimensional charts 2 based upon image components of the respective three-dimensional charts 2 contained in the image data. When the first calculation unit 196 finds the relative positional relationship of the three-dimensional charts 2, it stores information relating to the relative positional relationship in memory 170, and also transmits this to movable camera 11 through control unit 160 and communication unit 167. Consequently, movable camera 11 is allowed to obtain information relating to the relative positional relationship of the three-dimensional charts 2, and the corresponding information is stored in memory 125 (see FIG. 80).

Moreover, in synchronism with the image-picking-up operation of subject-use camera 13 on subject 30, based upon image data obtained from movable camera 11 when the movable camera 11 picks up an image of the proximate three-dimensional chart closest to movable camera 11 among the three-dimensional charts 2, the second calculation unit 197 finds the relative image-pickup position and image-pickup orientation of movable camera 11 with respect to the proximate three-dimensional chart. Further, the first calculation unit 197 achieves a calculating function which finds three-dimensional information of subject 30 from picked-up images obtained from subject-use camera 13, based upon the relative image-pickup position and image-pickup orientation of movable camera 11 with respect to the proximate three-dimensional chart, the relative position and relative orientation between movable camera 11 and subject-use camera 13 and the relative positional relationship between the proximate three-dimensional chart and another three-dimensional chart 2.

In the case when movable camera 11 image-picks up the proximate three-dimensional chart among a plurality of three-dimensional charts 2, the image obtained from movable camera 11 is allowed to contain image components of the proximate three-dimensional chart 2 with the greatest size thereof, in comparison with a case in which movable camera 11 picks up an image of another three-dimensional chart 2.

For this reason, the second calculation unit 197 makes it possible to find the relative position and relative orientation of movable camera 11 with respect to the proximate chart with high precision. As a result, even in the case when three dimensional information of subject 30 is found based upon picked-up images obtained from subject-use camera 13, it becomes possible to find three dimensional information with high precision.

<Principle of Generation of Three-dimensional Information>

The principle of the generation of three-dimensional information applied in this preferred embodiment is the same as that explained in the tenth preferred embodiment.

When, upon picking up an image of a side face of subject 30 by using subject-use camera 13, the proximate three-dimensional chart 2 is image-picked up by movable camera 11, it is possible to specify the relative position and relative orientation of movable camera 11 at the time of image-picking up the proximate three-dimensional chart 2, and it is also possible to specify the relative position and relative orientation between subject-use camera 13 and movable camera 11; therefore, the external parameters of subject-use camera 13 are found, and based upon the image obtained from subject-use camera 13, it is possible to generate three-dimensional information of subject 30.

Further, when, upon picking up an image of subject 30 by subject-use camera 13, movable camera 11 image-picks up the proximate three-dimensional chart 2 that is closest to movable camera 11, it is possible to specify the relative position and relative orientation of movable camera 11 at the time of image-picking up the proximate three-dimensional chart 2 with high precision.

In other words, by preliminarily finding the relative positional relationship among a plurality of three-dimensional charts 2, when movable camera 11 image-picks up one of the three-dimensional charts 2, it is possible to determine whether or not the three-dimensional chart is located closest to movable camera 11, and it is also possible to specify the proximate three-dimensional chart that is closest to movable camera 11 among the three-dimensional charts 2.

<Operation Process of Image Pickup System 1>

The following description will discuss the operation process of image-pickup system 1. Here, the operation process of image pickup system 1 in the present preferred embodiment is carried out in accordance with a flow chart of FIG. 75 used in the tenth preferred embodiment; however, detailed process sequences in the respective steps are slightly different, and the following description will discuss these points.

When the process of step S327 is carried out in a flow chart of FIG. 76, data is stored, and during the process, when the relative positional relationship is found among a plurality of three-dimensional chart 2, subject-use camera 13 transmits information relating to the relative positional relationship to movable camera 11. Then, movable camera 11 stores information relating to the relative positional relationship received from subject-use camera 13 in memory 125.

With the foregoing processes, the relative positional relationship among a plurality of three-dimensional charts 2 is found, and a plurality of three-dimensional charts 2 are also classified to one reference three-dimensional chart and the other three-dimensional charts with the relative positional relationship of all the other three-dimensional charts with respect to the reference three-dimensional chart being determined; thus, the processes at step S302 are completed.

Figure 81:
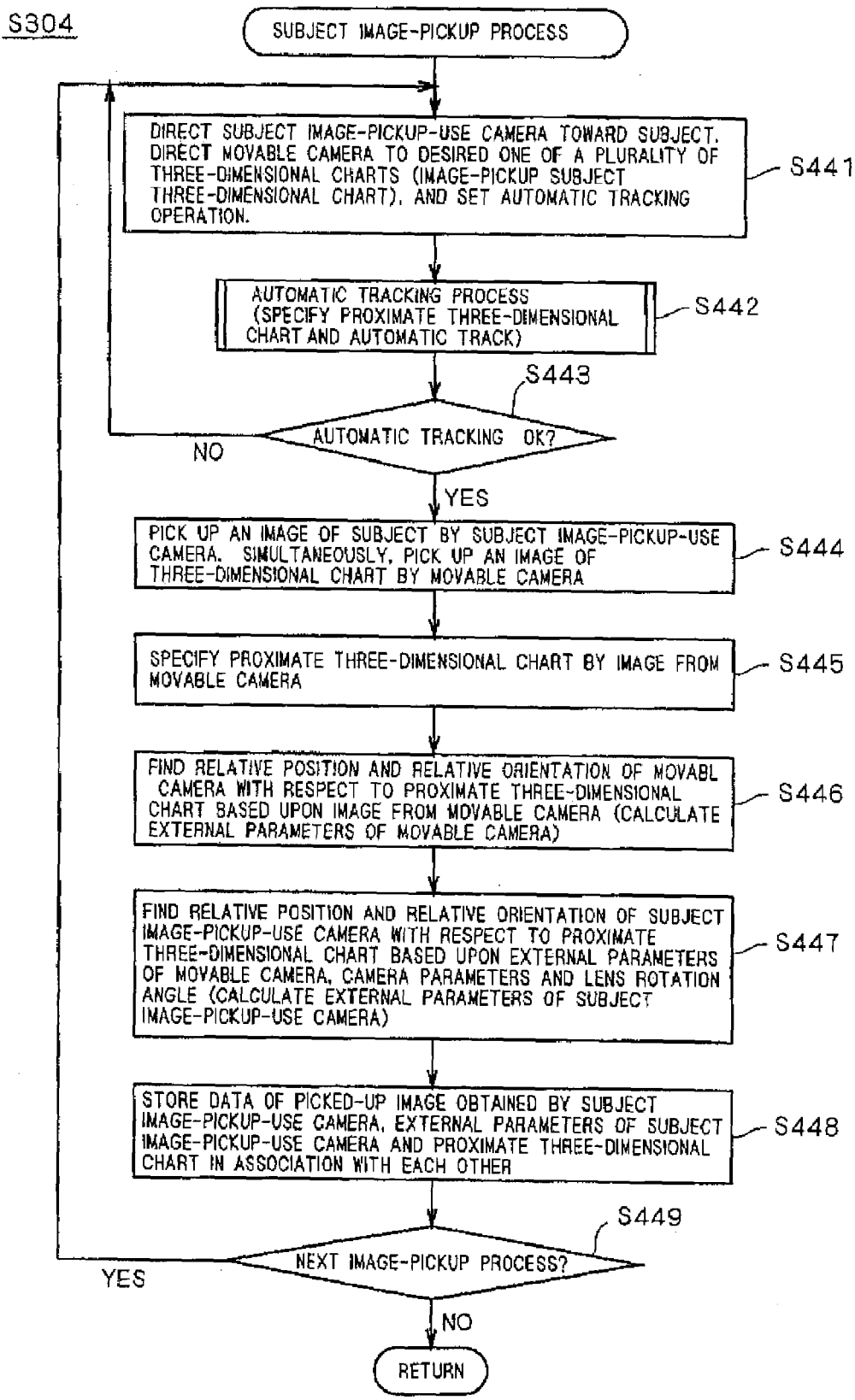
FIG. 81 is a flow chart that shows one portion of processes in the operation processes in accordance with the eleventh embodiment.

Next, the processes for calculating the relative position and the relative orientation between subject-use camera 13 and movable camera 11 are carried out (see FIG. 75; step S303), and the subject image-pickup process for picking up an image of subject 30 that is a target for generation of three-dimensional information is carried out (see FIG. 75; step S304). FIG. 81 shows this process of the present preferred embodiment in detail by means of a flow chart.

At step S441, the user places camera system 10 at a desired position on the periphery of subject 30, and directs subject-use camera 13 to subject 30. Then, the user sets movable camera 11 to the manual mode, and directs movable camera 11 to a desired one of a plurality of three-dimensional charts 2. At the time when the three-dimensional chart serving as the image-pickup subject is held within the view angle of movable camera 11, the user sets movable camera 11 to the automatic tracing mode.

Figure 82:
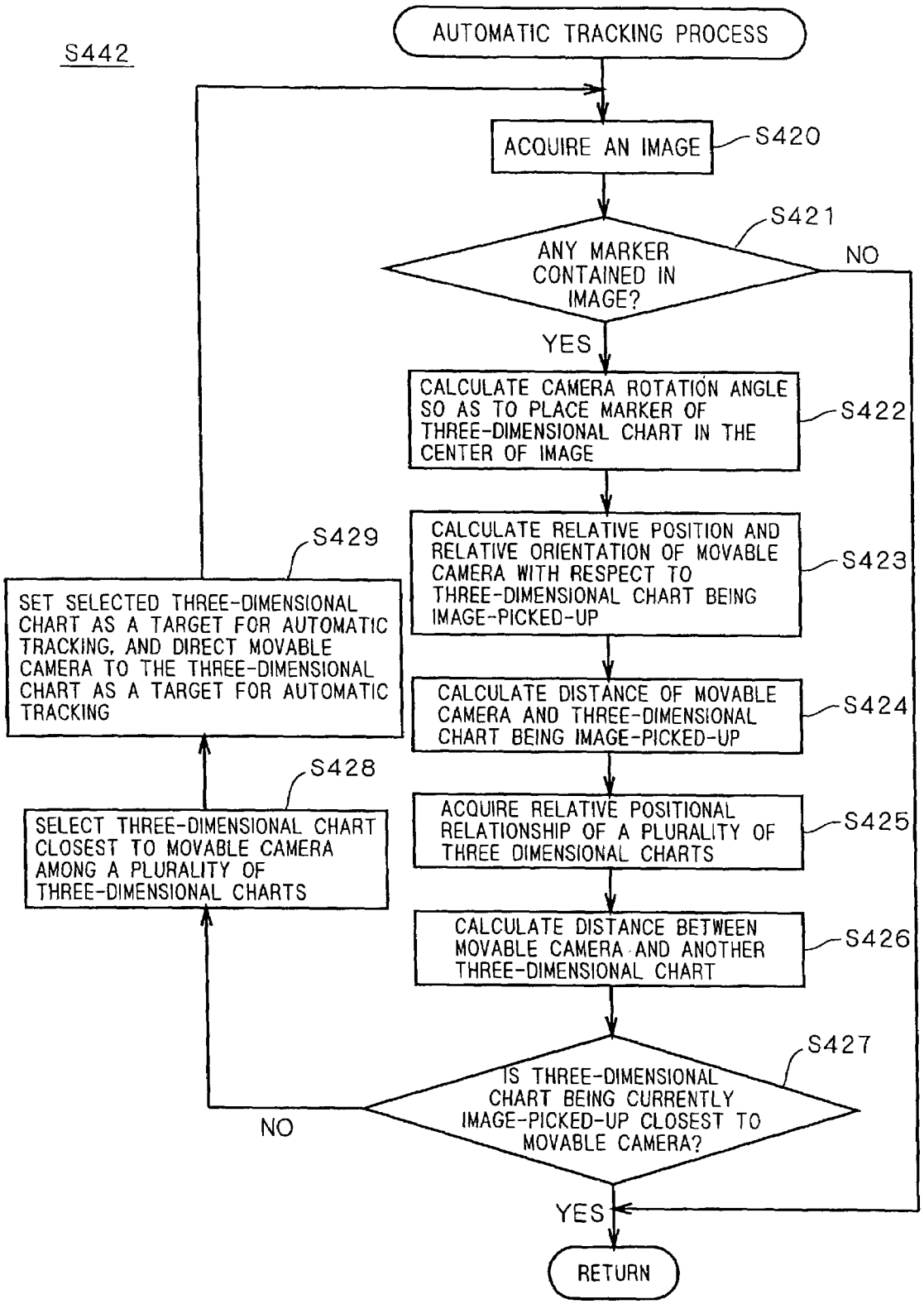
FIG. 82 is a flow chart that shows one portion of processes in the operation processes in accordance with the eleventh embodiment.

Thus, the automatic tracing process is carried out in movable camera 11 (step S442). This automatic tracing process is a process which specifies the proximate three-dimensional chart that is closest to movable camera 11 among a plurality of three-dimensional charts 2 so as to automatically trace the proximate three-dimensional chart. FIG. 82 shows this automatic tracing process in detail by means of a flow chart.

First, two-dimensional light-receiving element 111 and image processing unit 121 function in movable camera 11 to carry out an image pickup process of the three-dimensional chart (step S420). Image pickup unit 121 gives image data obtained by the image-pickup operation to three-dimensional chart recognition unit 127. Three-dimensional chart recognition unit 127 makes a determination as to whether or not image components of marker 201 are contained in the image obtained by the image-pickup process (step S421), and in the case when no image components of marker 201 are included therein, the automatic tracing process results in a failure, thereby passing through the automatic tracing process. In contrast, in the case when image components of marker are included in the image, since the automatic tracing process is available, the sequence proceeds to step S422.

In movable camera 11, automatic tracing control unit 123a functions so that the camera rotation angle is calculated in such a manner that marker 201 of three-dimensional chart 2 currently being image-picked up (a three-dimensional chart 2 serving as the image-pickup subject at step S441 (see FIG. 81), or a three-dimensional chart 2 to be used as the image-pickup subject at step S429, which will be described later) is placed in the center of the image (step S422). Camera control unit 123 gives a driving signal to orientation altering device 113 so as to set the camera rotation angle obtained by the calculation. Thus, movable camera 11 is allowed to automatically trace the three-dimensional chart 2 currently being image-picked up.

Then, based upon the image picked up by movable camera 11, automatic tracing control unit 123a calculates the relative position and relative orientation of movable camera 11 with respect to the three-dimensional chart 2 currently being image-picked up (that is, the three-dimensional chart 2 being automatically traced)(step S423). Here, in the tenth preferred embodiment, automatic tracing control unit 123a carries out the same processes as the above-mentioned step S326 in the tenth preferred embodiment, so that the relative position and relative orientation of movable camera 11 with respect to three-dimensional chart 2 currently being image-picked up can be calculated.

Based upon the relative position and relative orientation of movable camera 11 with respect to three-dimensional chart 2 currently being image-picked up, automatic tracing control unit 123a calculates the distance between the three-dimensional chart 2 currently being image-picked up and movable camera 11 (step S424).

Moreover, automatic tracing control unit 123a acquires the relative positional relationship among a plurality of three-dimensional charts 2 from memory 125 (step S425) and calculates the respective distances between the other three-dimensional charts 2 and movable camera 11 (step S426). Here, in the case when the relative positional relationship among the three-dimensional charts 2 has been preliminarily found, based upon the relative position and relative orientation of movable camera 11 with respect to one three-dimensional chart, it is possible to easily find the distance between each three-dimensional chart 2 and movable camera 11.

Then, automatic tracing control unit 123a makes a determination as to whether or not the three-dimensional chart 2 currently being picked up is closest to movable camera 11 (step S427), and if YES, specifies the three-dimensional chart 2 currently being image-picked up as the proximate three-dimensional chart, thereby passing through the automatic tracing process with the automatic tracing state being maintained.

In contrast, if the determination shows that the three-dimensional chart 2 currently being image-picked up is not the three-dimensional chart 2 closest to movable camera 11, the sequence proceeds to step S428, and automatic tracing control unit 123a selects the three-dimensional chart (that is, the proximate three-dimensional chart) closest to movable camera 11 among the three-dimensional charts 2 based upon the distance between the respective three-dimensional charts 2 and movable camera 11 (step S428).

Then, automatic tracing control unit 123a sets the proximate three-dimensional chart 2 selected at step S428 as the target for automatic tracing process, and directs movable camera 11 to the proximate three-dimensional chart 2 (step S429). More specifically, based upon the relative positional relationship among a plurality of three-dimensional charts 2, it calculates the relative position and relative orientation of movable camera 11 with respect to the proximate three-dimensional chart 2, and drives orientation altering device 113 so that movable camera 11 is allowed to hold the proximate three-dimensional chart 2 within the view angle; thus, the proximate three-dimensional chart 2 forms the three-dimensional chart of the target for the automatic tracing process.

Further, an image-pickup operation is again carried out (step S420), and the automatic tracing process is carried out so as to hold marker image components of the proximate three-dimensional chart 2 in the center of image (step S422).

Thereafter, at step S427, since the proximate three-dimensional chart 2 is being held by movable camera 11, the sequence is allowed to pass through the automatic tracing process with the automatic tracing state of the proximate three-dimensional chart 2 being maintained.

With the foregoing processes, the automatic tracing process in movable camera 11 (step S442) is completed, and the proximate three-dimensional chart that is closest to movable camera 11 is specified among a plurality of three-dimensional charts 2, and in this state, movable camera 11 automatically traces the proximate three-dimensional chart.

The sequence returns to the flow chart of FIG. 81, and then proceeds to step S443.

The user carries out operations such as framing adjustments of subject-use camera 13 so as to pick up an image of subject 30 by using subject-use camera. The user may change the position or the orientation of camera system 10 so as to carry out the framing adjustments; however, in such a case, the automatic tracing process of the proximate three-dimensional chart 2 by movable camera 11 sometimes results in failure.

For this reason, three-dimensional chart recognition unit 127 of movable camera 11 makes a determination as to whether or not marker 201 of the proximate three-dimensional chart 2 is held within the view angle so that it is determined whether or not the automatic tracing operation is normally carried out (step S443). If the automatic tracing operation is preferably carried out, the sequence proceeds to step S444, and if the automatic tracing operation results in a failure, the sequence returns to step S441 where, after manual operations have been carried out so as to hold a desired three-dimensional chart within the view angle among a plurality of three-dimensional charts, the automatic tracing operation is again set (step S441).

In the case when the automatic tracing operation is carried out desirably, after having finished the framing adjustments of subject-use camera 13, the user presses shutter button 161 of subject-use camera 13 so as to give an instruction for an image-pickup operation of subject 30. In response to this, subject-use camera 13 picks up an image of subject 30, and simultaneously, movable camera 11 carries out an image-pickup operation on the proximate three-dimensional chart 2 (step S444).

Then, the picked-up image of subject 30 obtained by subject-use camera 13 is stored in memory 170 and the image data of the proximate three-dimensional chart picked up by movable camera 11 and the lens rotation angle information are also stored in memory 170.

Here, the second calculation unit 197 functions in subject-use camera 13. The second calculation unit 197 reads images obtained by movable camera 11 and stored in memory 170, and specifies which three-dimensional chart among a plurality of three-dimensional charts is image-picked up as the proximate three-dimensional chart (step S445).

The following description will discuss one example in which the proximate three-dimensional chart is specified among a plurality of three-dimensional charts. For example, chart patterns CP of a plurality of three-dimensional charts 2 are formed so as to have respectively different colors. Then, calculation unit 195 identifies the color of the proximate three-dimensional chart in the images obtained by movable camera 11 so that it becomes possible to identify the three-dimensional chart that has been image-picked up as the proximate three-dimensional chart among the three-dimensional charts.

Moreover, by forming chart patterns CP of the three-dimensional charts 2 with different colors as described above, it is possible to specify each three-dimensional chart 2 when the relative positional relationship among the three-dimensional charts 2 is found.

Then, based upon the image of the proximate three-dimensional chart 2 obtained from movable camera 11, the second calculation unit 197 finds the relative position and relative orientation of movable camera 11 with respect to the proximate three-dimensional chart 2 (step S446). Thus, the external parameters of movable camera 11 at the time when movable camera 11 has image-picked up the proximate three-dimensional chart is calculated.

Based upon the picked-up image of the proximate three-dimensional chart 2 that is located closest to movable camera 11, the second calculation unit 197 calculates the external parameters of movable camera 11 so that, in comparison with a case in which the external parameters of movable camera 11 are calculated based upon picked-up images of the other three-dimensional charts 2, it is possible to provide greater image components relating to chart pattern CP of the proximate three-dimensional chart 2 contained in the images, and consequently to calculate the external parameters with high precision.

Then, based upon the external parameters of movable camera 11 obtained at step S446, the camera parameters obtained at step S334 explained in the tenth preferred embodiment and the lens rotation angle information at the time of image-pickup processes at step S444, the second calculation unit 197 finds the relative position and relative orientation of subject-use camera 13 with respect to the proximate three-dimensional chart (step S447). In other words, the external parameters of subject-use camera 13 are found. Thus, the respective parameters can be obtained, and it becomes possible to convert coordinate values of subject 30 obtained from the picked-up image of subject 30 to coordinate values in the chart coordinate system Xc of the proximate three-dimensional chart.

Then, the picked-up image obtained from subject-use camera 13, the external parameters of subject-use camera 13 obtained as described above and information indicating which chart is image-picked up as the proximate three-dimensional chart among a plurality of three-dimensional charts 2 (information for specifying the proximate three-dimensional chart) are stored in memory 170 as data in association with each other (step S448).

Based upon processes at steps S441 to S448, it is possible to find parameters used for converting images obtained from picked-up images of subject 30 by subject-use camera 13 to the chart coordinate system of the proximate three-dimensional chart. By repeating such processes so as to pick up divided images along the circumference of subject 30, it becomes possible to generate parameters related to all the circumference of subject 30.

At step S449, when it is determined that the user picks up another side face of subject 30, the processes from step S441 are carried out repeatedly. In this case also, at step S442, movable camera 11 specifies the proximate three-dimensional chart 2, and an automatic tracing operation is carried out on the proximate three-dimensional chart 2. In other words, in the case when the user moves around subject 30 so as to pick up images of the circumference of subject 30 in a divided manner, each time the user picks up an image, movable camera 11 specifies the proximate three-dimensional chart 2 among a plurality of three-dimensional charts 2, and carries out an automatic tracing operation and picks up the image.

Moreover, when the user has carried out image-pickup operations from all the circumference of subject 30, the user instructs completion of the image-pickup operations by giving a predetermined input through operation buttons 164. In the case when this instruction input for the completion of the image-pickup operations is given, camera system 10 completes the subject image-pickup processes (step S304 in FIG. 75).

Here, in the case when the user repeatedly picks up images of subject 30 while moving around subject 30, in each image-pickup operation, a different three-dimensional chart is specified as the proximate three-dimensional chart to be picked up by movable camera 11. For this reason, the external parameters of subject-use camera 13 found at the time of each image-pickup operation are related to a different three-dimensional chart serving as a reference.

Next, in image-pickup system 1, a generating process for three-dimensional information is carried out (see FIG. 75; step S305). FIG. 83 shows this step in detail by means of a flow chart.

In image-pickup camera 13, the second calculation unit 197 functions. Then, the second calculation unit 197 reads the picked-up images of subject 30 obtained by subject-use camera 13, the external parameters of subject-use camera 13 at the time of the image-pickup operation and information for specifying the proximate three-dimensional chart at the time of the image-pickup operation from memory 170 (step S451).

Moreover, the second calculation unit 197 accesses memory 170 and reads the relative position and relative orientation of the proximate three-dimensional chart with respect to the reference three-dimensional chart from the relative positional relationship of the plurality of three-dimensional charts 2 that have been preliminarily found by the first calculation unit 196 at step S302 (see FIG. 75) at step S452. At this time, based upon information used for identifying the proximate three-dimensional chart at the time of the image-pickup operation thereof at step S451, the second calculation unit 197 reads the relative position and relative orientation of the proximate three-dimensional chart with respect to the reference three-dimensional chart.

Here, the external parameters of subject-use camera 13, which have been found at the time of the image-pickup operation, and obtained at step S451, correspond to respective parameters indicated in the above-mentioned equation 109. Moreover, the relative position and relative orientation of the proximate three-dimensional chart with respect to the reference three-dimensional chart, obtained at step S452, correspond to respective parameters indicated by the above-mentioned equations 112 and 113. Therefore, when calculations are carried out based upon these parameters, the coordinate values of subject 30, obtained from the picked-up images of subject 30 by subject-use camera 13, can be coordinate-converted to coordinate values represented by the reference coordinate system of the reference three-dimensional chart. In other words, by finding a composite conversion equation between the coordinate conversion equation between equation 109 and the coordinate conversion equation of equation 112 or equation 113, it is possible to find a conversion equation capable of finding coordinate values in the reference coordinate system (world coordinate system) of subject 30.

The second calculation unit 197 finds the above-mentioned composite conversion equation based upon the relative position and relative orientation of the proximate three-dimensional chart with respect to the reference three-dimensional chart and the external parameters of subject-use camera 13 to generate three-dimensional information of the subject image contained in the picked-up images (step S453).

Then, the second calculation unit 197 makes a determination as to whether or not any other picked-up image exists in memory 170, and in the case when if there is any, the processes of step S451 to S453 are repeated (step S454). By this repetition, coordinate values in the reference coordinate system (world coordinate system) from all the images obtained by picking up divided images along the circumference of subject 30; thus, it becomes possible to generate three-dimensional information related to all the circumference of the subject image.

When three-dimensional information related to all the circumference of subject 30 has been generated finally, the corresponding three-dimensional information is outputted or stored, thereby completing all the processes (step S455).

Here, in the above-mentioned operation processes, the order of the respective sequences may be changed slightly. For example, the process (step S302) for calculating the relative positional relationship among a plurality of three-dimensional charts 2 may be changed so as to be carried out after the process of step S303.

As described above, in image pickup system 1 in accordance with this preferred embodiment, a plurality of three-dimensional charts 2 formed so as to have a known structure are placed on the periphery of subject 30. Further, when camera system 10 is placed at a desired position on the periphery of subject 30 so as to pick up an image of subject 30, movable camera 11 is arranged to pick up an image of the proximate three-dimensional chart that is located closest to movable camera 11.

For this reason, it is possible to greatly widen the movable range of camera system 10, and also to construct a three-dimensional image model with high measuring precision. In other words, in the case when the size of subject 30 is large, the number of three-dimensional charts to be placed on the periphery of subject 30 may be increased in accordance with the subject size. Moreover, even in the case when the number of three-dimensional charts has increased, since the relative positional relationship between the respective three-dimensional charts is found with high precision and since the external parameters of subject-use camera 13 can be found with high precision, it is possible to generate high-precision three-dimensional information even with the expanded movable range of camera system 10.

Moreover, based upon the respective three-dimensional charts contained in images of a plurality of three-dimensional charts 2 preliminarily picked up by movable camera 11, the first calculation unit 196 finds the relative positional relationship among a plurality of charts 2, and based upon the relative positional relationship, the proximate three-dimensional chart is specified by movable camera 11. For this reason, it is possible to easily determine whether or not the three-dimensional chart that is an image-pickup subject of movable camera 11 is located closest to movable camera 11, and consequently to easily specify the proximate three-dimensional chart 2 among a plurality of three-dimensional charts.

Moreover, based upon the image-pickup position and image-pickup orientation of movable camera 11 at the time of picking up an image of the proximate three-dimensional chart, the relative position and relative orientation between movable camera 11 and subject-use camera 13 and the relative positional relationship between the proximate three-dimensional chart and the other three-dimensional charts 2, the second calculation unit 197 is allowed to generate three-dimensional information of a subject from picked-up images obtained from subject-use camera 13; therefore, even in the case when the size of subject 30 is large, it is possible to find the three-dimensional information of the subject 30 with high precision.

Moreover, in image pickup system 1 of the present preferred embodiment, the relative positional relationship of a plurality of three-dimensional charts 2 has been found based upon the respective three-dimensional charts contained in images of a plurality of three-dimensional charts preliminarily picked up by movable camera 11, and when subject-use camera 13 picks up an image of subject 30, based upon a picked-up image of a desired three-dimensional chart among a plurality of three-dimensional charts 2 by movable camera 11, the relative position and relative orientation of movable camera 11 with respect to the corresponding three-dimensional chart are found, and based upon the relative position and relative orientation of movable camera 11 with respect to the corresponding three-dimensional chart and the relative positional relationship among the plurality of three-dimensional charts 2, the proximate three-dimensional chart is specified from the plurality of three dimensional charts 2; therefore, it is possible to find the proximate three-dimensional chart located closest to movable camera 11 accurately.

Moreover, in this image pickup system 1, the control of the image-pickup orientation relating to movable camera 11 is carried out so that movable camera 11 automatically traces the specified proximate three-dimensional chart; therefore, even in the case when framing adjustments, etc. of subject 30 are carried out by subject-use camera 13, movable camera 11 is allowed to hold the proximate three-dimensional chart.

Moreover, at the time of the automatic tracing operation, the image-pickup orientation of movable camera 11 is controlled so that the image components of marker 201 are moved to a predetermined position in the image obtained by movable camera 11; thus, it is possible to carry out the automatic tracing operation accurately in a comparatively easy manner.

Here, a controller (camera control unit 123), which allows movable camera 11 to pick up an image of the proximate chart that is closest to movable camera 11, is installed in movable camera 11; therefore, it is possible to provide an efficient controlling operation for allowing movable camera 11 to hold the proximate three-dimensional chart.

Further, upon finding the relative positional relationship among a plurality of three-dimensional charts 2 placed on the periphery of subject 30, an image pickup process may be carried out with at least two three-dimensional chart 2 being held within the view angle of movable camera 11; thus, it is possible to provide a more efficient method since the relative positional relationship of at least two three-dimensional charts 2 is found easily from a picked-up image.

Moreover, upon finding the relative positional relationship among a plurality of three-dimensional charts 2 placed on the periphery of subject 30, the plurality of three-dimensional charts may be picked up by movable camera 11 while the image-pickup direction (that is, image-pickup orientation) of movable camera 11 is altered. Even in such an image-pickup operation, based upon the respective images obtained from movable camera 11 and the image-pickup direction (image-pickup orientation) of movable camera 11 at the time of picking up each image, it is possible to properly find the relative positional relationship among a plurality of three-dimensional charts. Furthermore, in the above-mentioned image-pickup mode in which at least two three-dimensional charts 2 are held within the view angle of movable camera 11, the layout of a plurality of three-dimensional charts is limited by the view angle of movable camera 11; however, in the case of an image-pickup mode in which a plurality of three-dimensional charts 2 are image-picked up by movable camera 11 with the image-pickup direction of the movable camera 11 being altered, the layout of a plurality of three-dimensional charts is not limited by the view angle of movable camera 11; therefore, it is possible to increase the degree of freedom in the layout of three-dimensional charts 2.

12. MODIFIED EXAMPLES

The above-mentioned description has discussed preferred embodiments of the present invention; however, the present invention is not intended to be limited by the contents of the preferred embodiments.

For example, in the above-mentioned calculation processes, not only one target unit graphic form but also a plurality of target unit graphic forms may be selected, and respective external parameters are calculated and the resulting plurality of external parameters are averaged; thus, it becomes possible to further improve the calculation precision in the external parameters.

In the above-mentioned preferred embodiments, camera external parameters are calculated in subject-use camera 13 so that subject-use camera 13 functions as a calibration-use information processing device. Instead of this, computer 15 may communicates with both of the cameras 11, 13, and by using computer 15, the respective cameras 11, 13 may be subjected to a synchronizing operation, calculation processes of image data and data storage processes. In this case, computer 15 functions as a calibration-use information processing device of the cameras.

Further, movable camera 11 may calculate image data to provide external parameters, and may communicate with computer 15 or subject-use camera 13. Information communications between these devices may be carried out through communication cables.

Moreover, in the above-mentioned preferred embodiments, the calculations of external parameters of movable camera 11 are executed only when subject-use camera 13 picks up an image; however, based upon an image of three-dimensional chart 2 held by movable camera 11 in real time, detection may be successively made as to which portion of three-dimensional chart 2 is being held so that external parameters may be calculated in real time. In this case, the positions of the apexes of three-dimensional chart 2 on the image are detected in real time so that it is possible to omit marker 201.

Furthermore, in the above-mentioned preferred embodiments, straight lines extracted from an image are grouped, and lattice-point coordinates of a unit trapezoid are then found; however, after the coordinates of the lattice points have been extracted by a corner extraction operator, straight lines passing through lattice points may be determined. Alternatively, repeated calculation processes may be carried out to find out how straight lines on three-dimensional chart 2 may be projected so as to make them coincident with the resulting edge image; thus, external parameters may be calculated.

Here, upon extracting four straight lines in the above-mentioned preferred embodiments, the apexes of three-dimensional chart 2 are not necessarily required. Therefore, with respect to three-dimensional chart 2, a three-dimensional shape, which is formed by cutting a portion including an apex of a pyramid with a plane in parallel with the bottom surface, for example, a three-dimensional shape such as a truncated pyramid shown in FIG. 84A, may be used.

In this case, the adjacent unit trapezoids may be painted in mutually different hues in a separated manner.

Movable camera 11 and subject-use camera 13 may be connected indirectly through a coupling mechanism.

Moreover, three-dimensional charts 2 may be arranged on a floor. In this case, it is preferable to direct the bottom face of each pyramid shape downward.

Three-dimensional chart 2 may be formed into not a regular polygonal pyramid shape, but a polygonal pyramid shape (uneven polygonal pyramid shape). However, the application of a regular polygonal pyramid shape has an advantage in which the observing precisions of unit graphic forms in all the circumferential directions are virtually equal.

Furthermore, as shown in FIG. 84B, a cone shape may be used as three-dimensional chart 2. In this case, since a chart is formed on the curved surface as a single side face, provision is made so that cross ratios of the distances between straight lines are found so as to identify unit trapezoids. Moreover, since the cone shape has a single side face, mutual discrimination between side faces is not necessary, and provision is made so that, within a range of one cycle of the side face, the cross ratios of the sides of the respective unit trapezoids are made different from each other. In the case of a cone shape, it is possible to observe unit graphic forms from all the circumferential directions with the same precision.

Moreover, a device construction may be made so that manual operations of movable camera 11 are carried out by operation keys from subject-use camera 13.

Furthermore, markers 201 may be formed by applying fluorescent paint without providing a light-emitting property, or may be simply prepared as apexes in the case of tracing (tracking) use.

Here, with respect to a program to be executed by a CPU so as to carry out image processing, etc. in accordance with the preferred embodiments, this is not necessarily written in ROM preliminarily. In the calibration-use information processing device, a program may be preliminarily read from a recording medium through a reading device, etc., and stored, and may be executed later.

Moreover, in the above-mentioned preferred embodiments, all the sequence of image-processing is executed by a CPU based upon software; however, one portion or all the portions of the processes may be achieved by an exclusively-used circuit.

Image-pickup processes by the respective movable cameras 11*a* in the second preferred embodiment may be carried out based upon instructions, etc. from computer 15.

Moreover, in the above-mentioned embodiments, the camera orientation is found by detecting four points on a pattern drawn on a chart; however, not limited by this arrangement, the camera orientation may be detected in the following manner.

Instead of charts of the above-mentioned preferred embodiments, objects having a known shape (for example, square pyramid) are placed. In a camera, model data with respect to this shape is stored in the camera coordinate system, and a picked-up image and a model image projected onto a face equivalent to the image-pickup face are compared, and when these are coincident with each other, the orientation of the model is found so as to detect the camera orientation.

Figure 85:
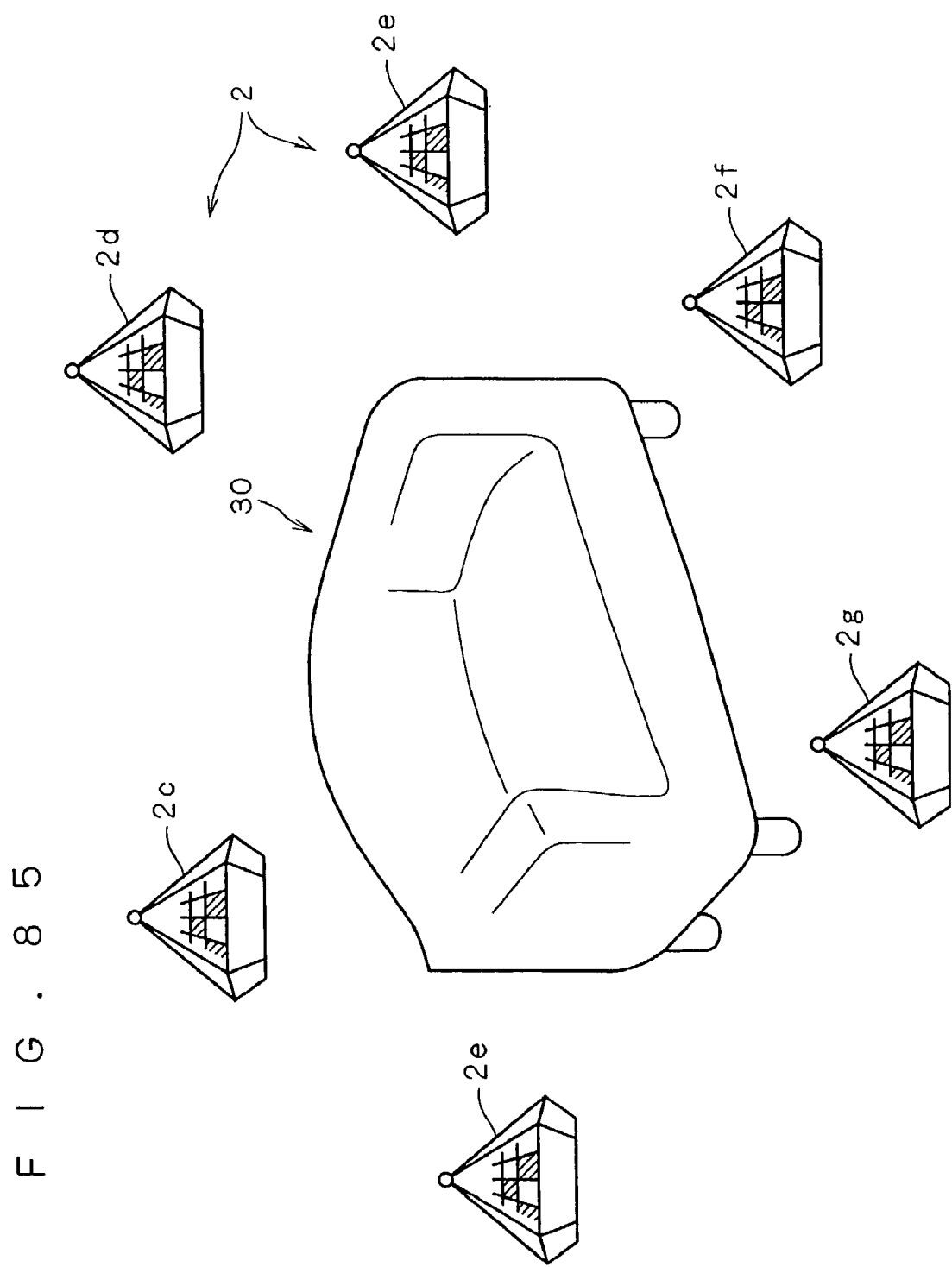
FIG. 85 is a drawing that shows a modified example related to a layout of a plurality of three-dimensional charts.

Furthermore, in the tenth and eleventh preferred embodiments, an explanation has been given of a case in which a plurality of three-dimensional charts 2 are suspended virtually above subject 30; however, the present invention is not intended to be limited by this arrangement. For example, FIG. 85 shows a modified example related to the layout of a plurality of three-dimensional charts. As shown in FIG. 85, a plurality of three-dimensional charts 2 (2*c* to 2*e*) may be arranged on a floor face on the periphery of subject 30. Even in this case, no changes are raised in the contents of the above-mentioned calculations.

While the invention has been described in detail, the foregoing description is in all aspects illustrative and not restrictive. It is understood that numerous other modifications and variations can be devised without departing from the scope of the invention.

What is claimed is:

1. An image pickup system comprising:
(a) a movable image-pickup apparatus;
(b) a reference object having a known shape in a three-dimensional space;
(c) a calibration-use information processing device; and
(d) a subject-use image-pickup apparatus for acquiring an image of a subject as second image data,
wherein said movable image-pickup apparatus includes:
(a-1) an image-pickup device for acquiring an image of said reference object as first image data;
(a-2) a driver which rotates and drives said image-pickup device with respect to a fixed portion;
(a-3) a controller which controls said driver in such a manner that, when said movable image-pickup apparatus is moved, said image-pickup device can acquire the image of said reference object;
(a-4) a first communication device for carrying out data communications with said calibration-use information processing device;
(a-5) a securing member which secures said fixed portion to another object;
(a-6) an element for finding a rotation angle from a reference orientation of said image-pickup device that has been rotated by said driver; and
(a-7) an image-pickup controller which is attached to said subject-use image-pickup apparatus by said securing member, and allows said image-pickup device to acquire said first image data in cooperation with the acquiring of said second image data by said subject-use image-pickup apparatus,
wherein said calibration-use information processing device includes:
(c-1) a second communication device for carrying out data communications with said movable image-pickup apparatus;
(c-2) a first calculator which, based upon said first image data, calculates a first parameter used for calibration for said movable image-pickup apparatus that depends on a relative position and a relative orientation of an image-pickup position of said movable image-pickup apparatus and said reference object;
(c-3) a second calculator which, based upon image data obtained by acquiring the image of said reference object, calculates a second parameter used for calibration for said subject-use image-pickup apparatus that depends on a relative position and a relative orientation of an image-pickup position of said subject-use image-pickup apparatus and said reference object;
(c-4) a third calculator which, based upon said first parameter, said second parameter and said rotation angle, calculates a third parameter used for calibration for said subject-use image-pickup apparatus that depends on a relative position and a relative orientation between an image-pickup position in a reference orientation of said movable image pickup apparatus and an image-pickup position of said subject-use image-pickup apparatus; and
(c-5) a fourth calculator which, based upon said first parameter and said third parameter, calculates a fourth parameter used for calibration for said subject-use image-pickup apparatus that depends on a relative position and a relative orientation between an image-pickup position of said subject-use image-pickup apparatus and said reference object, and
wherein said subject-use image-pickup apparatus includes:
(d-1) a third communication device for transmitting said second image data to said calibration-use information processing device.

2. An image pickup system comprising:
(a) a movable image-pickup apparatus;
(b) a reference object having a known shape in a three-dimensional space; and
(c) a calibration-use information processing device,
wherein said movable image-pickup apparatus includes:
(a-1) an image-pickup device for acquiring an image of said reference object as first image data;
(a-2) a driver which rotates and drives said image-pickup device with respect to a fixed portion;

(a-3) a controller which controls said driver in such a manner that, when said movable image-pickup apparatus is moved, said image-pickup device can acquire the image of said reference object;
(a-4) a first communication device for carrying out data communications with said calibration-use information processing device;
(a-8) a securing member which secures said fixed portion to another object;
(a-9) an element for finding a rotation angle from a reference orientation of said image-pickup device that has been rotated by said driver;
(a-10) an element for acquiring reference relative data that depends on a relative position and a relative orientation between an image-pickup position in a reference orientation of said image pickup device and said fixed portion; and
(a-11) an element which, based upon said rotation angle and said reference relative data, calculates a fifth parameter that depends on a relative position and a relative orientation between an image-pickup position of said image pickup device and said fixed portion, wherein said calibration-use information processing device includes:
(c-1) a second communication device for carrying out data communications with said movable image-pickup apparatus; and
(c-2) a first calculator which, based upon said first image data, calculates a first parameter used for calibration for said movable image-pickup apparatus that depends on a relative position and a relative orientation of an image-pickup position of said movable image-pickup apparatus and said reference object, and wherein said calibration-use information processing device calculates a sixth parameter that depends on a relative position and a relative orientation between a position of said fixed portion and said reference object based upon said fifth parameter and said first parameter.

3. A movable image-pickup device comprising:
an image pickup device which acquires first image data of a reference object having a known three-dimensional shape;
a driver which drives said image pickup device with respect to a fixed portion;
a controller which, in the case when said movable image-pickup device is shifted, controls said driver so as to allow said image pickup device to acquire an image of said reference object;
a memory which stores said first image data acquired by said image pickup device, said first image data for use to find a position of said image pickup device that has been driven by said driver;
a securing member which attaches said fixed portion to a subject-use image-pickup device that acquires an image of a subject as second image data; and
an image-pickup controller which allows said image pickup device to acquire said first image data simultaneously with an acquiring process of said second image data of said subject-use image-pickup device.

4. The moveable image-pickup device according to claim 3, wherein said driver rotates said image pickup device.

5. The movable image-pickup device according to claim 4, further comprising an element for finding a rotation angle from a reference orientation of said image pickup device that has been rotated by said driver.

6. The movable image-pickup device according to claim 3, further comprising a communication device which transmits said first image data to said subject-use image-pickup device or an information processing device.

7. The movable image-pickup device according to claim 3, further comprising:
an image processing unit which receives said first image data acquired by said image pickup device and carries out image processing on said first image data,
wherein said memory stores said first image data processed by said image processing unit.

* * * * *